US006233242B1

(12) United States Patent
Mayer et al.

(10) Patent No.: US 6,233,242 B1
(45) Date of Patent: May 15, 2001

(54) NETWORK SWITCH WITH SHARED MEMORY SYSTEM

(75) Inventors: Dale J. Mayer; Roger Richter; Michael L. Witkowski; Gary B. Kotzur; Patricia E. Hareski; William J. Walker, all of Harris County, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/774,557

(22) Filed: Dec. 30, 1996

(51) Int. Cl.[7] .......... H04L 12/46
(52) U.S. Cl. .......... 370/412; 370/392; 370/401
(58) Field of Search .......... 370/392, 400, 370/399, 401, 402, 449, 412, 428

(56) References Cited

U.S. PATENT DOCUMENTS

| | | | |
|---|---|---|---|
| 4,597,078 | 6/1986 | Kempf | 370/94 |
| 5,179,552 | 1/1993 | Chao . | |
| 5,274,631 | 12/1993 | Bhardwaj . | |

(List continued on next page.)

OTHER PUBLICATIONS

Security Feature for Local Area Network Switches (XP 000638255), IBM Technical Disclosure Bulletin, vol. 39, No. 09, Sep. 1996, pp. 137–143.
Kremien, Orly and Yehuda Shvager, Memory Management for Taken–Bus LAN (XP 002012717), Motorola Technical Developments, vol. 6, Oct. 1986, pp. 20–23.
K.Eng, M. Karol and Y. Yeh "A Growable Packet (ATM) Switch Architecture: Design Principles and Applications", *IEEE Transactions on Communications*, vol. 40, No. 2, Feb. 1992, pp. 423–430.
Y. Yeh, M. Hluchyj and A. Acampora "The Knockout Switch: A Simple, Modular Architecture for High–Performance Packet Switching", *IEEE Transactions on Communications*, vol. SAC–5, No. 8, Oct. 1987, pp. 1274–1283.

M. Karol, M. Hluchyj, S. Morgan, "Input Versus Output Queuing on a Space–Division Packet Switch" *IEEE Transactions on Communications*, vol. COM–35, No. 12, Dec. 1987, pp. 1347–1356.

*Primary Examiner*—Chi H. Pham
*Assistant Examiner*—Frank Duong
(74) *Attorney, Agent, or Firm*—Akin, Gump, Strauss, Hauer & Feld, LLP

(57) ABSTRACT

A network switch including a central memory that stores device identification information, port numbers, control information, and packet data received at the ports of the switch. The memory includes a packet section that stores packet data and a device identification section that stores identification entries, where each entry corresponds to a network device coupled to a port of the switch. The switch includes a switch manager to control data flow between the ports and the central memory. Each of the identification entries includes a unique network address to identify one of the network devices and a port number to identify one of the network ports. Each of the identification entries is located within the central memory at a hash address derived by hashing the unique network address. Hash logic receives and hashes each network address to determine a hash address, which is used to access the identification entries. The memory is organized into a chain structure to enable quick access of entries. The switch manager further includes a control memory for storing control registers, including a freepool control register for identifying a freepool chain of memory sectors, a receive control register for identifying a corresponding receive sector chain and a transmit control register for identifying a corresponding transmit packet chain for each of the ports.

27 Claims, 44 Drawing Sheets

U.S. PATENT DOCUMENTS

| | | | | |
|---|---|---|---|---|
| 5,361,255 | | 11/1994 | Diaz et al. . | |
| 5,438,567 | | 8/1995 | Ikeda . | |
| 5,451,936 | | 9/1995 | Yang et al. . | |
| 5,583,861 | | 12/1996 | Holden . | |
| 5,633,865 | * | 5/1997 | Short | 370/412 |
| 5,636,210 | | 6/1997 | Agrawal . | |
| 5,689,644 | * | 11/1997 | Chou et al. | 370/392 |
| 5,740,171 | * | 4/1998 | Mazzola et al. | 370/401 |
| 5,742,760 | * | 4/1998 | Picazo, Jr. et al. | 370/401 |
| 5,757,795 | * | 5/1998 | Schnell | 370/401 |
| 5,764,634 | * | 6/1998 | Christensen et al. | 370/401 |
| 5,802,052 | * | 9/1998 | Venkataraman | 370/395 |

* cited by examiner

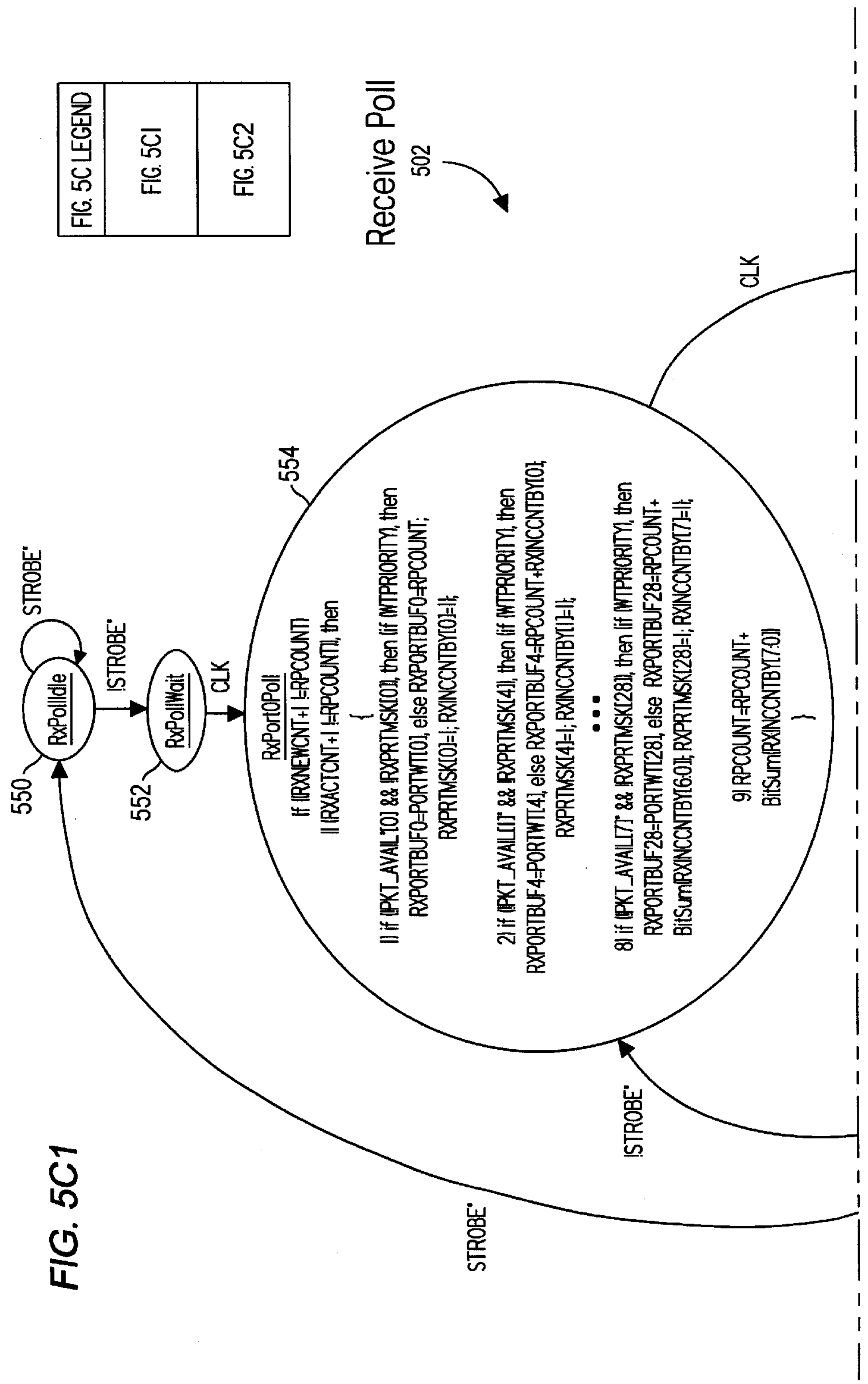
FIG. 5C1

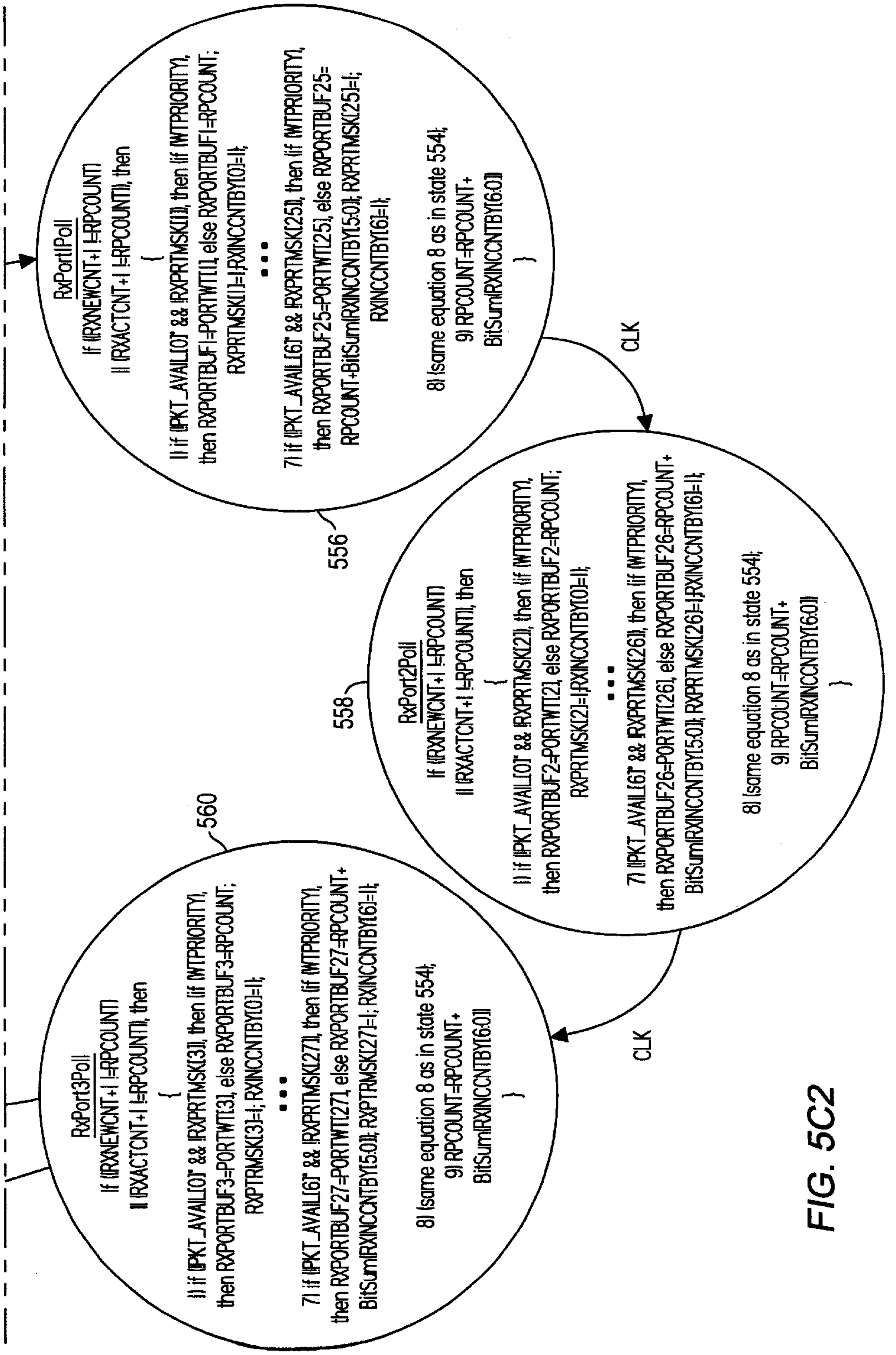
*FIG. 5C2*

FIG. 5D1
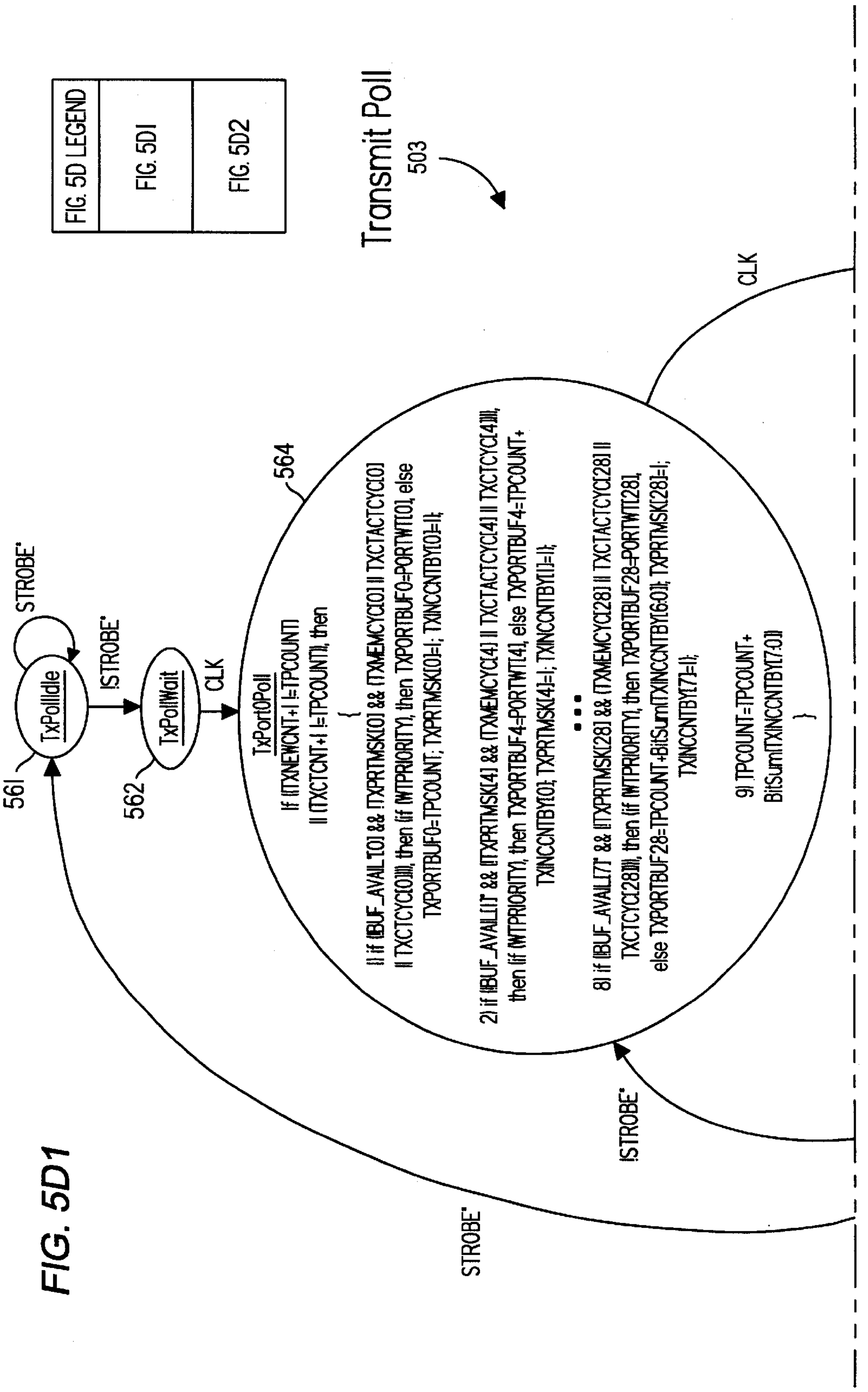

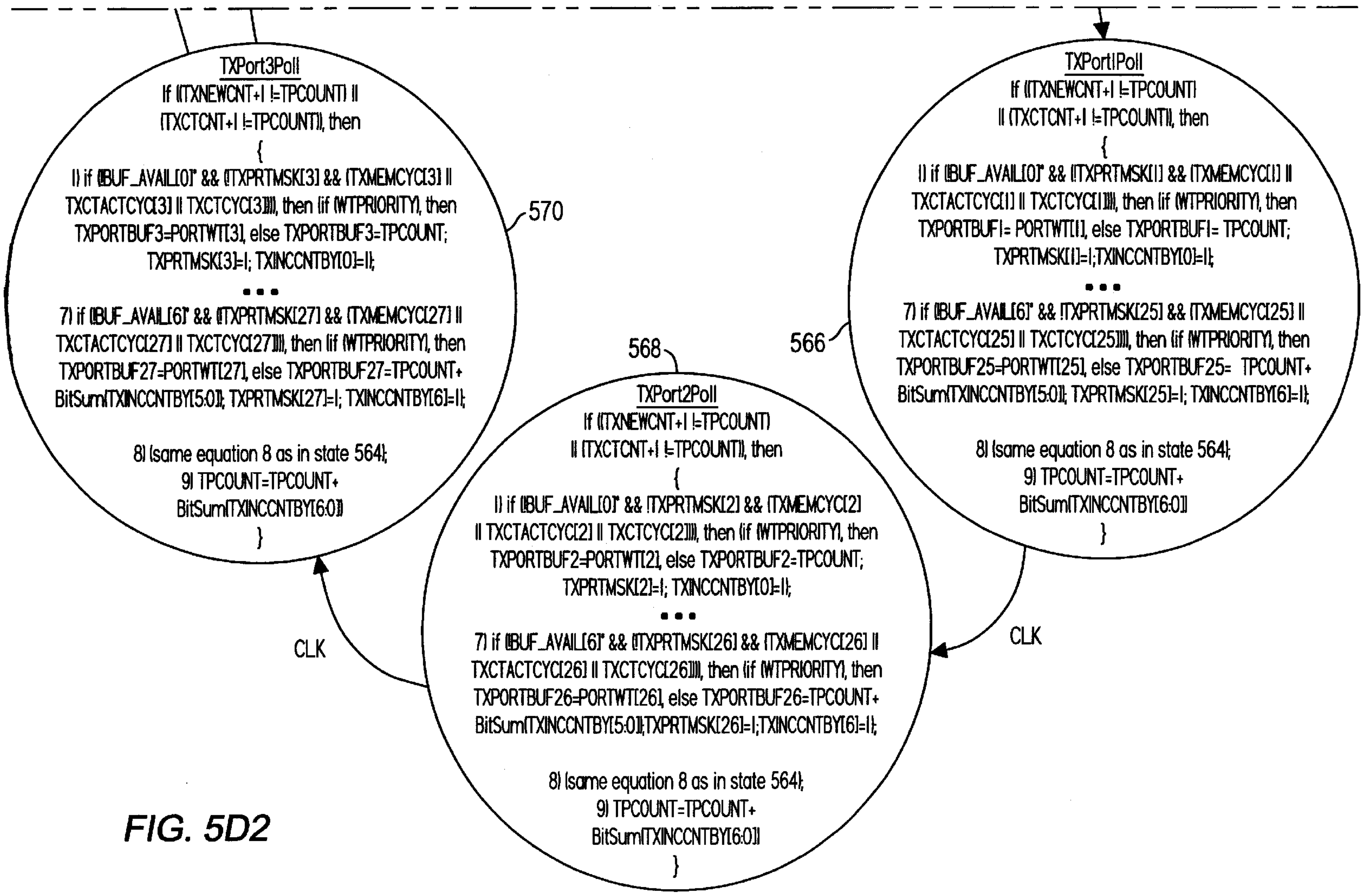
FIG. 5D2

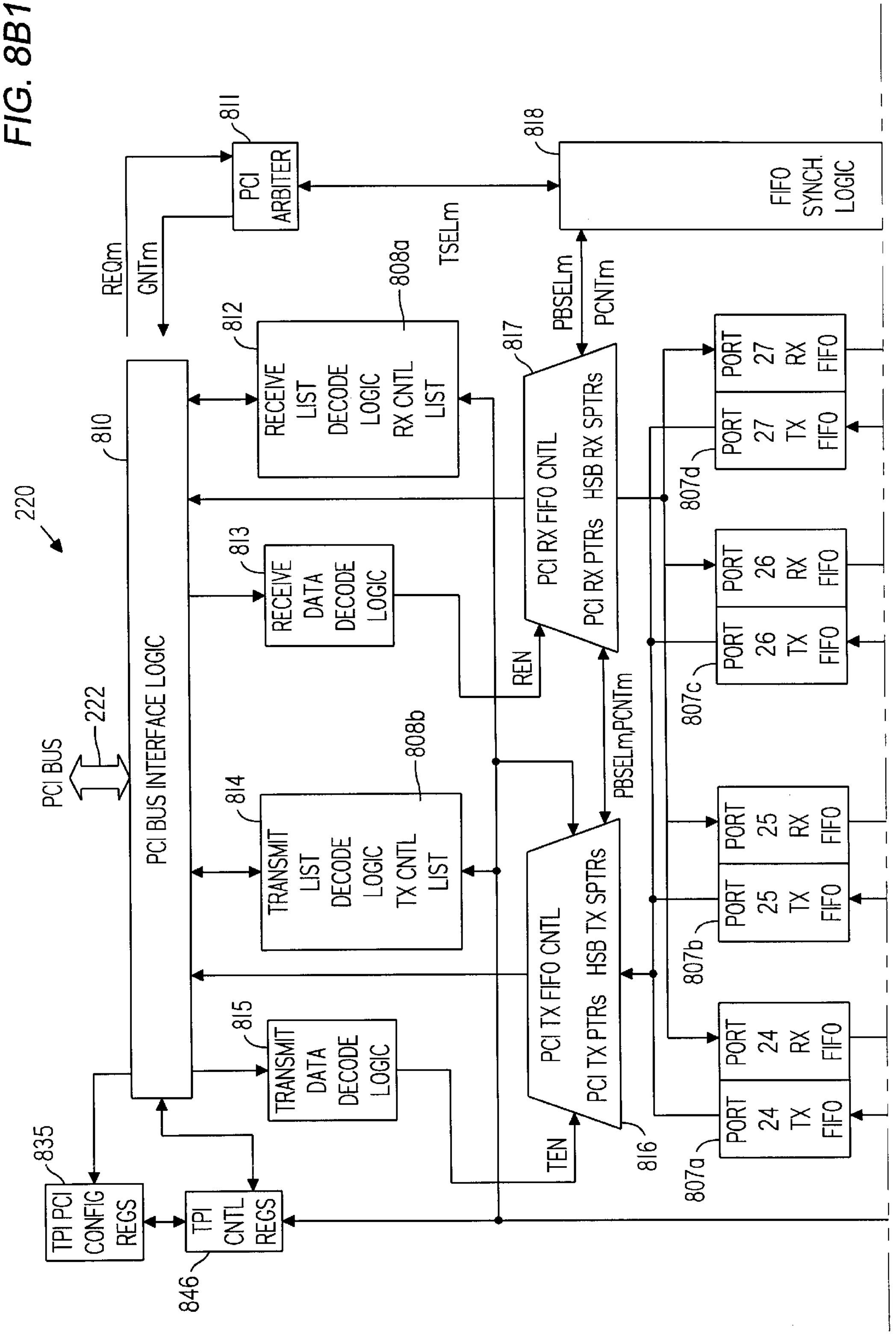
FIG. 8B1

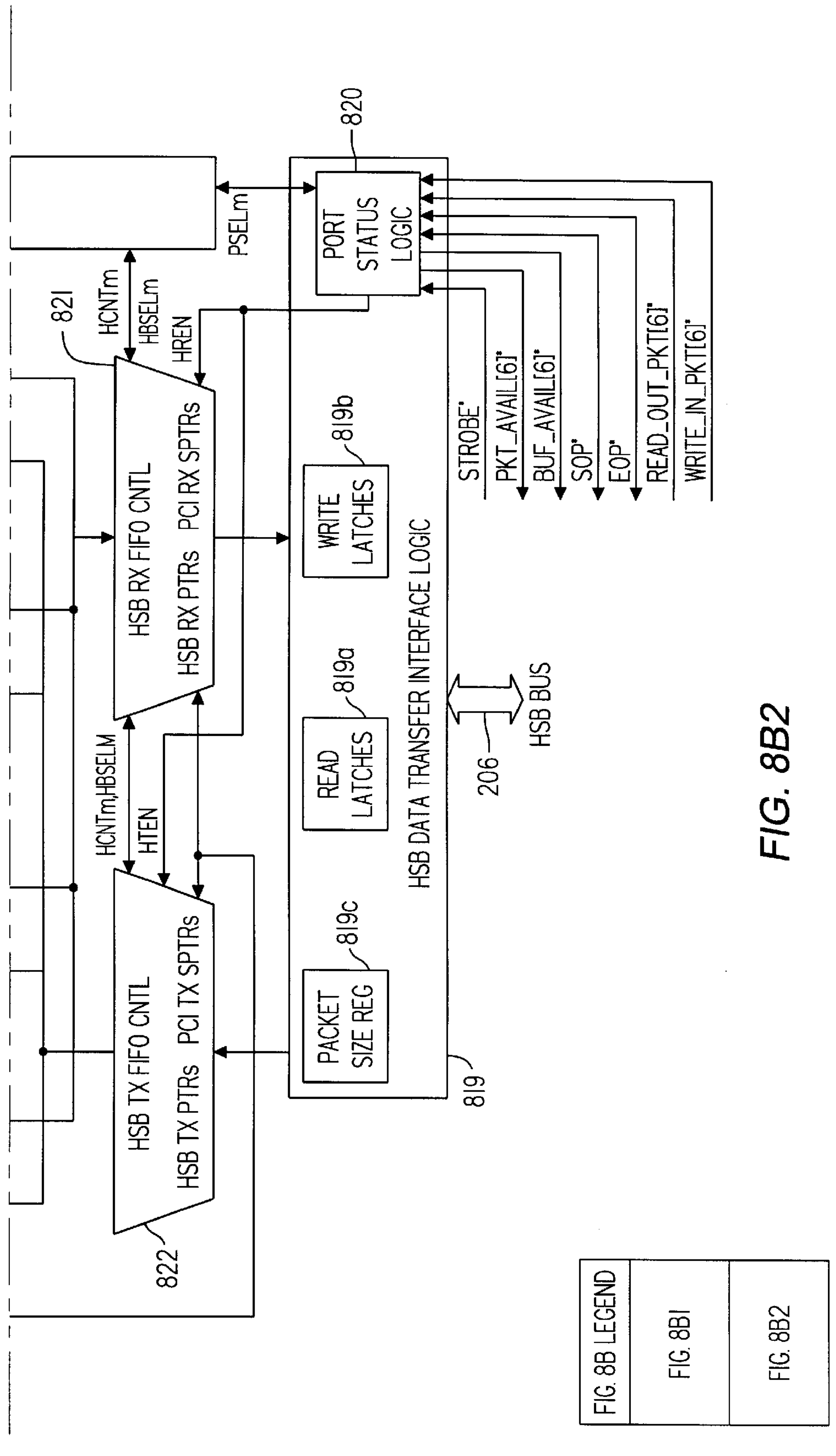
FIG. 8B2

| BIT 31 | | BIT 0 | |
|---|---|---|---|
| FORWARD POINTER | | | 831 |
| PACKET_SIZE 832a | | CSTAT | 832b |
| COUNT | | | 833 |
| DATA POINTER | | | 834 |

830

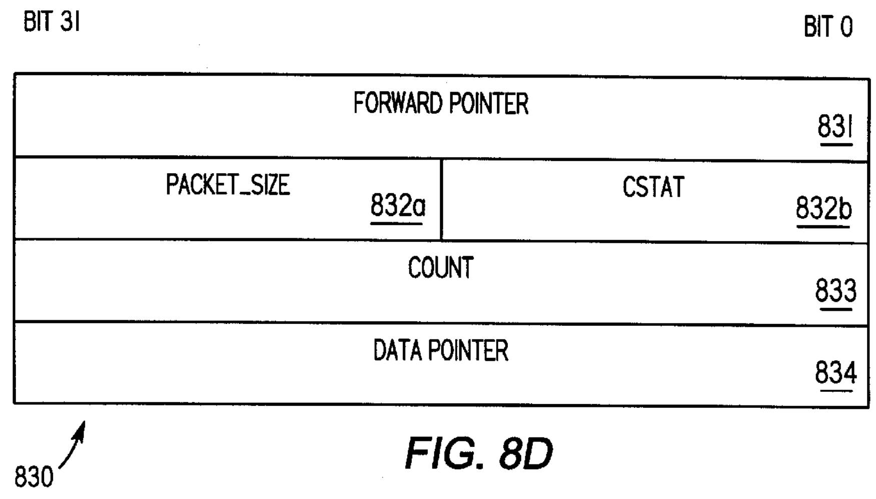

*FIG. 8D*

| BIT 31 | | | BIT 0 | |
|---|---|---|---|---|
| DEVICE_ID | 836a | | VENDOR_ID | 836b |
| STATUS | 837a | | COMMAND | 837b |
| CLASS_CODE | | 838a | REV_ID | 838b |
| BIST 839a | HDR_TYPE 839b | LATENCY 839c | CACHELSZ | 839d |
| TPI CONTROL IO BASE ADDRESS | | | | 840 |
| TPI CONTROL MEMORY BASE ADDRESS | | | | 841 |
| TRANSMIT LIST MEMORY BASE ADDRESS | | | | 842 |
| RECEIVE LIST MEMORY BASE ADDRESS | | | | 843 |
| PACKET DATA MEMORY BASE ADDRESS | | | | 844 |
| MAXLAT 845a | MINGNT 845b | INTPIN 845c | INTLINE | 845d |

835

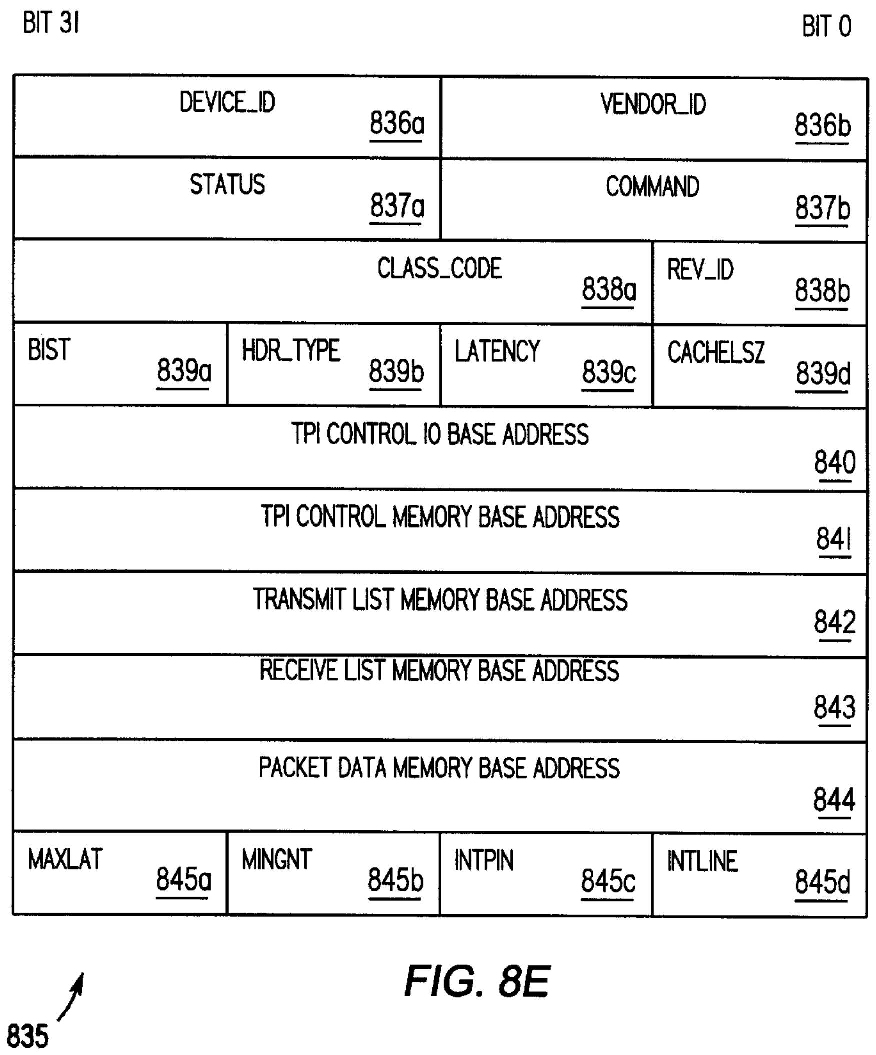

*FIG. 8E*

BIT 31 BIT 0

| | | | |
|---|---|---|---|
| 0 847a | | RCV_DATA_COUNT 847b | |
| XBSIZE3 848a | XBSIZE2 848b | XBSIZE1 848c | XBSIZE0 848d |
| RBSIZE3 849a | RBSIZE2 849b | RBSIZE1 849c | RBSIZE0 849d |
| NET_PRI3 850a | NET_PRI2 850b | NET_PRI1 850c | NET_PRI0 850d |
| TLAN0 MEMORY BASE ADDRESS (PORT 24) 851 | | | |
| TLAN1 MEMORY BASE ADDRESS (PORT 25) 852 | | | |
| TLAN2 MEMORY BASE ADDRESS (PORT 26) 853 | | | |
| TLAN3 MEMORY BASE ADDRESS (PORT 27) 854 | | | |

| | | | | |
|---|---|---|---|---|
| Link A31-24 | Link A23-16 | Link A15-8 | Link A7-4,0000 | Bytes F-C |
| VLAN Byte 3 | VLAN Byte 2 | VLAN Byte 1 | VLAN Byte 0 | Bytes B-8 |
| Control / Age | Port Num | Address Byte 5 | Address Byte 4 | Bytes 7-4 |
| Address Byte 3 | Address Byte 2 | Address Byte 1 | Address Byte 0 | Bytes 3-0 |

*Broadcast Packet Header*

922

| Contents | | | Bytes |
|---|---|---|---|
| Reserved | | | Bytes 127-124 |
| Port 28 NextTxLink A31:4, 00, NextPktSnF, NextPktBC | | | Bytes 123-120 |
| ⋮ | | ⋮ | |
| Port 1 NextTxLink A31:4, 00, NextPktSnF, NextPktBC | | | Bytes 15-12 |
| Port 0 NextTxLink A31:4, 00, NextPktSnF, NextPktBC | | | Bytes 11-8 |
| BC_Ports bit map | | | Bytes 7-4 |
| DestPort | SourcePort | 0, PktLength | Bytes 3-0 |

FIG. 9G

*MCB Pkt Control Registers per port (located in SRAM)*

1102

| | Byte 3 | Byte 2 | Byte 1 | Byte 0 | Sram Addresses (D800_0xxxh base) Port0, 1, ..., 28 |
|---|---|---|---|---|---|
| 1104 | RxBasePtr[31:4], 0000 | | | | 000h, 004h, .., 070h |
| 1104 | RxCurPtr[31:4], RxBC, RxIP, MultiSecPkt, SnF | | | | 080h, 084h, .., 0F0h |
| 1104 | Reserved[31:17], MidCT | | RxPktLn[15:0] | | 100h, 104h, .., 170h |
| 1104 | RxSecThreshold[15:0] | | RxSecCnt[15:0] | | 180h, 184h, .., 1F0h |
| 1104 | EndOfTxQPtr[31:4], 000, EOQ_BC | | | | 200h, 204h, .., 270h |
| 1106 | TxBasePtr[31:4], 0000 | | | | 280h, 284h, .., 2F0h |
| 1106 | TxCurPtr[31:2], TxBC, TxIP, TxPrefix, TxSnF | | | | 300h, 304h, .., 370h |
| 1106 | Reserved[31:24] | TxSrcPort[7:0] | TxPktLn[15:0] | | 380h, 384h, .., 3F0h |
| 1106 | TxPktThreshold[15:0] | | TxPktCnt[15:0] | | 400h, 404h, .., 470h |

FIG. 11A

*Other SRAM base packet control registers*

1108

| Byte 3 | Byte 2 | Byte 1 | Byte 0 | Sram Addresses (D800_0xxxh base) |
|---|---|---|---|---|
| NextFreeSecPtr[31:11], Rsvd[10:0] (Not used by EPSM) | | | | 074h |
| LastFreeSecPtr[31:11], Rsvd[10:0] (Not used by EPSM) | | | | 078h |
| FreeSecThreshold[15:0] | | FreeSecCnt[15:0] | | 07Ch |
| BC_PktThreshold[15:0] | | BC_PktCnt[15:0] | | 0F4h |

FIG. 11B

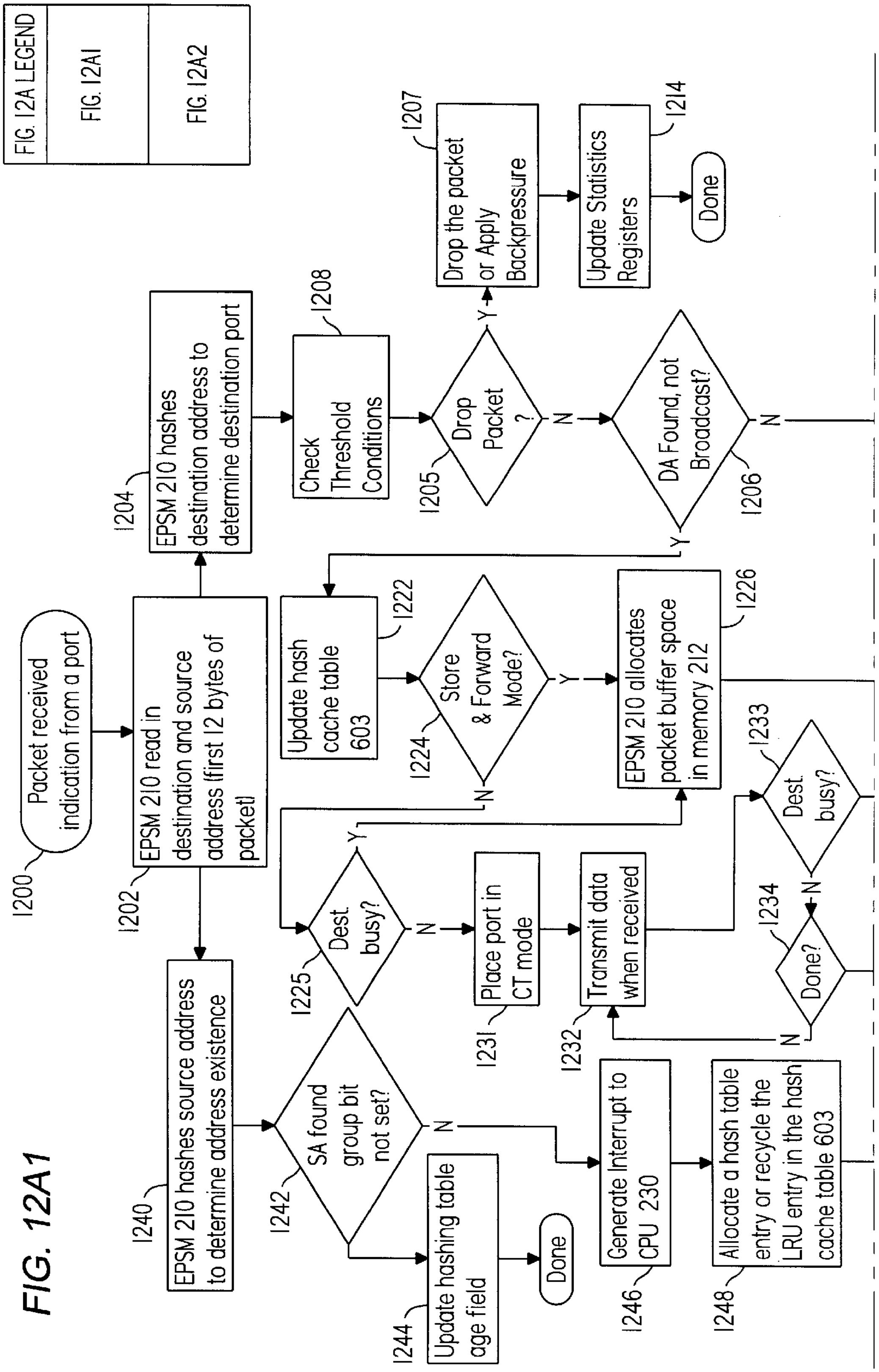
FIG. 12A1

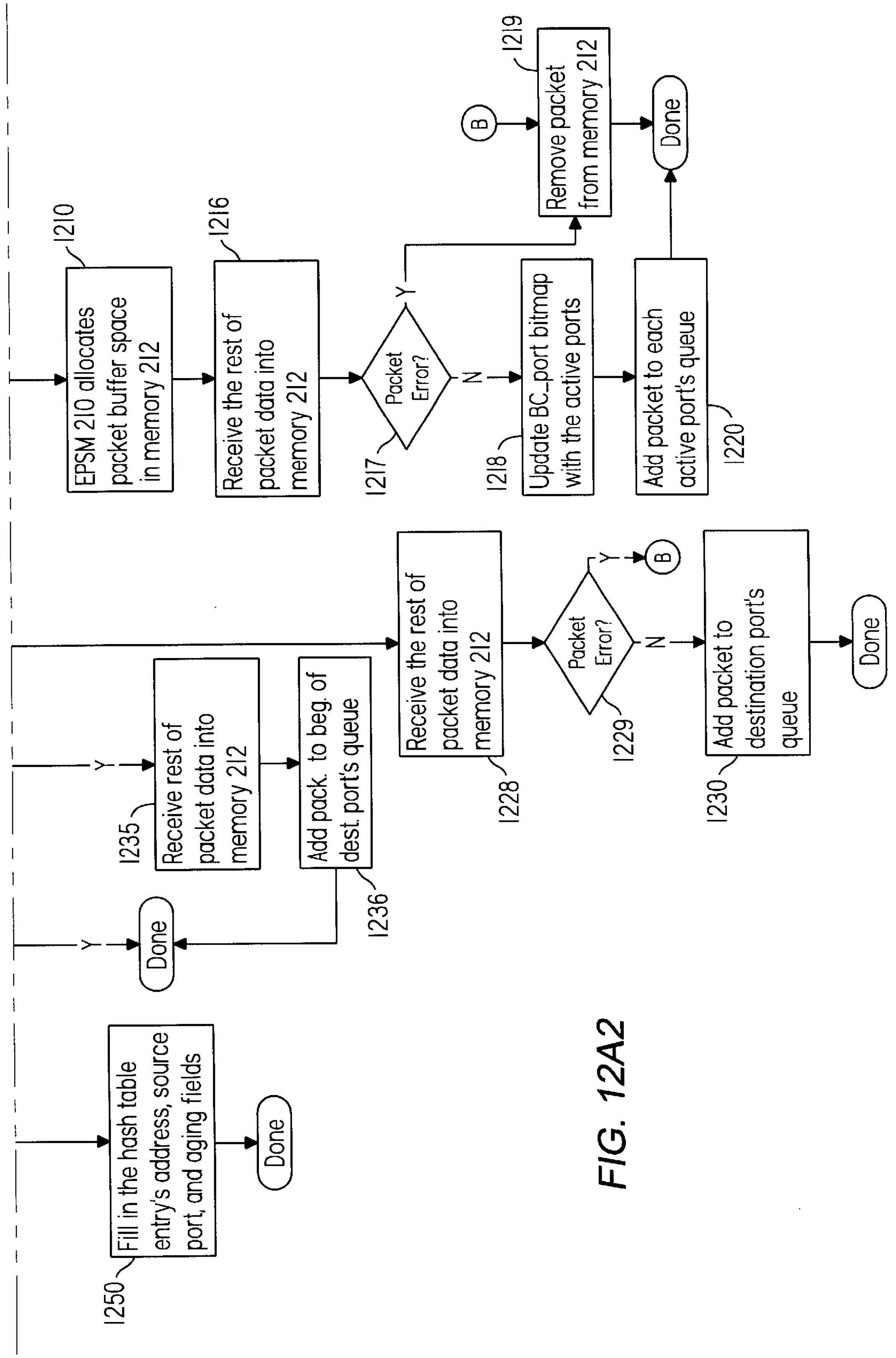
FIG. 12A2

NETWORK SWITCH WITH SHARED MEMORY SYSTEM

CROSS REFERENCE TO RELATED APPLICATIONS

The present application is related to the following U.S. applications: U.S. application Ser. No. 08/774,605 entitled "Network Switch with Multiple Bus Architecture" by Walker et al; U.S. application Ser. No. 08/774,601 entitled "A Programmable Arbitration System for Determining Priority of the Ports of a Network Switch" by Kotzur et al; U.S. application Ser. No. 08/774,602 entitled "Multiport Polling System for a Network Switch" by Walker et al; U.S. application Ser. No. 08/774,555 entitled "Network Switch with Separate Cut-through Buffer" Kotzur et al; U.S. application Ser. No. 08/774,553 entitled "Network Switch with Statistics Read Accesses" by Hareski et al; U.S. application Ser. No. 08/744,524 entitled "Network Switch with Dynamic Backpressure Per Port" by Witkowski et al; U.S. application Ser. No. 08/777,501 entitled "A Network Switch With a Multiple Bus Structure and a Bridge Interface for Transferring Network Data Between Different Buses" by Witkowski et al; and U.S. application Ser. No. 08/774,547 entitled "Method and System for Performing Concurrent Read and Write Cycles in a Network Switch" by Walker et al, all of which have at least one common inventor, are commonly assigned and are filed concurrently with the present application.

FIELD OF THE INVENTION

The present invention relates to the field of networking devices, and more particularly to a network switch including a shared memory system.

DESCRIPTION OF THE RELATED ART

There are many different types of networks and network systems for sharing files and resources or for otherwise enabling communication between two or more computers. Networks may be categorized based on various features and functions, such as message capacity, range over which the nodes are distributed, node or computer types, node relationships, topology or logical and/or physical layout, architecture or structure based on cable type and data packet format, access possibilities, etc. For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc.

The structure of a network generally refers to the cabling or media and media access used as well as the packet structure of the data transmitted across the media. Various structures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network structures using coaxial, twisted pair or fiber-optic cables for operation at 2.5 Mbps. Token Ring topologies use special IBM cable or fiber-optic cable for operation between 1–16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs) as well as various other devices on the network, such as repeaters, bridges, switches, routers, brouters, to name a few examples. A network operating according to a given communications protocol may be expanded by using one or more repeaters, bridges or switches. A repeater is a hardware device that functions at the physical layer and re-transmits each received packet to every other port. A bridge operates at the data link layer of OSI Reference Model and increases efficiency by filtering packets to reduce the amount of unnecessary packet propagation on each network segment.

A network switch is similar in function to, yet more efficient than, a multiport bridge, which includes a plurality of ports for coupling to several similar networks for directing network traffic among the networks. A network switch usually includes a switching matrix coupled to the ports across a bus and memory for temporarily storing network data, such as Ethernet packets or the like. The particular memory configuration for switches often included static random access memory (SRAM) modules distributed throughout the switch for performing various functions. Many switches, for example, included a separate SRAM memory device for each network port for buffering purposes. An SRAM device was also provided for management functions, such as a hash lookup table and related statistical information, and a separate SRAM device was provided as the primary buffer memory for storing data packets being transferred between ports. An alternative type of port-distributed memory is known as content addressable memory (CAM), where each port required a dedicated CAM.

SRAMs generally provided greater performance as compared to other types of memory, such as dynamic RAM (DRAM). Also, SRAMs were commonly used because they are non-volatile and thus do not require refresh overhead. In standard switch configurations, refresh cycles would otherwise consume valuable processor resources. However, SRAM devices, as well as CAM devices, are relatively expensive. Also, SRAM devices are relatively large and consume valuable real-estate and appreciable amounts of power. The use of distributed port-distributed SRAM or CAMs caused performance limitations, including a limit on the number of addresses that could be supported per port. The use of distributed SRAMs also caused extra time to access the data in the buffer for hash lookup purposes. For example, one SRAM device included a list of link address pointers to the buffer contents, while another SRAM implemented the actual buffer. Thus, at least two separate memory accesses were required to access data within the buffer.

In summary, due to the size and cost of SRAM devices, switch designers distributed the memory throughout the switch and limited the size of each memory device to save cost and printed circuit board resources. It is desired to maintain the advantages switch memory systems while also eliminating many of the inherent limitations and problems while also reducing cost.

SUMMARY OF THE INVENTION

A network switch according to the present invention for enabling communication among a plurality of network devices includes a central memory that stores device identification information, port numbers and other control information, and that buffers the actual packet data received at the ports. The central memory is organized to include a packet section to temporarily store packet data and a network device identification section to store a plurality of identification entries, where each entry corresponds to a network device coupled to a port of the switch. The switch further includes a switch manager that controls data flow between the network ports and the central memory. The network switch is useful to enable communication in a network system including a plurality of networks coupled to the switch ports, where each network includes one or more network devices.

Each of the identification entries includes a unique network address to identify one of the network devices and a port number to identify one of the network ports. The unique address is typically a media access control (MAC) address to ensure uniqueness among network devices in the industry. Each of the identification entries further includes a group bitmap number to identify a subset of the network ports according to a virtual local area network (VLAN).

Each of the identification entries is preferably located within the central memory at a hash address derived by hashing the unique network address. The switch manager further includes hash logic that receives and hashes the network addresses to determine the hash address, and that uses the hash address to access the identification entries within the central memory. The hash logic preferably includes a cache memory that retrieves and stores data from the central memory to enhance performance of the network switch.

The network device identification section is organized into a primary section and a chained section. The primary section stores identification entries corresponding to the first occurrence of each hash address, and the chained section stores identification entries corresponding to subsequent occurrences of the same hash address for different MAC addresses. Each of the identification entries further includes a link address to another identification entry within the chained section in the event of duplicate hash addresses. The use of a separate memory of link addresses is eliminated so that the port information for the first entry is immediately available. The chain structure enables quick access of entries corresponding to duplicate hash entries.

The packet section is organized into a plurality of sectors, where each of the sectors includes a packet section and a corresponding sector information block. The packet section stores packet data, where each packet of data is stored in a packet data block. The sector information block includes a sector packet count identifying the number of packet data blocks stored in the packet section. The memory sectors are initially organized into a freepool chain of sectors, where the sector information block of each sector includes a link address to a next sector in the freepool chain. The switch manager includes a processor, which executes code within an associated memory and performs the initial organization. The switch manager forms a receive sector chain within the central memory for each of the network ports receiving packets of data for storage by allocating at least one sector from the freepool chain, linking allocated sectors into a receive sector chain using the link addresses, and storing the packets of data received from a network port into the receive sector chain.

A switch manager according to the present invention also performs dynamic memory sector allocation, which allows the number of sectors for each receive sector chain to grow or shrink as necessary. Fixed allocation tends to under-utilize the memory for smaller packets or to consume bandwidth for packets larger than the fixed size. In particular, for each packet of data to be stored, the switch manager determines if a packet section of a current sector in the receive sector chain is large enough to store a received packet of data, and if not, allocates a subsequent sector from the freepool chain, and then stores the packet into the current sector and into the subsequent sector, if allocated. It is noted that a packet of data in each packet data block may span two sectors.

Each packet data block includes a packet block header, where the packet block header includes a packet length value identifying the amount of packet data therein. The packet block header further includes a transmit link address to a next sector holding subsequent data for one of the network ports, thereby forming a transmit packet chain for the network port. The switch manager forms a transmit packet chain for each network port from which stored data is to be transmitted. The switch manager retrieves packets of data from the sectors of each of the receive sector chains in an order specified by each transmit packet chain. The switch manager provides the packets of data to a corresponding transmit port, and when a sector is empty, replaces the empty sector back into the freepool chain.

The packet block header is a broadcast packet header if the packet data is intended to be transmitted to more than one of the network ports. Packets are broadcast to all of the other ports, or to other related grouped ports according to the VLAN bitmap, if a broadcast bit is set in the packet or if the destination port is not known. The broadcast packet header includes a transmit link address for each network port to maintain each of the transmit packet chains for each of the network ports from which the packet of data is to be transmitted.

The switch manager further includes a freepool control register to identify the freepool chain, a receive control register to identify a corresponding receive sector chain for each of the network ports receiving data for storage, and a transmit control register to identify a corresponding transmit packet chain for each of the network ports from which stored data is to be transmitted. Each receive control register preferably includes a receive base pointer, a current data store pointer, a receive packet data length value, a value indicating a number of receive sectors, and a pointer to a last data packet in a corresponding transmit packet chain. The transmit control register preferably includes a transmit base pointer, a current data retrieval pointer, a transmit packet data length value and a value indicating a number of transmit packet data blocks. The control memory preferably comprises SRAM embedded within the switch manager.

In the preferred embodiment, the central memory of the network switch is DRAM type memory. Although DRAM typically does not have the performance level of SRAM, the performance the central memory is enhanced since it is consolidated and since the switch manager controls the memory rather than the processor. The switch manager is preferably implemented as an application specific integrated circuit (ASIC) which may be operated faster than many processors. Further, the switch manager handles the refresh functions alleviating the processor from a significant amount of overhead associated with DRAM. The refresh cycles are significantly less than one percent (approximately 0.01%) of the overall bandwidth of memory accesses, so that the refresh overhead is relatively insignificant for the switch manager.

The use of a centralized DRAM enables other performance enhancements as well. The size of the memory is easily upgraded from 4 Megabytes (MB) up to 16 MB or more as desired without significant cost. The memory stores the packet data as well as the port identification information. In particular, the central memory stores the hash tables, the source and destination MAC addresses as well as port count numbers and thresholds in a central memory device, thereby improving memory efficiency and utilization. The network switch preferably includes a memory controller, which detects and supports multiple types of DRAM. In particular, the memory manager is capable of operation with fast page mode (FPM) DRAM, extended data output (EDO) DRAM and synchronous mode DRAM.

BRIEF DESCRIPTION OF THE DRAWINGS

A better understanding of the present invention can be obtained when the following detailed description of the preferred embodiment is considered in conjunction with the following drawings, in which:

FIG. 5C is a state diagram illustrating operation of the receive poll state machine within the bus controller block of FIG. 5A;

FIG. 5D is a state diagram illustrating operation of the transmit poll state machine within the bus controller block of FIG. 5A;

FIG. 8B is a more detailed block diagram of the TPI;

FIG. 8D is a diagram illustrating the general format of a control list for execution by any of the TLANs;

FIG. 8E is a diagram illustrating a definition of TPI peripheral component interconnect (PCI) configuration registers used by the TPI associated with the PCI bus of FIG. 2;

FIG. 8F is a diagram illustrating the definition of the TPI control registers used by the TPI;

FIGS. 9A–9H are block diagrams illustrating the organization of the memory of FIG. 2;

FIGS. 11A and 11B are block diagrams illustrating the organization of the static memory of FIG. 6;

FIG. 12A is a flowchart diagram illustrating the general operation of the network switch of FIG. 2 for receiving data packets into memory and for transmitting data packets in cut-through mode of operation;

DETAILED DESCRIPTION OF THE PREFERRED EMBODIMENT

Figure 1:
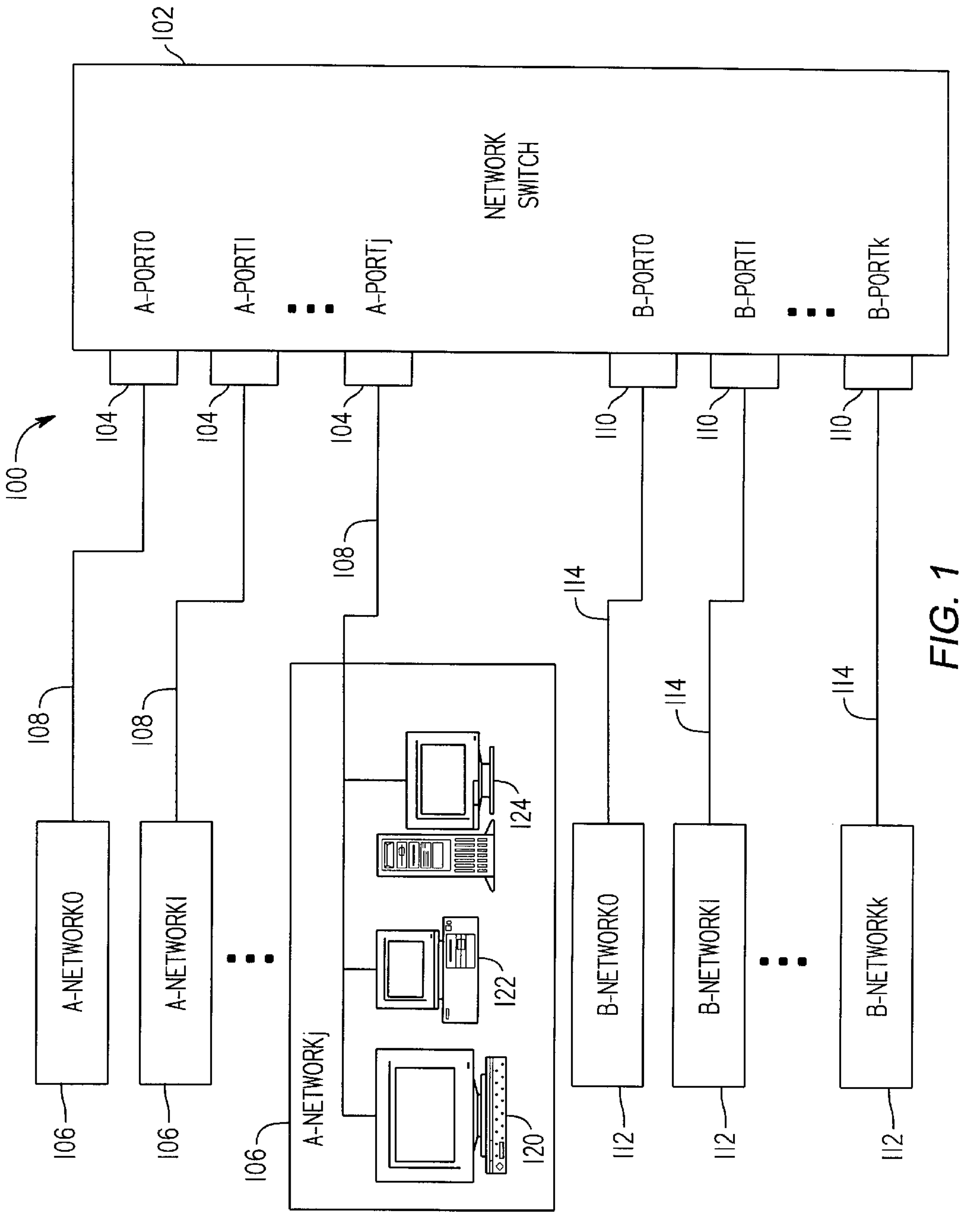
FIG. 1 is a simplified diagram of a network system including a network switch according to the present invention.

Referring now to FIG. 1, a simplified network diagram is shown of a network system 100 including a network switch 102 implemented according to the present invention. The network switch 102 includes one or more “A” ports 104, each for coupling to and communicating with one of several “A” networks 106 through an appropriate media segment 108. Each media segment 108 is any type of media for connecting network devices, such as twisted-pair wire cable, fiber optic cable, etc. The ports 104 enable bidirectional communication or data flow between the network switch 102 and each of the networks 106. Such bidirectional data flow is according to any one of several modes, such as half-duplex mode or full-duplex mode, for example. As shown in FIG. 1, there are up to “j”+1 networks 106 individually labeled A-NETWORK0, A-NETWORK1, . . . A-NETWORKj, where each network 106 is coupled to the network switch 102 through a corresponding one of the j+1 ports 104, individually labeled A-PORT0, A-PORT1, . . . , A-PORTj. The network switch 102 may include any desirable number of ports 104 for coupling up to an associated number of networks 106. In the embodiment described herein, j is an integer number equal to 23 for a total of 24 ports for coupling up to 24 networks 106, where these ports will be referred to collectively as ports 104, or individually as ports PORT0, PORT1, PORT2, . . . , PORT23, respectively.

In a similar manner, the network switch 102 further includes one or more “B” ports 110, each for coupling to and interfacing a “B” network 112 through an appropriate media segment 114. Again, each media segment 114 is any type of media for connecting network devices, such as twisted-pair wire cable, fiber optic cable, etc. The ports 110 are also bidirectional for enabling data flow between the network switch 102 and the networks 112 in a similar manner as described for the ports 104. In the embodiment shown, there are “k”+1 ports 110, individually labeled B-PORT0, B-PORT1, . . . , B-PORTk, for connecting up to k+1 networks 112, individually labeled B-NETWORK0, B-NETWORK1, . . . B-NETWORKk. The network switch 102 may include any desirable number of ports 110 for coupling up to an associated number of networks 112. In the specific embodiment shown, k is an integer equal to 3 for a total of 4 ports 110 for coupling up to four networks 112. The “A” type ports and networks operate at a different network protocol and/or speed than the “B” type ports and networks. In the specific embodiment shown, the ports 104 and networks 106 operate according to the Ethernet protocol at 10 Megabits per second (Mbps), while the ports 110 and networks 112 operate according to the Ethernet protocol at 100 Mbps. The ports B-PORT0, B-PORT1, . . . B-PORT3 will be referred to herein collectively as the ports 110 and individually as PORT24, PORT25, . . . , PORT27, respectively.

The networks 106 and 112 include one or more data devices or data terminal equipment (DTE) that allows either input or output of data, or any type of network device for connecting together one or more data devices. Thus, any of the networks, such as A-NETWORK0 or B-NETWORK1, etc., may each include one or more computers, network interface cards (NICs), work stations, file servers, modems, printers, or any other device that receives or transmits data in a network, such as repeaters, switches, routers, hubs, concentrators, etc. For example, as shown in FIG. 1, several computer systems or workstations 120, 122 and 124 are coupled to the corresponding segment 108 of A-NETWORKj. The computer systems 120, 122 and 124 may communicate with each other or with other devices of other networks through the network switch 102. Thus, each network 106 and 112 represents one or more data devices coupled through one or more segments, where the network switch 102 transfers data between any two or more data devices in any of the networks 106 and 112.

The network switch 102 generally operates to receive information from data devices coupled to each of the ports 104 and 110 and to route the information to any one or more of the other ports 104 and 110. The network switch 102 also filters the information by dropping or otherwise ignoring information received from a data device in one network 106 or 112 that is only intended for data devices in that same network. The data or information is in the form of packets, where the particular form of each data packet depends upon the protocol supported by a given network. A packet is a predefined block of bytes, which generally consists of header, data, and trailer, where the format of a given packet depends on the protocol that created the packet. The header usually includes a destination address identifying the destination data device and a source address identifying a data device originating the packet, which addresses are typically media access control (MAC) addresses to ensure uniqueness in the industry. A packet intended for one destination device is referred to herein as a unicast packet. The header further includes a GROUP bit indicating whether the packet is a multicast or broadcast (BC) packet intended for multiple destination devices. If the GROUP bit is set to logic one (1), then it is considered a multicast packet, and if all of the destination address bits are also set to logic 1, the packet is a BC packet. However, for purposes of the present invention, multicast and BC packets are treated the same and will be referred to hereinafter as BC packets.

Figure 2:
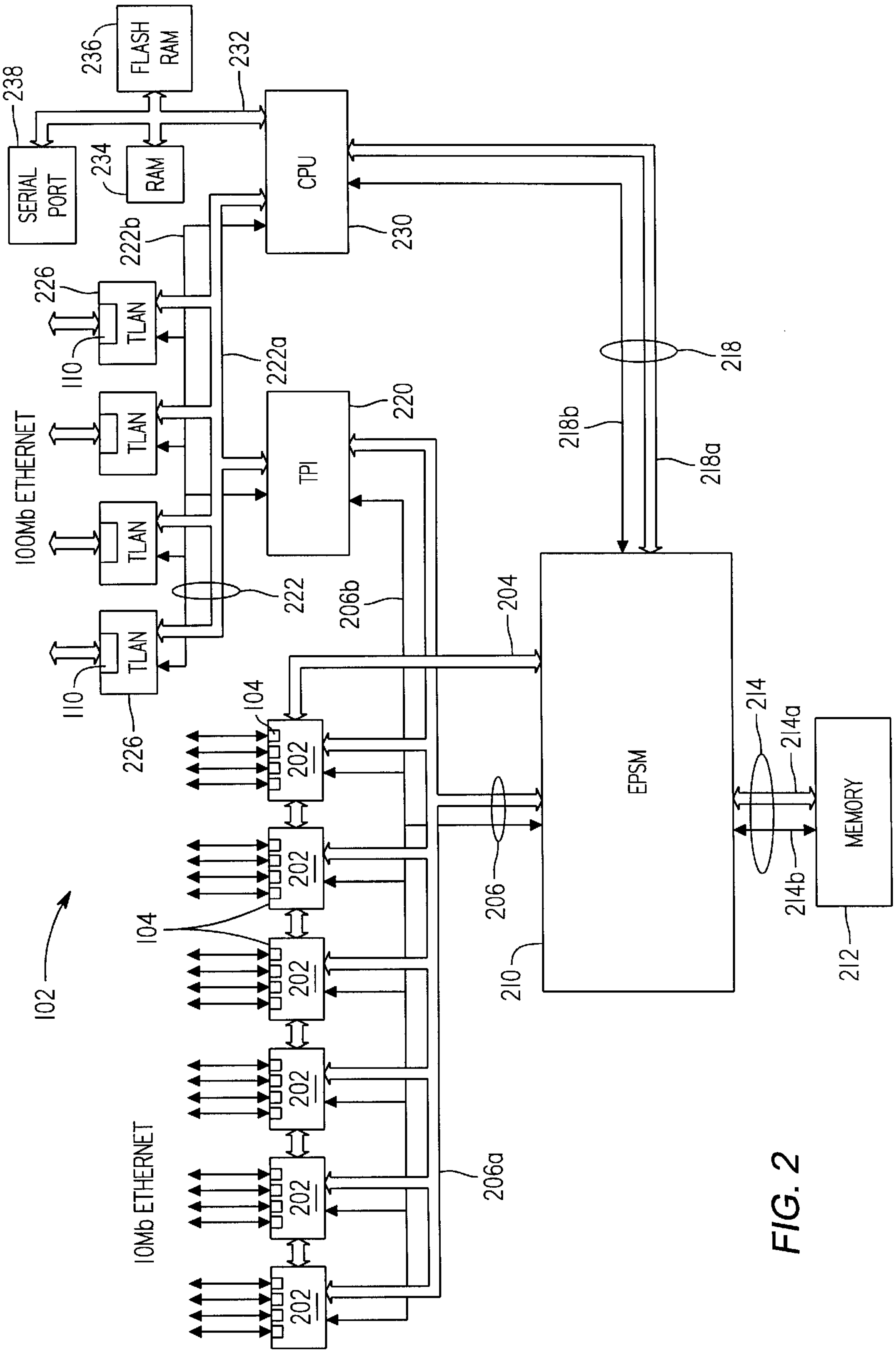
FIG. 2 is a more specific block diagram of the network switch of FIG. 1.

Referring now to FIG. 2, a more specific block diagram is shown of the network switch 102. In the embodiment shown, the network switch 102 includes six similar quad controller or quad cascade (QC) devices 202, each incorporating four of the ports 104. The QC devices 202 may be implemented in any desired manner, such as integrated into a single Application Specific Integrated Circuit (ASIC) package or as separate integrated circuit (IC) chips as shown. In the embodiment shown, each port 104 operates at 10 Mbps at half duplex, for a total throughput of 20 Mbps per port at full duplex. This results in a total of 480 Mbps for all six of the QC devices 202 operating at full duplex. Each of the QC devices 202 preferably includes a processor interface coupled to a QC/CPU bus 204, and a bus interface coupled to a high speed bus (HSB) 206. The HSB 206 includes a data portion 206*a* and various control and status signals 206*b*. The HSB 206 is a 32-bit, 33 Megahertz (MHz) bus for transferring over one gigabit of data per second.

The HSB 206 and the QC/CPU bus 204 are further coupled to an Ethernet Packet Switch Manager (EPSM) 210, which is implemented as an ASIC in the embodiment shown, although the present invention is not limited to any particular physical or logical implementation. The EPSM 210 is further coupled to a memory 212 through a 32-bit memory bus 214, which includes a data and address portion 214*a* and control signals 214*b*. The memory 212 preferably includes between 4 to 16 Megabytes (MB) of dynamic random access memory (DRAM), although more memory is added as desired depending upon particular application needs. The EPSM 210 supports any one of at least three different types of DRAM for implementing the memory 212, including fast page-mode (FPM) single inline memory modules (SIMMs) operating at approximately 60 nanoseconds (ns), extended data output (EDO) mode DRAM SIMMs, or synchronous mode DRAM SIMMs. Synchronous DRAMs generally require a 66 MHz clock for achieving a burst data rate of 66 MHz data rate or 266 MB per second. EDO DRAMs may operate with either a 33 or 66 MHz clock, but achieve a maximum data burst data rate of 33 MHz, or 133 MB per second with either clock rate. FPM DRAMs may also operate with a 33 or 66 MHz clock, and achieve a maximum burst rate of 16 MHz or 64 MB per second with a 33 MHz clock and a burst rate of 22 MHz or 88 MB per second with a 66 MHz clock.

The memory bus 214 includes a memory data bus MD[31:0], data parity signals MD_PAR[3:0], row and column address signals MA[11:0], a write enable signal MWE*, bank select signals RAS[3:0]*/SD_CS*[3:0] which are either row signals for FPM DRAM and EDO DRAM or chip selects for synchronous DRAM, memory byte controls signals CAS[3:0]*/SD_DQM[3:0] which are column signals for FPM and EDO or DQM for synchronous DRAM, a row signal SD_RAS* for synchronous DRAM only, a column signal SD_CAS* for synchronous DRAM only, a serial input SIMM/DIMM presence detect signal PD_SERIAL_IN and a parallel input SIMM/DIMM presence detect signal PD_LOAD*.

The HSB 206 is coupled to a Thunder LAN (TLAN) port interface (TPI) 220, which is further coupled to a peripheral component interconnect (PCI) bus 222 including data and address signals 222*a* and related control and status signals 222*b*. The PCI bus 222 is coupled to four TLANs 226, which may be implemented in any desired manner. The TLANs 226 are preferably the TNETE100 ThunderLAN™ PCI Ethernet™ controllers manufactured by Texas Instruments, Inc. (TI), where each incorporates one of the ports 110. To the EPSM 210, the TPI 220 operates in a similar manner on the HSB 206 as another QC device 202 for interfacing four ports. Thus, the EPSM 210 effectively "sees" seven (7) quad port devices. With respect to the PCI bus 222, the TPI 220 emulates a standard PCI bus to the degree necessary for proper operation of the TLANs 226, which normally interface with PCI memory devices. Thus, the PCI bus 222 need not be fully PCI compliant. The PCI bus 222 is coupled to a processor or central processing unit (CPU) 230, which is coupled to a local processor bus 232 for coupling the CPU 230 to local RAM 234, a local flash RAM 236, and if desired, a serial port interface 238. The serial port interface 238 is preferably a UART or the like. In the embodiment shown, the CPU is a 32-bit, 33 MHz i960RP CPU by Intel, although the CPU 230 may be any other suitable processor.

The CPU 230 generally handles initialization and configuration of the TPI 220 and the EPSM 210 upon power up of the network switch 102. The CPU 230 also monitors and gathers statistics and also manages and controls the functions of the various devices of the network switch 102 during operation. The CPU 230 further updates the hash table data in the memory 212 through the EPSM 210. The EPSM 210, however, controls access to the memory 212 and performs the DRAM refresh cycles thereby removing refresh operations from the CPU 230. The CPU 230 would otherwise require approximately 6–8 bus cycles to perform each refresh cycle, which would consume valuable processor resources. The CPU 230 also acts as an additional network port for various purposes, and is often referred herein as PORT28. Thus, the ports 104, 110 and the CPU 230 collectively incorporate ports PORT0–PORT28, respectively.

The CPU 230 is further coupled to the EPSM 210 through a CPU bus 218, which includes an address and data portion 218*a* and related control and status signals 218*b*. The address and data portion 218*a* is preferably multiplexed between address and data signals. In particular, the CPU bus 218 includes an address/data bus CPU_AD[31:0], an address strobe CPU_ADS* from the CPU 230, data byte enables CPU_BE[3:0], a read/write select signal CPU_WR* a burst last data strobe CPU_BLAST*, a data ready signal CPU_RDY* and at least one CPU interrupt signal CPU_INT*. In this disclosure, normal signal names, other than data or address signals, denote positive logic, where the signal is considered asserted when high or at logic one (1), and signal names followed by an asterisk (*) denote negative logic, where the signal is considered asserted when low or at logic zero (0). The functional definition of the signals is generally straightforward and usually determinable by the signal name.

Figure 3A:
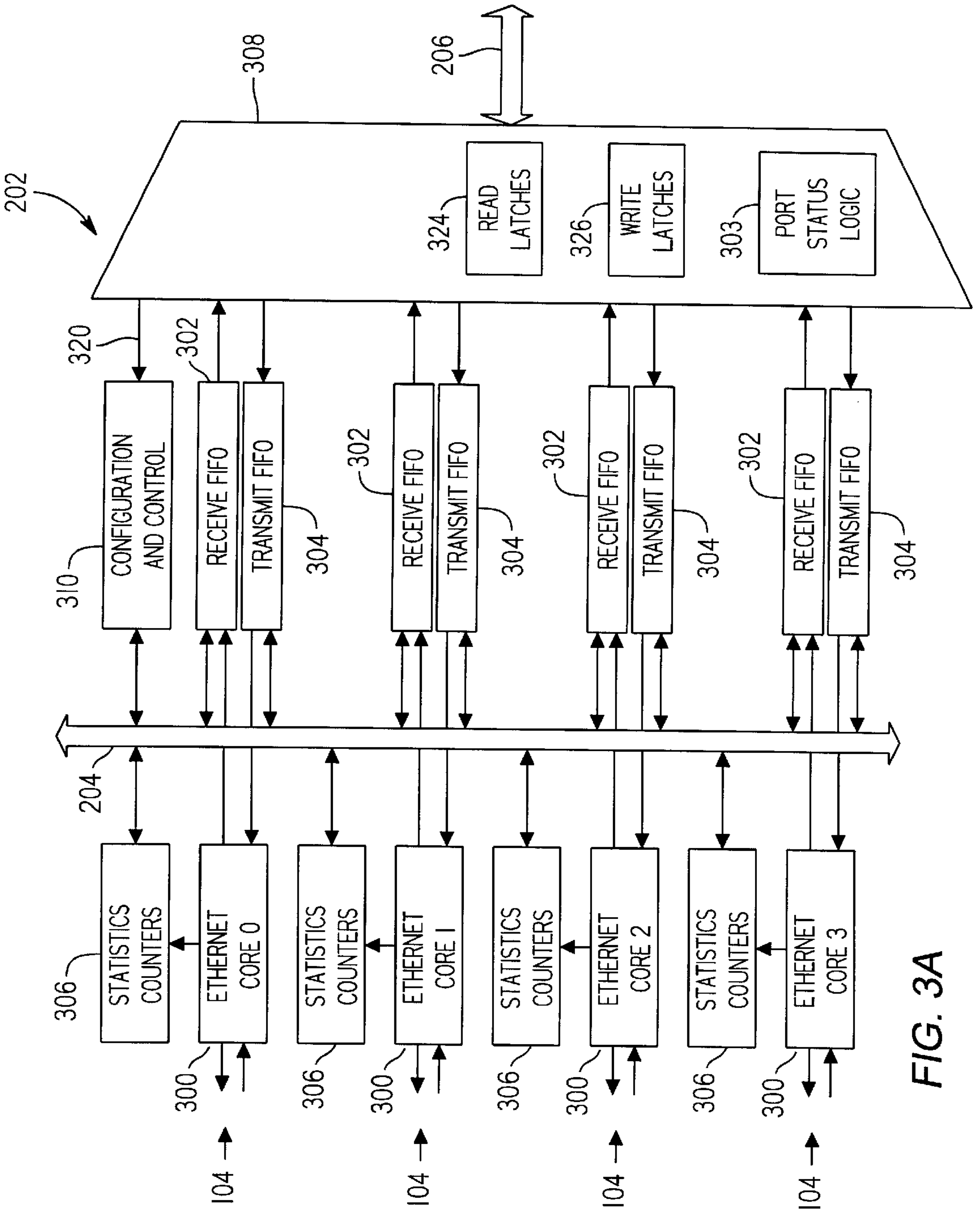
FIG. 3A is a block diagram of an exemplary quad cascade device of FIG. 2 for implementing the ports of the network switch.

FIG. 3A is a block diagram of an exemplary QC device 202 for implementing four of the ports 104, which device is duplicated six times to implement the 24 ports PORT0–PORT23. One particular device is the L64381 Quad Cascade Ethernet controller device from LSI Logic Corporation (LSI). An upgrade device is the QE110 Quad Cascade Ethernet controller device, also from LSI, which includes additional features and capabilities as described herein. It is noted, however, that the present invention is not limited to any particular device for implementing the ports 104. In the embodiment shown, each QC device 202 includes an Ethernet core 300 for each of the ports 104, where the Ethernet core 300 is fully synchronous and includes a media access controller, a Manchester Encoder/Decoder, and twisted-pair/AUI (attachment unit interface) transceivers. Each Ethernet core 300 enables bidirectional data communication with a coupled network 106 on a corresponding segment 108, and each is coupled to a corresponding 128-bit receive FIFO (first-in, first-out) 302 and a 128-bit transmit FIFO 304. Each Ethernet core 300 is also coupled to a block of statistics counters 306, where each block of statistics counters 306 includes 25 counters for providing on-chip maintenance. The counters within each block of statistics counters 306 preferably meet the requirements of the simple network management protocol (SNMP). Each of the FIFOs 302, 304 are further coupled to bus interface logic 308, which is coupled to the HSB 206 for enabling bidirectional data flow between each QC device 202 and the EPSM 210. Each QC device 202 includes configuration and control logic 310, for enabling programmable configuration, such as source address insertion, frame check sequence (FCS) insertion, immediate retransmission on collision, bus transfer size and transmit buffer threshold size.

The configuration and control logic 310 and each of the blocks of statistics counters 306 and the FIFOs 302, 304 are coupled to the QC/CPU bus 204. The EPSM 210 provides a separate interface between the CPU bus 218 and the QC/CPU bus 204. In this manner, the CPU 230 has full access to initialize, configure, monitor and modify the activities of each of the QC devices 202 and thus each of the ports 104. The QE110 Quad Cascade Ethernet controller device includes an additional connection 320 between the configuration and control logic 310 for detecting a backpressure indication to assert a jamming sequence to terminate a packet being received, if the backpressure indication is received in time. The backpressure indication is preferably a backpressure cycle executed on the HSB 206, although any one of several methods may be used to indicate backpressure, such as a separate signal or the like.

It is noted that the jamming sequence should be sent during the first 64 bytes of the data packet being received at a port to be considered "early" or timely. The first 16 bytes (4 DWORDs) are required before a hash lookup procedure, described below, is performed by the EPSM 210. Each data bit is transferred in about 100 ns across Ethernet 10Base-T, so that the first 16 bytes are transferred in approximately 13 microseconds (μs). 64 bytes are received in about 51 μs, so that the network switch 102 has approximately 38 μs to transfer the first 16 bytes received, perform the hashing procedure, execute the backpressure cycle and finally assert the jamming sequence. Since a hash lookup takes approximately 1–2 μs to complete, there is almost always enough time to send the jamming sequence in a timely manner. However, timely assertion of the jamming sequence is not guaranteed, so that there is the possibility of dropping packets due to a threshold violation condition. If the backpressure cycle is executed late, the port rejects the backpressure cycle and the network switch 102 drops the packet if it is unable to accept the packet. The network switch 102 may accept that packet since a threshold condition is an early indication and thus memory may be available to store the packet.

If the backpressure cycle is executed in a timely manner and if the port is operating in half duplex, the configuration and control logic 310 respondingly asserts a collision command to one of the Ethernet cores 300 of an indicated port 104. The Ethernet core 300 receiving the collision command then asserts a jamming sequence to terminate a packet being received by that port 104. If the backpressure cycle is executed within the 64 byte window, then the port indicates that the backpressure cycle will be executed for that port to the EPSM 210 by asserting an abort signal ABORT_OUT* on the HSB 206. If the backpressure cycle is outside the 64 byte window and thus not asserted in time, the ABORT_OUT* signal is not asserted and the EPSM 210 drops the packet. The EPSM 210 drops the packet in most cases when an attempt to assert backpressure fails. Although it is desired to drop as few packets as possible for maximum efficiency, a dropped packet is eventually detected at higher network levels at the originating data device and thus is not fatal to overall operation of the network system 100. The origination device detects that the packet was dropped and re-sends one or more packets including the dropped packet.

The bus interface logic 308 preferably includes read latches 324 and write latches 326 for implementing concurrent read and write cycle on the HSB 206 as described further below. These latches latch PORT_NO[1:0] signals asserted on the HSB 206 at particular cycles of a first clock (CLK_1) signal. The CLK_1 signal is the primary clock for the HSB 206 and typically operates at approximately 30–33 MHz in the embodiment shown. Since the CLK_1 signal is the primary clock, it is referred to hereinafter as simply the CLK signal. A second clock signal CLK_2 is also used for interface to the memory 212, and operates at twice (2×) the frequency of the CLK signal or at approximately 60–66 MHz.

Figure 3B:
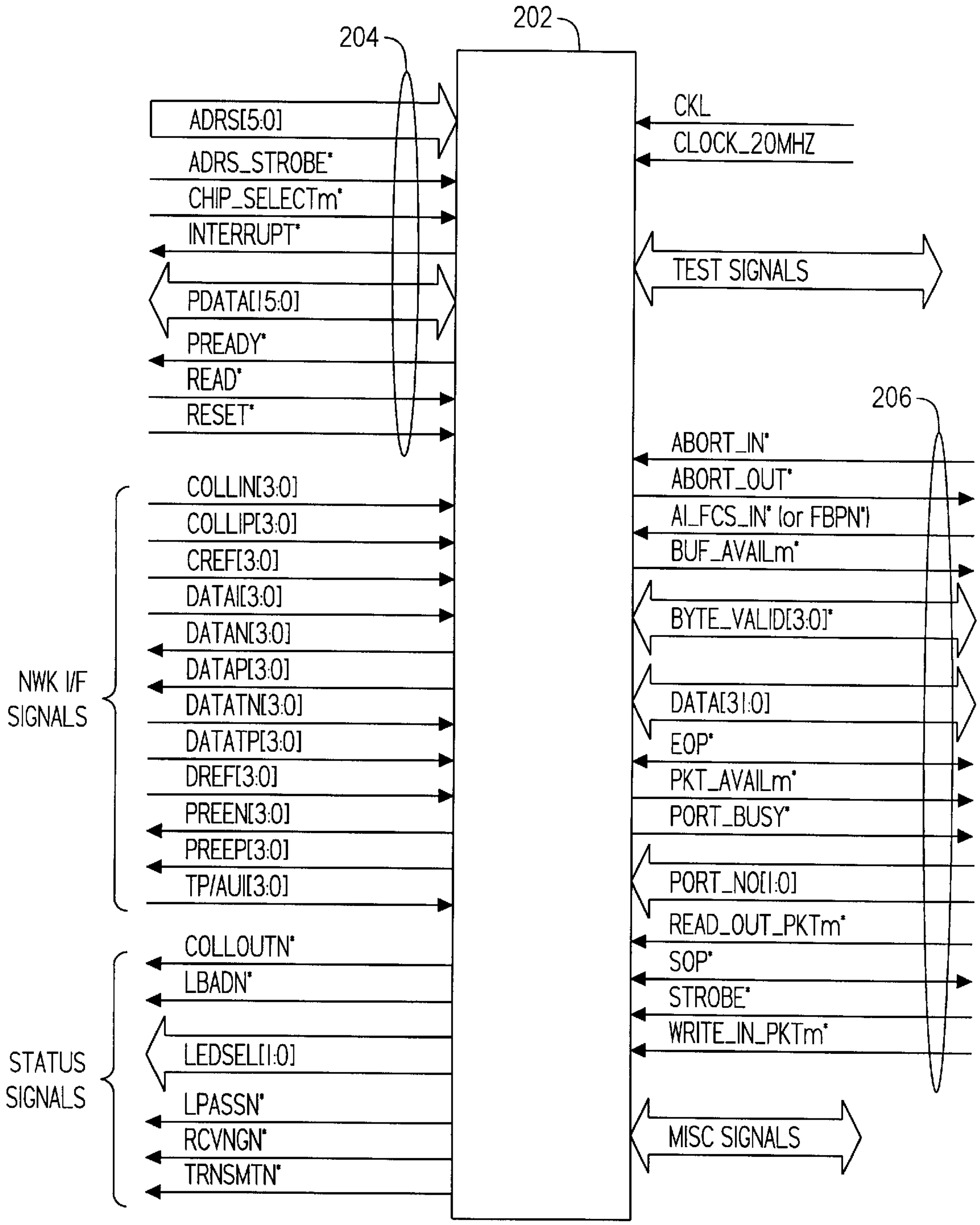
FIG. 3B is a diagram illustrating the signals of the particular quad cascade device shown in FIG. 3A.

FIG. 3B is a diagram illustrating the signals of the particular quad cascade device 202 shown in FIG. 3A. The signals are divided into several functional and bus sections, including processor interface signals associated with the QC bus 204, network interface signals associated with the four ports 104, status signals, clock and test signals, bus interface signals associated with the HSB bus 206, and miscellaneous signals.

Concerning the QC bus 204, the EPSM 210 writes data to and reads data from the registers and counters 306, 310 of the QC device 202 through data signals PDATA[15:0]. The READ* signal is asserted high for a write operation and low for a read operation. The particular register within the QC device 202 is determined by an address asserted on ADRS [5:0] signals. Assertion of an address strobe signal ADRS_STROBE* along with the corresponding one of several chip select signals CHIP_SELECTm* causes the QC device 202 to latch the ADRS signals. A lower case "m" appended to the signal name generally denotes multiple signals of a particular type. For example, there are six separate CHIP_SELECT[5:0]* signals, each for separately accessing a respective one of the six QC devices 202. A signal PREADY* is asserted low by the QC device 202 for one cycle of a CLK signal during a write cycle after the rising CLK edge on which the requested data is latched. For a read cycle, the QC device 202 asserts PREADY* low for one CLK cycle after it places data on the PDATA bus.

Figure 3C:
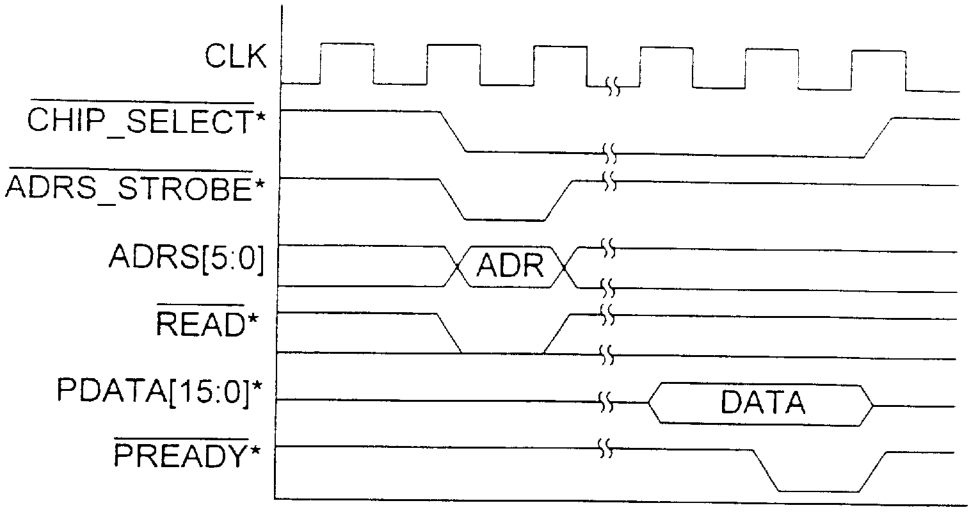
FIG. 3C is an exemplary timing diagram illustrating processor read timing of the quad cascade device of FIG. 3A.
Figure 3D:
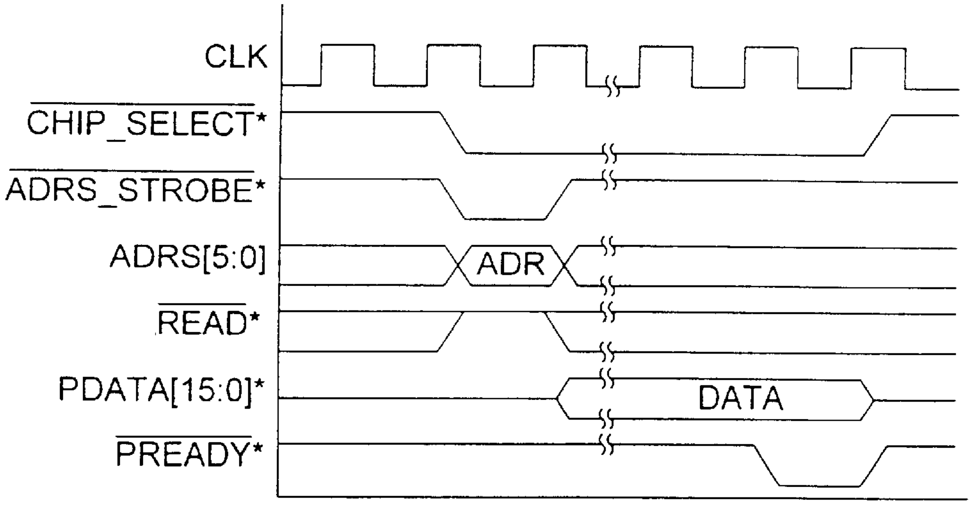
FIG. 3D is an exemplary timing diagram illustrating processor write timing of the quad cascade device of FIG. 3A.
Figure 3E:
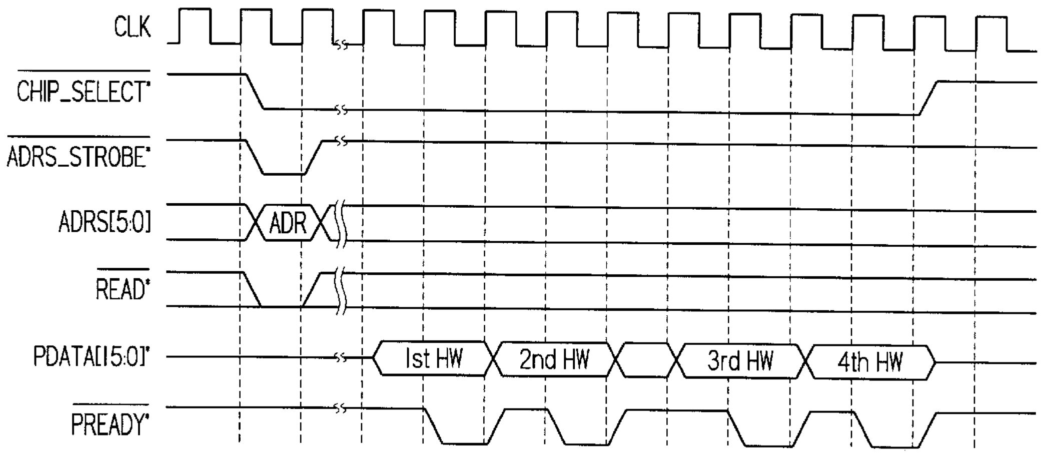
FIG. 3E is an exemplary timing diagram illustrating processor burst read access timing of the quad cascade device of FIG. 3A.

FIG. 3C is an exemplary timing diagram illustrating a processor read cycle for a QC device 202 and FIG. 3D is an exemplary timing diagram illustrating a processor write cycle. FIG. 3E is an exemplary timing diagram illustrating processor burst read access cycle for a QC device 202. These timing diagrams are exemplary only and shown to illustrate general functionality and not particular timing or particular signal characteristics.

Referring back to FIG. 3B, the network interface signals include the negative and positive collision threshold signals, the collision reference signal, the serial data in signal, the negative and positive Manchester-Encoded data signals, the positive and negative data threshold signals, the data threshold reference signal, the positive and negative Pre-emphasis signals and the twister-pair/AUI mode select signals for each of the four ports denoted [3:0] of each QC device 202. Each QC device receives the CLK signal and has a CLOCK_20MHZ input, which receives a 20 MHz clock signal to generate 80, 20 and 10 MHz internal clock signals for use by the ports 104. Each Ethernet core 300 detects a collision occurring on the corresponding segment 108 and transmits a jamming sequence according to the Ethernet CSMA/CD (Carrier Sense Multiple Access/Collision Detect) method.

Concerning the bus interface signals associated with the HSB 206, a QC device 202 aborts an entire packet by asserting the ABORT_OUT* signal. The EPSM 210 aborts the current bus cycle by asserting an abort signal ABORT_IN*. In one embodiment, the QC devices 202 are QE110 devices which are devised to enable the EPSM 210 to abort a packet being received by executing a backpressure cycle on the HSB 206. This particular type of backpressure capability is a "packet by packet" or dynamic "per port" backpressure that allows rejection of one packet being received at one port. L64381 devices include an auto-insert frame check sequence signal (AI_FCS_IN*), which is described further below. QE110 devices replace the AI_FCS_IN* signal with a signal FBPN*, which is used to perform the same functions as the AI_FCS_IN* signal, but is also used to indicate a backpressure cycle and an enhanced packet flush. Of course, many alternative methods may be used to implement dynamic backpressure as described herein. In particular, the EPSM 210 asserts the FBPN* signal during a read cycle to perform a backpressure request cycle. If the ABORT_OUT* signal is asserted by the corresponding QC device 202 during the data phase of the read cycle, then the backpressure "request" has been granted by that QC device 202, which then asserts a jamming sequence to abort the packet. If the ABORT_OUT* signal is not asserted, then the EPSM 210 drops the packet.

The EPSM 210 asserts a status strobe signal STROBE* to all of the QC devices 202 and the TPI 220, each of which responds with the status of its four ports 104 or 110 (in the case of the TPI 220) in multiplexed fashion on signals PKT_AVAILm* and BUF_AVAILm* when the STROBE* signal is sampled asserted on the rising edge of the CLK signal. There is a separate signal for each QC device 202, one set for the TPI 220 and a similar set for the CPU 230, which acts as another port for some operations. In particular, the PKT_AVAILm* and BUF_AVAILm* signals include signals PKT_AVAIL[5:0]* and BUF_AVAIL[5:0]* for the QC devices 202, signals TPI_PKT_AVAIL* and TPI_BUF_AVAIL*, otherwise referred to as PKT_AVAIL[6]* and BUF_AVAIL[6]*, respectively, for the TPI 220, and signals PCB_PKT_AVAIL* and PCB_BUF_AVAIL*, otherwise referred to as PKT_AVAIL[7]* and BUF_AVAIL[7]*, respectively, corresponding to the CPU 230, for a total of 8 signals per signal type.

In this manner, the HSB 206 includes signals PKT_AVAIL[0]* and BUF_AVAIL[0]* for the first QC device 202 to access the four ports PORT0–PORT3, the HSB 206 includes signals PKT_AVAIL[1]* and BUF_AVAIL[1]* for the next QC device 202 to access the next four ports PORT4–PORT7 etc., the TPI 220 includes signals PKT_AVAIL[6]* and BUF_AVAIL[6]* to access the ports PORT24–PORT27, and the EPSM 210 includes internal signals PKT_AVAIL[7]* and BUF_AVAIL[7]* for the CPU 230. Up to four bits are multiplexed on each of the signals corresponding to the four ports separated by respective cycles of the CLK signal.

In response to the STROBE* signal, the bus interface logic 308 includes port status logic 303 for multiplexing four status bits on a respective one of the BUF_AVAIL[5:0]* signals to indicate whether each of its corresponding transmit FIFOs 304 for the respective port has enough empty space available to store data. The port status logic 303 is either centralized for all four of the ports as shown, or is distributed among the ports. The determination of empty space is according to a configuration register in the bus interface logic 308 storing a bus transfer field size (TBUS), which is preferably configured by the CPU 230 to 16, 32 or 64 bytes. In a similar manner, in response to the STROBE* signal, the TPI 220 includes similar port status logic 820 (FIG. 8B) coupled to the HSB 206 for multiplexing four status bits on the BUF_AVAIL[6]* signal to indicate whether each of its internal transmit FIFOs, described below, has enough empty space to store data for corresponding ones of the TLANs 226 for the respective ports PORT24–PORT27. For the CPU 230 or PORT28, a PCB 406 (FIG. 4) within the EPSM 210 asserts a single status bit on the BUF_AVAIL[7]* signal to indicate whether an internal PCB transmit FIFO within the EPSM 210 has available space to store data for the CPU 230.

In a similar manner, in response to the STROBE* signal, the port status logic 303 of the bus interface logic 308 in each QC device 202 multiplexes four status bits on a respective one of the PKT_AVAIL[5:0]* signals indicating whether each of its receive FIFOs 302 for the respective port has enough data, according to the TBUS value, to transfer received data for a bus transfer on the HSB 206. Likewise, the TPI 220 multiplexes four status bits on the PKT_AVAIL [6]* signal indicating whether its internal receive FIFOs have received enough data from the respective ports PORT23–PORT27 to transfer on the HSB 206. For the CPU 230, the PCB 406 within the EPSM 210 asserts a single status bit on the PKT_AVAIL[7]* signal to indicate whether an internal PCB receive FIFO within the EPSM 210 has received enough data from the CPU 230 for an HSB 206 bus transfer.

Figure 3F:
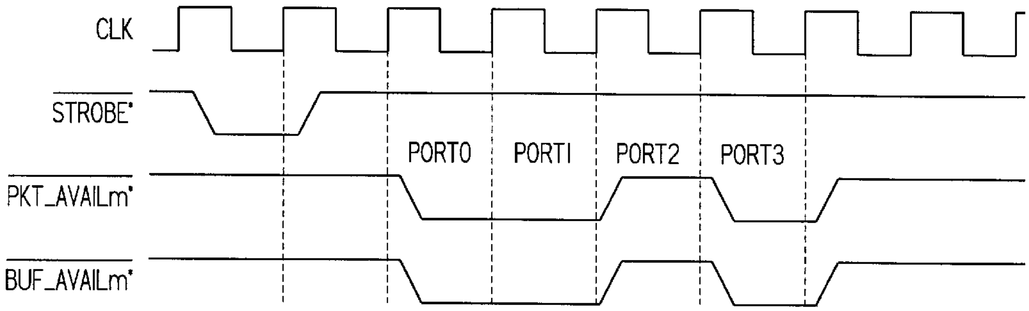
FIG. 3F is an exemplary timing diagram illustrating a buffer status inquiry of each of the ports FIG. 3A.

FIG. 3F is an exemplary timing diagram illustrating a buffer status inquiry of the QC device 202 and the TPI 220, including assertion of the STROBE* signal by the EPSM 210 and response by each of the QC devices 202, the TPI 220 asserting respective PKT_AVAILm* and BUF_AVAILm* signals. The references to PORT0, PORT1, PORT2 and PORT3 in FIG. 3F are the four respective ports of a particular QC device 202 or the TPI 220. The PCB 406 responds in a similar fashion except that its port is active for all four phases. The STROBE* signal is level triggered and thus sampled low on the first rising edge of the CLK signal. It is noted that the timing diagram of FIG. 3F is exemplary only and shown to illustrate general functionality and not particular timing or particular signal characteristics. For example, the STROBE* signal is periodic and typically asserted low for more than one CLK cycle in operation of the embodiment shown.

Referring back to FIG. 3B, a signal PORT_BUSY* is used to indicate whether the respective port is sending or receiving in half duplex mode, or when the port is transmitting in full duplex mode. Read data signals READ_OUT_PKT[5:0]* are asserted by the EPSM 210 to inform a respective QC device 202 to place data from a respective receive FIFO 302 on the data signals DATA[31:0]. In a similar manner, write data signals WRITE_IN_PKT[5:0]* are asserted by the EPSM 210 to inform a respective QC device 202 to retrieve data from the data signals DATA [31:0] into a respective transmit FIFO 304. Also, similar signals PCB_RD_OUT_PKT*, PCB_WR_IN_PKT* and TPI_READ_OUT_PKT*, TPI_WRITE_IN_PKT* signals are included for the TPI 220 and the CPU 230, respectively. All of the read and write signals are collectively referred to as the READ_OUT_PKTm* and WRITE_IN_PKTm* signals, respectively. The PORT_NO[1:0] bits indicate which particular port 104 is being addressed for a cycle executed on the HSB 206.

A signal SOP* indicates the Start Of Packet when the beginning or header of a packet is transferred on the HSB 206. The AI_FCS_IN* signal is typically asserted with the SOP* and one of the WRITE_IN_PKTm* signals by an external device to cause a L64381 device (for one implementation of the QC devices 202) to automatically calculate a CRC (cyclic redundancy check) value from the data in the packet and to insert the CRC into the FCS field of the packet. A QE110 device replaces the AI_FCS_IN* signal with the FBPN* signal, as described previously, for additional functions. A signal EOP* indicates the End Of Packet when the last data transfer of a data packet is transferred on the HSB 206. BYTE_VALID[3:0]* signals indicate which bytes are valid in the current word on the DATA signals. It is noted that a data packet is usually too large for a single transfer on the HSB 206, so that each bus cycle transfers an amount of data less than or equal to the TBUS value.

It is appreciated that each QC device 202 operates each of its four ports as 10Base-T Ethernet ports. It is further appreciated that the EPSM 210 has access to read and write all registers of the QC devices 202 through the QC bus 204. Further, the EPSM 210 reads data from all of the receive FIFOs 302 and writes data to all of the transmit FIFOs 304 through the HSB 206.

Figure 3G:
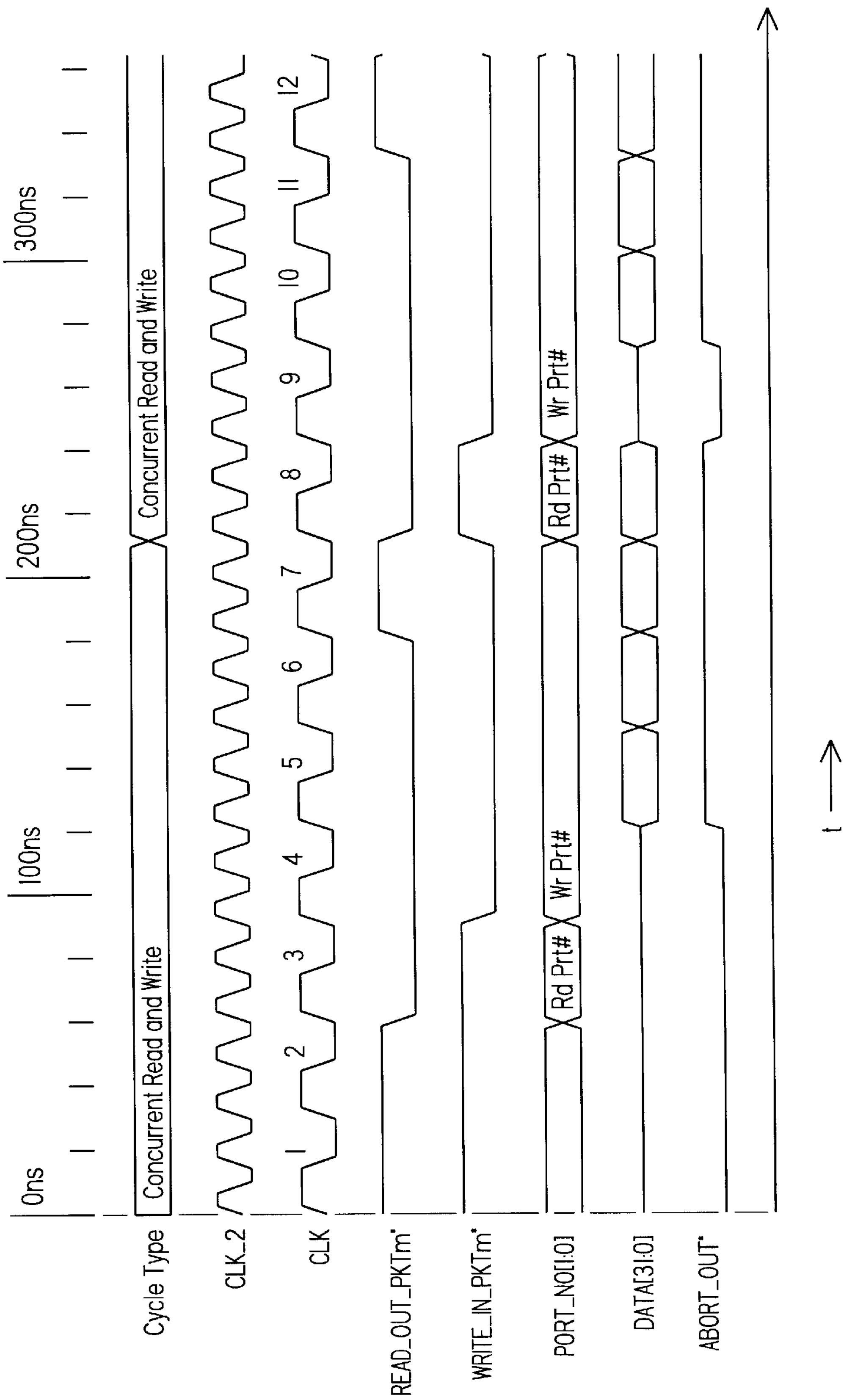
FIG. 3G is an exemplary timing diagram illustrating a concurrent read and write cycle on the HSB of FIG. 2.

FIG. 3G is an exemplary timing diagram illustrating a concurrent read and write cycle on the HSB 206. The top of the timing diagram indicates the cycle type, where two concurrent read and write cycles are executed one after the other. The CLK, CLK_2, STROBE*, READ_OUT_PKTm*, WRITE_IN_PKTm*, PORT_NO[1:0], DATA [31:0] and ABORT_OUT* signals are shown plotted on a Y-axis (or vertical axis) versus time plotted on an X-axis (or horizontal axis) of the timing diagram. There are two different types of concurrent read and write cycles that are performed depending upon the particular configuration. For the first, general type of concurrent cycle, if the QC devices 202 are implemented with the QE110 devices which include the latches 324, 326, then concurrent read and write cycles are performed without further enhancement. Alternatively, if the QC devices 202 are implemented with the L64381 devices, external latches and select logic (not shown) are added to latch the PORT_NO signals when asserted on the HSB 206. A second, special type of concurrent read and write cycle is performed with the L64381 devices without further enhancement, but only if the PORT_NO signals are the same and only if the QC devices 202 are different.

The EPSM 210 determines the type of cycle to execute, such as, for example, read, write, concurrent read and write, backpressure, etc. A read cycle is generally indicated by assertion of one of the READ_OUT_PKTm* signals, and a write cycle is generally indicated by assertion of one of the WRITE_IN_PKTm* signals. A concurrent read and write cycle is indicated by simultaneous assertion of a READ_OUT_PKTm* signal and a WRITE_IN_PKTm* signal. The EPSM 210 performs a concurrent read and write cycle between two ports under certain conditions, such as, for example, only if both ports are configured to operate in cut-through (CT) mode, described more fully below.

During the concurrent cycle, the EPSM 210 asserts one of the READ__OUT__PKTm* signals low at the beginning of the third CLK cycle to indicate one of the QC devices 202 or the TPI 220, and asserts the appropriate port number on the PORT__NO[1:0] signals during the third CLK cycle to indicate one of the four ports of the QC device 202 identified by the particular READ__OUT__PKTm* signal asserted. The QC device 202 identified by the particular READ__OUT__PKTm* signal latches the PORT__NO[1:0] signals in the third CLK cycle to determine the particular port being read. For example, the QE110 devices implementing the QC devices 202 are configured with the read latches 324 to latch the PORT__NO[1:0] signals. Also, the TPI 220 includes similar read latches 819*b* (FIG. 8B) to latch the PORT__NO [1:0] signals in the third CLK cycle, if indicated by the READ__OUT__PKT[6]* signal. Alternatively, external latches are used for this purpose if the QC devices 202 are implemented with the L64381 devices. At this point, the particular port PORT0–PORT27 identified has been indicated as the source port for a read cycle on the HSB 206.

The EPSM 210 then asserts one of the WRITE__IN__PKTm* signals low at the beginning of the fourth CLK cycle to indicate the same or any other one of the QC devices 202 or the TPI 220, and asserts the appropriate port number on the PORT__NO[1:0] signals during the fourth CLK cycle to indicate one of the four ports of the device indicated by the particular WRITE__IN__PKTm* signal asserted. The QC device 202 identified by the particular WRITE__IN__PKTm* signal latches the PORT__NO[1:0] signals in the fourth CLK cycle to determine the particular port being written to. For example, the QE110 devices implementing the QC devices 202 are configured with the write latches 326 to latch the PORT__NO[1:0] signals in the fourth CLK cycle. Also, the TPI 220 includes similar write latches 819*b* to latch the PORT__NO[1:0] signals in the fourth CLK cycle, if indicated by the WRITE__IN__PKT[6]* signal. In this manner, any other one of the ports PORT0–PORT27 is indicated as the destination port for a write cycle on the HSB 206, where the write cycle occurs at the same time as the read cycle just indicated. The source and destination ports may be on the same QC device 202 or two ports of the TPI 220, or may be between different QC devices 202. However, a concurrent read and write cycle is not performed between one of the ports 104 of the QC devices 202 and one of the ports 110 of the TPI 220 in the embodiment shown due to differences in speed of data transfer.

In the following cycles of the CLK signal, packet data is concurrently transferred or read from the source port and directly written to the destination port across the HSB 206 without being stored in the EPSM 210 or the memory 212. Data transfer occurs in cycles 5, 6, 7 and 8, for transferring several bytes depending upon the embodiment. For example, up to 64 bytes are transferred for L64381 devices, and up to 256 bytes are transferred for QE110 devices. Although four CLK cycles are shown for the data transfer, the data transfer may occur with one, two or four CLK cycles depending upon how much data is transferred. For new packets, a normal read cycle is first performed to provide the source and destination MAC addresses into the EPSM 210, which then performs a hashing procedure, described further below, to determine the destination port number, if known. Once the destination port number is known, and if there is only one destination port; a concurrent read and write operation may be performed for any portion or the entire remainder of the packet as desired.

The special type of concurrent read and write cycle is performed if the PORT__NO signals are the same but between two different ports and thus between two different QC devices 202. FIG. 3G also illustrates this case except that the PORT__NO signals remain unchanged throughout the entire cycle. The latches 324, 326 are not necessary since the PORT__NO signals remain unchanged, so that this type of concurrent cycle may be performed between two different L64381 devices without external latches or select logic. The EPSM 210 determines that the PORT__NO signals are the same between the source and destination ports and that two different QC devices 202 are involved, and then runs the concurrent cycle as shown.

As shown in FIG. 3G, a second concurrent read and write transfer occurs in the sixth CLK cycle, where the PORT__NO[1:0] signals are then asserted in the seventh, eighth and ninth cycles with the read mode, the read port number and the write port number, respectively. A READ__OUT__PKTm* signal is de-asserted for the seventh CLK cycle in response. Likewise, a WRITE__IN__PKTm* signal is deasserted for the eighth CLK cycle. This second concurrent cycle is either a continuation of the first concurrent cycle for providing continuing and consecutive data of the same data packet, or may be the beginning of an entirely different data packet. The source and destination ports are the same for continuing data for the same packet. However, either the source port, or the destination port, or both may be different in the second concurrent cycle for transferring data for a different packet.

Figure 3H:
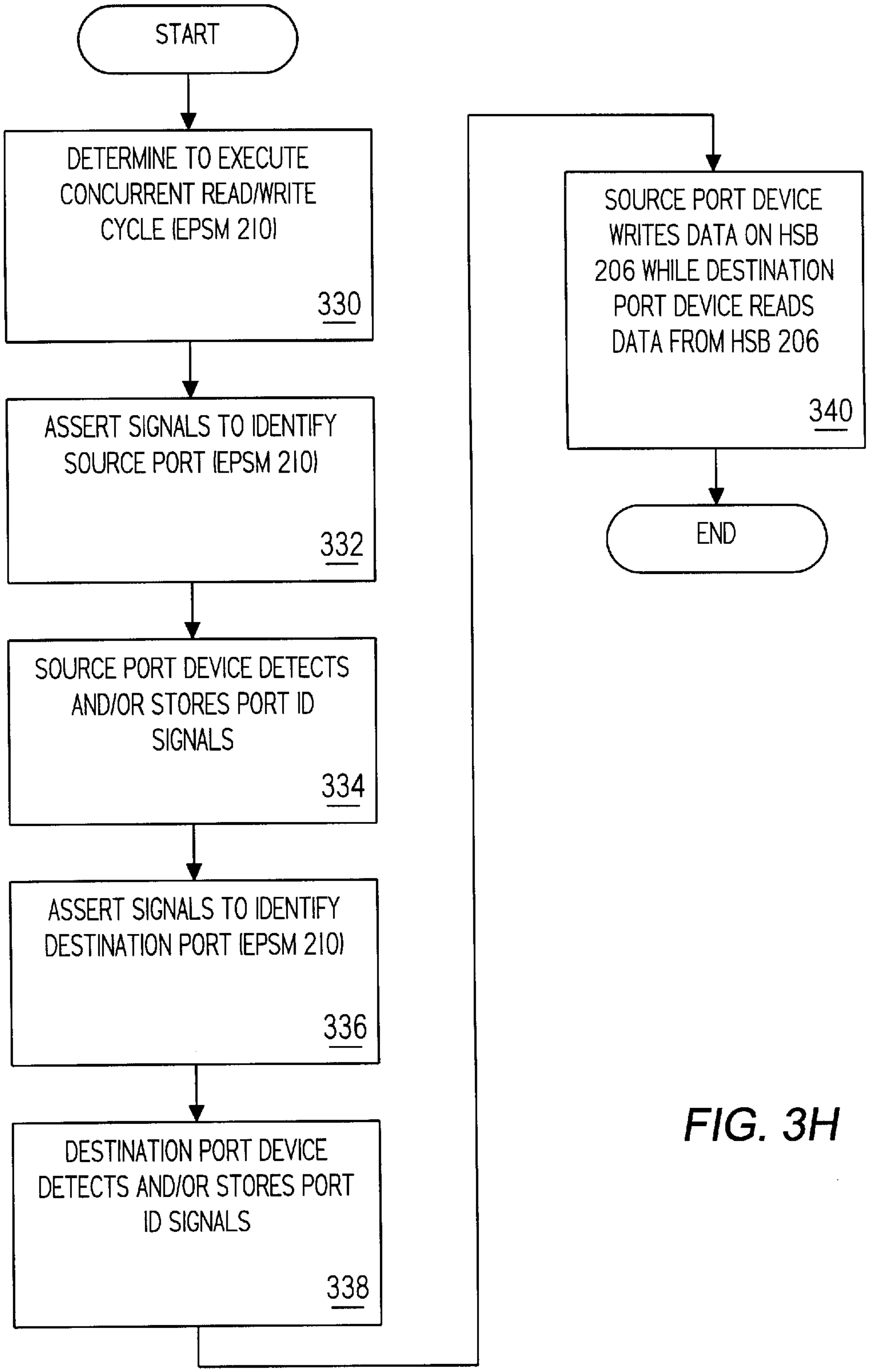
FIG. 3H is a flowchart diagram illustrating a procedure for executing a concurrent read and write cycle on the HSB of FIG. 2.

FIG. 3H is a flowchart diagram illustrating a procedure for executing a concurrent read and write cycle on the HSB 206. At a first step 330, the EPSM 210 determines whether a concurrent read and write cycle may be executed on the HSB 206 between a source port and a destination port. The EPSM 210 then asserts the appropriate signals to identify the source port at next step 332. This is performed by asserting the source or "read" port number using the PORT__NO signals on the HSB 206 and by asserting the appropriate READ__OUT__PKTm* signal. At next step 334, the identified source port device detects or stores the identification signals. In the special concurrent cycle with no latches, the QC device 202 detects the READ__OUT__PKTm* signal and then the PORT__NO signals on the HSB 206 and begins preparing for a read cycle. In the general concurrent cycles using latches, the indicated QC device 202 or the TPI 220 latches the read port number at step 334 and begins preparing for a read cycle.

At next step 336, the EPSM 210 asserts the appropriate signals to identify the destination port. For the special concurrent cycle, the EPSM 210 asserts the appropriate WRITE__IN__PKTm* signal and maintains the same PORT__NO signals. For the general case, the EPSM 210 also asserts the destination or "write" port number on the HSB 206 along with the appropriate WRITE__IN__PKTm* signal at next step 336. At next step 338, the identified destination port device detects or stores the identification signals. In the special concurrent cycle with no latches, the indicated QC device 202 detects the WRITE__IN__PKTm* signal and then the PORT NO signals on the HSB 206 and begins preparing for a write cycle. For the general case, the indicated QC device 202 or the TPI 220 latches the destination or write port number at next step 338. Finally, the indicated source port provides the data on the HSB 206 while the indicated destination port reads the data from the HSB 206 at next step 340 in a concurrent read and write cycle.

The concurrent read and write operation is the fastest type of data transfer cycle since only a single bus cycle is needed for each transfer of packet data. As described further below, a normal CT mode of operation requires at least two transfers, one from the source port to the EPSM 210, and another one from the EPSM 210 to the destination port, which requires two separate cycles on the HSB 206 for the same data. A concurrent read and write cycle requires a single and direct transfer on the HSB 206 for the same data, thereby increasing bandwidth of the HSB 206. Other, slower modes are provided, including several interim CT and store-and-forward (SnF) modes, where packet data is written to the memory 212 before being transferred to the destination port.

Figure 4:
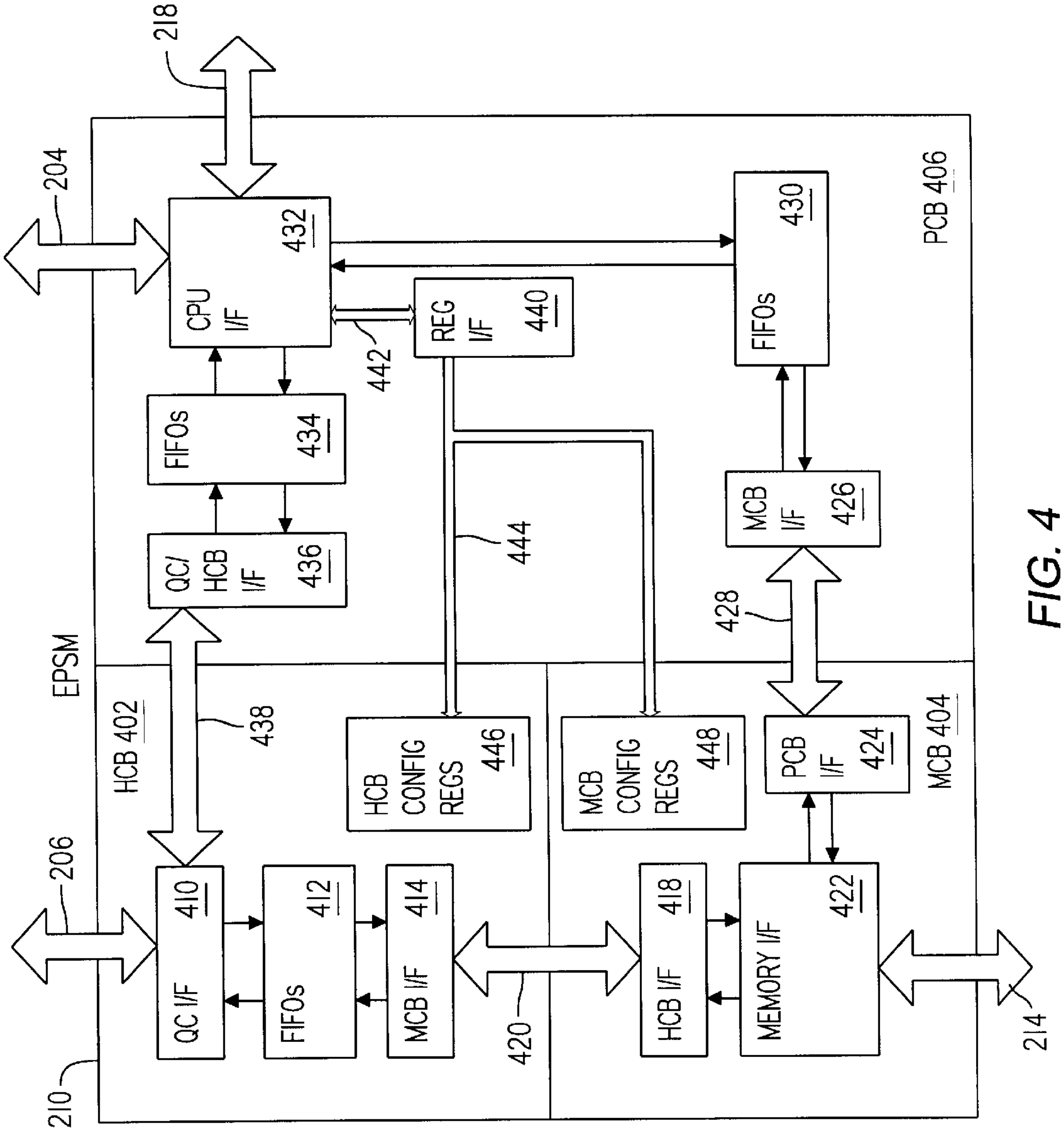
FIG. 4 is a block diagram of the switch manager of FIG. 2.

Referring now to FIG. 4, a simplified block diagram is shown of the EPSM 210 illustrating data flow and configuration registers. The EPSM 210 includes three primary sections including an HSB controller block (HCB) 402, a memory controller block (MCB) 404 and a processor control block (PCB) 406. A QC interface 410 couples the HSB 206 the HCB 402 of the EPSM 210. A set of buffers or FIFOs 412 are coupled to the other side of the QC interface 410, where the FIFOs 412 include receive, transmit and cut-through FIFOs, described further below. The other side of the FIFOs 412 (excluding a CT buffer 528, FIG. 5A) is coupled to the MCB 404 through an MCB interface 414, which is coupled to an HCB interface 418 in the MCB 404 through an appropriate bus 420. The HCB interface 418 is further coupled to a memory interface 422, which is coupled to the memory 212 through the memory bus 214. The memory interface 422 is further coupled to one side of a PCB interface 424, which has its other side coupled to one side of an MCB interface 426 within the PCB 406 through an appropriate MCB bus 428. The other side of the MCB interface 426 is coupled to one side of a set of FIFOs 430, which are further coupled to a CPU interface 432 within the PCB 406. The CPU interface 432 is coupled to the QC/CPU bus 204 and to the CPU bus 218. The CPU interface 432 is further coupled to one side of a second set of FIFOs 434 within the PCB 406, which has its other side coupled to a QC/HCB interface 436. The other side of the QC/HCB interface 436 is coupled to the QC interface 410 across an appropriate HCB bus 438.

It is noted that the PCB__BUF__AVAIL*, PCB__PKT__AVAIL*, PCB__RD__OUT__PKT* and PCB__WR__IN__PKT* signals of the HCB bus 438, associated with the PCB 406 and the CPU 230, are included in the BUF__AVAILm*, PKT__AVAILm*, READ__OUT__PKTm* and WRITE__IN__PKTm* signals, respectively. In the embodiment shown, the HCB bus 438 is similar to the HSB 206, and is essentially an internal version of the HSB 206 within the EPSM 210. The PCB 406 behaves in a similar manner as each of the ports 104 and the TPI 220 to the HCB 402. In this manner, the CPU 230, through operation of the PCB 406, operates as an additional port (PORT28) to the HCB 402.

The CPU interface 432 is coupled to a register interface 440 through a bus 442, where the register interface 440 is further coupled to a register bus 444. The register bus 444 is coupled to a set of HCB configuration registers 446 within the HCB 402 and to a set of MCB configuration registers 448 within the MCB 404. In this manner, the CPU 230 initializes and programs the registers in both the HCB and MCB configuration registers 446, 448 through the CPU interface 432 and the register interface 440.

The MCB configuration registers 448 are used to store a significant amount of configuration information associated with the ports and the memory 212. For example, the MCB configuration registers 448 include port state information indicating whether each port is in a learning (LRN), forwarding (FWD), blocked (BLK), listening (LST), or disabled (DIS) state, memory sector information, bus utilization information of the memory bus 214, number of dropped packets, hash table definitions, memory thresholds, BC thresholds, identification of secure ports, if any, memory control information, MCB interrupt source bits, interrupt mask bits and polling source bits, etc.

The description of the EPSM 210 illustrates that the CPU 230 has access to the QC devices 202 and to the memory 212 for configuration and control purposes. Although primary data flow with the HSB 206 with the EPSM 210 is through the FIFOs 412 and the memory 212, data flow also occurs between the HSB 206 and the CPU 230 through the HCB bus 438 and associated FIFOs and interfaces of the EPSM 210.

Figure 5A:
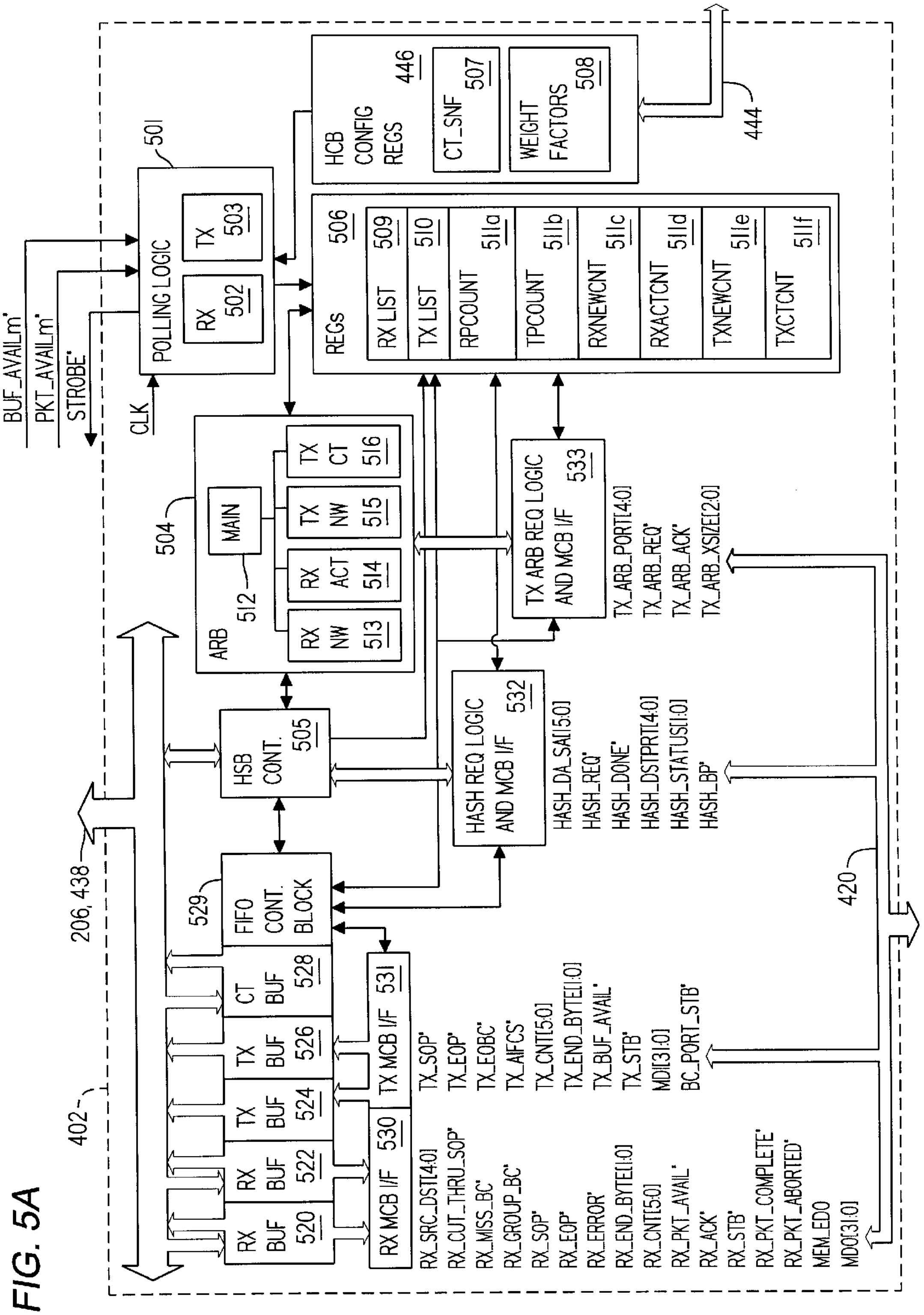
FIG. 5A is a more detailed block diagram of the bus controller block of FIG. 4.

Referring now to FIG. 5A, a more detailed block diagram is shown of the HCB 402. The HCB bus 438 is an internal version of the HSB 206 for interfacing the PCB 406, where both buses 206, 438 will collectively be referred to as the HSB 206. Polling logic 501 is coupled to the HSB 206, to a set of local registers 506 and to the HCB configuration registers 446. The polling logic 501 receives the CLK signal, and periodically asserts the STROBE* signal to the QC devices 202 and the TPI 220 for querying the ports 104, 110 and the PCB 406. The polling logic 501 then monitors the multiplexed PKT__AVAILm* and BUF__AVAILm* signals from the QC devices 202, the TPI 220, where each QC device 202 and the TPI 220 provide the status of its four ports 104, 110, respectively, as described previously. The TPI 220 responds with the PKT__AVAIL[6]* and BUF__AVAIL[6]* signals and the PCB 406 responds with the PKT__AVAIL[7]* and BUF__AVAIL[7]* signals.

The polling logic 501 includes a receive (RX) poll state machine 502, which reviews the PKT__AVAILm* signals and updates a RECEIVE LIST 509 within the registers 506. In a similar manner, the polling logic 501 includes a transmit (TX) poll state machine 503, which reviews the BUF__AVAILm* signals and updates a TRANSMIT LIST 510 within the registers 506. If a WTPRIORITY flag in the HCB configuration registers 446 is set by the CPU 230, the RX poll state machine 502 and the TX poll state machine 503 both use a set of WEIGHT FACTORS 508 in the HCB configuration registers 446 for programming the RECEIVE LIST 509 and the TRANSMIT LIST 510, respectively, as further described below. The HCB configuration registers 446 also include a set of CT__SNF registers 507, which are programmed by the CPU 230 to determine the desired mode of operation between CT and SnF when the corresponding port is either a source or a destination port.

The registers 506 are implemented in any desired fashion depending upon the implementation of the EPSM 210, such as a latches, flip-flops, static RAM (SRAM), DRAM devices etc., and includes a plurality of status and control registers or buffers. The RECEIVE LIST 509 includes a plurality of register values indicative of relative receive status and priority of each port. Likewise, the TRANSMIT LIST 510 includes a plurality of register values indicative of relative transmit status and priority of each port. An RPCOUNT register 511*a* stores an RPCOUNT number used by the RX poll state machine 502 to assign a relative receive priority to each port when packet data is received by that port from an external network device. Alternatively, the RX poll state machine 502 uses a corresponding weight factor from the WEIGHT FACTORS 508. Likewise, a TPCOUNT register 511 *b* stores a TPCOUNT number used by the TX poll state machine 503 to assign a relative transmit priority to each port when packet data is available for transmission by that port to an external network device and the port has room to receive data for transmission. Alternatively, the TX poll state machine 502 uses a corresponding weight factor from the WEIGHT FACTORS 508. Relative arbitration count numbers RXNEWCNT, RXACTCNT, TXNEWCNT and TXCTCNT are stored in registers RXNEWCNT 511*c,* RXACTCNT 511*d,* TXNEWCNT 511*e* and TXCTCNT 511*f,* respectively.

The HCB 402 includes arbitration logic 504 coupled to review the data in the registers 506 and 446 for determining the types of cycles executed on the HSB 206. An HSB controller 505 performs and controls each cycle executed on the HSB 206 for controlling data flow between the EPSM 210 and the HSB 206. The HSB controller 505 is coupled to the registers 506 for modifying status bits. The HSB controller 505 receives an indication of the type of each cycle from the arbitration logic 504. The arbitration logic 504 includes a MAIN arbiter 512 coupled to four data arbiters, including a new packet receive (RX NW) arbiter 513, a receive active (RX ACT) arbiter 514, a new packet transmit (TX NW) arbiter 515, and a transmit cut-through (TX CT) arbiter 516. The MAIN arbiter 512 generally selects between the RX NW arbiter 513, the RX ACT arbiter 514, the TX NW arbiter 515 and the TX CT arbiter 516, where each arbiter arbitrates to define the next cycle. The MAIN arbiter 512 uses any acceptable priority scheme as desired. In the embodiment shown, for example, the MAIN arbiter 512 uses a round-robin priority scheme.

The FIFOs 412 are implemented in any desired fashion. In the embodiment shown, two receive buffers RX BUFs 520, 522 implement an RX FIFO, where data is read from one buffer while being written to the other, and vice-versa. Also, two transmit buffers TX BUFs 524, 526 are provided and operate in a similar manner as the RX BUFs 520, 522. The FIFOs 412 also include at least one cut-through buffer CT BUF 528. The RX BUFs 520, 522 are both 64-byte buffers that each include a bidirectional data interface with the HSB 206 for data flow in either direction, and a uni-directional interface for providing data to the MCB 404 through an RX MCB interface 530. The TX BUFs 524, 526 are both 64-byte buffers coupled between the HSB 206 and a TX MCB interface 531. The TX BUFs 524, 526 receive data from the MCB 404 through the TX MCB interface 531, and provide data to the HSB 206. The CT BUF 528 is a 64-byte buffer having a bidirectional interface with the HSB 206. A FIFO control block 529 is coupled to the registers 506, the HSB controller 505, the RX BUFs 520, 522, the TX BUFs 524, 526, the CT BUF 528, the RX MCB interface 530 and the TX MCB interface 531 for controlling data flow through the FIFOs 520, 522, 524 and 526, for detecting certain status signals asserted through the RX, TX MCB interfaces 530, 531 and for setting certain bits in the registers 506, as described further below.

The bus 420 includes a plurality of data and control signals for interfacing the HCB 402 to the MCB 404 through the RX, TX MCB interfaces 530, 531, hash request logic and MCB interface (referred to as HASH REQ LOGIC) 532 and transmit arbiter request logic and MCB interface (referred to as TX ARB REQ LOGIC) 533. The HSB controller 505 copies the header of each new packet from one of the ports PORT0–PORT28 into one of the RX BUFs 520, 522 and also into the HASH REQ LOGIC 532. The header is at least three DWORDs (32 bits each) or 96 bits, which includes both the source and destination MAC addresses. The HASH REQ LOGIC 532 requests the hashing procedure to be performed by the MCB 404, and sets appropriate bits in the registers 506. The hashing procedure is performed to determine the appropriate action to take for the packet.

In the embodiment shown, after receiving the header of a new packet, the HASH REQ LOGIC 532 asserts a signal HASH_REQ* to the MCB 404 and multiplexes the 48-bit MAC destination and source addresses and an 8-bit source port number on HASH_DA_SA[15:0] signals. The MCB 404 detects the HASH_REQ* signal, performs the hashing procedure and then asserts a signal HASH_DONE* to the HASH_REQ LOGIC 532. The MCB 404 also asserts signals HASH_DSTPRT[4:0], HASH_STATUS[1:0] and a signal HASH_BP*, if appropriate. The HASH_STATUS [1:0] signals indicate one of four results, including 00b (b denotes a binary number)=DROP_PKT to drop the packet, 01b=GROUP_BC for a broadcast (BC) packet, 10b=MISS_BC for an unknown destination port and thus a BC packet, and 11b FORWARD_PKT indicating a unicast packet to a single destination port. If HASH_STATUS[1:0] =FORWARD_PKT, then the HASH_DSTPRT[4:0] signals are asserted with a binary port number designating the destination port for the packet. The HASH_BP* signal is asserted to indicate backpressure, if backpressure is enabled and applicable, due to a threshold overflow condition in the memory 212 as determined by the MCB 404.

Certain threshold values are set for the entire memory 212, for particular types of packets (BC packets, for example) and on a port by port basis. If a threshold value is reached, so that another packet provided to the memory 212 would violate a threshold condition, the network switch 102 determines whether to drop the packet. The sending device eventually detects that the packet is dropped and re-sends the packet. If certain threshold conditions are violated, if backpressure is enabled and if the source port is operating in half duplex mode, the HASH_BP* signal is asserted.

The HASH REQ LOGIC 532 detects the HASH_BP* signal and determines if HASH_STATUS[1:0] =DROP_PKT, such as, for example, the source and destination ports are the same. If HASH_STATUS[1:0] =DROP_PKT, then no further action is required since the packet is to be dropped. If HASH_STATUS[1:0] is not equal to DROP_PKT, then the HASH REQ LOGIC 532 determines if HASH_STATUS[1:0] =FORWARD_PKT and the packet is to be transferred in CT mode through the CT BUF 528, thereby potentially avoiding the memory 212. If the destination port is busy, or if HASH_STATUS[1:0] does not indicate to drop or to forward the packet, then the HASH REQ LOGIC 532 instructs the HSB controller 505 to execute a backpressure cycle to the port receiving data.

During SnF operation, the EPSM 210 receives and stores the entire packet in the memory 212 before sending any portion of the packet to a destination port. After the packet is received and if the destination port is known, the packet is sent to the destination port when available according to the particular arbitration scheme being used. For CT operation to apply, both ports are preset for CT mode in the CT_SNF registers 507, both ports operate at the same speed and the TBUS setting for the destination port is greater than or equal to the TBUS setting for the source port. For the particular embodiment shown using the TLANs 226 to implement the 100 Mbps Ethernet ports PORT24–PORT27, CT mode is not performed for the ports PORT24–PORT27 since the TLANs require the size of the entire packet prior to transmission. Also, the shown embodiment requires the TBUS values to be equal. The present invention is not limited by these various design considerations. During CT mode of operation, the EPSM 210 provides the data to the appropriate QC device 202 for transmission on the indicated destination port if it is not busy. The packet data is buffered through the FIFOs 412 between the source and destination ports without being transferred to the memory 212.

If the destination port is busy at the beginning of a received packet, the data is buffered in the memory 212 between the source and destination ports according to the interim CT mode of operation. However, the packet portion is immediately available for transmission by a destination port, so that the transfer to the destination port need not wait for the entire packet to be received. As a safety mechanism, interim CT mode of operation may be overridden and the operation for that particular packet switched to SnF mode for the next packet.

If, for any reason, the destination port is unable to accept more data during transfer of a packet in CT mode, such as when the destination port stalls, then operation is switched to the mid-packet interim CT mode. During the mid-packet interim CT mode, the packet data in the FIFOs 412 is sent to the memory 212, and then sent to the destination port when it is available to receive more data. It is noted that since other, subsequently received packets may be received by other ports for transmission by the same stalled port, where these subsequent packets are placed in a corresponding transmit chain for the port, the remaining packet portion of the packet switched to mid-packet interim CT mode is placed first in the transmit chain to ensure proper ordering.

Another mode is referred to as the adaptive SnF mode. While a packet is being transferred according to CT operation, the CPU 230 monitors and tracks activity of the ports 104, 110 and the PCB 406 to determine if any one or more of the ports experiences a significant number of errors, such as "runts", "overruns", "jabbers", late collisions, FCS errors, etc. A runt is a packet less than a certain minimum amount of data, which minimum is 64 bytes in the embodiment shown. An overrun is a packet that is greater than a certain maximum amount of data, which maximum is 1,518 bytes in the embodiment shown according to the Ethernet standard. A jabber is packet larger than the maximum size (1518 bytes for Ethernet) and contains an invalid CRC (cyclic redundancy check) value. Usually, packets with any such errors are dropped and not propagated through the system. According to the adaptive SnF mode, if a port 104 is operating using CT operation and a significant number of such errors are experienced as determined by the CPU 230, the CPU 230 toggles the preset mode for the desired port from CT to SnF operation until any errors are corrected or otherwise eliminated.

Operation of the ports 110 of each TLAN 226 is similar, except that packet data passes through the TPI 220 across the HSB 206 to the EPSM 210 and is stored in the memory 212 prior to transmission. The TPI 220 effectively operates as a bridge between the PCI bus 222 and the HSB 206. The TLANs 226 require the length of the entire packet before transmitting the packet to an external network, so that each packet is received and stored in the memory 212 in its entirety before being re-transmitted to by one of the TLANs 226. Furthermore, data received by a TLAN 226 for transmission by a QC device 202, and data received by a QC device 202 for transmission by a TLAN 226 are operated in SnF mode and stored in the memory 212 due to the large speed differential between the devices 202, 226 in the embodiment shown.

The RX MCB interface 530 asserts a signal RX_PKT_AVAIL* to the MCB 404 when packet data is in one of the RX BUFs 520, 522 and ready for transfer to the memory 212. Packet data is transferred from the HCB 402 to the MCB 404 on a memory data output bus MemDataOut or MDO[31:0]. A static signal MEM_EDO is asserted if the type of memory 212 is either EDO or synchronous DRAM, and is not asserted for FPM DRAM. The RX MCB interface 530 also asserts several other signals while asserting the RX_PKT_AVAIL* signal as appropriate. In particular, the RX MCB interface 530 multiplexes the source port number on RX_SRC_DST[4:0] signals for one CLK cycle followed by the destination port number, if known, during the next CLK cycle while asserting the RX_PKT_AVAIL* signal. Also, the RX MCB interface 530 asserts the number of DWORDs (minus one DWORD) on RX_CNT[5:0] signals that is in the selected RX BUF 520 or 522.

The RX MCB interface 530 asserts a signal RX_SOP* with the RX PKT_AVAIL* signal if the data is the beginning of a packet, or asserts a signal RX_EOP* with the RX_PKT_AVAIL* signal if the data is the end of the packet. The RX MCB interface 530 asserts a signal RX_CUT_THRU_SOP* with the RX_PKT_AVAIL* and RX SOP* signals if the packet is being transferred in CT mode but buffered through the memory 212, such as for interim CT or mid-packet CT modes. In particular, interim CT (full packet) is indicated if (!RX_CUT_THRU_SOP* & !RX_PKT_AVAIL* & !RX_SOP*) and interim CT mid-packet is indicated if (!RX_CUT_THRU_SOP* & IRX_PKT_AVAIL* & RX_SOP*). The RX MCB interface 530 asserts a signal RX_MISS_BC* with the RX_PKT_AVAIL* and RX_SOP* signals if the destination address was unknown and thus the packet is a BC packet. The RX MCB interface 530 asserts a signal RX_GROUP_BC* with the RX_PKT_AVAIL* and RX_SOP* signals if the GROUP bit is set within the packet header, so that, again, the packet is a BC packet. The RX MCB interface 530 asserts a signal RX_END_BYTE[1:0] with the RX_PKT_AVAIL* and RX_EOP* signals to indicate the byte lane of the last byte in the packet.

The RX MCB interface 530 asserts a signal RX_ERROR* with the RX_PKT_AVAIL* and RX_EOP* signals if the source port detects and indicates an error in the packet during transmission by asserting the ABORT_OUT* signal. Several error conditions are checked by the ports 104, 110, such as detection of a FIFO overrun, a runt packet, an oversized packet, frame check sequence (FCS) error, or a Phased-Locked Loop (PLL) error. If the RX_ERROR* signal is asserted, the network switch 102 drops the packet if being transferred in SnF mode.

The MCB 404 asserts a signal RX_ACK* to the HCB 402 after detecting the RX_PKT_AVAIL* signal asserted and after latching the associated signals asserted with the RX_PKT_AVAIL* signal as described above. The MCB 404 asserts a signal RX_STB* when it is ready to accept the next DWORD of data. The MCB 404 asserts a signal RX_PKT_COMPLETE* when it determines that the HCB 402 may request the data. In particular, the MCB 404 asserts the RX_PKT_COMPLETE* signal after detecting the RX_SOP* signal asserted by the HCB 402 for CT mode packets. Also, the MCB 404 asserts the RX_PKT_COMPLETE* signal after detecting the RX_EOP* signal asserted by the HCB 402 for SnF mode packets. The MCB 404 does not assert the RX_PKT_COMPLETE* signal if the RX ERROR* signal was asserted for a SnF packet (indicated by the RX_CUT_THRU* signal not being asserted with the RX_SOP* signal). The MCB 404 asserts a signal RX_PKT_ABORTED* to the HCB 402 in lieu of the RX_PKT_COMPLETE* signal if the packet is dropped due to an overflow condition of the memory 212 as determined by the MCB 404.

The TX ARB REQ LOGIC 533 receives a request from the arbitration logic 504 to retrieve packet data from the memory 212 for transmission by an available destination port, which request is typically originated by the TX NW arbiter 515. The TX ARB REQ LOGIC 533 correspondingly asserts a transmit request signal TX_ARB_REQ* to the MCB 404 while also asserting the destination port number on signals TX_ARB_PORT[4:0] and a maximum transfer length for each data portion on signals TX_ARB_XSIZE [2:0]. The maximum transfer length is defined for the TX BUFs 524, 526 as 000b=16 bytes, 001b=32 bytes, 010b=64 bytes, 011=128 bytes and 100=256 bytes. The MCB 404 latches these values and asserts an acknowledge signal TX_ARB_ACK* to the TX ARB REQ LOGIC 533. The MCB 404 then retrieves the requested data from the memory 212 and writes the data to one of the TX BUFs 524, 526.

Data is transferred to the TX BUFs 524, 526 in the HCB 402 across a memory data input bus MemDataIn or MDI [31:0]. The TX MCB interface 531 asserts a signal TX_BUF_AVAIL* when the FIFO control block 529 determines that either of the TX BUFs 524, 526 are available to receive data from the MCB 404. The MCB 404 asserts a strobe signal TX_STB* when data is available to be sampled by the TX MCB interface 531 of the HCB 402 for storage in the available TX BUF 524 or 526. The MCB 404 asserts several signals concurrently with the TX_STB* signal for identifying characteristics of the data. In particular, the MCB 404 asserts a signal TX_SOP* with the TX_STB* signal for the beginning or start of a packet from the memory 212. The MCB 404 asserts a signal TX_AIFCS* with the TX_STB* signal if the source port is the PCB 406 indicating the CPU 230. The MCB 404 asserts a binary number on signals TX CNT[5:0] with the TX_STB* signal, where the TX_CNT[5:0] signals indicate the number of DWORDs (minus one DWORD) to write into the selected TX FIFO. The MCB 404 asserts a signal TX_EOP* with the TX_STB* signal for the end of the packet from the memory 212. The MCB 404 also asserts an end of buffer chain signal TX_EOBC* with the TX_EOP* and TX_STB* signals if there is no more data in the memory 212 for the particular destination port. The MCB 404 also asserts end byte signals TX_END_BYTE[1:0]* with the TX_EOP* and TX_STB* signals to indicate the byte lane of the last byte in the packet.

For BC packets, the MCB 404 asserts a signal BC_PORT_STB* while asserting a BC bitmap on the MDI[31:0] signals. The FIFO control block 529 detects assertion of the BC_PORT_STB* signal, latches the MDI [31:0] signals and stores the result in an internal BCBITMAP[28:0] register. The FIFO control block 529 uses the values in the BCBITMAP register when setting bits in an array of memory bits TXMEMCYC[28:0] in the TRANSMIT LIST 510.

Figure 5B:
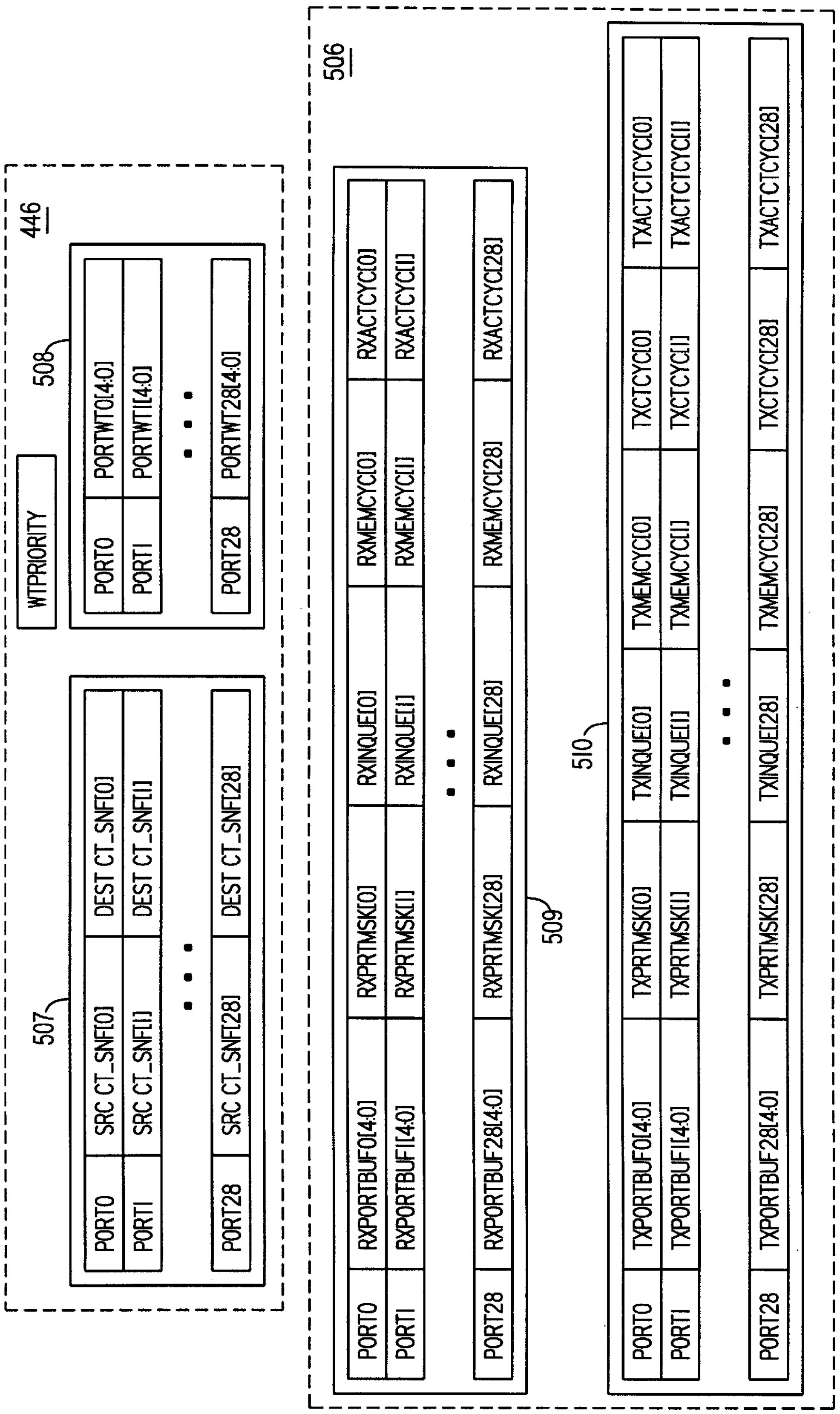
FIG. 5B is a diagram illustrating buffers within the memory of the bus controller block of FIG. 5A.

FIG. 5B is a diagram illustrating several of the registers 446 within the registers 506. The CT_SNF registers 507 include an array of programmable source port mode bits SRC CT_SNF[28:0], each corresponding to one of the ports PORT28 to PORT0, respectively, which are programmed by the CPU 230 to identify the desired mode of operation between CT and SnF when the corresponding port is a source port. In particular, when the SRC CT_SNF bit is set for a given port, it is desired to operate that port in CT mode when the port is acting as a source port. When the SRC CT_SNF bit is cleared, it is desired to operate that port in SnF mode when the port is acting as a source port. Likewise, the CT_SNF registers 507 include an array of programmable destination port mode bits DEST CT_SNF[28:0], each corresponding to one of the ports PORT28 to PORT0, respectively, which are programmed by the CPU 230 to identify the desired mode of operation between CT and SnF when the corresponding port is acting as a destination port for a unicast packet. CT mode is desired only when the source and destination ports are both designated for CT mode in the CT_SNF registers 507.

The RECEIVE LIST 509 includes a plurality of registers for storing corresponding receive priority counts referred to as the RXPORTBUFx[4:0] counts, where "x" reflects the port number. Each RXPORTBUFx count is five bits in the embodiment shown for prioritizing up to 32 ports. The RECEIVE LIST 509 includes a corresponding array of port mask bits RXPRTMSK[28:0], where each RXPRTMSK bit is set by the RX poll state machine 502 when that RXPRTMSK bit is initially at logic 0, indicating priority is not currently assigned, and when the respective PKT_AVAILm* signal is then asserted. At that time, the RX poll state machine 502 assigns a priority number in the corresponding RXPORTBUFx register. The priority number remains valid until the port is serviced. While the RXPRTMSK bit is set, the RX poll state machine 502 ignores further requests by masking subsequent assertions of the corresponding PKT_AVAILm* signal. The HSB controller 505 clears the RXPRTMSK bit during every read cycle transfer from the respective port for that packet other than for the first transfer for a new packet. The HASH REQ LOGIC 532 clears the RXPRTMSK bit during the first read cycle transfer if the packet is to be transferred according to SnF mode of operation. The HSB controller 505 clears the RXPRTMSK bit during the first write cycle transfer to the destination port if the packet is transferred in CT mode.

The RECEIVE LIST 509 includes an array of in-queue bits RXINQUE[28:0], which are each set when the corresponding RXPRTMSK bit is set. Each RXINQUE bit indicates whether the priority value is valid and if so, that the corresponding port is to be included in arbitration by the arbitration logic 504. The RXINQUE bit is cleared by an arbiter in the arbitration logic 504 when the respective port is submitted to the MAIN arbiter 512 to be serviced as the next port for transferring data for a new packet or for a continuing SnF packet.

The RECEIVE LIST 509 includes an array of memory bits RXMEMCYC[28:0] which indicate whether the respective port is to receive data into the memory 212. This occurs for SnF mode, for interim CT mode and for interim mid-packet CT mode of operation. The HASH REQ LOGIC 532 sets a corresponding RXMEMCYC bit upon determination of SnF mode or interim CT mode. The MAIN arbiter 512 sets the RXMEMCYC bit for mid-packet interim CT mode packets if the destination port does not indicate buffer space available during normal CT mode. The HSB controller 505 clears the RXMEMCYC bit on the last read cycle transfer of data for the respective port.

The RECEIVE LIST 509 includes an array of active or CT bits RXACTCYC[28:0], which indicate whether the respective port is transferring a data packet according to normal CT mode of operation. The HASH REQ LOGIC 532 sets a corresponding RXACTCYC bit for CT mode packets. The HSB controller 505 clears the RXACTCYC bit on a read cycle of the last data transfer of a packet for the corresponding port. The MAIN arbiter 512 clears the RXACTCYC bit if the bit is set for CT mode and the MAIN arbiter 512 converts the packet to a mid-packet interim CT packet.

The TRANSMIT LIST 510 includes a plurality of registers for storing corresponding transmit priority counts referred to as the TXPORTBUFx[4:0] counts, where "x" reflects the port number. Each TXPORTBUFx count is five bits in the embodiment shown for prioritizing up to 32 ports.

The TRANSMIT LIST 510 includes a corresponding array of port mask bits TXPRTMSK[28:0], where each TXPRTMSK bit is set by the TX poll state machine 503 when that TXPRTMSK bit is initially at logic 0, indicating priority is not currently assigned, and when the respective BUF_AVAILm* signal is then asserted. At that time, the TX poll state machine 503 assigns a priority number in the corresponding TXPORTBUFx register. The priority number remains valid until the port is serviced. While the TXPRTMSK bit is set, the TX poll state machine 503 ignores further requests by masking subsequent assertions of the corresponding BUF_AVAILm* signal. The HSB controller 505 clears the TXPRTMSK bit during every read cycle transfer from the respective port for that packet other than for the first transfer for a new packet. The HSB controller 505 clears the TXPRTMSK bit during every write cycle transfer of packet data to the destination port.

The TRANSMIT LIST 510 includes an array of in-queue bits TXINQUE[28:0], which are each set when the corresponding TXPRTMSK bit is set. Each TXINQUE bit indicates whether the priority value is valid and if so, that the corresponding port is to be included in arbitration by the arbitration logic 504. The TXINQUE bit is cleared by an arbiter in the arbitration logic 504 when the respective port is submitted to the MAIN arbiter 512 to be serviced for transferring data for a new packet or a continuing SnF packet.

The TRANSMIT LIST 510 includes the TXMEMCYC [28:0] array of memory bits, which indicate whether the respective port is to transmit data received from the memory 212. This occurs for SnF mode, for interim CT mode and for interim mid-packet CT mode of operation. The FIFO control block 529 sets one or more TXMEMCYC bit in response to assertion of the RX_PKT_COMPLETE* signal by the MCB 404 after receiving data from the HCB 402. For unicast packets, only one of the TXMEMCYC bits are set. For BC packets, the FIFO control block 529 uses its BCBITMAP register to determine which TXMEMCYC bits to set. For SnF mode packets, the TXMEMCYC bits are set after the entire packet is transferred to the MCB 404 for storage in the memory 212. For interim CT mode packets including mid-packet interim mode CT packets, a TXMEMCYC bit is set during the first data transfer of data to the MCB 404. The HSB controller 505 clears a TXMEMCYC bit on the last write cycle transfer of data to a respective port. This occurs when the MCB 404 also asserts the TX_EOBC* signal indicating there is no more data in the memory 212 for that port.

The TRANSMIT LIST 510 includes an array of transmit CT bits TXCTCYC[28:0], which indicate whether there is data in one of the RX BUFs 520, 522 for writing directly to the respective destination port according to normal CT mode of operation. The HASH REQ LOGIC 532 sets a corresponding TXCTCYC bit on the first data transfer of the packet. The HSB controller 505 clears the TXCTCYC bit on the first write cycle transfer of data to the corresponding destination port.

The TRANSMIT LIST 510 includes an array of active CT bits TXACTCTCYC[28:0], which indicate whether the respective port is involved in transferring a packet according to CT mode of operation. The HASH REQ LOGIC 532 sets a corresponding TXACTCYC bit when it determines that the packet is to be transferred according to CT mode. The FIFO control block 529 clears the TXACTCYC bit during the first transfer of data to the MCB 404 for storage in the memory 212 when the packet is converted from CT mode to mid-packet interim CT mode. The HSB controller 505 also clears the TXACTCYC bit during the last data transfer of a packet.

The WEIGHT FACTORS 508 include an array of port weight factors PORTWTx[4:0] for each of the ports PORT0–PORT28, where "x" indicates the particular port number. The PORTWT weight factors are preferably unique and pre-programmed by the user for providing user-programmable priority of the ports. In the embodiment shown, the same weight factor is assigned to each port for both the receive and transmit cases, although different weight factors could be defined for the transmit and receive operations.

FIG. 5C is a state diagram illustrating the receive poll operation of the RX poll state machine 502. The primary function of the RX poll state machine 502 is to monitor the PKT_AVAILm* signals, assign priority counts RXPORTBUFx and set the RXPRTMSK bits in the RECEIVE LIST 509. Transitions between states are based on transitions or cycles of the CLK signal and the state of the STROBE* signal. Initially, upon power-up and configuration, the receive priority count number RPCOUNT is set equal to zero and the RX poll state machine 502 is placed in an initial idle state 550. Also, RXINCCNTBY[7:0] logic bits that correspond to the PKT_AVAILm* signals are cleared. The RX poll state machine 502 stays in state 550 while the STROBE* signal is not asserted, which is when the STROBE* signal is high or at logic 1. When the STROBE* signal is asserted low, operation transitions to one CLK wait state (RxPollWait) 552.

In response to sampling the STROBE* signal being asserted, the QC devices 202, the TPI 220 and the PCB 406 each respond by asserting a corresponding one of the PKT_AVAILm* signals, otherwise referred to as the PKT_AVAIL[7:0]* signals, after one CLK cycle. Thus, operation proceeds to state 554 after one CLK cycle to begin polling each of the PKT_AVAIL[7:0]* signals. Operation transitions from state 554 to state 556, then to state 558 and then to state 560 on successive cycles of the CLK signal. Operation returns to state 554 from state 560 and continues to loop while the STROBE* signal remains asserted. However, the STROBE* signal is preferably periodic and is negated for one CLK cycle and then re-asserted for the next three CLK cycles. Thus, operation returns to state 550 if the STROBE* signal is de-asserted at step 560. In each of the states 554, 556, 558 and 560, an initial arbitration count logic operation is performed based on an increment of the RXNEWCNT and RXACTCNT numbers compared to the RPCOUNT number to determine if any of the remaining logic operations are performed.

If the initial arbitration count logic operation is true at step 554, nine logic operations are performed, labeled 1–9, where the first eight operations correspond to ports PORT0, PORT4, PORT8, PORT12, PORT16, PORT20, PORT24 and PORT28, respectively, for the first port of each of the QC devices 202 and the TPI 220, and the PCB 406. For each of the eight port logic operations 1–8, a corresponding one of the PKT_AVAILm* signals is compared to a corresponding RXPRTMSK bit to determine whether to accept the request. If the request is accepted for a port, which occurs if the RXPRTMSK has not been previously set, an RXPORTBUFx priority number is assigned for that port. Also, the corresponding RXPRTMSK bit is set to logic 1 to mask further requests by that port, and a corresponding RXINCCNTBY bit is set to logic 1. The ninth logic operation is performed to increment RPCOUNT.

For PORT0, if PKT_AVAIL[0]* is not asserted or if RXPRTMSK[0] is equal to logic 1, then priority has already been established and is not changed until PORT0 is serviced.

If, however, the PKT_AVAIL[0]* signal is asserted low and if RXPRTMSK[0] is logic 0, then the corresponding priority count RXPORTBUF0 is set equal to the corresponding weight factor RXPORTWT0 if a WTPRIORITY flag indicates priority according to the weight factors. If, however, the WTPRIORITY flag is false, the priority count RXPORTBUF0 is set equal to RPCOUNT. Then, the RXPRTMSK[0] and RXINCCNTBY[0] bits are both set to logic 1. Setting RXPRTMSK[0] masks further receive polling requests for PORT0. The RXINCCNTBY[0] bit corresponds to the PKT_AVAIL[0]* signal and is used in remaining logic operations in state 554 to indicate that a priority value was set for PORT0.

In the second logic operation corresponding to PORT4, if PKT_AVAIL[1] is not asserted low or if RXPRTMSK[4] is equal to logic 1, then priority has already been established and is not changed until PORT4 is serviced. If, however, the PKT_AVAIL[1]* signal is asserted low and if RXPRTMSK [4] is logic 0, then the corresponding priority count RXPORTBUF4 is set equal to the corresponding weight factor RXPORTWT4 if the WTPRIORITY flag indicates priority according to the weight factors. If, however, the WTPRIORITY flag is false, the priority count RXPORTBUF4 is set equal to RPCOUNT plus RXINCCNTBY[0]. In this manner, if WTPRIORITY is false, RXPORTBUF4 is given a priority number of RPCOUNT if PORT0 was not assigned a priority number, or is given a priority number of RPCOUNT+1 if PORT0 was given a priority number. This ensures that PORT0 and PORT4 are not given the same priority number. The RXPRTMSK[4] bit is then set to logic 1 to mask further polling requests. In this manner, the priority number assigned to each port is either the predetermined weight factor for that port, or the priority number is equal to RPCOUNT plus the number of ports having a lower port number and assigned a priority number at the same time.

The next six logic operations are similar to the second logic operation. In an eighth logic operation corresponding to the PCB 406, if PKT_AVAIL[7]* is not asserted low or if RXPRTMSK[28] is equal to logic 1, then priority has already been established and is not changed until the PCB 406 is serviced. If, however, the PKT_AVAIL[7]* signal is asserted low and if RXPRTMSK[28] is logic 0, then the corresponding priority count RXPORTBUF28 for the PCB 406 is set equal to the corresponding weight factor RXPORTWT28 if the WTPRIORITY flag indicates priority according to the weight factors. If, however, the WTPRIORITY flag is false, the priority count RXPORTBUF28 is set equal to RPCOUNT plus the "bit sum" of RXINCCNTBY[6:0]. The bit sum of RXINCCNTBY[6:0] equals the number of the number of priority values that were assigned in the previous seven port logic operations. Thus, the PCB 406 is given a priority number equal to the predetermined weight factor, or the priority number is RPCOUNT plus the number of ports having a lower port number and simultaneously assigned a priority number. A ninth logic operation is performed in state 554 to increment RPCOUNT by the bit sum of RXINCCNTBY[7:0], which equals the number of ports assigned priority in state 554. This operation ensures that RPCOUNT is incremented for the next set of logic operations in state 556.

For example, if all of the ports associated with the first multiplexed bit of the PKT_AVAIL[7:0]* signals, or ports PORT0, PORT4, PORT8, PORT12, PORT16, PORT20, PORT24 and PORT28 request at the same time in state 554 and RPCOUNT is initially equal to zero and none of the corresponding RXPRTMSK bits have previously been set and if WTPRIORITY is false, then the corresponding priority counts RXPORTBUFx (x=0, 4, 8, 12, 16, 20, 24 and 28) are assigned priority numbers of 0, 1, 2, 3, 4, 5, 6 and 7, respectively, in state 554. Then, RPCOUNT is set equal to 8. As another example, if ports PORT4, PORT12 and PORT20 are the only ports requesting service, then the priority numbers RXPORTBUFx (x=4, 12, 20) are assigned priority numbers of 0, 1 and 2, respectively, if WTPRIORITY is false, and then RPCOUNT is set equal to 3. The bit sum operation ensures that a unique priority number is given to each port if several ports are requesting service at the same time. In this manner, the priority numbers are according to a first-come, first-served (FCFS) priority scheme, but a particular order is predetermined to establish priority to handle simultaneous assignments.

The logic operations in states 556, 558 and 560 are similar to those performed in state 554. In state 556, if the initial arbitration count logic operation is true, eight logic operations are performed, including seven logic operations associated with the second port of each of the QC devices 202 and the TPI 220 based on the PKT_AVAIL[6:0]* signals, which includes ports PORT1, PORT5, PORT9, PORT13, PORT17, PORT21 and PORT25, and the eighth logic operation of state 554 is repeated for the port PORT28 for the CPU 230. In state 558, seven logic operations associated with the third port of each of the QC devices 202 and the TPI 220 are performed based on the PKT_AVAIL[6:0]* signals, including ports PORT2, PORT6, PORT10, PORT14, PORT18, PORT22 and PORT26, and the eighth logic operation of state 554 is repeated for the port PORT28 for the CPU 230. In state 560, seven logic operations associated with the fourth port of each of the QC devices 202 and the TPI 220 are performed based on the PKT_AVAIL[6:0]* signals, including ports PORT3, PORT7, PORT11, PORT15, PORT19, PORT23 and PORT27, and the eighth logic operation of state 554 is repeated for the port PORT28 for the CPU 230. In each of the states 556, 558 and 560, a final logic operation is performed to update the RPCOUNT by the bit sum of the RXINCCNTBY bits in a similar manner as described previously.

FIG. 5D is a state diagram illustrating the transmit poll operation of the TX poll state machine 503. The TX poll state machine 503 operates in a similar manner as the RX poll state machine 502, and includes states 561, 562, 564, 566, 568 and 570, which are analogous to the states 550, 552, 554, 556, 558 and 560, respectively. However, RPCOUNT is replaced with TPCOUNT and the initial arbitration count logic operation is performed based on an increment of the TXNEWCNT and TXACTCNT numbers compared to the TPCOUNT number to determine if any of the remaining logic operations are performed. The BUF_AVAILm* signals replace the PKT_AVAILm* signals, and TXPRTMSK bits replace the RXPRTMSK bits. Also, for each port equation, each TXPRTMSK bit is logically ANDed with a logic term based on corresponding bits of the TXMEMCYC, TXCTACTCYC and TXCTCYC bit arrays. In particular, the corresponding bits of the TXMEMCYC, TXCTACTCYC and TXCTCYC bit arrays are OR'd together so that priority is assigned to a destination port only if data is available in the EPSM 210 or the memory 212 for transmission by that port. Also, TXPORTBUFx priority numbers replace the RXPORTBUFx numbers, TXPORTWT weight factors replace the RXPORTWT weight factors and TXINCCNTBY bits replace the RXINCCNTBY bits. In this manner, each port and the PCB 406 indicates with a respective one of the BUF_AVAIL* signals in response to the STROBE* signal, and the TX poll state machine 503 assigns a priority number based on the weight factors or FCFS using TPCOUNT, and sets priority accordingly.

It is appreciated that the polling logic 501 periodically or continuously toggles the STROBE* signal and monitors the PKT_AVAILm* and BUF_AVAILm* signals of each of the ports 104, 110 and the PCB 406 for assigning priority to each of the requesting ports, and for setting the corresponding poll mask bits. The assigned priority is based on the pre-programmed weight factors if WTPRIORITY is true, or FCFS if WTPRIORITY is false. The priority remains static until the port is serviced. Eventually the port is serviced and the mask bit is cleared, as described below.

The arbiters 513–516 select between the ports 104, 110 and the PCB 406 based on one of several arbitration schemes, where the particular arbitration scheme is user-programmable. The first is the round-robin scheme, where the ports are reviewed in any arbitrary order, such as PORT0, PORT1, . . . , PORT28 or the like, or the order is selected by the WEIGHT FACTORS 508 pre-programmed in the PORTWTx registers. In the embodiment shown, the WEIGHT FACTORS are used to assign the round-robin order, and are programmed into the respective RXPORTBUFx and TXPORTBUFx counts. The RX NW arbiter 513 uses and increments the RXNEWCNT priority number, the RX ACT arbiter 514 uses and increments the RXACTCNT priority number, the TX NW arbiter 515 uses and increments the TXNEWCNT priority number and the TX CT arbiter 516 uses and increments the TXCTCNT priority number. For the round-robin scheme, the RX arbiters 513, 514 each review the RXINQUE[ ] values to determine the active receive ports requesting service, and then compare its respective priority number (RXNEWCNT, RXACTCNT) with the values in the RXPORTBUFx counts of the active ports to determine the next port to service. Also, the TX arbiters 515, 516 each review the TXINQUE[ ] values to determine the active transmit ports requesting service, and then compare its respective priority number (TXNEWCNT, TXCTCNT) with the count values in the TXPORTBUFx counts of the active ports to determine the next port to service. Since the WEIGHT FACTORS determine a particular order, the ports are ordered in round-robin fashion.

The second arbitration scheme is FCFS, where WTPRIORITY is false and the ports are serviced based on the order they requested service as indicated by the RXPORTBUFx and TXPORTBUFx priority numbers. The FCFS operates in a similar manner as round-robin, except that the RXPORTBUFx and TXPORTBUFx counts are programmed according to the RPCOUNT and TPCOUNT values as described previously. Then, the RX arbiters 513, 514 each review the RXINQUE[ ] values to determine the active receive ports requesting service, and then compare its respective priority number (RXNEWCNT, RXACTCNT) with the values in the RXPORTBUFx counts of the active ports to determine the next port to service. Also, the TX arbiters 515, 516 each review the TXINQUE[ ] values to determine the active transmit ports requesting service, and then compare its respective priority number (TXNEWCNT, TXCTCNT) with the count values in the TXPORTBUFx counts of the active ports to determine the next port to service. Since the RPCOUNT and TPCOUNT values determine the order, the ports are ordered in FCFS fashion.

Another scheme is the weighted priority scheme, where WTPRIORITY is true and the RXPORTWTx and TXPORTWTx numbers are copied into correspondirig ones of the RXPORTBUFx and TXPORTBUFx registers and used for determining priority. However, the RX arbiters 513, 514 determine priority from an RX HIGH PRIORITY number and the TX arbiters 515, 516 determine priority from a TX HIGH PRIORITY number. The RX HIGH PRIORITY number is determined by identifying the highest priority number (or the lowest number) in the RXPORTBUFx counts of the active receive ports, where the active receive ports are determined from the RXINQUE values. Likewise, the TX HIGH PRIORITY number is determined by identifying the highest priority number (or the lowest number) in the TXPORTBUFx counts of the active transmit ports, where the active transmit ports are determined from the TXINQUE values. In this manner, an active (requesting service) port with the highest WEIGHT FACTOR is selected each time, thereby implementing the weighted priority scheme.

The RX NW arbiter 513 handles all new packet header data and continuing SnF mode packet data received at the ports PORT0–PORT28, which data is transferred to either one of the RX BUFs 520, 522. The RX NW arbiter 513 updates the RXNEWCNT number and reviews the RECEIVE LIST 509 to determine which of the ports PORT0–PORT28 meet its receive criterion. The receive criterion for the RX NW arbiter 513 is met by those ports having their respective RXINQUE bit asserted and their RXACTCYC bit not asserted. The receive criterion for the RX NW arbiter 513 also includes ports with their respective RXINQUE and RXMEMCYC bits both asserted. The RX NW arbiter 513 then arbitrates between those ports meeting its receive criterion and according to a selected arbitration scheme as described previously. After selecting a port and defining a cycle, the RX NW arbiter 513 requests the MAIN arbiter 512 to execute a read cycle. When the RX NW arbiter 513 is next selected by the MAIN arbiter 512, the RX NW arbiter 513 clears the RXINQUE bit of the selected port to be serviced. The RX NW arbiter 513 continuously repeats this process.

The TX CT arbiter 516 transfers data in the RX BUFs 520, 522 to a destination port for normal CT operation. The TX CT arbiter 516 updates the TXCTCNT number and reviews the TRANSMIT LIST 510 to determine which of the ports PORT0–PORT28 meet its transmit criterion. The transmit criterion for the TX CT arbiter 516 is met by those ports having their respective TXINQUE and TXCTCYC bits both asserted. The TX CT arbiter 516 then arbitrates between those ports meeting its transmit criterion and according to the selected arbitration scheme as described above. After selecting a port and defining a cycle, the TX CT arbiter 516 requests the MAIN arbiter 512 to execute a write cycle from the selected RX BUF 520 or 522 to the winning destination port. When the TX CT arbiter 516 is next selected by the MAIN arbiter 512, the TX CT arbiter 516 clears the TXINQUE bit of the selected port to be serviced. The TX CT arbiter 516 continuously repeats this process.

The RX ACT arbiter 514 transfers subsequent packet data to the CT BUF 528 from a source port operating in normal CT mode of operation, other than the first read cycle for a new packet (which is handled by the RX NW arbiter 513). The RX ACT arbiter 514 updates the RXACTCNT number and reviews the RECEIVE LIST 509 to determine which of the ports PORT0–PORT28 meet its receive criterion. The receive criterion for the RX ACT arbiter 514 is met by those ports having their respective RXINQUE and RXACTCYC bits asserted and their respective RXMEMCYC bit not asserted. The RX ACT arbiter 514 then arbitrates between those ports meeting its receive criterion and the selected arbitration scheme as described above. After selecting a port and defining a cycle, the RX ACT arbiter 514 requests the MAIN arbiter 512 to execute a read cycle to transfer data from the selected source port to the CT BUF 528. When the RX ACT arbiter 514 is next selected by the MAIN arbiter 512, the RX ACT arbiter 514 clears the RXINQUE bit of the selected port to be serviced. The RX ACT arbiter 514 continuously repeats this process.

The MAIN arbiter 512 follows each CT mode read cycle into the CT BUF 528 with a write cycle to transfer data in the CT BUF 528 to the destination port indicated by the HASH REQ LOGIC 532. The MAIN arbiter 512 determines whether the destination port is busy before allowing the RX ACT arbiter 514 to transfer CT data to the CT BUF 528. If the MAIN arbiter 512 determines that that destination port is busy, it converts the source and destination ports to mid-packet interim CT mode by setting the respective RXMEMCYC bit and clearing the respective RXACTCYC bit for the source port.

The TX NW arbiter 515 transfers data from either of the TX BUFs 524, 526 to the HSB 206 according to SnF mode of operation. The TX NW arbiter 515 updates the TXNEWCNT number and reviews the TRANSMIT LIST 510 to determine which of the ports PORT0–PORT28 meet its transmit criterion. The transmit criterion for the TX NW arbiter 515 is met by those ports having their respective TXINQUE and TXMEMCYC bits asserted and their respective TXACTCTCYC bit not asserted. The TX NW arbiter 515 then arbitrates between those ports meeting its transmit criterion according to the selected arbitration scheme. After selecting a port and defining a write cycle from a TX BUFs 524, 526 to the selected destination port, the TX NW arbiter 515 requests the MAIN arbiter 512 to execute the write cycle. When the TX NW arbiter 515 is next selected by the MAIN arbiter 512, the TX NW arbiter 515 clears the TXINQUE bit of the selected port to be serviced. The TX NW arbiter 515 continuously repeats this process.

Figure 6:
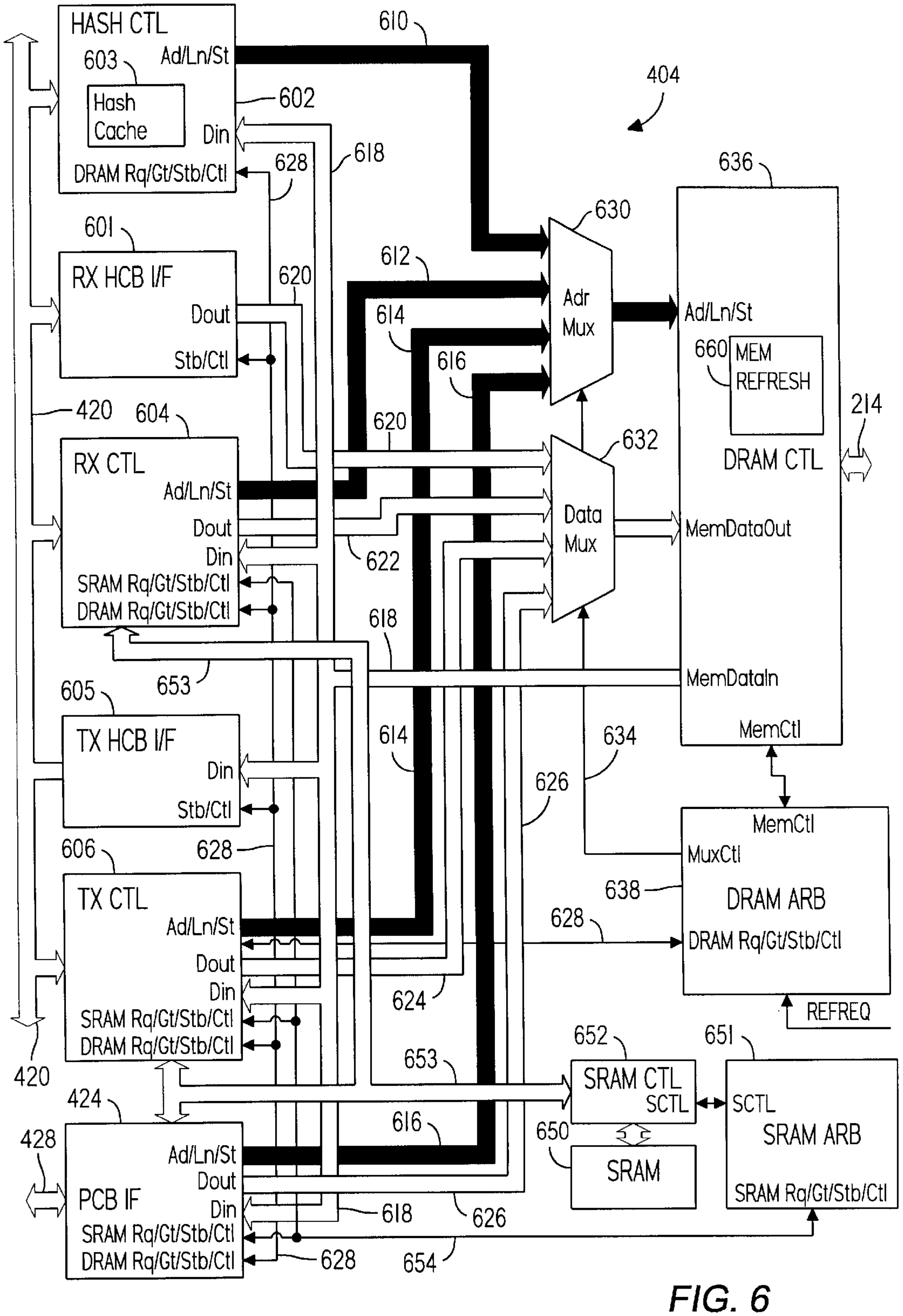
FIG. 6 is a more detailed block diagram of the memory controller block of FIG. 4.

Referring now to FIG. 6, a more detailed block diagram is shown of the MCB 404 within the EPSM 210. The MCB configuration registers 448 are not shown in FIG. 6 though are included and are further accessible as necessary by many of the functional blocks, that will now be described. The MCB 404 includes a hash controller 602, which is coupled to the MCB interface 414 through the bus 420. The hash controller 602 optionally includes a hash cache table 603, which stores data retrieved from the memory 212. The hash cache 603 provides faster access to data recently pulled from the memory 212 rather than requiring another memory cycle to retrieve recently accessed information. The hash controller 602 includes Address/Length/Status (AD/LN/ST) outputs coupled to one multi-line input of a four-input address multiplexer (mux) 630 across a bus 610. The AD/LN/ST outputs define an address for the memory 212, the length of the transaction for determining whether a burst cycle is to be performed or not, and miscellaneous status signals such as a read/write (R/W) signal, byte enables, a page hit signal, a lock signal, etc. DRAM Request/Grant/Strobe/Control (DRAM RQ/GT/STB/CTL) signals 628 are coupled to a DRAM memory arbiter 638 and to DRAM RQ/GT/STB/CTL inputs of the hash controller 602. The output of the mux 630 is provided to AD/LN/ST inputs of a DRAM memory controller 636, which is further coupled to the memory 212 through the memory bus 214. The hash controller 602 has a data input (DIN) for receiving data from a MemDataIn output of the DRAM controller 636 across a data bus 618.

An RX HCB interface 601 is coupled to the bus 420 including the MDO[3 1:0] signals, and includes a data output (DOUT) for providing data to a first multi-line input of a four-input data mux 632 across a bus 620, where the mux 632 provides its output to MemDataOut inputs of the DRAM controller 636. The RX HCB interface 601 includes STB/CTL inputs for receiving the strobe and control signals of the DRAM RQ/GT/STB/CTL signals 628. An RX controller 604 is coupled to the bus 420, and has AD/LN/ST outputs coupled across a bus 612 to the second input of the mux 630. The RX controller 604 has a data output DOUT coupled to the second input of the mux 632 across a bus 622, a data input DIN coupled to the bus 618, SRAM RQ/GT/STB/CTL inputs for receiving SRAM RQ/GT/STB/CTL signals 654 associated with a static RAM (SRAM) 650 and DRAM RQ/GT/STB/CTL inputs for receiving the DRAM RQ/GT/STB/CTL signals 628.

A TX HCB interface 605 is coupled to the bus 420 including the MDI[31:0] signals, and has a data input DIN coupled to the bus 618 and STB/CTL inputs receiving the strobe and control signals of the DRAM RQ/GT/STB/CTL signals 628. A TX controller 606 is coupled to the bus 420 and has AD/LN/ST outputs provided to the third input of the mux 630 across a bus 614, a data output DOUT coupled to the third input of the mux 632 across a bus 624, a data input DIN coupled to the bus 618, SRAM RQ/GT/STB/CTL inputs for receiving the SRAM RQ/GT/STB/CTL signals 654 and DRAM RQ/GT/STB/CTL inputs for receiving the DRAM RQ/GT/STB/CTL signals 628. The PCB interface 424 has AD/LN/ST outputs coupled to the fourth input of the mux 630 across a bus 616, a data output DOUT coupled to the fourth input of the mux 632 across a bus 626, a data input DIN coupled to the bus 618, SRAM RQ/GT/STB/CTL inputs for receiving the SRAM RQ/GT/STB/CTL signals 654 and DRAM RQ/GT/STB/CTL inputs for receiving the DRAM RQ/GT/STB/CTL signals 628.

The hash controller 602, the RX controller 604, the TX controller 606, the PCB interface 424, the RX HCB interface 601 and the TX HCB interface 605 each use the STB signal for synchronizing data flow, where assertion of the STROBE signal determines when data is valid for a read cycle or when data is retrieved for a write cycle. The CTL signals are miscellaneous control signals, such as, for example, a signal indicating when a data cycle is completed.

The DRAM arbiter 638 is further coupled to the DRAM controller 636 through memory control signals (MEMCTL), and provides mux control signals (MUXCTL) to the select inputs of the muxes 630, 632. The MEMCTL signals generally indicate the beginning and end of each memory cycle. In this manner, the hash controller 602, the RX controller 604, the TX controller 606 and the PCB interface 424 arbitrate for access to the DRAM controller 636 to execute a memory cycle to the memory 212 by asserting respective request signals. The DRAM arbiter 638 receives the request signals and asserts a corresponding grant (GT) signal to one of the requesting devices 602, 604, 606 or 424, thereby granting access to that device. Once access is granted, the DRAM arbiter 638 asserts the MUXCTL signals to the muxes 630 and 632 to enable access of the DRAM controller 636 by the selected one of the devices 602, 604, 606 or 424 to perform memory cycles as desired, and one of the MEMCTL signals is asserted to indicate to the DRAM controller 636 the start of the cycle. The DRAM controller 636 asserts or negates one of the MEMCTL signals to indicate completion of a memory cycle.

The hash controller 602 communicates with the HASH REQ LOGIC 532 to perform the hashing procedure to determine how to handle a new packet header stored in the HASH REQ LOGIC 532. The hash controller 602 detects the HASH_REQ* signal asserted, retrieves the source and destination media access control (MAC) addresses from the HASH_DA_SA[15:0] signals, and performs the hashing procedure for determining the HASH_STATUS[1:0] signals and for providing the destination port number on the HASH_DSTPRT[4:0] signals, if previously stored in the memory 212. The RX controller 604 and the RX HCB interface 601 control and transfer data from the RX BUFs 520, 522 to the memory 212. The TX controller 606 and the TX HCB interface 605 primarily control and transfer data from the memory 212 to the TX BUFs 524, 526. The PCB interface 424 enables the CPU 230 more direct access to data within memory, including the memory 212 and the SRAM 650.

The SRAM 650 is coupled to an SRAM controller 652, which is further coupled to the RX controller 604, the TX controller 606 and the PCB interface 424 across a bus 653. An SRAM arbiter 651 is coupled to the SRAM controller 652 through control signals SCTL, and is also coupled to the SRAM RQ/GT/STB/CTL signals 654 for controlling access to the SRAM 650 by the PCB interface 424, The TX controller 606 and the RX controller 604 across the bus 653 in a similar manner as the DRAM arbiter 638 controls access to the DRAM controller 636.

The MCB 404 includes the SRAM 650 for storing packet control registers and other data as described further below. The packet control registers include a set of pointers to a RECEIVE SECTOR CHAIN per port, a TRANSMIT PACKET CHAIN per port and a FREEPOOL CHAIN of free memory sectors within the memory 212. The packet control registers further include control information and parameters for enabling control of the flow of packet data in the network switch 102. The memory 212 includes a packet memory section, which is organized as a plurality of contiguous and equal-sized sectors. The sectors are initially linked together using address pointers or the like forming the FREEPOOL CHAIN. As packet data is received from a port, the sectors are pulled from the FREEPOOL CHAIN and added to the RECEIVE SECTOR CHAIN for that port. Also, the packet is linked into one or more of the TRANSMIT PACKET CHAINs for the one or more destination ports to which the packet is to be sent for transmission. The bus 653 enables the RX controller 604, the TX controller 606 and the CPU interface 436 to access the packet control registers, which include the pointers to the packet chains of data in the memory 212.

The DRAM controller 636 further includes memory refresh logic 660 for maintaining the data within the memory 212. The refresh logic 660 is adaptable to operate according to the type of memory coupled to the memory bus 214, including FPM DRAM, EDO DRAM, or synchronous DRAM. In this manner, refresh functions are removed from the CPU 230 for more efficient operation and improved performance. A 10-bit memory refresh counter (MRC) located in the MCB configuration registers 448 defines the number of clock cycles between refresh requests. It is desired that the period be less than or equal to 15.625 μs. The default is 208h, where "h" denotes a hexadecimal value, which provides a refresh period of approximately 15.60 μsecs for a 30 ns CLK cycle. Upon timeout, the MRC counter asserts a signal REFREQ to the DRAM arbiter 638, which asserts one of the MEMCTL signals to the DRAM controller 636 indicating for the memory refresh logic 660 to perform the refresh cycles. The MCB configuration registers 448 include a memory control register (MCR), which defines the memory type, speed and configuration of the memory 212. For example, 2 bits of the MCR define whether the memory type is FPM, EDO or synchronous DRAM. Another bit defines memory speed as either 50 or 60 ns. Other bits define particular modes of the selected DRAM type and also indicate errors, such as parity errors.

Figure 7A:
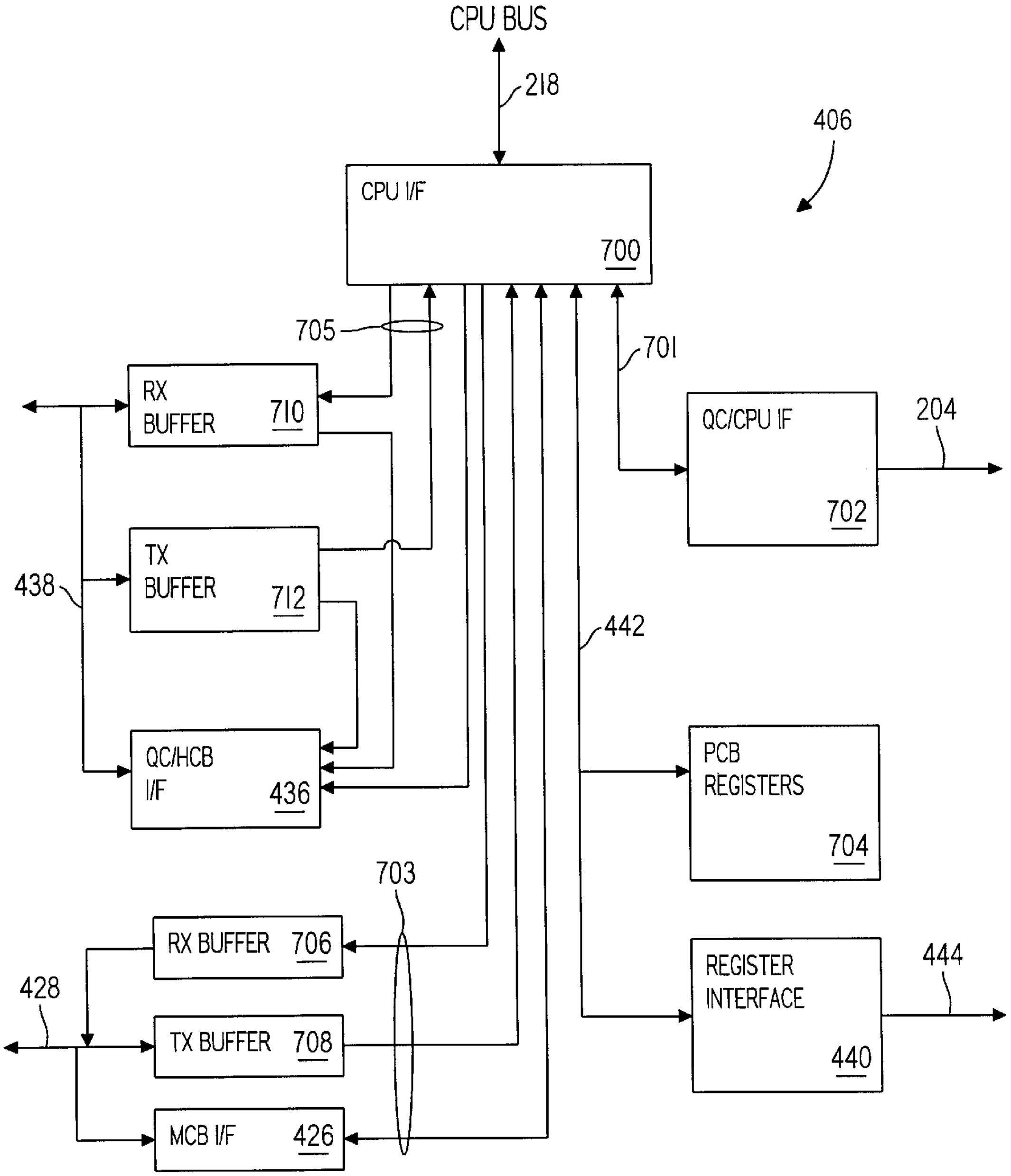
FIGS. 7A–7E are more detailed block diagrams of the processor controller block of FIG. 4.

Referring now to FIG. 7A, a more detailed block diagram is shown of the PCB 406. The CPU bus 218 is coupled to CPU interface logic 700 within the CPU interface 432, where the CPU interface logic 700 is further coupled through a bus 701 to a QC/CPU interface 702 for interfacing the QC/CPU bus 204. The CPU interface logic 700 provides data to a 16-byte receive buffer RX BUF 706 within the FIFOs 430, which asserts data on the MCB bus 428. The MCB bus 428 provides data to a 16-byte transmit buffer TX BUF 708, also within the FIFOs 430, for providing data to the CPU interface logic 700. The MCB interface 426 controls data flow between the CPU interface logic 700 and the MCB bus 428. The CPU interface logic 700 is coupled to the RX BUF 706, the TX BUF 708 and the MCB interface 426 through bus signals 703.

The CPU interface logic 700 is coupled to the register interface 440 through the bus 442, where the register interface 440 enables access to other configuration registers in the EPSM 210. The CPU interface logic 700 is also coupled to a set of PCB registers 704 through the bus 442 for defining the input/output (I/O) space of the CPU 230, such as interrupt registers, configuration registers, packet information registers, memory related registers, setup and status registers, interface and monitoring registers, statistics registers, mode registers, arbitration registers, etc.

During power up and configuration, the CPU 230 programs initial or default values in the PCB registers 704. For example, the CPU 230 programs a PORT SPEED REGISTER in the PCB registers 704, which is a bitmap defining the speed of each port, which is either 10 or 100 MHz in the embodiment shown. Also, a PORT TYPE REGISTER is programmed, which is a bitmap defining the type of port between QC and TLAN. These registers are typically not changed during operation, but may be re-programmed as desired.

Other registers in the PCB registers 704 are used during operation. For example, the PCB registers 704 include an INTERRUPT SOURCE register and a POLLING SOURCE register. The INTERRUPT SOURCE register includes a set of interrupt bits MCB_INT, MEM_RDY, PKT_AVAIL, BUF_AVAIL, ABORT_PKT and STAT_RDY. The PCT_AVAIL and BUF_AVAIL interrupts bits correspond to the PCB_PKT_AVAIL* and PCB_BUF_AVAIL* signals. At least one interrupt signal CPU_INT* is provided to the CPU 230, which reads the INTERRUPT SOURCE register to determine the source of the interrupt when the CPU_INT* signal is asserted. The MCB_INT interrupt bit indicates to the CPU 230 that an interrupt has occurred in the MCB 404. The MEM_RDY interrupt bit informs the CPU 230 that the requested data in the memory 212 is available in the FIFOs 430. The PKT_AVAIL interrupt bit informs the CPU 230 that packet data is available for the CPU 230. The BUF_AVAIL interrupt bit informs the CPU 230 that buffer space is available for the CPU 230 to send packet data. The ABORT_PKT interrupt bit informs the CPU 230 that the ABORT_IN* signal was asserted. The STAT_RDY interrupt bit informs the CPU 230 that requested statistical information from the QC devices 202 is in the FIFOs 430. The POLLING SOURCE register includes a copy of each interrupt bit in the event the interrupts are masked and the polling method is used.

The CPU interface logic 700 provides data to a 64-byte receive buffer RX BUF 710 within the FIFOs 434, which asserts data on the HCB bus 438. A transmit buffer TX BUF 712 within the FIFOs 434 receives data from the HCB bus 438 for providing the data to the CPU interface logic 700. The CPU interface logic 700 is coupled to the RX BUF 710, the TX BUF 712 and the QC/HCB interface 436 through bus signals 705. The QC/HCB interface 436 is coupled to the CPU interface logic 700, the RX and TX BUFs 710, 712 and the HCB bus 438 for controlling data transfers between the HCB 402 and the PCB 406.

Figure 7B:
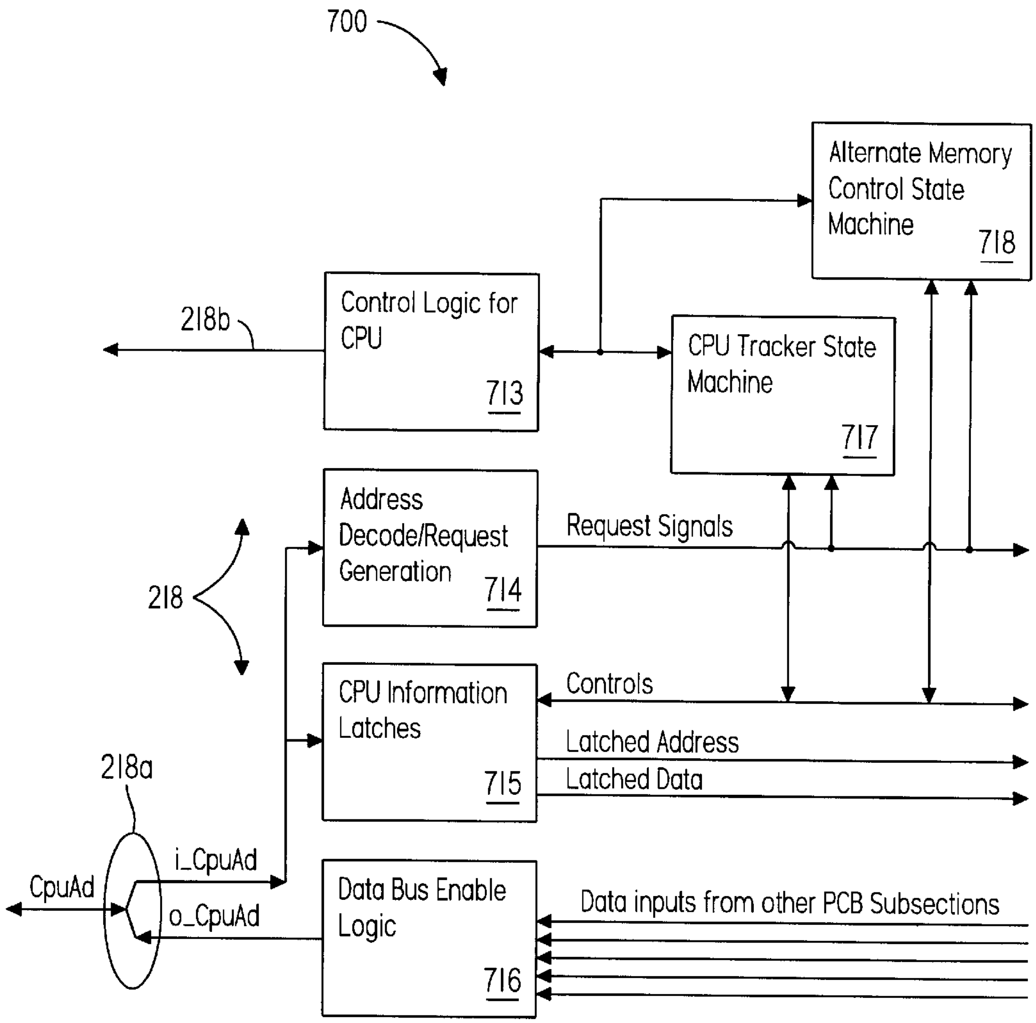

FIG. 7B is a more detailed block diagram of the CPU interface 700. The CPU control and status signals 218*b* are asserted by control logic 713, which is further coupled to a CPU tracker state machine 717 and an alternate memory control state machine 718. The address and data portion 218*a* of the CPU bus 218 is a multiplexed bus, where data from other portions of the PCB 406 are provided to data bus enable logic 716 for assertion on the CPU address and data portion 218*a* to the CPU 230. The CPU 230 asserts addresses to address decode/request generation logic 714, which provides a plurality of request signals to other portions of the PCB 406, including the CPU tracker state machine 717 and the alternate memory control state machine 718. A set of CPU information latches 715 receive addresses and data from the CPU 230 and asserts latched addresses and latched data to other portions of the PCB 406, as described further below. CPU control signals are provided between the address decode/request generation logic 714, the CPU tracker state machine 717 and the alternate memory control state machine 718 for monitoring and controlling CPU cycles.

Figure 7C:
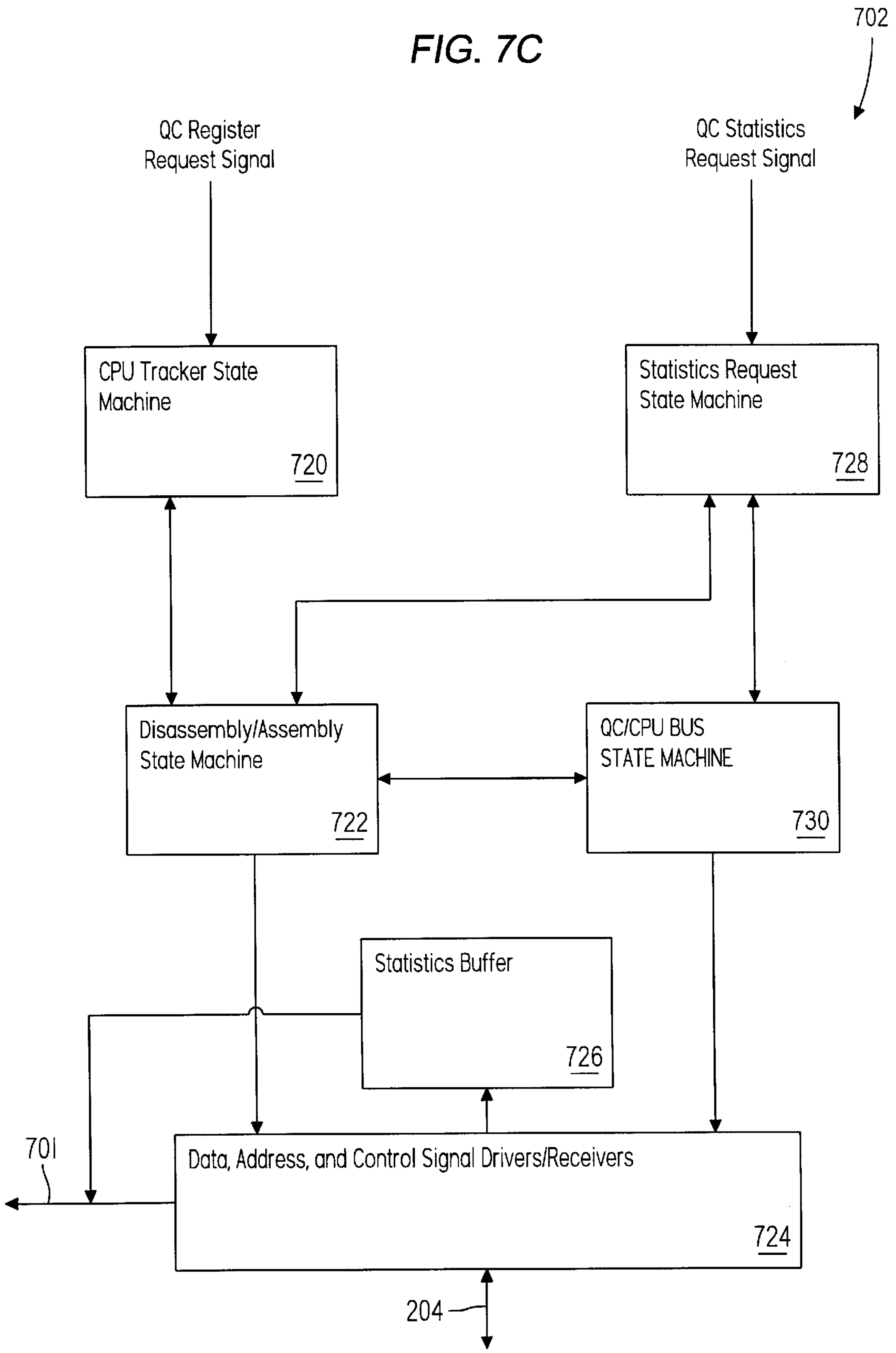

FIG. 7C is a more detailed diagram of the QC/CPU interface logic 702. The QC/CPU interface logic 702 generally operates to establish a relatively transparent interface between the CPU 230 and the QC devices 202, such as converting between the 32-bit format of the CPU 230 and the 16-bit format of the QC devices 202. A QC REGISTER REQUEST signal is provided from the address decode/request generation logic 714 to a CPU tracker state machine 720, which is coupled to a disassembly/assembly state machine 722 for converting between 16-bit and 32-bit formats. The disassembly/assembly state machine 722 is coupled to a set of data, address and control signal drivers and receivers 724 for interfacing with the CPU interface 700 across the bus 701 and with the QC devices 202 through the QC/CPU bus 204. A statistics buffer 726 receives statistics data and other information from the QC/CPU bus 204 for providing the data to the CPU interface 700 across the bus 701. A QC STATISTICS REQUEST signal is provided from the address decode/request generation logic 714 to a statistics request state machine 728, which is coupled to the disassembly/assembly state machine 722 and a QC/CPU bus state machine 730. The QC/CPU bus state machine 730 is further coupled to the disassembly/assembly state machine 722 and the set of data, address and control signal drivers and receivers 724. In this manner, the CPU 230 has relatively complete and independent access to the QC devices 202 for gathering statistics and other information of the ports 104, and also for modifying the configuration of the ports 104, without disturbing data flow and operation of the HSB 206.

The CPU 230 requests the EPSM 210 to retrieve statistical and status information from the QC devices 202 by writing to a QC STATISTICS INFORMATION register within the PCB registers 704. The CPU 230 requests statistical information by providing a number corresponding to one of the QC devices 202, a port number, the number of the starting register for the indicated port, and the number of registers to be read for the indicated port. As shown in FIG. 7C, writing to the QC STATISTICS INFORMATION register causes the QC STATISTICS REQUEST signal to be asserted, where the statistics request state machine 728 makes the indicated requests on the QC/CPU bus 204 through the set of data, address and control signal drivers and receivers 724. The CPU interface 700 performs the desired read cycles to the appropriate QC device(s) 202 using the appropriate CHIP_SELECTm* signals, and then writes the information into the statistics buffer 726.

Once all the requested data is retrieved and stored in the statistics buffer 726, the CPU interface 700 updates the STAT_RDY bit in the POLLING SOURCE register in the PCB registers 704, and sets the STAT_RDY interrupt bit in the INTERRUPT SOURCE register. The EPSM 210 asserts the CPU_INT* signal to the CPU 230, which responds by reading the INTERRUPT SOURCE register to determine the source of the interrupt. If interrupts are masked, the CPU 230 detects STAT_RDY bit in the POLLING SOURCE register during a polling routine. In this manner, the CPU 230 determines that the request is completed through either an interrupt, or a polling mechanism if the interrupts are masked. The STAT_RDY interrupt is programmatically masked, if desired, if the polling mechanism is to be used. The CPU 230 respondingly retrieves all of the statistics information from the statistics buffer 726 in one or more consecutive processor cycles. The processor cycles across the CPU bus 218 may be regular processor bus cycles, but are preferably burst cycles for transferring larger amounts of data.

Of course, several alternative embodiments are contemplated. In a first alternative embodiment, the CPU 230 simply provides a number corresponding to any one of the QC devices 202, and the EPSM 210 correspondingly collects all of the data of all of the registers 306 of all of the ports of the QC device 202. In a second alternative embodiment, the CPU 230 simply provides a global statistics request, and all of the registers 306 of all of the QC devices 202 are collected. It is noted, however, that the CPU 230 typically needs statistics information for one of the ports 104 at a time.

It is appreciated that the CPU 230 need only make a single request to the EPSM 210 to retrieve all the statistics information for any one of the ports 104. In particular, the QC STATISTICS INFORMATION register is written by the CPU 230 in a single command to make the request. The CPU 230 is then freed to perform other tasks rather than being tied up waiting for responses by the QC devices 202. Instead, the EPSM 210 performs all of the individual statistic read requests across the QC/CPU bus 204 and gathers all the data. The CPU 230 is informed through an interrupt signal or a polling mechanism, and is able to retrieve all of the requested information. This results in a more efficient use of CPU 230 processor time.

Figure 7D:
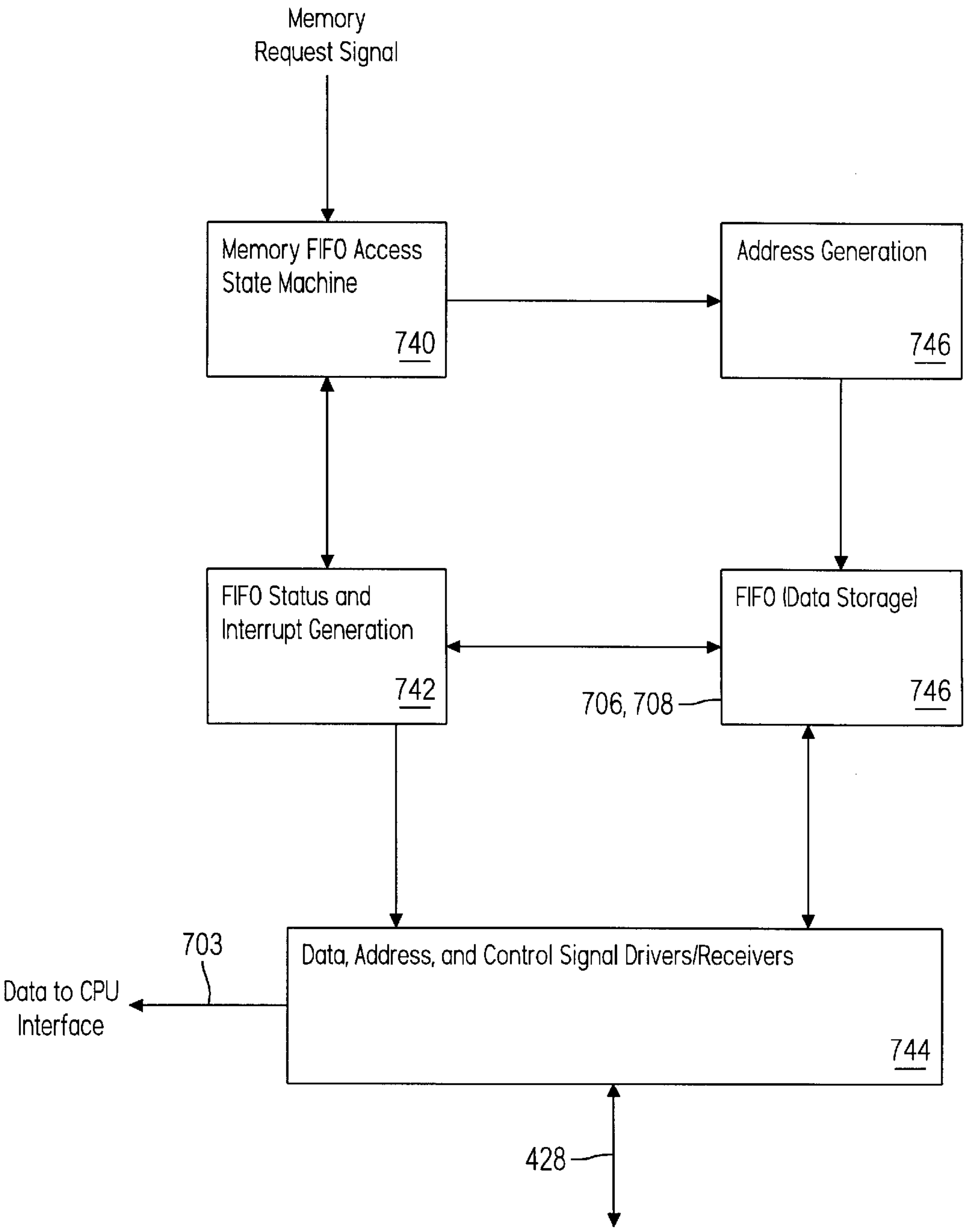

FIG. 7D is a more detailed block diagram of the interface between the CPU interface 700 and the MCB 404. A memory request signal from the address decode/request generation logic 714 is provided to a memory FIFO access state machine 740, which is coupled to address generation logic 746 and FIFO status and interrupt generation logic 742. A FIFO block 748 including the RX BUF 706 and the TX BUF 708 is coupled to the address generation logic 746 and the FIFO status and interrupt generation logic 742. The address generation logic 746 and the FIFO status and interrupt generation logic 742 are both coupled to a set of data, address and control signal drivers and receivers 744 for interfacing with the CPU interface 700 across the bus 703 and with the MCB 404 through the MCB bus 428.

Figure 7E:
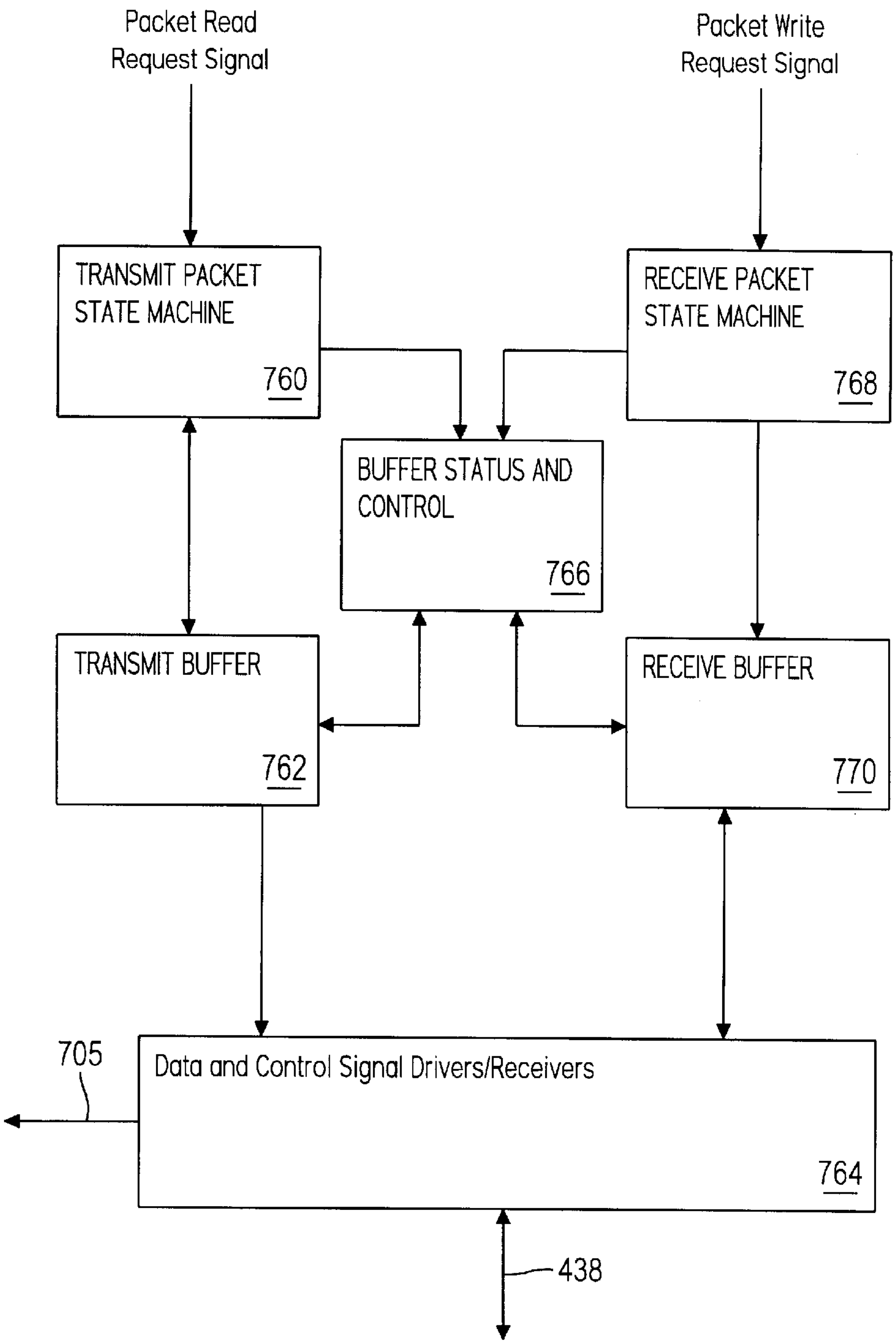

FIG. 7E is a more detailed block diagram of the interface between the CPU interface 700 and the HCB 402. A packet read request signal from the address decode/request generation logic 714 is provided to a transmit packet state machine 760, which is coupled to a transmit buffer 762 including the TX BUF 712. A packet write request signal from the address decode/request generation logic 714 is provided to a receive packet state machine 768, which is coupled to a receive buffer 770 including the RX BUF 710. The transmit buffer 762 and the receive buffer 770 are both coupled to a set of data, address and control signal drivers and receivers 764 for interfacing with the CPU interface 700 across the bus 705 and with the HCB 402 through the HCB bus 438.

Figure 8A:
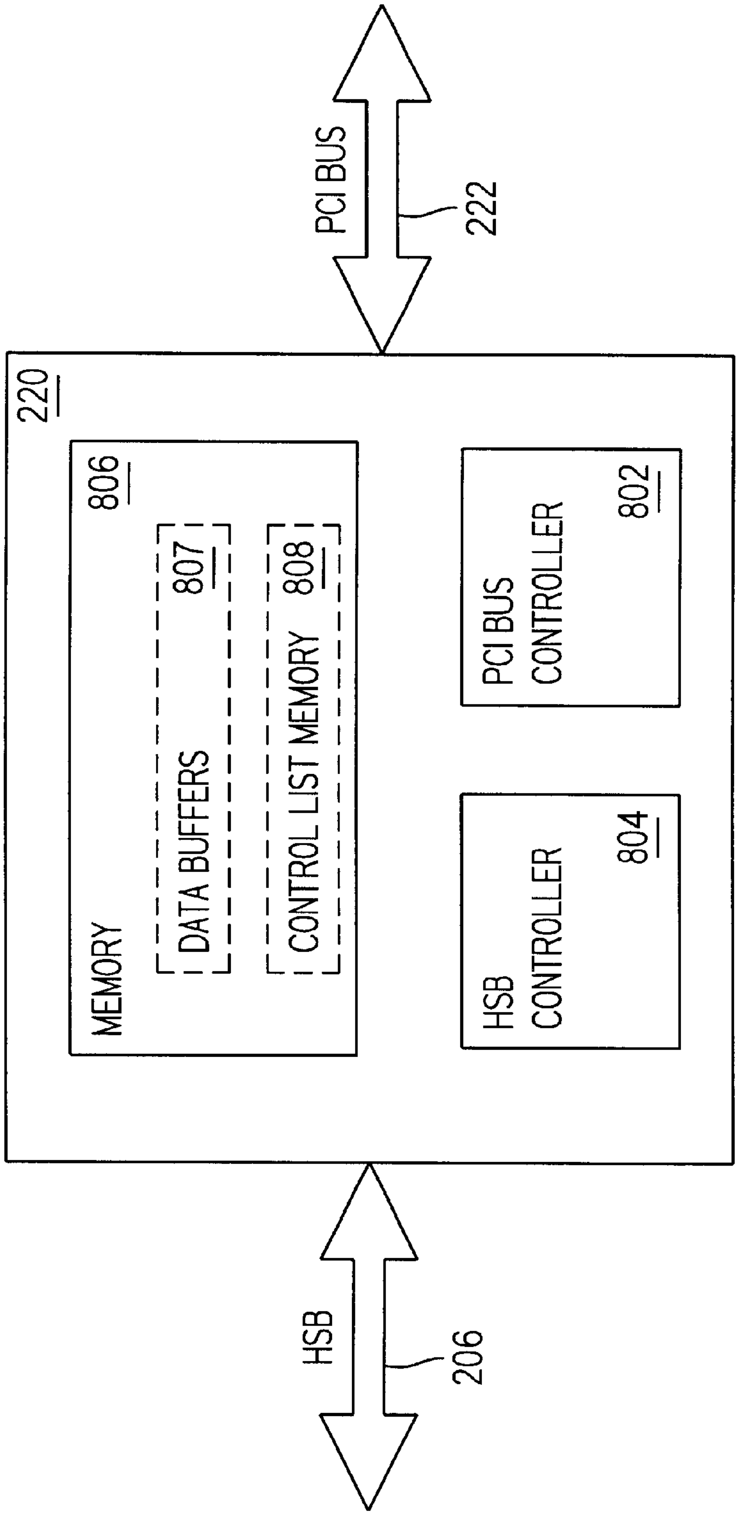
FIG. 8A is a simplified block diagram of the Thunder LAN port interface (TPI) of FIG. 2.

Referring now to FIG. 8A, a simplified block diagram is shown more fully illustrating the TPI 220. The TPI 220 transfers data between the HSB 206 and the PCI bus 222 to pass network data between the TLANs 226 and the EPSM 210. The TPI 220 operates as a slave on the HSB 206, responds to EPSM 210 polls, and transfers data to and from the EPSM 210 in a similar manner as the QC devices 202. On the PCI bus 222 side, the TPI 220 transfers network data to and receives network data from each of the four TLANs 226 (PORT24, PORT25, PORT26 and PORT27) across the PCI bus 222.

The TPI 220 includes an HSB controller 804, a PCI bus controller 802, and memory 806. The PCI bus controller 802 interfaces the PCI bus 222 in accordance with PCI bus standards and facilitates data transfers between the TPI 220 and the PCI bus 222. The PCI bus standards are defined by the Intel Architecture Lab along with their industry partners. The HSB controller 804 interfaces the HSB 206 in accordance with the defined operation of the HSB 206 and facilitates data transfers between the TPI 220 and the EPSM 210. The memory 806 may be centralized or distributed and includes a plurality of data buffers 807 and a control list memory 808. The data buffers 807 provide temporary storage to facilitate data transfer between the PCI bus 222 and the HSB 206. The control list memory 808 facilitates bus master operation of the TLANs 226 on the PCI bus 222.

Referring now to FIG. 8B, a more detailed block diagram of the TPI 220 is shown. The TPI 220 includes PCI bus interface logic 810, which further includes buffers, drivers and related circuitry to interface the PCI bus 222. The PCI bus 222 of the present embodiment has a data width of 32 bits and operates at a clock frequency of 33 MHz. It is understood, however, that the PCI bus 222 may have a different data width and may operate at any desired or available clock frequency, such as 66 MHz, for example. The TPI 220 includes a PCI arbiter 811, which arbitrates between each of the TLANs 226, the TPI 220 and the CPU 230 for access and control of the PCI bus 222. In particular, each of the TLANs 226, the TPI 220 and the CPU 230 assert a respective one of several request signals REQm to request control of the PCI bus 222, where the REQm signals are received by the PCI arbiter 811. The PCI arbiter 811 respondingly grants control to one of the requesting devices by asserting a respective grant signal GNTm. The PCI arbiter 811 performs round-robin arbitration in the illustrated embodiment, although the PCI arbiter 811 may use any other arbitration scheme desired. The PCI arbiter 811 asserts TLAN select signals (TSELm) to identify a particular TLAN 226 after granting it control of the PCI bus 222.

The TPI 220 includes HSB data transfer interface logic 819 that includes buffers, drivers and related circuitry to interface the TPI 220 with the HSB 206. The HSB data transfer interface logic 819 includes read latches 819*a* and write latches 819*b* for performing concurrent read and write cycles on the HSB 206. The HSB data transfer interface logic 819 includes port status logic 820 for responding to EPSM 210 polls and for monitoring cycles executed on the HSB 206. In particular, the port status logic 820 receives and detects assertions of the STROBE* signal by the EPSM 210 and responds by asserting the PKT_AVAIL*[6] and BUF_AVAIL*[6] signals in multiplexed fashion based upon the data status of the TPI 220. The port state logic 820 also detects read and write cycles on the HSB 206 intended for the TPI 220 by detecting the READ_OUT_PKT[6]* and WRITE_IN_PKT[6]* signals, respectively. During transfers of packet data from the TPI 220 to the EPSM 210 over the HSB 206, the port status logic 820 asserts the SOP* and EOP* signals during the HSB 206 bus cycle if transferring the start of packet or the end of packet, respectively. During transfers of packet data from the EPSM 210 to the TPI 220 over the HSB 206, the port status logic 820 reads the SOP* and EOP* signals to determine whether the data being received is the start of a packet or the end of a packet, respectively.

The data buffers 807 include several bidirectional FIFO data buffers 807*a*, 807*b*, 807*c* and 807*d* (807*a–d*), each including both a 32-bit wide transmit buffer (TPI TX FIFO) and a 32-bit wide receive buffer (TPI RX FIFO). In the embodiment shown, the data buffers 807*a*, 807*b*, 807*c* and 807*d* correspond to the ports PORT24, PORT25, PORT26 and PORT27, respectively. Each TPI RX FIFO receives data from a respective TLAN 226 across the PCI bus 222, where the data is transmitted by the TPI 220 to the EPSM 210 across the HSB 206. Each TPI TX FIFO receives data from the EPSM 210 across the HSB 206, where the data is transmitted by the TPI 220 to a respective TLAN 226 across the PCI bus 222.

Receive list decode logic 812 is coupled to the PCI bus interface logic 810 and stores at least one receive control list in a receive control list memory (RX CNTL LIST) 808*a*, which is part of the control list memory 808. The receive list decode logic 812 responds to the assertion of a RECEIVE LIST MEMORY BASE ADDRESS asserted as an address on the PCI bus 222 by writing a receive control list from the RX CNTL LIST 808*a* as data to the PCI bus 222. In the embodiment shown, the RX CNTL LIST 808*a* holds one receive control list at a time. In particular, each TLAN 226 gains control of the PCI bus 222 and asserts the RECEIVE LIST MEMORY BASE ADDRESS on the PCI bus 222 and receives a corresponding receive control list from the RX CNTL LIST 808*a*. The receive control list includes a PACKET DATA MEMORY BASE ADDRESS for use by the TLAN 226, which is an address indicating where to store the received data. In response to receiving a data packet from its respective port 110, the TLAN 226 then re-gains control of the PCI bus 222 to transfer data from the received data packet to the TPI 220 using the stored address in the receive control list fetched earlier. As described further below, the TLAN 226 arbitrates and is granted control of the PCI bus 222, and asserts the PACKET DATA MEMORY BASE ADDRESS during a write cycle on the PCI bus 222.

Receive data decode logic 813, PCI RX FIFO control logic 817, the PCI arbiter 811 and FIFO synchronization logic 818 control the flow of received data from the PCI bus interface logic 810 into the corresponding TPI RX FIFO. The PCI RX FIFO control logic 817 includes an input to receive data from the PCI bus interface logic 810 and several selectable outputs, each coupled to the input of a corresponding TPI RX FIFO. The PCI arbiter 811 provides the TSELm signals to the FIFO synchronization logic 818, which asserts corresponding PCI buffer select signals (PBSELm) to the PCI RX FIFO control logic 817 to select the appropriate TPI RX FIFO based on the particular TLAN 226 granted access to the PCI bus 222. The receive data decode logic 813 receives and decodes the PACKET DATA MEMORY BASE ADDRESS asserted by the TLAN 226 executing a write cycle on the PCI bus 222, and respondingly asserts a receive enable signal (REN) to the PCI RX FIFO control logic 817 to enable the PCI RX FIFO control logic 817 to pass data to the selected TPI RX FIFO.

It is noted that bidirectional data flow occurs between the PCI bus 222 and the HSB 206 through the data buffers 807. The PCI bus 222 and the HSB 206 operate at the same speed in one embodiment, such as a 33 MHz clock, but may operate at different clock frequencies in alternative embodiments. For example, in another embodiment, the HSB 206 operates at 33 MHz while the PCI bus 222 operates at 66 MHz. The TPI 220 is implemented to handle and synchronize data flow in spite of differences in clock speed. Each TPI RX FIFO and TPI TX FIFO of the data buffers 807*a–d* is preferably implemented as a circular buffer, with pointers maintained on both sides for writing and reading data. The FIFO synchronization logic 818 generally operates to synchronize, maintain and update the pointers on both sides of each FIFO to ensure that data is properly written to or read from the appropriate TPI FIFO.

As stated above, each TPI RX FIFO is implemented as a circular buffer. The PCI RX FIFO control logic 817 includes several PCI receive pointers (PCI RX PTRs), one pointer for each TPI RX FIFO to point to or address the next location to receive a DWORD (32 bits) of data within the selected TPI RX FIFO. In a similar manner, HSB RX FIFO control logic 821, located on the other side of each TPI RX FIFO, includes several PCI receive "synchronized" pointers (PCI RX SPTRs), each of which is a synchronized copy of a corresponding PCI RX PTR. Along with the PBSELm signals to select the appropriate TPI RX FIFO, the FIFO synchronization logic 818 also asserts a corresponding one of a plurality of PCI count signals (PCNTm) to synchronously update or increment the appropriate PCI RX PTR within the PCI RX FIFO control logic 817. The FIFO synchronization logic 818 further asserts a corresponding one of a plurality of HSB count signals (HCNTm) to synchronously update or increment a corresponding PCI RX SPTR within the HSB RX FIFO control logic 821. In this manner, a pointer is provided on both sides of each TPI RX FIFO to indicate where data is to be inserted.

PCI TX FIFO control logic 816 detects data in any of the TPI TX FIFOs and causes the TPI 220 to request and gain control of the PCI bus 222 for sending a command to a TLAN 226 corresponding to the TPI TX FIFO having data for transmission. The PCI TX FIFO control logic 816 accesses the address of the appropriate TLAN 226 from a set of TPI control registers 846. The TPI 220 writes a command to the appropriate TLAN 226 and provides a TRANSMIT LIST MEMORY BASE ADDRESS to cause the TLAN 226 to subsequently request a transmit control list from the TPI 220 using the TRANSMIT LIST MEMORY BASE ADDRESS.

Transmit list decode logic 814 is coupled to the PCI bus interface logic 810 and stores at least one transmit control list in a transmit control list memory (TX CNTL LIST) 808*b*, which is part of the control list memory 808. The transmit list decode logic 814 responds to the assertion of the TRANSMIT LIST MEMORY BASE ADDRESS asserted as an address on the PCI bus 222 by writing a transmit control list from the TX CNTL LIST 808*b* as data to the PCI bus 222. In the embodiment shown, the TX CNTL LIST 808*b* holds one transmit control list at a time. In this manner, each TLAN 226 gains control of the PCI bus 222 and asserts the TRANSMIT LIST MEMORY BASE ADDRESS on the PCI bus 222 and receives a corresponding transmit control list from the TX CNTL LIST 808*b*. After retrieving the transmit control list, the TLAN 226 executes the transmit control list by requesting and gaining control of the PCI bus 222 to perform a read cycle to retrieve the data from the corresponding TPI TX FIFO of the TPI 220 using the PACKET DATA MEMORY BASE ADDRESS.

Transmit data decode logic 815, the PCI TX FIFO control logic 816, the PCI arbiter 811 and the FIFO synchronization logic 818 control the flow of data from each of the TPI TX FIFOs of the data buffers 807 onto the PCI bus 222. The PCI TX FIFO control logic 816 includes an output to provide data to the PCI bus interface logic 810 and several selectable inputs, each coupled to an output of a corresponding one of the TPI TX FIFOs. When a TLAN 226 performs a read cycle on the PCI bus 22 to read data, the PCI arbiter 811 provides the TSELm signals to the FIFO synchronization logic 818, which asserts the PBSELm signals to the PCI TX FIFO control logic 816 to select the corresponding TPI TX FIFO based on the particular TLAN 226 having control of the PCI bus 222. The transmit data decode logic 815 receives and decodes the PACKET DATA MEMORY BASE ADDRESS asserted by the TLAN 226 and respondingly asserts an enable signal TEN to the PCI TX FIFO control logic 816 to enable transfer of data to the selected TPI TX FIFO. It is noted that the PBSELm signals are provided to both the PCI RX FIFO control logic 817 and the PCI TX FIFO control logic 816, and that the TEN and REN signals select between the PCI RX FIFO control logic 817 and the PCI TX FIFO control logic 816 depending upon the type of cycle and direction of data flow.

Each TPI TX FIFO is implemented as a circular buffer in the embodiment shown. The PCI TX FIFO control logic 816 includes several PCI transmit pointers (PCI TX PTRs), one pointer each for each TPI TX FIFO to point to or address the next location where a DWORD of data is to be read from. In a similar manner, HSB TX FIFO control logic 822, described further below, located on the other side of each TPI TX FIFO, includes several PCI transmit "synchronized" pointers (PCI TX SPTRs), each of which is a synchronized copy of a corresponding PCI TX PTR. The FIFO synchronization logic 818 asserts a corresponding one of the PCNTm signals to increment the appropriate PCI TX PTR and a corresponding one of the HCNTm signals to increment the appropriate PCI TX SPTR each time a DWORD of data is provided to the PCI bus 222 from the PCI TX FIFO control logic 816. In this manner, a pointer is provided on both sides of each TPI TX FIFO to indicate where data is to be read.

The HSB RX FIFO control logic 821 has several selectable inputs, each coupled to an output of a corresponding one of the TPI RX FIFOs. The HSB RX FIFO control logic 821 has an output for providing the data to the HSB data transfer interface logic 819 for assertion on the HSB 206. The HSB TX FIFO control logic 822 has several selectable outputs, each coupled to an input of a corresponding one of the TPI TX FIFOs. The HSB TX FIFO control logic 822 has an input for receiving data from the HSB data transfer interface logic 819 from the HSB 206.

The HSB RX FIFO control logic 821, the port status logic 820 and the FIFO synchronization logic 818 control the flow of data between the TPI RX FIFOs of the data buffers 807*a–d* and the HSB 206 during data transfers from the TPI 220 to the EPSM 210. The port status logic 820 detects assertion of the READ_OUT_PKT[6]* signal indicating a read cycle on the HSB 206, and decodes the PORT_NO

[1:0] signals to identify the corresponding TPI RX FIFO of the selected port. In particular, the EPSM 210 asserts PORT_NO[1:0] signals 00, 01, 10 or 11 to select the TPI RX FIFO of one of the data buffers 807*a*, 807*b*, 807*c* or 807*d*, respectively, for the port PORT24, PORT25, PORT26 or PORT27. The port status logic 820 asserts port select signals (PSELm) to the FIFO synchronization logic 818 to indicate the selected port, which respondingly asserts corresponding HSB select signals (HBSELm) to select one output of the HSB RX FIFO control logic 821 coupled to the corresponding TPI RX FIFO. Also, the port status logic 820 asserts an HSB enable signal (HREN) to enable the HSB RX FIFO control logic 821 to provide the data to the HSB data transfer interface logic 819 for assertion on the HSB 206.

The HSB RX FIFO control logic 821 includes an HSB receive pointer (HSB RX PTR) for each TPI RX FIFO to locate the particular data within the TPI RX FIFO. The FIFO synchronization logic 818 asserts a corresponding one of the HCNTm signals to update or decrement the corresponding HSB RX PRT of the selected TPI RX FIFO for each DWORD read from the TPI RX FIFO. Also, the PCI RX FIFO control logic 817 includes a corresponding HSB receive "synchronized" pointer (HSB RX SPTR), which is decremented by the FIFO synchronization logic 818 by asserting a corresponding one of the PCNTm signals. In this manner, the HSB RX FIFO control logic 821 has two pointers for each TPI RX FIFO, including the PCI RX SPTR indicating where to write data, and the HSB RX PTR indicating where to read data. The port status logic 820 also accesses these pointers to derive the amount of valid data or number of valid data bytes in each TPI RX FIFO. This count is compared to a corresponding RBSIZE (corresponding to the TBUS value) for the HSB 206 for determining how to assert the PKT_AVAIL[6]* signals in response to the STROBE* signal.

The HSB TX FIFO control logic 822, the port status logic 820 and the FIFO synchronization logic 818 control the flow of data between each TPI TX FIFO and the HSB 206 during data transfers from the EPSM 210 to the TPI 220. The port status logic 820 detects assertion of the WRITE_IN_PKT[6]* signal and determines the port number from the PORT_NO[1:0] signals during a write cycle executed on the HSB 206 by the EPSM 210. The port status logic 820 correspondingly asserts the PSELm signals and an HSB transmit enable signal (HTEN) to indicate the appropriate TPI TX FIFO. The FIFO synchronization logic 818 respondingly asserts the HBSELm signals to select the corresponding input of the HSB TX FIFO control logic 822 to the appropriate TPI TX FIFO. The HTEN signal enables the HSB TX FIFO control logic 822 to receive the data from the HSB data transfer interface logic 819 for assertion to the selected TPI TX FIFO.

The HSB TX FIFO control logic 822 includes an HSB transmit pointer (HSB TX PTR) for each TPI TX FIFO to locate the particular data location within the TPI TX FIFO to write data. The FIFO synchronization logic 818 asserts a corresponding one of the HCNTm signals to update or increment the corresponding HSB TX PRT of the selected TPI TX FIFO for each DWORD written to the selected TPI TX FIFO. Also, the PCI TX FIFO control logic 816 includes a corresponding HSB transmit "synchronized" pointer (HSB TX SPTR), which is incremented by the FIFO synchronization logic 818 by asserting a corresponding one of the PCNTm signals. In this manner, the HSB TX FIFO control logic 822 has two counters for each TPI TX FIFO, including the PCI TX SPTR indicating where to read data, and the HSB TX PTR indicating where to write data. The port status logic 820 also accesses these pointers for deriving the amount of available space or number of empty data bytes exists in each TPI TX FIFO. This count is compared to a corresponding XBSIZE (corresponding to the TBUS value) for the HSB 206 for determining how to assert the BUF_AVAIL[6]* signals in response to the STROBE* signal.

A set of TPI PCI configuration registers 835 is provided within the TPI 220 and coupled to the PCI bus interface logic 810 for access via the PCI bus 222. Also, the TPI control registers 846 are provided and coupled to various devices within the TPI 220 and to the PCI bus interface logic 810 for access via the PCI bus 222. The contents and structure of these registers 846 and 835 are described further below. The HSB data transfer interface logic 819 also includes a PACKET SIZE tag register 819*c*. The HSB data transfer interface logic 819 captures and stores the first DWORD of each data packet sent from the EPSM 210 in the PACKET SIZE tag register 819*c*, and then writes to contents of the PACKET SIZE register 819*c* to the TX CNTL LIST 808*b* of the transmit list decode logic 814.

Figure 8C:
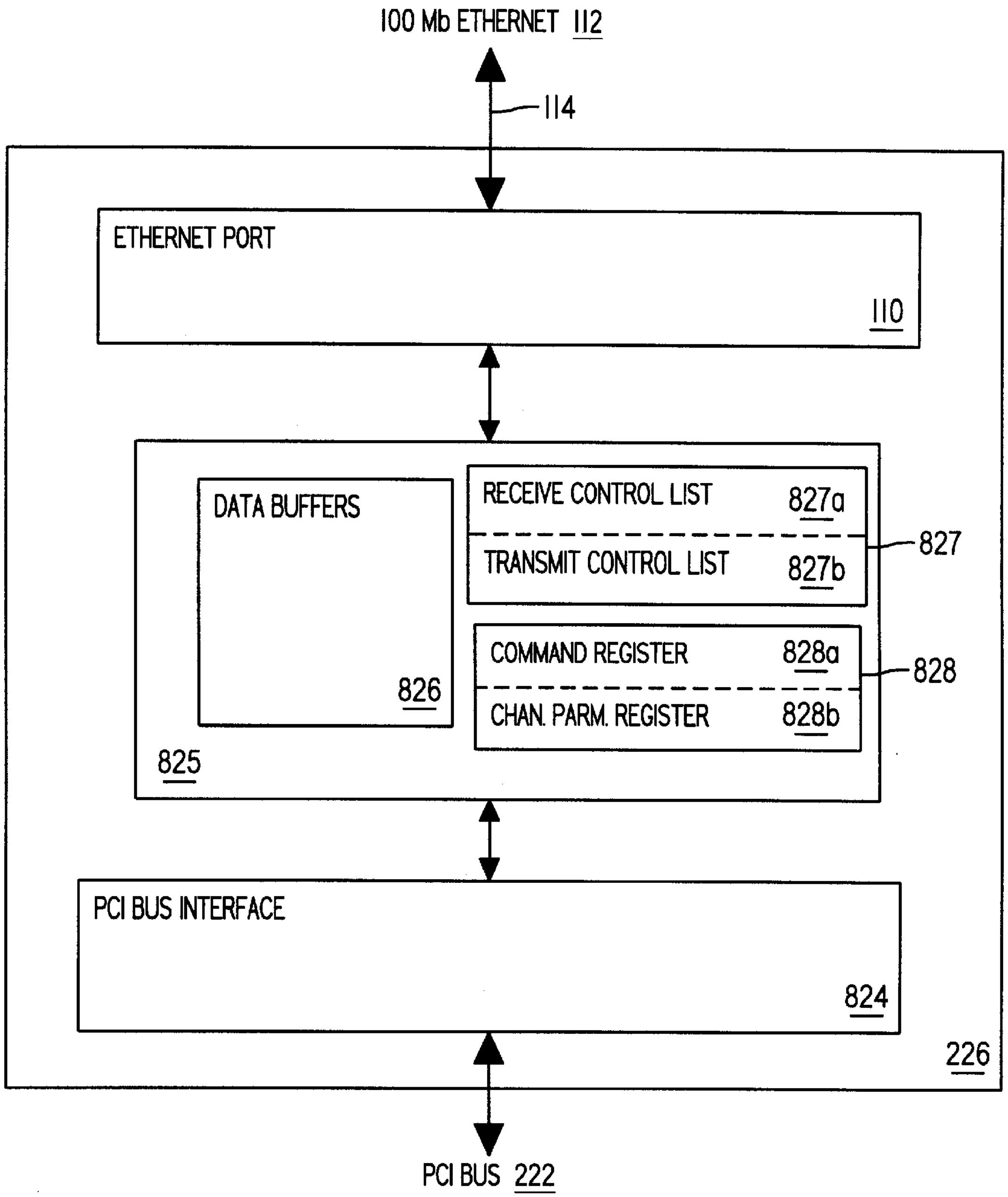
FIG. 8C is a block diagram illustrating the configuration and functionality of each of the Thunder LANs (TLANs) of FIG. 2.

Referring now to FIG. 8C, a block diagram is shown illustrating the configuration and functionality of each of the TLANs 226. The TLAN 226 includes an Ethernet port 110, a PCI bus interface 824 and memory 825 coupled between the Ethernet port 110 and the PCI bus interface 824. The Ethernet port 110 includes an appropriate receptacle to receive a compatible connector of a 100 Mb Ethernet segment 114 for receiving packet data from and for transmitting packet data to a corresponding network 112. The Ethernet port 110 provides received packet data to data buffers 826 in the memory 825. The Ethernet port 110 retrieves packet data from the data buffers 826 and transmits the packet data onto an Ethernet segment 114.

The TLAN 226 includes a set of registers 828 within the memory 825 for controlling its operation. The registers 828 include a command register 828*a* for enabling an external device to insert commands through the PCI bus 222. The registers 828 further include a channel parameter register 828*b* for storing an address to access a command list from an external memory through the PCI bus 222. The command register 828*a* includes a GO bit (not shown) for instructing the TLAN 226 to retrieve and execute a command list. The command register 828*a* also includes an RX/TX bit (not shown) for instructing the TLAN 226 to retrieve and execute a receive command list (for the RX case) or a transmit command list (for the TX case). The memory 825 includes a list buffer 827 for storing current control lists, where the list buffer 827 further includes a receive control list buffer 827*a* for storing the current receive control list and a transmit control list buffer 827*b* for storing the current transmit control list.

The PCI bus interface 824 includes the appropriate logic to couple to the PCI bus 222 to control data transfers between the TPI 220 and the TLAN 226 by operating as a bus master of the PCI bus 222 during the data transfer. An external device, such as the TPI 220 or the CPU 230, writes an address to the channel parameter register 828*b* and writes a command to the command register 828*a*. The TLAN 226 respondingly asserts its REQm signal to arbitrate for the PCI bus 222. When its GNTm signal is received, the TLAN 226 executes a cycle on the PCI bus 222 to retrieve and store an indicated command list into the list buffer 827. The command is considered a transmit command if the RX/TX bit is set for TX and a receive command if the RX/TX bit is set for RX.

To initiate receive operations, the CPU 230 writes the RECEIVE LIST MEMORY BASE ADDRESS to the channel parameter register 828_b_ and a receive command to the command register 828_a_ of each TLAN 226. The TLAN 226 respondingly requests the PCI bus 222 to retrieve a receive control list using the RECEIVE LIST MEMORY BASE ADDRESS. The TPI 220 provides a receive control list to the TLAN 226, and the TLAN 226 then waits to receive data before executing the receive control list. The receive control list includes a forward pointer as the next address for the TLAN 226 that it uses to retrieve the next receive control list to establish control list chaining. In the preferred embodiment, however, the TPI 220 loads the forward pointer of each receive control list with the same RECEIVE LIST MEMORY BASE ADDRESS. When data is received from the port 110 to the TPI 220, the PCI bus interface 824 arbitrates and gains control of the PCI bus 222 and executes the receive control list in its receive control list buffer 827_a_ to transfer data across the PCI bus 222 to the TPI 220. Once the transfer of an entire data packet is completed, the TLAN 226 uses the RECEIVE LIST MEMORY BASE ADDRESS in the forward pointer of the current receive control list to request another receive control list.

For transmit operations, the TPI 220 detects data to transmit from any of its TPI TX FIFOs and respondingly arbitrates and gains control of the PCI bus 222. The TPI 220 then writes the TRANSMIT LIST MEMORY BASE ADDRESS to the channel parameter register 828_b_ and a transmit command to the command register 828_a_ of each TLAN 226. The TLAN 226 respondingly requests the PCI bus 222 to retrieve a transmit control list using the TRANSMIT LIST MEMORY BASE ADDRESS. Once the transmit control list is received, the TLAN 226 stores the transmit control list in its transmit control list buffer 827_b_ and then executes the stored transmit control list to receive packet data. The transmit control list also includes a forward pointer, which is normally used as the next address for the TLAN 226 to use to retrieve the next transmit control list to establish control list chaining. In the embodiment shown, however, the TPI 220 loads the forward pointer of each transmit control list with a null value. Thus, after executing the transmit control list in its transmit control list buffer 827_b_, the TLAN 226 waits until the TPI 220 writes another transmit command.

Referring now to FIG. 8D, a diagram is shown illustrating a control list 830, which is the format for both receive and transmit control lists and is also the format of the RX CNTL LIST 808_a_ and the TX CNTL LIST 808_b_. The control list 830 includes a FORWARD_POINTER field 831, a PACKET_SIZE field 832_a_, a CSTAT field 832_b_, a COUNT field 833 and a DATA_POINTER field 834. Each field is 32 bits except for the PACKET_SIZE field 832_a_ and the CSTAT field 832_b_, which are 16 bit fields.

The FORWARD_POINTER field 832 is generally used to chain control lists together. For receive operations, the TLAN 226 executes receive control lists provided by the TPI 220 from the RX CNTL LIST 808_a_ over and over, since the FORWARD_POINTER field 831 is the same RECEIVE LIST MEMORY BASE ADDRESS in each case. In this manner, each TLAN 226 uses the RECEIVE LIST MEMORY BASE ADDRESS in the FORWARD_POINTER field 831 of its current receive control list to request the next receive control list when the next data packet is received from a network 112. Thus, the TPI 220 does not have to issue start operation commands to the TLANs 226 for receive operations. For transmit operations, the TLAN 226 executes transmit control lists from the same TX CNTL LIST 808_b_ each time. However, the TPI 220 sets the FORWARD_POINTER field 831 to a NULL value (0000h) so that the TPI 220 and a respective TLAN 226 perform one transmit operation when initiated by the TPI 220. When data is detected within any of the TPI TX FIFOs and the TPI 220 is not currently performing any transmit operations on a TPI TX FIFO's respective TLAN port, then the TPI 220 issues a transmit command to a respective TLAN 226 to initiate a transmit operation. The respective TLAN 226 retrieves the transmit control list from the TX CNTL LIST 808_b_, executes the transmit control list, and then returns to a default state when encountering the NULL value in the FORWARD_POINTER field 831.

The PACKET_SIZE field 832_a_ generally indicates the size of a data packet. For receive operations, the TPI 220 initially sets the PACKET_SIZE field 832_a_ in the RX CNTL LIST 808_a_ to zero. After the TLAN 226 completes a transfer of a complete data packet to the TPI 220, the TLAN 226 performs a final single DWORD write to the PACKET_SIZE field 832_a_ and the CSTAT field 832_b_ of the RX CNTL LIST 808_a_. The PACKET_SIZE field 832_a_ is loaded with the actual packet data size, and a frame complete bit within the CSTAT field 832_b_ is set. For transmit operations, the PACKET_SIZE field 832_a_ of the TX CNTL LIST 808_b_ is loaded with the size of a data packet to be transmitted by the TPI 220 to a TLAN 226. The HSB data transfer interface logic 819 writes the packet size DWORD in the PACKET SIZE register tag 819_c_ to the TX CNTL LIST 808_b_ in the transmit list decode logic 814. The TPI 220 then writes the transmit command to the corresponding TLAN 226 as previously described, and the contents of the TX CNTL LIST 808_b_ is provided to a TLAN 226 as a transmit control list when requested.

The CSTAT field 832_b_ is used to pass command and status information between the TPI 220 and the TLANs 226. The TPI 220 initially sets the CSTAT field 832_b_ of the RX CNTL LIST 808_a_ to zero. When a packet data transfer from a TLAN 226 into a respective TPI RX FIFO has been completed, the TPI 220 sets the frame complete bit of the CSTAT field 832_b_ (bit 14) in the RX CNTL LIST 808_a_ to represent that the packet data transfer has been completed. The TPI 220 indicates to the port status logic 820 that the data packet is complete to initiate a transfer over the HSB 206 to the EPSM 210. The port status logic 820 then indicates that data is available in a respective TPI RX FIFO for transfer to the EPSM 210 in response to a poll by the EPSM 210. This is true even if the amount of end of packet data does not meet the RBSIZE or TBUS value since the end of the packet must be transferred.

The TPI 220 sets the pass CRC (cyclic redundancy check) bit in the CSTAT field 832_b_ of the TX CNTL LIST 808_b_ based the state of the AI_FCS_IN* (or FBPN*) signal during receipt of a data packet from the EPSM 210. The TPI 220 sets the CRC bit to indicate whether the data packet includes data used in a CRC. An Ethernet data packet including CRC contains four bytes of CRC data used for error checking in addition to the packet data.

The DATA_POINTER field 834 specifies the PCI address to be asserted by a TLAN 226 during a data transfer operation. The address is preferably the same for both transmit and receive operations, which is the PACKET DATA MEMORY BASE ADDRESS. During a data receive operation, a TLAN 226 asserts the PACKET DATA MEMORY BASE ADDRESS, and the receive data decode logic 813 decodes the address and a write cycle on the PCI bus 222 and enables the PCI RX FIFO control logic 817 to allow receipt of packet data into a selected TPI RX FIFO. During a data transmit operation, a TLAN 226 asserts the PACKET DATA MEMORY BASE ADDRESS, and the transmit data decode logic 815 decodes the address and a read operation and enables the PCI TX FIFO control logic 816 to facilitate the transfer of packet data packet from a selected TPI TX FIFO.

The COUNT field 833 specifies an amount of data present or the amount of buffer space available at the current value of the DATA_POINTER field 834. During a receive data operation, the receive list decode logic 812 sets the COUNT field 833 to a value written into a RCV_DATA_COUNT register 847*b* (FIG. 8F) of the TPI control registers 846. The value from the RCV_DATA_COUNT register 847*b* determines the largest packet size to be received by the TPI 220. As a default, this value is 1518 bytes, which is the largest Ethernet data packet size with four bytes of CRC. During a transmit data operation, the TPI 220 sets the COUNT field 833 to the same value as the PACKET_SIZE field 832*a*.

Referring now to FIG. 8E, a diagram is shown illustrating a definition of the TPI PCI configuration registers 835 employed by the TPI 220. The TPI PCI configuration registers 835 include registers common to all PCI bus architectures as well as additional registers unique to the TPI 220. Registers common to all PCI buses include a DEVICE_ID register 836*a*, a VENDOR_ID register 836*b*, a STATUS register 837*a*, a COMMAND register 837*b*, a CLASS_CODE register 838*a*, a REV_ID register 838*b*, a BIST register 839*a*, a HDR_TYPE register 839*b*, a LATENCY register 839*c*, a CACHELSZ register 839*d*, a MAXLAT register 845*a*, a MINGNT register 845*b*, an INTPIN register 845*c* and an INTLINE register 845*d*. Registers unique to the TPI 220 include a TPI CONTROL IO BASE ADDRESS register 840, a TPI CONTROL MEMORY BASE ADDRESS register 841, a TRANSMIT LIST MEMORY BASE ADDRESS register 842, a RECEIVE LIST MEMORY BASE ADDRESS register 843, and a PACKET DATA MEMORY BASE ADDRESS register 844.

After being initialized, the TPI CONTROL IO BASE ADDRESS register 840 contains a TPI CONTROL 10 BASE ADDRESS for the TPI control registers 846. The TPI CONTROL MEMORY BASE ADDRESS register 841 contains a TPI CONTROL MEMORY BASE ADDRESS for the TPI control registers 846. In this manner, the TPI control registers 846 are accessible in both I/O and memory space of the PCI bus 222. The TRANSMIT LIST MEMORY BASE ADDRESS register 842 contains the TRANSMIT LIST MEMORY BASE ADDRESS for the TX CNTL LIST 808*b* that is decoded by the transmit list decode logic 814. The RECEIVE LIST MEMORY BASE ADDRESS 843 contains the RECEIVE LIST MEMORY BASE ADDRESS for the RX CNTL LIST 808*a* that is decoded by the receive list decode logic 812. The PACKET DATA MEMORY BASE ADDRESS register 844 contains the PACKET DATA MEMORY BASE ADDRESS corresponding to the data buffers 807 of the TPI 220. The PACKET DATA MEMORY BASE ADDRESS is decoded by both the transmit data decode logic 815 and the receive data decode logic 813.

Referring now to FIG. 8F, a diagram is shown illustrating the definition of the TPI control registers 846 employed by the TPI 220. The TPI control registers 846 include a RCV_DATA_COUNT register 847*b*, an XBSIZE3 register 848*a*, an XBSIZE2 register 848*b*, an XBSIZE1 register 848*c*, an XBSIZE0 register 848*c*, an RBSIZE3 register 849*a*, an RBSIZE2 register 849*b*, an RBSIZE1 register 849*c*, an RBSIZE0 register 849*d*, a NET_PRI3 register 850*a*, a NET_PRI2 register 850*b*, a NET_PRI1 register 850*c*, a NET_PRI0 register 850*d*, a TLAN0 MEMORY BASE ADDRESS register 851, a TLAN1 MEMORY BASE ADDRESS register 852, a TLAN2 MEMORY BASE ADDRESS register 853 and a TLAN3 MEMORY BASE ADDRESS register 854.

The RCV_DATA_COUNT register 847*b* stores the maximum size of received data packets handled by the TPI 220. The TPI 220 retrieves and places this value into the COUNT field 833 of RX CNTL LIST 808*a*. Each of the XBSIZE registers 848*a–d* hold a transmit burst size in DWORDs for respective ports, namely, XBSIZE0 for PORT24, XBSIZE1 for PORT25, XBSIZE2 for PORT26 and XBSIZE3 for PORT27. The XBSIZE transmit burst size values are used by the HSB TX FIFO control logic 822 and the port status logic 820 of the TPI 220 when determining whether there is enough packet buffer space in a respective TPI TX FIFO to request data from the EPSM 210 for the respective port. Each of the RBSIZE registers 849*a–d* hold respective HSB receive burst sizes in DWORDs for the respective ports, namely, RBSIZE0 for PORT24, RBSIZE1 for PORT25, RBSIZE2 for PORT26 and RBSIZE3 for PORT27. The RBSIZE receive burst size values are used by the HSB RX FIFO control logic 821 and the port status logic 820 when determining whether there is enough packet data in a respective TPI RX FIFO to request a transfer of received data to the EPSM 210 from the respective port. In the embodiment illustrated, values stored in the XBSIZE and RBSIZE registers 848, 849 are equal to each other and to the TBUS value. However, the XBSIZE registers 848 and the RBSIZE registers 849 are programmed with any desired burst transfer values depending on the embodiment.

The NET_PRI registers 850 hold respective network priority values for the ports, namely, NET_PRI0 for PORT24, NET_PRI1 for PORT25, NET_PRI2 for PORT26 and NET_PRI3 for PORT27. These values are used by the transmit list decode logic 814 to set the transmit priority of respective ports. The TLAN0 MEMORY BASE ADDRESS register 851 holds a PCI memory address referred to as TLAN0 MEMORY BASE ADDRESS for PORT24. The TLAN1 MEMORY BASE ADDRESS register 852 holds a PCI memory address referred to as TLAN1 MEMORY BASE ADDRESS for PORT25. The TLAN2 MEMORY BASE ADDRESS register 853 holds a PCI memory address referred to as TLAN2 MEMORY BASE ADDRESS for PORT26. The TLAN3 MEMORY BASE ADDRESS register 854 holds a PCI memory address referred to as TLAN3 MEMORY BASE ADDRESS for PORT24. Each of these registers is initialized at startup by the CPU 230 after determining the addresses of each of the TLANs 226. These values are provided to and used by the PCI TX FIFO control logic 816 to issue each transmit command on the PCI bus 222 to start transmit packet operations.

Figure 8G:
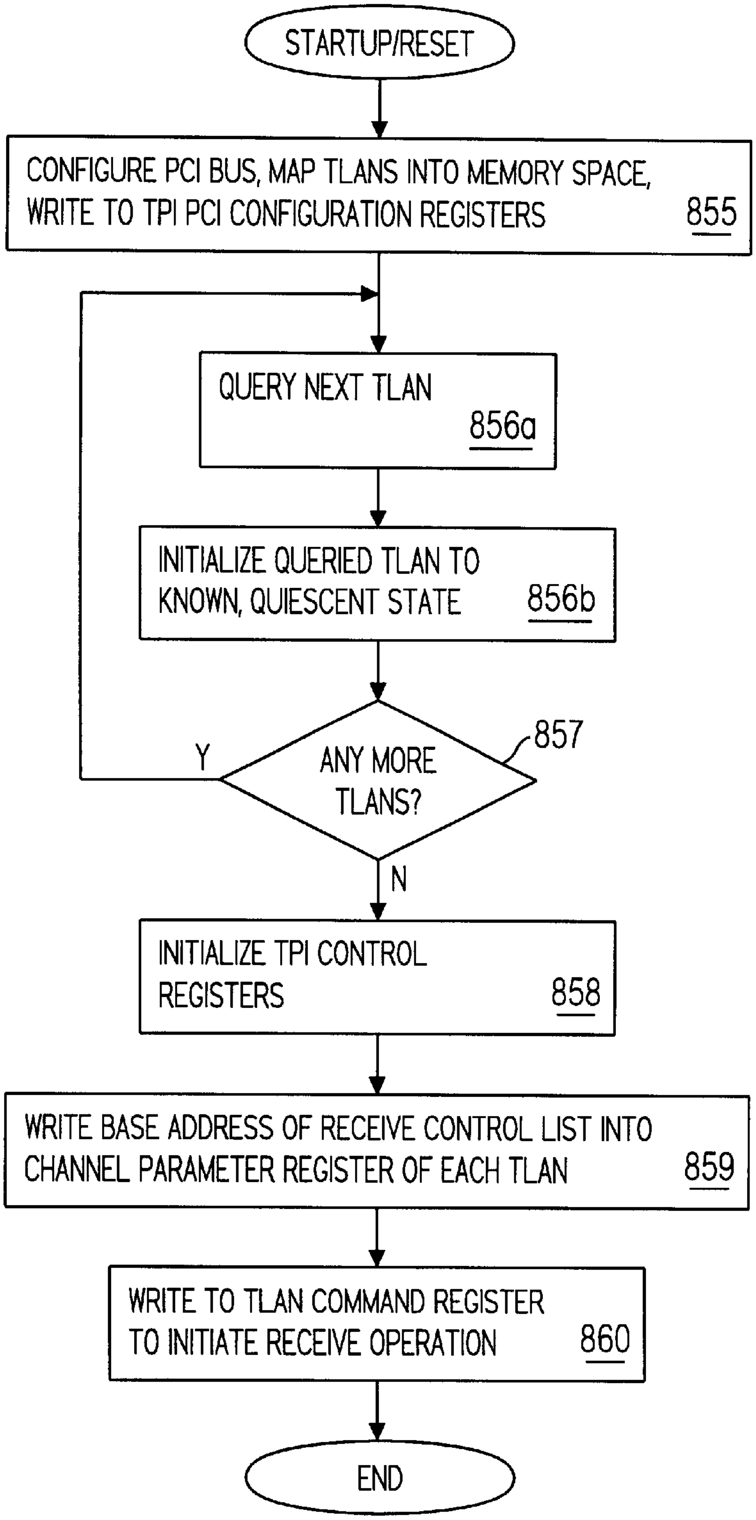
FIG. 8G is a flowchart diagram illustrating PCI initialization operations of the CPU of FIG. 2.

Referring now to FIG. 8G, a flowchart diagram is shown illustrating PCI initialization operations of the CPU 230 at initialization, startup or reset of the network switch 102. At first step 855, the CPU 230 configures the PCI bus 222, maps the TLANs 226 into PCI memory space and writes this configuration into the TPI PCI configuration registers 835 via the PCI bus 222. Steps for configuring the PCI bus 222 are known and will not be further described.

In particular, the DEVICE_ID register 836*a* is the standard PCI device ID register and its value is set to 0x5000h. The VENDOR_ID register 836*b* is the standard PCI vendor ID register and its value is set to 0x0E11h. The STATUS register 837*a* is the standard PCI device status register. The COMMAND register 837*b* is the standard PCI device command register. The CLASS_CODE register 838*a* is the standard PCI device class code register and its value is set to 0x060200h. The REV_ID register 838*b* is the standard PCI device revision ID register and its value is set to 0x00h. The BIST register 839*a* is the standard PCI BIST status register and its value is set to 0x00h. The HDR_TYPE register 839*b* is the standard PCI header type register and its value is set to 0x80h. The LATENCY register 839*c* is the standard PCI latency type register and it is initialized by the CPU 230. The CACHELSZ register 839*d* is the standard PCI cache line size register and it is initialized by the CPU 230. The MAXLAT register 845*a* is the standard PCI device maximum latency register and its value is set to 0x00h. The MINGNT register 845*b* is the standard PCI device minimum grant register and its value is set to 0x00h. The INTPIN register 845*c* is the standard PCI device interrupt pin register and its value is set to 0x00h. The INTLINE register 845*d* is the standard PCI device interrupt line register and it is setup by the CPU 230.

Also at step 855, the CPU 230 writes a value of 0xFFFFFFFFh into each of the following registers: the TPI CONTROL IO BASE ADDRESS register 840; the TPI CONTROL MEMORY BASE ADDRESS register 841; the TRANSMIT LIST MEMORY BASE ADDRESS register 842; the RECEIVE LIST MEMORY BASE ADDRESS register 843; and the PACKET DATA MEMORY BASE ADDRESS register 844. After each write, the TPI 220 replaces the value in each register with a value indicating the amount of I/O or memory space required by the particular register indicated. The CPU 230 respondingly reads each new value in each register and then writes back a base address into each register to map the entity into PCI I/O or memory space.

In particular, after determining the amount of space required, the CPU 230 writes the TPI CONTROL 10 BASE ADDRESS to the TPI CONTROL IO BASE ADDRESS register 840 to enable I/O space access of the TPI control registers 846, the CPU 230 writes the TPI CONTROL MEMORY BASE ADDRESS to the TPI CONTROL MEMORY BASE ADDRESS register 841 to enable memory space access of the TPI control registers 846, the CPU 230 writes the TRANSMIT LIST MEMORY BASE ADDRESS into the TRANSMIT LIST MEMORY BASE ADDRESS register 842 corresponding to the address of the TX CNTL LIST 808*b* memory block, the CPU 230 writes the RECEIVE LIST MEMORY BASE ADDRESS into the RECEIVE LIST MEMORY BASE ADDRESS register 843 corresponding to the address of the RX CNTL LIST 808*a*, and the CPU 230 writes the PACKET DATA MEMORY BASE ADDRESS into the PACKET DATA MEMORY BASE ADDRESS register 844 to correspond to the PCI address of the data buffers 807.

At next step 856*a*, the CPU 230 queries each TLAN 226, one by one, on the PCI bus 222 to determine the number of TLANs present and their corresponding PCI addresses. At next step 856*b*, the CPU 230 initializes the queried TLAN 226 to a known, quiescent state. The CPU 230 then determines whether there are any more TLANS 226 at next step 857, and if so, returns to step 856*a* to query the next TLAN until all of the TLANs 226 on the PCI bus 222 are initialized. At this time, the TLAN0 MEMORY BASE ADDRESS, the TLAN1 MEMORY BASE ADDRESS, the TLAN2 MEMORY BASE ADDRESS and the TLAN3 MEMORY BASE ADDRESS values are known.

At next step 858, the CPU 230 initializes the TPI control registers 846 to the appropriate values, as described above with reference to FIG. 8F. This includes the TLAN0 MEMORY BASE ADDRESS, the TLAN1 MEMORY BASE ADDRESS, the TLAN2 MEMORY BASE ADDRESS and the TLAN3 MEMORY BASE ADDRESS values. At next step 859, the CPU 230 begins initiation of the receive operation for each TLAN 226 by writing the RECEIVE LIST MEMORY BASE ADDRESS into the channel parameter register 828*b*. The initiation of the receive operation is completed at step 860, where the CPU 230 writes to the command register 828*a* of each TLAN 226. Initialized in this fashion, each TLAN 226 immediately begins a receive operation by requesting the PCI bus 222 to request a receive control list.

Figure 8H:
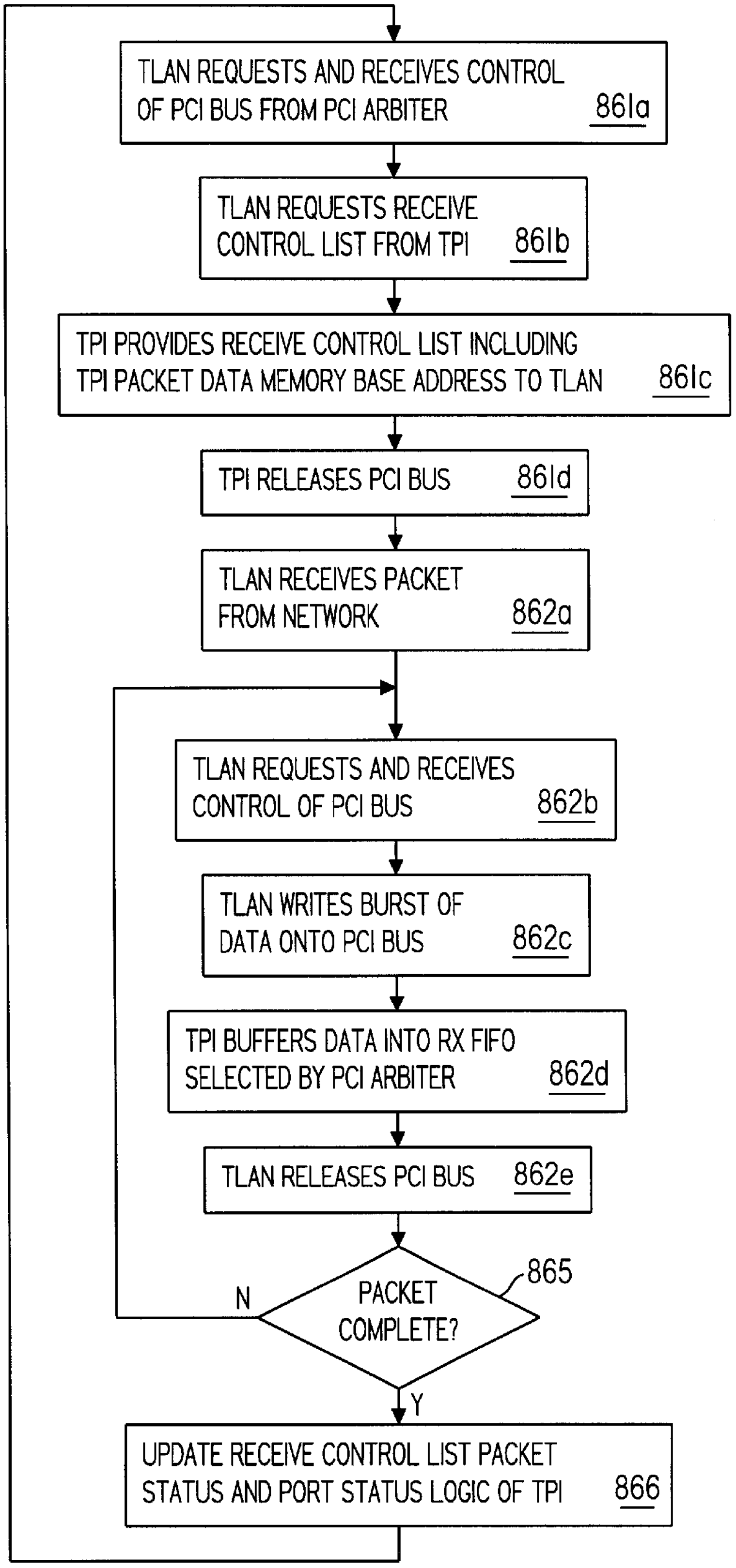
FIG. 8H is a flowchart diagram illustrating a receive operation for each of the TLANs.

Referring now to FIG. 8H, a flowchart diagram is shown illustrating the receive operation of the network switch 102 for each of the TLANs 226. Operation commences at first step 861*a,* where a TLAN 226 requests and receives control of the PCI bus 222 from the PCI arbiter 811. The TLAN 226 asserts the RECEIVE LIST MEMORY BASE ADDRESS onto the PCI bus 222 at next step 861*b* to request a receive control list, and the TPI 220 provides a receive control list to the TLAN 226 at next step 861*c*. The receive control list includes the PACKET DATA MEMORY BASE ADDRESS to inform the TLAN 226 where, or how, to send a received data packet. At next step 861*d*, the TLAN 226 releases control of the PCI bus 222.

A TLAN 226 eventually receives a data packet from a network 112 as indicated at next step 862*a*, and then requests and receives control of the PCI bus 222 at next step 862*b*. The TLAN 226 then writes a burst of data using the PACKET DATA MEMORY BASE ADDRESS as the address on the PCI bus 222 at next step 862*c*, while the TPI 220 writes the data into a selected TPI RX FIFO as indicated at next step 862*d*. Upon completion of the write burst, the TLAN releases the PCI bus 222 at next step 862*e*. At next step 865, the TLAN 226 determines whether the entire data packet has been sent to the TPI 220, which is indicated by a final DWORD write operation. If not, operation returns to step 862*b*, where the TLAN 226 once again requests the PCI bus 222 to send another burst of data.

After the TLAN 226 has sent the final portion of the data packet, it performs a final iteration to inform the TPI 220 of the end of the packet. In particular, the TLAN 226 executes a final single DWORD transfer to the PACKET_SIZE field 832*a* and the CSTAT field 832*b* within the RX CNTL LIST 808*a* of the TPI 220. This DWORD transfer updates the RX CNTL LIST 808*a* with the packet size of the data packet just completed and updates the frame complete bit in the CSTAT field 832*b*. The TPI 220 detects this write operation as indicated at step 865, and sets internal flags to represent that the operation is complete and passes the appropriate status to the port status logic 820 as indicated at step 866. Operation returns to step 861 a to request another receive control list.

Figure 8I:
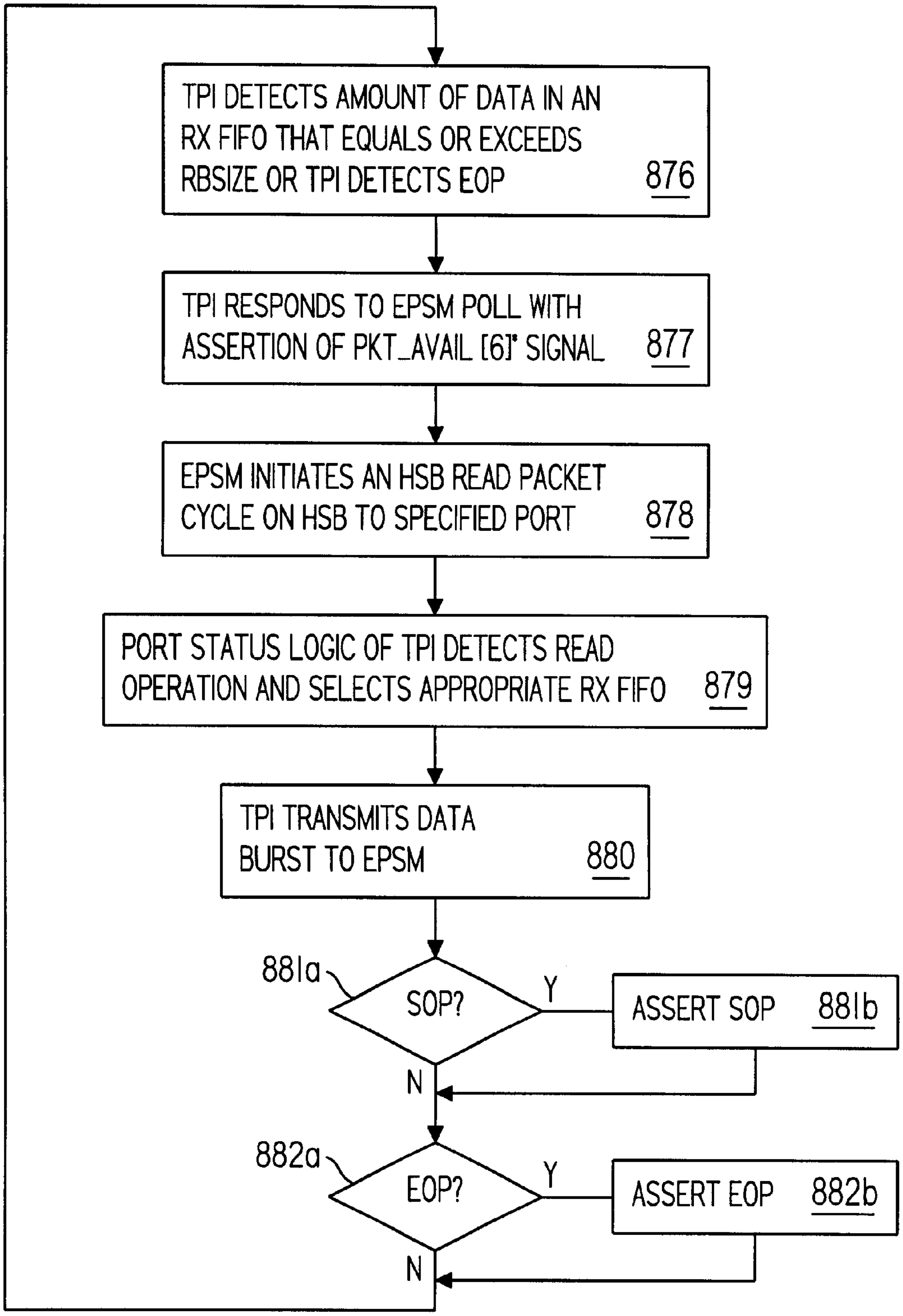
FIG. 8I is a flowchart diagram illustrating a receive data transfer operation across the high speed bus (HSB) of FIG. 2.

Referring now to FIG. 8I, a flowchart diagram is shown illustrating a receive data transfer operation from the TPI 220 to the EPSM 210 across the HSB 206. Operation commences at a first step 876, where the port status logic 820 of the TPI 220 detects an amount of data in any one of the TPI RX FIFOs that equals or exceeds the respective RBSIZE as provided in the TPI control registers 846, or the EOP for that port has been indicated by a TLAN 226.

As indicated at next step 877, the TPI 220 responds to EPSM 210 polls by properly asserting the PKT_AVAIL[6]* signals in multiplexed fashion, which indicate whether enough data is available in each of the TPI RX FIFOs. The polling occurs independently and is included for clarification. If the PKT_AVAIL[6]*signal indicates that enough data is in any TPI RX FIFO of the TPI 220, the EPSM 210 eventually initiates a read cycle on the HSB 206 to the specified port at next step 878 if it has enough buffer space in an available receive buffer of the EPSM 210.

The port status logic 820 of the TPI 220 detects the read cycle on the HSB 206, selects the appropriate TPI RX FIFO to provide data at next step 879. Then the TPI 220 transmits the data burst to the EPSM 210 over the HSB 206 at step 880. During the data transfer of step 880, if the port status logic 820 determines that the current data transfer across the HSB 206 is the start of packet as indicated at next step 881*a*, the TPI 220 asserts the SOP* signal on the HSB 206 at step 881*b* during the data transfer. Likewise, during the data transfer at step 880, if the port status logic 820 determines that the current data transfer across the HSB 206 is an end of packet as indicated at next step 882*a*, the TPI 220 asserts the EOP* signal on the HSB 206 as indicated by step 881*b* during the data transfer. From step 882*a* or 882*b*, operation returns to step 876.

Figure 8J:
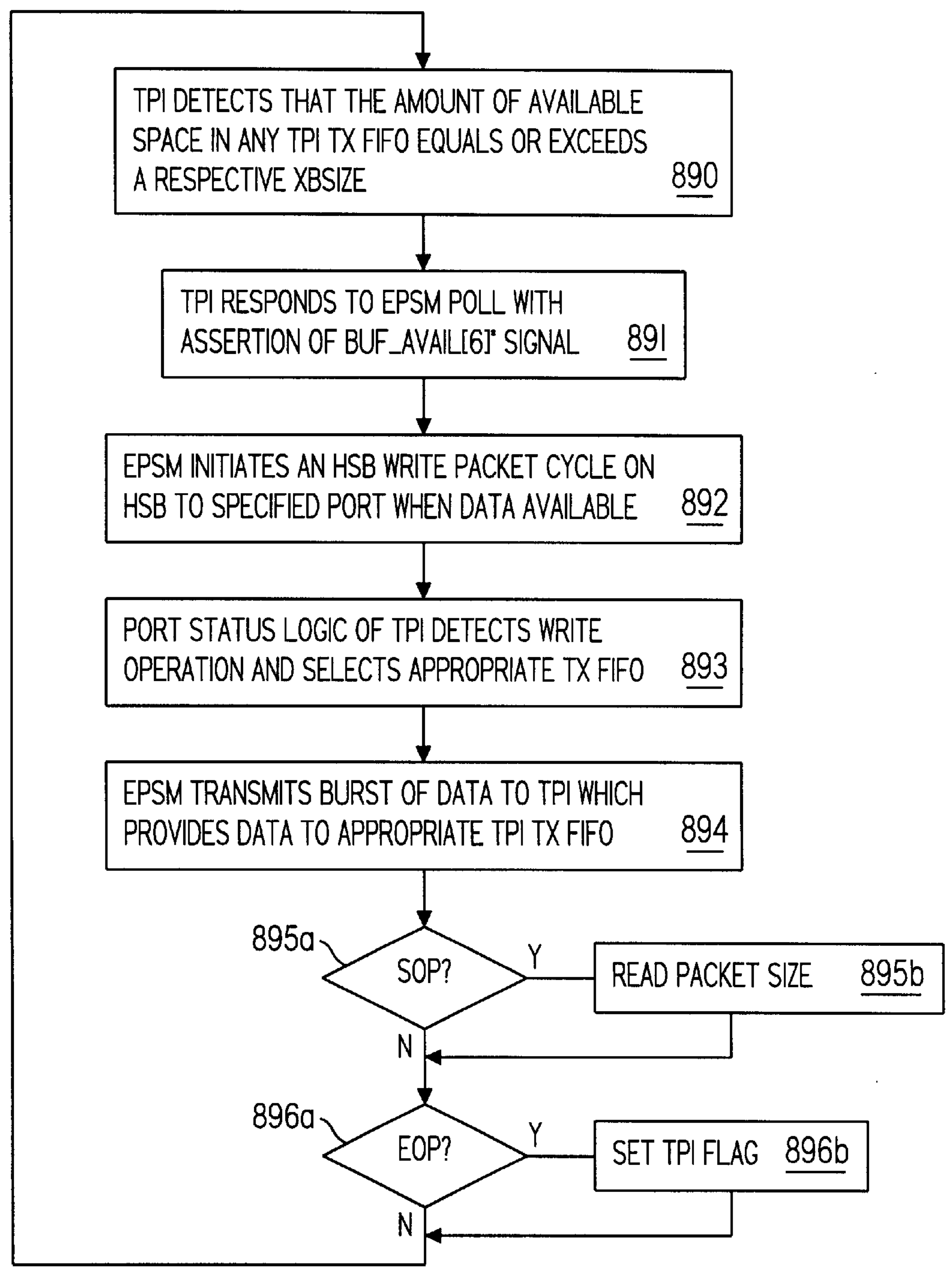
FIG. 8J is a flowchart diagram illustrating a transmit data transfer operation across the HSB.

Referring now to FIG. 8J, a flowchart diagram is shown illustrating a transmit data transfer operation for transferring packet data from the EPSM 210 to the TPI 220 across the HSB 206. Operation commences at first step 890, where the port status logic 820 of the TPI 220 detects that any one of the TPI TX FIFOs has an amount of available buffer space equaling or exceeding the corresponding XBSIZE. If so, operation proceeds to next step 891, where the port status logic 820 responds to an EPSM 210 poll by properly asserting the BUF_AVAIL[6]* signal in multiplexed fashion to indicate available buffer space in the corresponding TPI TX FIFO. As described above, the polling occurs independently and is included for clarification. At next step 892, the EPSM 210 initiates a write cycle on the HSB 206 to a port corresponding to the TPI TX FIFO having enough space when enough data is available for transmission by the EPSM 210 for that port. At next step 893, the port status logic 820 of the TPI 220 detects the write cycle on the HSB 206 and selects the appropriate TPI TX FIFO for the indicated port. At next step 894, the EPSM 210 transmits a burst of data to the TPI 220 over the HSB 206 and the TPI 220 writes the data to the corresponding TPI TX FIFO within the TPI 220.

As indicated at step 895*a*, if the TPI 220 detects assertion of the SOP* signal during the data burst of step 894, the first DWORD of the data holding the packet size is placed into the PACKET SIZE tag register 819*c* at step 895*b*. As indicated at step 896*a*, if the TPI 220 detects assertion of the EOP* signal during the data burst of step 894, the TPI 220 sets a flag within the TPI 220 at step 896*b* to indicate the end of the data packet. From either step 896*a* or 896*b*, operation returns to step 890.

Figure 8K:
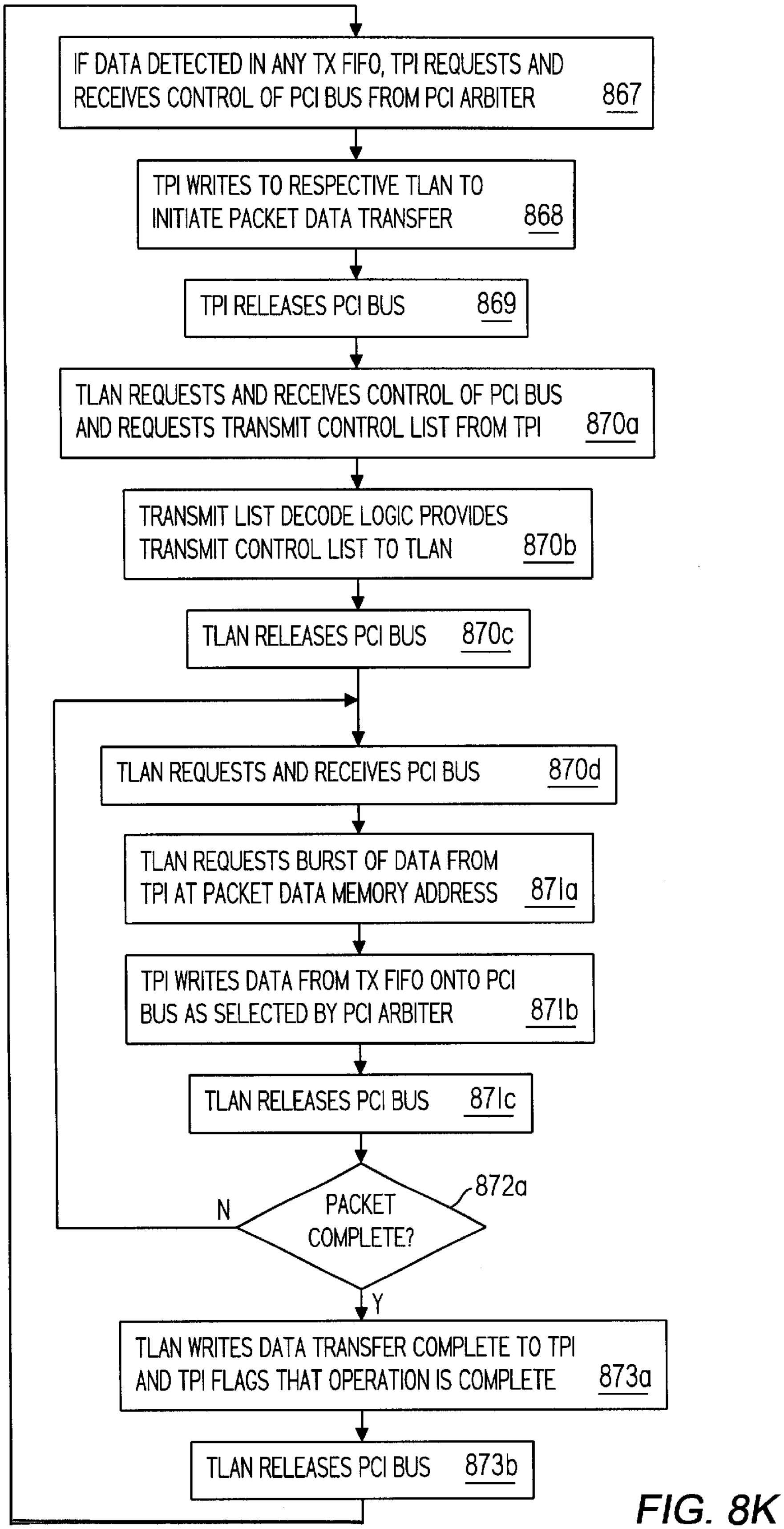
FIG. 8K is a flowchart diagram illustrating a transmit operation for each of the TLANs.

Referring now to FIG. 8K, a flowchart diagram is shown illustrating a transmit operation of the network switch 102 for each of the TLANs 226. At first step 867, the TPI 220 detects data in any one of the TPI TX FIFOs, and respondingly requests and receives control of the PCI bus 222 from the PCI arbiter 811. At next step 868, the TPI 220 writes a transmit command to the command register 828*a* of the corresponding TLAN 226. The TPI 220 then releases the PCI bus 222 at next step 869.

At next step 870*a*, the TLAN 226 receiving the transmit command requests and receives control of the PCI bus 222 from the PCI arbiter 811, and then requests a transmit control list from the TPI 220. At next step 870*b*, the TPI 220 provides the transmit control list to the TLAN 226 in control of the PCI bus 222, where the TLAN 226 provides the transmit control list to its transmit control list buffer 827*b*.

At next step 870*c*, the TLAN 226 releases the PCI bus 222, but immediately re-requests the PCI bus 222 as indicated at step 870*d*. Once the TLAN 226 again receives control of the PCI bus 222, it commences execution of the transmit control list as indicated at step 871*a* by requesting a burst of data from the TPI 220. In particular, the TLAN 226 asserts the PACKET DATA MEMORY BASE ADDRESS on the PCI bus 222 at step 871*a*. At next step 871*b*, the TPI 220 responds by selecting and enabling the corresponding TPI TX FIFO and provides the data to the TLAN 226 across the PCI bus 222. After each data burst, the TLAN 226 releases control the of the PCI bus 222 as indicated at next step 871*c*. If transfer of a complete packet of data has not been completed as indicated at next step 872, operation returns to step 870*d*, where the TLAN 226 again requests and eventually regains control of the PCI bus 222.

If transmission of the packet was completed as determined at step 872*a*, operation passes to step 873*a*, where the TLAN 226 writes that the data transfer is complete to the TPI 220 and the TPI 220 correspondingly flags that the operation is complete. In particular, the TLAN 226 performs a final single DWORD write to the CSTAT field 832*b* of the TX CNTL LIST 808*b* to set a frame complete bit within the CSTAT field 832. Also, the PACKET_SIZE field 832*a* of the TX CNTL LIST 808*b* is loaded with the size of a data packet to be transmitted by the TPI 220 to a TLAN 226. Once the TLAN 226 has completed the write operation, it releases the PCI bus 222 at step 873*b*. From step 873*b* operation returns to step 867 for the next transmit operation.

It is now appreciated that after initialization by the CPU 230, the TPI 220 is configured to cooperate with the TLANs 226 to allow the CPU 230 to perform other important tasks and functions of the network switch 102. The CPU 230 initializes PCI memory and I/O space by determining the type and number of devices on the PCI bus 222 and assigning corresponding address values. The CPU 230 provides address values of the TLANs 226 to the TPI 220. Also, the CPU 230 provides initial address values of the TPI 220 to each of the TLANs 226 and inserts a command to initiate operations. The TLANs 226 are configured to request a control list and then to execute the control list to read data from or write data to a memory located at an address within the control list. The TPI 220 is configured to update and provide each control list to each requesting TLAN 226. Further, the TPI 220 is configured to initiate transmit operations by writing a command to the appropriate TLAN 226, and then provide the corresponding transmit control list when subsequently requested. In this manner, after the CPU 230 performs initialization, it is free to perform other functions of the network switch 102.

Figure 9A:
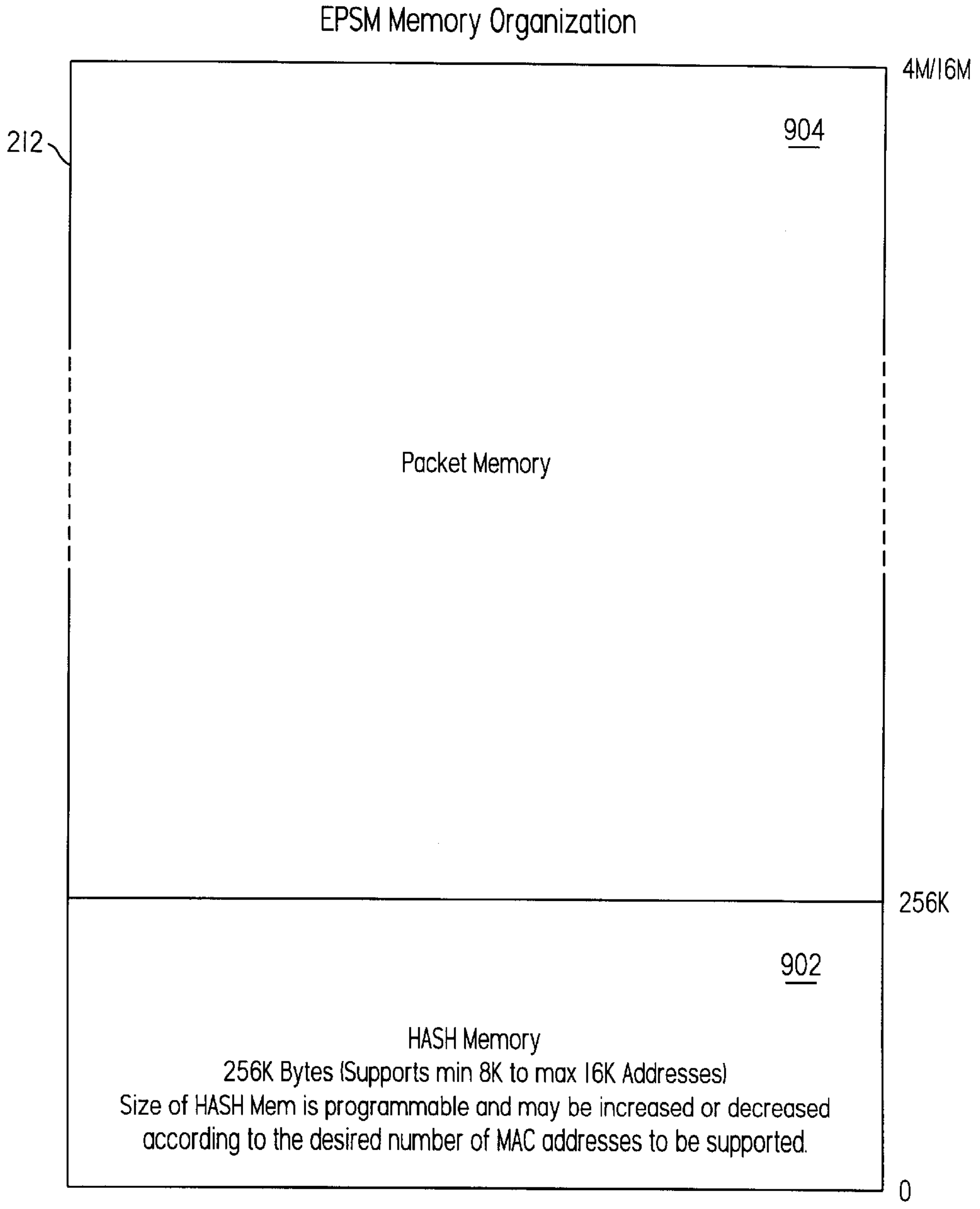

FIG. 9A is a block diagram illustrating the organization of the memory 212. In the embodiment shown, the size of the memory 212 is between 4 to 16 megabytes (Mbytes), although the memory size may vary and may be as small or large as desired. The width of the memory section blocks shown in FIGS. 9A–9G, and thus the width of each memory line, is one DWORD or 32 bits. The memory 212 is divided into two main sections including a hash memory section 902 and a packet memory section 904. The hash memory section 902 serves as a network device identification section for identifying one or more of the network devices in the networks 106, 112 coupled to the network switch 102. The size of the hash memory section 902 is programmable based on the number of devices and associated addresses and entries desired. In the embodiment shown, the hash memory section 902 includes 256 kilobytes (Kbytes) of memory for supporting at least 8K ($K=2^{10}=1,024$) addresses up to 16K addresses. The hash memory section 902 may be located anywhere in the memory 212, and is located at the beginning of the memory 212 in the embodiment shown. The size of the packet memory section 904 is the balance of the remaining memory 212 not used by the hash memory section 902.

Figures 9B, 9C:
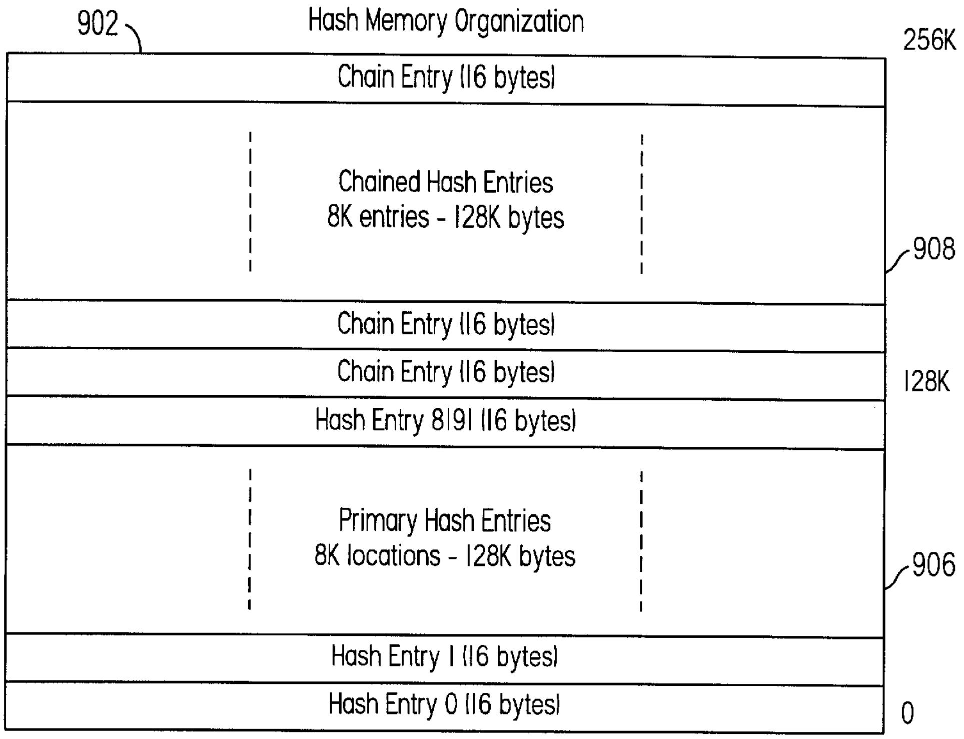

FIG. 9B is a block diagram of the organization of the hash memory section 902 of the memory 212. The hash memory section 902 is shown to be 256 Kbytes in length, where it is understood that the hash memory section size is either fixed or programmable as desired. The hash memory section 902 is divided into two 128 Kbyte sections including a first 128 Kbyte primary hash entry section 906 for primary hash entries and a second 128 Kbyte chained hash entry section 908 for chained hash entries. Each of the sections 906, 908 includes 8K entries, each 16 bytes in length.

FIG. 9C is a diagram illustrating the organization of a hash table entry 910 representative of each of the entries in the hash memory section 902, including both the primary hash entry section 906 and the chained hash entry section 908. Each entry 910 corresponds to one network device of the networks 106, 112 coupled to the network switch 102. Each of the primary entries are located at a hash address, which address is determined by "hashing" the MAC address for that device. In particular, each network device is assigned a 48-bit hardware address, also known as a physical address or a MAC address, which is a unique numerical value assigned to each network device during the manufacturing process or by setting jumpers or switches during network installation. One part of this MAC address is assigned to the manufacturer by the IEEE (Institute of Electrical and Electronics Engineers) and is common to all components from that manufacturer; the second part of the hardware address is a unique value assigned by the hardware manufacturer. The first 6 bytes, or bytes 5-0, of the hash table entry 910 contains the MAC address of the device associated with that entry. The network switch 102, therefore, adds a hash table entry for each network device that sends a data packet including its source MAC address.

Each data packet sent from each network device in the networks 106, 112 typically includes a source and a destination MAC address, which are both hashed according to one of several algorithms. In the embodiment shown, two portions of each MAC address are logically combined or compared to calculate a corresponding hash address. Each portion is 13 bits to 16 bits, which are combined using exclusive-OR (XOR) logic in a bit-wise fashion to form a 13 to 16 bit hash address. For example, the first 16 bits of a MAC address, or MA[15:0] are XOR'd in bitwise fashion with the next 16 bits of the MAC address MA[31:16] to obtain the hash address HA[15:0]. In one embodiment, the first 13, 14, 15 or 16 bits of the hashed result are used as the hash address HA. Alternatively, the first 13 bits of the MAC address MA[12:0] is hashed with the next 13 bits MA[25:13] to obtain a 13-bit hash address HA[12:0]. Or, the first 14 bits of the MAC address MA[13:0] is hashed with the next 14 bits MA[27:14] to obtain a 14-bit hash address HA[13:0], and so on. It is understood that many other different hashing algorithms are known and may be used to combine any particular combinations of the address bits as known to those skilled in the art, and that the present invention is not limited to any particular hashing scheme.

The hash address is used as the actual address or as an offset address to locate each of the hash entries of the primary hash entry section 906. Although the MAC addresses are unique, the hash address may not be unique such that two different MAC addresses hash to the same hash address. The chained hash entry section 908 is provided to store duplicate hash addresses for different devices, as described further below. The organization including a primary hash entry section 906 accessible by the hash address and a chained hash entry section 908 accessible by a Link address located in the first entry of the primary section 906 eliminates at least one branch operation. Rather than using a list of pointers to access the table entries, the first entry in the memory 212 is retrieved in a single branch operation, the second entry in a second branch operation, etc. In this manner, the organization of the memory 212 provides more efficient access of the hash entries by eliminating at least one branch operation per access.

The next byte (6) of the hash table entry 910 contains a binary port number (PortNum) identifying the associated port number to which the device is connected, where the port number for PORT0 is zero, the port number for PORT1 is one, the port number for PORT28 (for the CPU 230) is 28, etc. The next byte (7) is a control and age information byte (Control/Age) including a valid bit (VALIDENTRY) identifying whether the entry is valid or not, where a logic "1" indicates the entry is valid and logic "0" indicates that the entry is not valid, otherwise called an empty entry. The Control/Age byte includes a binary age number (AGE) representing the elapsed time from the last source access associated with this device. A device may be aged and deleted from the hash entry by the CPU 230 after a predetermined amount of time of non-use since the last source access. The measurement of elapsed time is performed using any one of several methods, and may be measured in seconds or portions thereof, minutes, hours, etc. The predetermined amount of time before a device is aged is also programmable. In an alternative embodiment, the AGE number is a single bit which is used to indicate whether the device is considered "old" or not, which is set by an elapsed timer or the like.

The next four bytes (B:8) define a 29-bit virtual-LAN (VLAN) bitmap value representing port groupings, if used. Each bit of the VLAN value corresponds to a respective one of the ports and is set if the device or port is grouped with that port. Thus, the VLAN value identifies which of the other ports that the device is grouped with. This enables the networks 106, 112 to be grouped in any desired combination to form a plurality of different LANs coupled to the network switch 102. For example, if the first five ports port PORT0–PORT4 are grouped together, then the VLAN value for each is 0000001Fh, where "h" denotes a hexadecimal value. A BC packet sent from a device coupled to port PORT2 is repeated to the ports PORT0, PORT1, PORT3 and PORT4 rather than being repeated to all other ports of the network switch 102. A VLAN value of all ones or 1FFFFFFFh denotes no groupings for that device. It is noted that it is possible for one device to be associated with more than one group. In an alternative embodiment, a VLAN field may be included for identifying more than one of several VLAN groups that each device belongs to, if any.

The last four bytes (F:C) of each hash table entry 910 is a link address (Link A[3 1:0] or Link Address) pointing to the next entry having an identical hash address, if any, in the chained hash entry section 908. The next entry is stored in the next available location in the chained hash entry section 908. In this manner, if two MAC addresses of two different devices hash to the same hash address, the first or "primary" entry is stored in the primary hash entry section 906, and the second entry is stored in the chained hash entry section 908, and the Link Address of the primary entry points to the second entry. If another MAC address hashes to the same hash address as the first two, then each additional entry is stored in the chained hash entry section 908 and linked together in consecutive order using the Link Addresses. Thus, the first points to the second, the second points to the third, and so on. Each entry follows the format of the hash table entry 910. The format of the Link address may be defined in any convenient manner. The Link address typically includes a base address portion pointing to the hash memory section 902 within the memory 212, and an offset portion to the actual entry within the hash memory section 902. The lower address bits may be set to zero for byte alignment as desired. The last entry in each chain is identified by setting a portion of the Link address to zero. For example, the last entry may be denoted by setting the Link Address bits [A31:28] to zero.

Figure 9D:
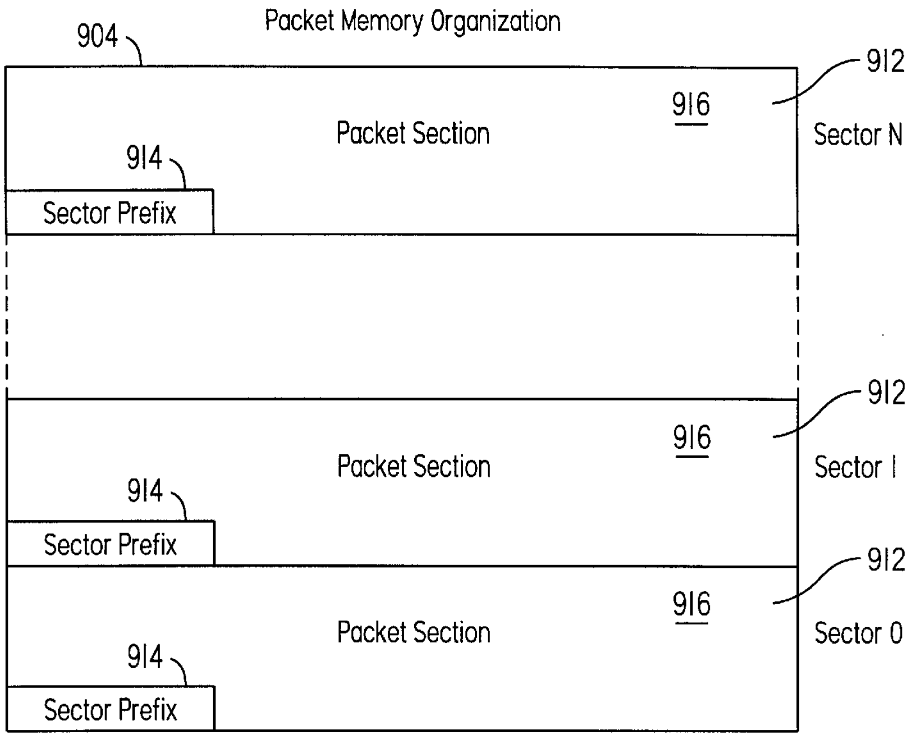

FIG. 9D is a block diagram illustrating the organization of the packet memory section 904 of the memory 212. In the embodiment shown, the packet memory section 904 is organized as a plurality of contiguous and equal-sized sectors 912, where each sector 912 includes a sector information section, called a sector prefix 914, and a packet section 916 including one or more packet data blocks. Each of the sectors 912 is preferably 2 Kbytes in size thereby corresponding to the page size of the memory devices implementing the memory 212 to simplify design and overhead. In the embodiment shown, FPM DRAM SIMMs are organized using 4 Kbyte page boundaries, and synchronous DRAM SIMMs are organized into 2 Kbyte page boundaries. Thus, a 2 Kbyte sector size is sufficient for the memory device types supported. The sectors 912 are initially empty but chained together with Link Addresses to form the FREEPOOL CHAIN of free memory sectors.

As new packets of information are received from each of the ports 104, 110, one or more sectors 912 are disconnected from the FREEPOOL CHAIN and linked together in a RECEIVE SECTOR CHAIN per port. Also, each packet is linked with other packets in the same or other RECEIVE SECTOR CHAINs to form a separate TRANSMIT PACKET CHAIN per port. In this manner, a packet in a RECEIVE SECTOR CHAIN for one port is also placed into a TRANSMIT PACKET CHAIN for another port. When all of the data in the packet section 916 of a sector 912 is transmitted to a destination port, that sector is freed from its RECEIVE SECTOR CHAIN and linked back into the FREEPOOL CHAIN. The RECEIVE SECTOR and FREEPOOL chains are implemented using link addresses or pointers from one sector to the next in a manner described further below. Each TRANSMIT PACKET CHAIN is linked together from one packet data block to the next for each port using link addresses or pointers as described below.

Figure 9E:
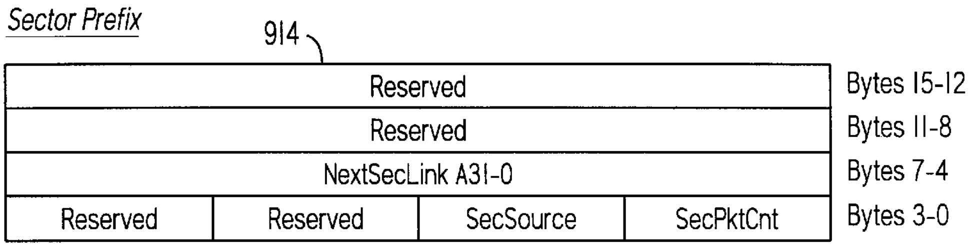

FIG. 9E is a diagram illustrating the organization of each of the sector prefixes 914 for each sector 912 of the packet memory section 904. The sector prefix 914 includes information of a corresponding sector 912 and further functions as a link to a next sector 912, if any. It is noted that although a prefix is indicated, this information portion may be placed anywhere within the sector 912. The first byte (0) defines a binary sector packet count (SecPktCnt) indicating the number of packets or packet pieces in the current sector 912. The sector packet count is incremented as packet data is stored into the sector, and decremented when the data is read for transmission by the destination port. The sector is released to the FREEPOOL CHAIN when the sector packet count SecPktCnt decrements to zero and when the sector is not at the end of the RECEIVE SECTOR CHAIN. The next byte (1) is a sector source value (SecSource), which specifies the source port of the received packet. This value is desired to identify and decrement an appropriate receive port sector count (RxSecCnt) when the sector is released back into the FREEPOOL CHAIN. The next two bytes (3:2) are reserved or not used.

The next four bytes (7:4) in each sector prefix 914 forms a next link address (NextSecLink) to the next sector in a corresponding RECEIVE SECTOR CHAIN or FREEPOOL CHAIN. The same link address is used for both purposes, although a different link address could also be used. In the embodiment shown, the NextSecLink address is 32 bits including base and offset portions. The least significant "n" bits may be set to zero to byte-align the NextSecLink address according to the sector-size. The integer "n" is 12 for 4 Kbyte sectors, 11 for 2 Kbyte sectors, 10 for 1 Kbyte sectors, and 9 for 512 Kbyte sectors. In the embodiment shown, n is 11 for 2 Kbyte sectors, etc. In this manner, as one or more packets are received from a port 104, 110, a RECEIVE SECTOR CHAIN of sectors 912 are allocated to store the one or more packets received by that port. The sectors 912 are linked together in chain fashion using the NextSecLink address within the sector prefix 914 of each sector 912 in the chain. The packet data is stored sequentially within the packet section 916 of each of the sector 912 in each RECEIVE SECTOR CHAIN. It is noted that packet data for a single packet may cross sector boundaries in a RECEIVE SECTOR CHAIN. The final eight bytes (15:8) of the sector prefix 914 are reserved or otherwise not used.

Figure 9F:
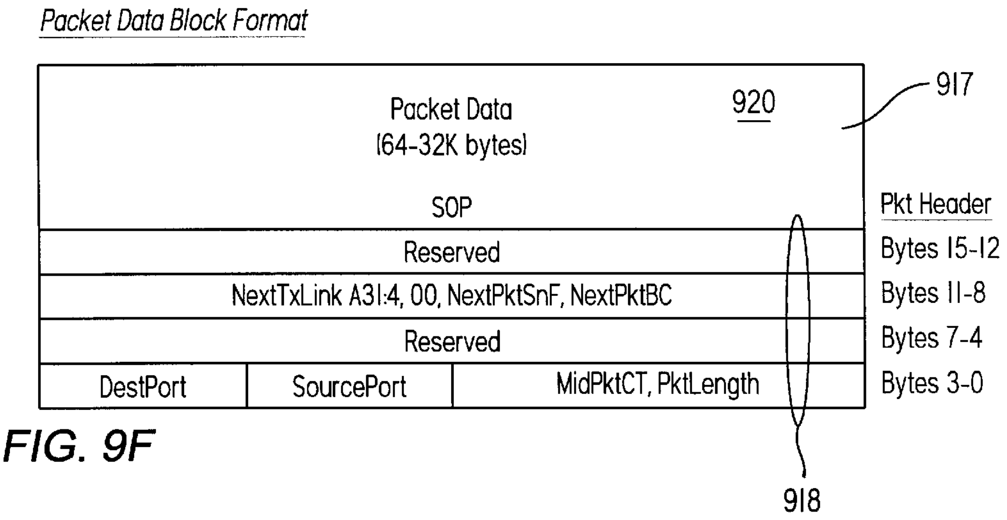

FIG. 9F is a diagram illustrating the organization of an exemplary packet data block 917 representing each packet data block within the packet sections 916. The packet data block 917 is further divided into two parts, including a packet block header 918 and a packet data section 920. The packet block header 918 is preferably prepended to each packet by the MCB 404 to form a packet data block 917. The first two bytes (1:0) in the packet block header 918 forms a 15-bit binary packet length (PktLength) value defining the packet length in bytes, and a 1-bit mid-packet CT value (MidPktCT), which is set if a CT mode packet is forwarded to the memory 212 due to a stalled port. The MCB 404 appends this first DWORD including the PktLength to the packet when transmitting to ports PORT24–PORT27 for the TLANs 226 and to port PORT28 for the CPU 230. The next byte (2) of the packet block header 918 identifies the source port (SourcePort) number of the packet, which is an 8-bit Port ID binary number identifying the number of the port associated with the source address. The source port is also identified by the particular RECEIVE SECTOR CHAIN in which the packet is stored. The next byte (4) identifies the destination port (DestPort) number, which is an 8-bit Port ID binary number identifying the number of the destination port in a similar manner as the SourcePort value. The destination port is also identified by the particular TRANSMIT PACKET CHAIN to which the packet belongs.

Four bytes (11:8) of the packet block header 918 define a 32-bit next link address (NextTxLink) to the next packet or packet data block 917 in a TRANSMIT PACKET CHAIN. The end of the TRANSMIT PACKET CHAIN is indicated when a transmit packet count (TxPktCnt) is decremented to zero. The least significant bit A0 of the NextTxLink address is used as a BC packet bit (NextPktBC) indicating whether the next packet is broadcast or not. If NextPktBC=1, then the next packet is in broadcast format, described below, and if NextPktBC=0, then the next packet is non-broadcast. The next least significant bit A1 of the NextTxLink address is used as a SnF packet bit (NextPktSnF) indicating whether the next packet is SnF or not in a similar manner. It is noted that the least significant nibble (four bits) of the NextTxLink address may be assumed to be zero for byte alignment purposes, regardless of the actual value of the nibble. Thus, for example, when the NextTxLink address is read, bits A[3:0] are assumed to be zero regardless of their actual value, such as NextPktBC=1. This allows these bits to be used for alternate purposes. In the embodiment shown, the data structures are 16-byte aligned so that the least significant bits A[3:0] are assumed to be zero.

In the embodiment shown, the packet data section 920 immediately follows the packet block header 918, where the length of the data field is defined in the packet header. It is noted, however, that the particular ordering of each sector and the particular locations of values in the embodiment shown is arbitrary and for purposes of illustration, and thus may be organized in any desired manner without going beyond the scope of the present invention.

Figure 9H:
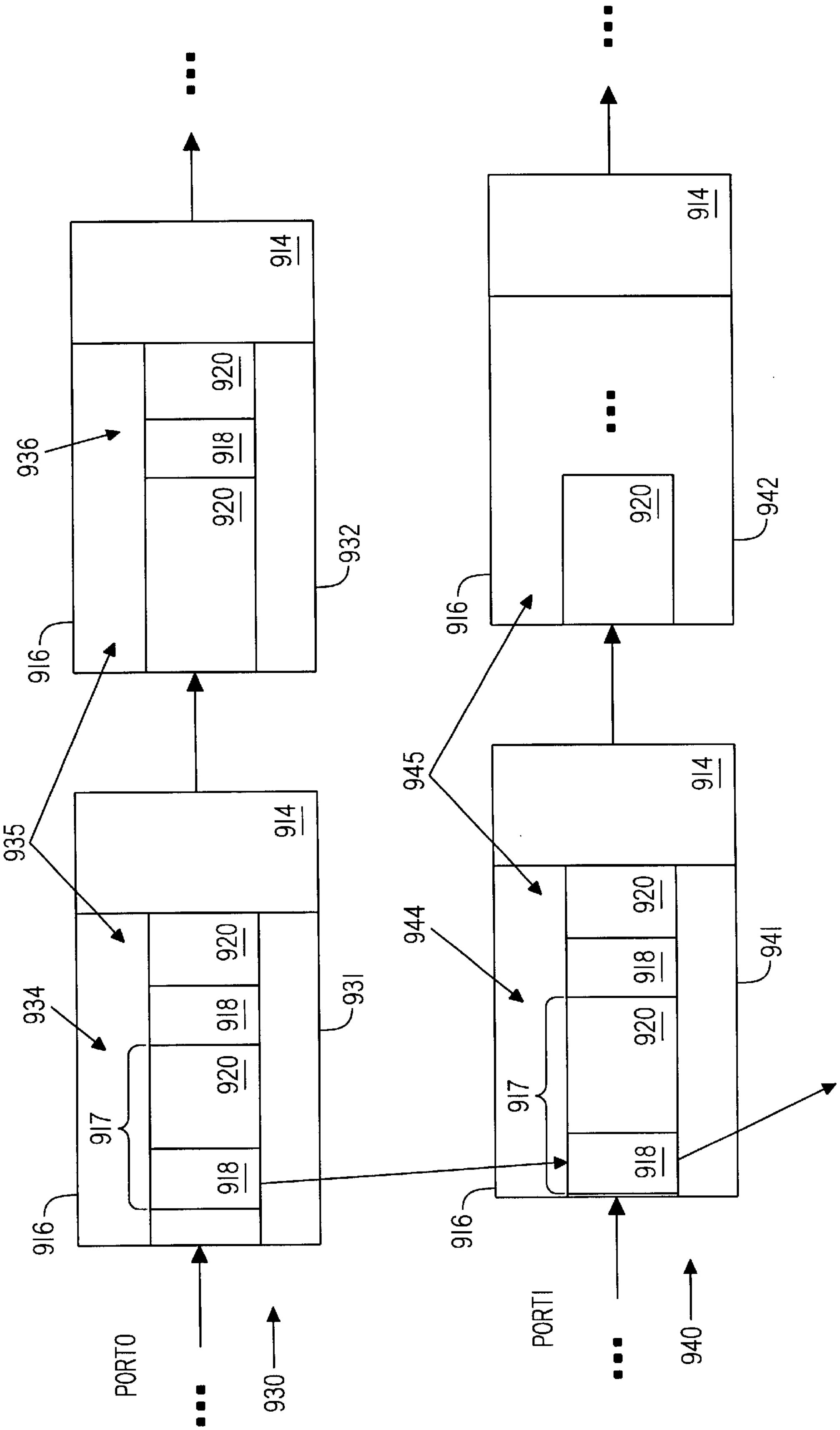

As described previously, packets are retrieved from each of the ports PORT0–PORT28 and stored in corresponding RECEIVE SECTOR CHAINs of the sectors 912, one RECEIVE SECTOR CHAIN per port. As shown in FIG. 9H, a first receive sector chain 930 is shown for PORT0 where a first sector 931 is linked to another sector 932 using the NextSecLink in the sector prefix 914 of the sector 931. Further sectors may be linked as desired using the link addresses in the sector prefixes 914. Also, a second receive sector chain 940 is shown for PORT1 where a first sector 941 is linked to another sector 942 using the NextSecLink in the sector prefix 914 of the sector 941. For each packet received at a given port, the packet block header 918 is placed immediately after the previously received packet data block 917 in the packet section 916 of the current sector 912 of the corresponding RECEIVE SECTOR CHAIN, and the packet block header 918 is followed by its packet data section 920. If the packet section 916 of the current sector 912 becomes full while storing a packet data block 917, another sector 912 is allocated from the FREEPOOL CHAIN and linked into the RECEIVE SECTOR CHAIN for the port. In this manner, the packet data blocks 917 received from a port are placed contiguously within the corresponding RECEIVE SECTOR CHAIN for that port. Also, the packet section of a sector 912 may include entire packets and/or packet portions.

Thus, as shown in FIG. 9H, packet data blocks 934, 935 and 936 received at port PORT0 are placed within the sectors 931 and 932 as shown. Note that packet data block 935 spans the sectors 931, 932. In a similar manner, packet data blocks 944 and 945 receive at port PORT1 are placed within the sectors 941 and 942 as shown, where packet data block 945 spans the sectors 941, 942.

Each packet is also associated with the TRANSMIT PACKET CHAIN of packets for each destination port, where the packets are linked together using the NextTxLink address. Packets in each TRANSMIT PACKET CHAIN are generally ordered based on when they are received by the network switch 102, so that the order is maintained when transmitted to the associated destination port. For example, as shown in FIG. 9H, if the packet data blocks 934 and 944 are to be transmitted from port PORT10, and the packet data block 934 is to be transmitted just prior to the packet data block 944, then the NextTxLink address of the packet block header 918 of the packet data block 934 points to the packet data block 944. The NextTxLink address of the packet block header 918 of the packet data block 944 points to the packet data block to be transmitted next, and so on. The actual order for transmission is determined when a packet is linked into a TRANSMIT PACKET CHAIN. CT mode packets are linked when at the beginning when the packet is received, and SnF mode packets are linked after the entire packet is stored. Mid-packet interim CT mode packets are linked to the front of the corresponding TRANSMIT PACKET CHAIN to ensure proper ordering.

FIG. 9G is a block diagram showing a 128-byte packet header 922 used for BC packets, which replaces the normal packet block header 918. For BC packets, the NextPktBC value is set in the previous packet indicating that the current packet is a BC packet. It is noted that each TRANSMIT PACKET CHAIN should be maintained for all ports that include the BC packet for transmission. Therefore, the BC packet header 922 includes a 4-byte link address (Port # NextTxLink), for each port numbered 0–28 (including ports 104, 110 and the CPU 230), where each NextTxLink address points to the next packet in the TRANSMIT PACKET CHAIN associated with the corresponding port identified by location in the list (Port #). Thus, NextTxLink addresses begin at bytes (11:8) and end at bytes (123:120). The first NextTxLink address entry (11:8) corresponds the next packet in the memory 212 for the first port PORT0, the second entry (bytes 15:12) is a NextTxLink address to the next packet in the memory 212 for the second port PORT1, etc., up to the last entry (bytes 123:120), which is a NextTxLink to the next packet for the CPU 230. Each BC link address also includes a next BC packet (NextPktBC) bit indicating whether the next packet in the respective transmit packet chain is a BC packet or not, and a next SnF packet (NextPktSnF) bit indicating whether the next packet in the respective transmit packet chain is a SnF packet or not.

The first four bytes (3:0) of the BC packet header 922 are similar to the final four bytes of the normal packet block header 918, including the PktLength, MidPktCT, SourcePort and DestPort values, except that the MidPktCT value is zero for BC packets. The next four bytes (7:4) of the BC packet header 922 is a broadcast port bitmap (BC_Ports) in which each of the bits 28:0 corresponds to a port which will receive the BC packet data. Each bit is cleared when the packet is sent to the corresponding port. When all BC_Ports bits have been cleared, the SecPktCnt count, described previously, is also decremented accordingly.

Figure 10:
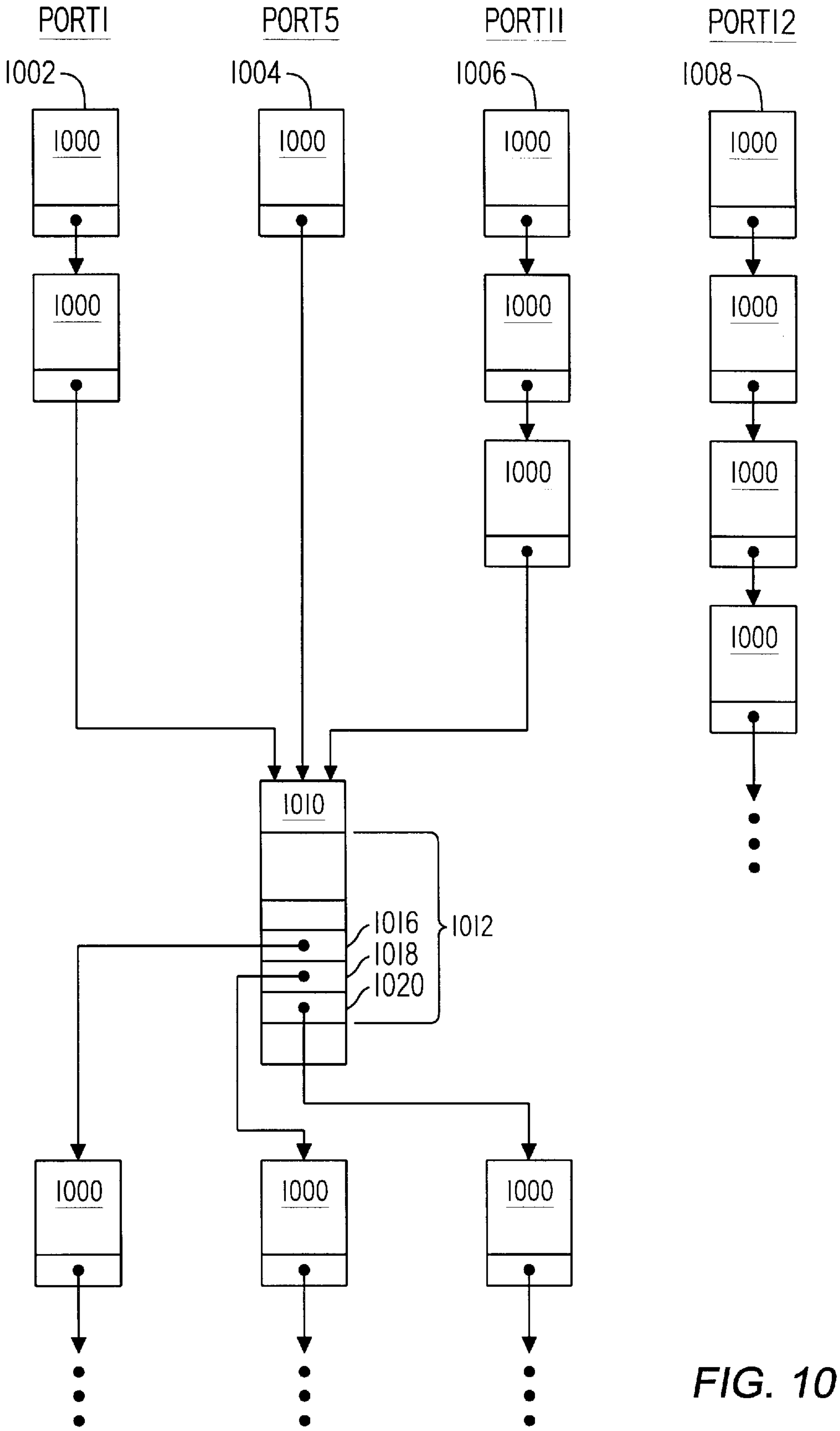
FIG. 10 is an exemplary block diagram illustrating several transmit packet links incorporating a broadcast packet.

Referring now to FIG. 10, an exemplary block diagram is shown illustrating several transmit packet links each incorporating the same BC packet 1010. In this example, ports 1, 5, 11 and 12 are grouped together using the VLAN function or the like, so that the data of the BC packet 1010 received at one source port, such as port 12, is duplicated to the remaining ports 1, 5 and 11 in that group. Four transmit packet chains 1002, 1004, 1006 and 1008 are shown for ports 1, 5, 11 and 12, respectively. The transmit packet chains 1002, 1004 and 1006 link several generic non-broadcast packets 1000 with the BC packet 1010. Since port 12 is the source port, the BC packet 1010 is not transmitted on port 12, so it is not included in the transmit packet chain 1008. The BC packet 1010 includes a BC packet header 1012, which includes a list of link addresses, one for each port, including a link address 1016 pointing to the next packet 1000 in the transmit packet chain 1002 of port 1, a link address 1018 pointing to the next packet 1000 in the transmit packet chain 1004 of port 5, and a link address 1020 pointing to the next packet 1000 in the transmit packet chain 1006 of port 11. In this manner, each of the transmit packet chains 1002, 1004 and 1006 are maintained. It is also noted that each transmit packet chain may include one or more BC packets, which may appear non-consecutively or consecutively, as desired.

FIG. 11A is a block diagram illustrating MCB packet control registers 1102, which set of registers is provided within the SRAM 650 and duplicated for each of the 29 ports 104, 110 including the CPU 230 of the network switch 102. The CPU 230 is treated as a "port" (PORT28) for certain purposes, such as for sending and receiving Bridge Protocol Data Units (BPDU's) for purposes of the spanning tree procedure. Each MCB packet control register 1102 includes a receive section 1104 and a transmit section 1106. In the receive section 1104, a 28-bit receive packet header base pointer (RxBasePtr) is a pointer to the base of the current receive packet header for the corresponding port, which is the beginning of the RECEIVE SECTOR CHAIN for that port. As described previously for the memory 212, the data structures for the SRAM 650 are 16-byte aligned so that the least significant bits A[3:0] of all pointers are assumed to be zero. A 28-bit current receive pointer (RxCurPtr) is a pointer to the current data store location for the RECEIVE SECTOR CHAIN of the port. The least significant four bits of the RxCurPtr value are control bits, including a receive BC packet indication bit (RxBC), a receive transfer in progress (RxIP) bit used as a Start Of Packet (SOP) flag, a multiple sector packet (MultiSecPkt) bit 1 indicating whether the current packet crosses a sector boundary, and a SnF bit 0 indicating that the transmit link is updated at the end of the packet. The receive section 1104 further includes a Mid-packet CT bit (MidCT), a 16-bit receive packet length (RxPktLn) value equal to the length of the current packet received in bytes up to the RxCurPtr, a 16-bit receive port sector count (RxSecCnt) indicating the number of sectors currently in use by the corresponding port, and a 16-bit receive sector threshold (RxSecThreshold) value identifying a CPU-programmed maximum number of sectors allowed for each port or RECEIVE SECTOR CHAIN. The RxSecThreshold value is used to determine whether back-pressure is to be applied for that port by comparing RxSecThreshold with RxSecCnt. If backpressure is disabled, the RxSecThreshold value is used to drop any further packets received at the corresponding port.

The receive section 1104 further includes an end of transmit queue pointer (EndOfTxQPtr), which is a 28-bit pointer to the base of the last packet in the TRANSMIT PACKET CHAIN for the corresponding port. Finally, an end of transmit queue BC (EOQ_BC) bit is set to indicate broadcast format for the last packet in the TRANSMIT PACKET CHAIN for the corresponding port.

The transmit section 1106 provides information for the TRANSMIT PACKET CHAIN for the corresponding port. A transmit base pointer (TxBasePtr) is a 28-bit pointer to the base of the current transmit packet header and another 28-bit transmit current pointer (TxCurPtr) points to the current data retrieval location for the corresponding port. A transmit broadcast (TxBC) bit is set to indicate that the packet header is in broadcast format. A transmit in progress (TXIP) bit is set to logic 1 to indicate that a transmit is currently in progress for the port and is used to indicate SOP. An 8-bit transmit source port (TxSrcPort) number is the source port number of the current transmit packet, which is read from the packet header at SOP. A 16-bit transmit packet length (TxPktLn) value is equal to the remaining bytes to be transmitted for the current transmit packet. When a packet is to be transmitted, the PktLength value in the packet block header 918 of the packet is copied into the TxPktLn value in the transmit section 1106, and then the TxpktLn valued is decremented by the TX controller 606 as the packet is transmitted. When the TxPktLn is decremented to zero, the EPSM 210 generates the corresponding EOP* signal to indicate the end of the packet. A 16-bit maximum packet number (TxPktThreshold) value is equal to the CPU-programmed maximum number of packets allowed to be queued for each port. It is noted that packets destined for the CPU 230 are not subject to the TxPktThreshold or RxPkt-Threshold limits. Finally, a 16-bit transmit packet count (TxPktCnt) is equal to the number of packets currently queued for the corresponding port.

FIG. 11B is a block diagram illustrating freepool packet control registers 1108 located in the SRAM 650, which registers are associated with the FREEPOOL CHAIN of registers. Each freepool register 1108 includes a pointer (NextFreeSecPtr) to the next free sector in the FREEPOOL CHAIN, a pointer (LastFreeSecPtr) to the last sector in the FREEPOOL CHAIN, a free sector count (FreeSecCnt) equal to the number of free sectors currently available, a free sector threshold (FreeSecThreshold) number equal to the CPU-programmed minimum number of sectors allowed before a memory overflow flag (MOF) is set for backpressure or filtering (dropping packets) purposes, a BC packet count (BC PktCnt) equal to the number of BC packets currently in the memory 212, and a BC packet threshold (BC_PktThreshold) count equal to a CPU-programmed maximum number of BC packets allowed in the memory 212.

Referring now to FIG. 12A, a flowchart diagram illustrating the operation of the network switch 102 for receiving data packets into the memory 212 and for transmitting data packets in CT mode of operation. Data is typically received and transmitted by the ports PORT0–PORT27 of the network switch 102 in the form of packets in real time or in their entirety and are not subdivided while being transmitted across the segments 108, 114. However, the FIFOs within the network switch 102 are typically not large enough to store an entire packet. Thus, packet data is transferred within the network switch 102 from one FIFO to another in packet portions or subdivisions of packets.

In a first step 1200, the EPSM 210 detects a new packet being received by one of the ports 104, 110 through indication of the PKT_AVAILm* signals. At next step 1202, the beginning portion or header of the packet is retrieved from the source port and read into the HASH REQ LOGIC 532, where the header includes the destination and source MAC addresses. The HASH REQ LOGIC 532 provides the destination and source addresses and the source port number on the HASH_DA_SA[15:0] signals and asserts the HASH_REQ* signal to the MCB 404. The MCB 404 respondingly invokes the hashing procedure for determining the appropriate action for the packet, where the source and destination addresses are hashed to determine if either of the addresses have been previously stored within the memory 212. The MCB 404 asserts the HASH_DONE* signal when enough information is available for the HCB 402 to determine the appropriate action to take for the packet. The flowchart shown in FIG. 12A includes two primary portions for the destination and the source addresses, which will be discussed separately. In the embodiment shown, the destination address is hashed first, followed by the source address, although the procedures may be performed concurrently or in any desired order.

For the destination address, operation proceeds to step 1204, where the hashing procedure is invoked to hash the destination address. Operation proceeds to step 1208 from step 1204 in response to the HASH_DONE* signal to check threshold conditions for both unicast and BC packets. At step 1208, it is determined whether any relevant threshold conditions would be violated by the new packet. In particular, if the FreeSecCnt number is equal to or less than the FreeSecThreshold number, then there may not be enough room to store the packet in the memory 212. Also, if the RxSecCnt is greater than or equal to the RxSecThreshold number for the source port, then the network switch 102 may determine to drop the packet. For BC packets, the BC_PktThreshold number is compared to the BC_PktCnt number, which is the actual number of BC packets, to determine if the maximum number of BC packets have already been received. For unicast packets, the TxSecThreshold number is compared to the TxSecCnt number for the destination port.

From step 1208, operation proceeds to step 1205, where the HCB 402 determines from the HASH_STATUS[1:0] signals and from comparison of any of the threshold conditions whether the packet is to be dropped. The packet may be dropped for a variety of other reasons as previously described, such as, for example, the source and destination ports are equal. If the packet is to be dropped, operation proceeds to step 1207 from step 1205, where the packet is either dropped or backpressure is applied. Backpressure is applied if the FreeSecThreshold or the RxSecThreshold conditions are violated, and if backpressure is enabled and the source port is operating in half duplex mode. Otherwise, the packet is dropped. For backpressure, the EPSM 210 executes a backpressure cycle on the HSB 206 causing the source port to assert a jamming sequence to the sending device. The packet is dropped if the backpressure indication is not accepted by the source port (as indicated by the ABORT_OUT* signal) because it is provided too late to assert the jamming sequence. Also, the packet is dropped if the BC_PktThreshold condition is the only threshold condition that is violated. The network switch 102 continues to receive the rest of the dropped packet, but the packet is not stored nor sent to another port. From step 1207, operation proceeds to step 1214, where the appropriate statistics registers in the MCB configuration registers 448 are updated based on the action taken at step 1207. The statistics registers indicate whether the packet was dropped or backpressured due to overflow conditions. For example, a per port "dropped packet-no buffer" count is incremented for the source port to indicate a packet is dropped due to overflow conditions, or a "packet backpressured" count is incremented if the packet is backpressured.

If the packet is not to be dropped, operation proceeds to step 1206 from step 1205, where it is determined whether the destination address was found in the hash memory section 902 and whether the packet is to be broadcast or not. The packet is broadcast if the destination address is not recognized and thus the destination port is not known, or if the GROUP bit within the packet is set. If the destination address is not found or if the packet is otherwise a BC packet as determined at step 1206, then the packet is to be broadcast and operation proceeds to step 1210, where the MCB 404 of the EPSM 210 allocates another sector within the memory 212 for the new packet, if necessary. A new sector is not necessary if the current sector has enough room for the packet. Operation then proceeds to step 1216 indicating that the remainder of the packet, burst by burst, is buffered through the EPSM 210 and transferred to the memory 212. Regardless of port settings, BC packets are handled with SnF mode where the entire packet is stored in the memory 212 before being transmitted. From step 1216, operation proceeds to step 1217 to determine of the ABORT_OUT* signal was asserted during reception of the packet due to a packet error. Several error conditions are checked by the ports PORT0–PORT27, such as detection of a FIFO overrun, a runt packet, an oversized packet, the packet had a bad FCS (frame check sequence), or a PLL error was detected. If a packet error is detected at step 1217, operation proceeds to step 1219, where the packet is removed from the memory 212.

If no packet errors are detected at step 1217, operation proceeds to step 1218, where the broadcast port bitmap BC_Ports in the packet header 922 of the BC packet is updated with the active ports from which the BC packet is to be transmitted. The BC packet is sent to all of the ports 104, 110 except the following ports: the source port; any port not in FORWARDING state if the source port is the CPU 230 or any port in DISABLED state if the source port is the CPU 230; and, any ports having a TxPktCnt number that is greater than or equal to the corresponding TxPktThreshold number. If VLAN is enabled, the VLAN bitmap value in the hash table entry 910 is also examined, which further limits the ports to active associated ports in the VLAN group. Also, miss BC packets, where the packet is broadcast due to an unknown destination address, are forwarded according to a MissBCBitMap register. It is noted that if the resulting BC_Ports bitmap is all zero's such that the packet is not to be sent to any ports, then this determination is either made at step 1205 and the packet is dropped at step 1207, or the packet is removed from the memory 212 at step 1218.

Operation proceeds to step 1220 from step 1218, where the packet is added to the TRANSMIT PACKET CHAIN for each port in the resulting BC_port bitmap. In particular, each of the NextTxLink link addresses for each port designated in the BC_port bitmap in the packet header 922 is updated to insert the BC packet in the TRANSMIT PACKET CHAINs of the appropriate ports. All other associated register or count values and statistics in the network switch 102 are updated accordingly as well, such as, for example, the BC_PktCnt number.

Referring back to step 1206, if the destination address is found and the packet is not a BC packet, operation proceeds to step 1222, where the hash cache table 603 is updated. Operation then proceeds to next step 1224, where it is queried whether either the source port or the destination port is set for SnF mode. If both ports are set for CT mode and the other CT conditions are met, such as equal port speed and the TBUS setting for the destination port is equal to the TBUS setting for the source port, operation proceeds to step 1225, where it is queried whether the destination port path is busy. If operation is designated for SnF mode as determined at step 1224, or if designated for CT mode but the destination port is busy as determined at step 1225 so that interim CT mode is initiated, operation proceeds to step 1226, where the MCB 404 of the EPSM 210 allocates space within the memory 212 for the new packet, if necessary. From step 1226, operation proceeds to step 1228, where the remaining portion of the packet is retrieved into the EPSM 210 and transferred to the memory 212. If a packet error occurs during the reception of the packet as indicated at step 1229, which step is similar to step 1217, operation proceeds to step 1219 to remove the packet from the memory 212. Otherwise, operation proceeds to next step 1230, where the packet is added to the TRANSMIT PACKET CHAIN of the destination port, and the appropriate Link addresses, counts and CHAINs are updated.

Referring back to step 1225, if the destination port path is not busy, operation proceeds to step 1231, where the source and destination ports are designated for normal CT operation for the current packet. For normal CT mode, each remaining packet portion is not sent to the memory 212, but instead, is buffered through the CT BUF 528 to the destination port. The header of the packet is transferred from the RX FIFO of the EPSM 210 directly to the destination port. Next step 1232 indicates receiving data packet portions into the CT BUF 528 and transferring the packet portions to the destination port. During CT operation, next step 1233 queries whether the destination port or path becomes busy or unavailable. This query indicated at step 1233 is performed before data is received into the CT BUF 528 by the MAIN arbiter 512. While the destination port remains available for more data, operation loops to step 1234 to query whether the entire packet has been transferred to the destination port, and if not, back to step 1232 to transmit more data. When the entire packet has been transferred in CT mode as determined at step 1234, operation for that packet is completed.

If the destination port becomes busy or unavailable as determined at step 1233 during normal CT mode transfer, operation proceeds to step 1235 to receive the remaining portion of the packet into the memory 212 to initiate mid-packet interim CT mode. During mid-packet interim CT mode, the remaining portion of the packet is buffered through the memory 212. Since the packet was in the middle of transmission, the remaining packet data sent to the memory 212 is placed at the beginning of the TRANSMIT PACKET CHAIN for that port to ensure proper packet ordering as indicated at next step 1236. As in normal CT mode of operation, each data portion provided to the memory 212 during mid-packet interim CT mode is available for transfer to the destination port as soon as received.

Referring back to step 1202, operation proceeds to step 1240 for hashing the source address. Operation then proceeds to next step 1242, where it is queried whether the source address was found in the hash memory section 902 and whether the GROUP bit within the packet was set. If the source address was found and if the GROUP bit was not set, operation proceeds to step 1244, where the AGE field of the hash memory section 902 is updated with the AGE information. For example, the AGE value is set to zero. It is noted that the source MAC address and source port number may no longer correspond with a previous entry. This could happen, for example, if a network or data device is moved from one port to another. This information is compared and updated at step 1244.

Referring back to step 1242, if the source address was not found or if the GROUP bit was set, operation proceeds to step 1246, where an interrupt is generated to the CPU 230, which performs the following steps. At next step 1248, the CPU 230 allocates a hash table entry in the hash memory section 902 of the memory 212 or a least recently used (LRU) section of the hash cache table 603 for the new source port address. Operation then proceeds to step 1250, where the values in the allocated hash entry, such as the source MAC address, the source port number and the AGE information, are updated.

Figure 12B:
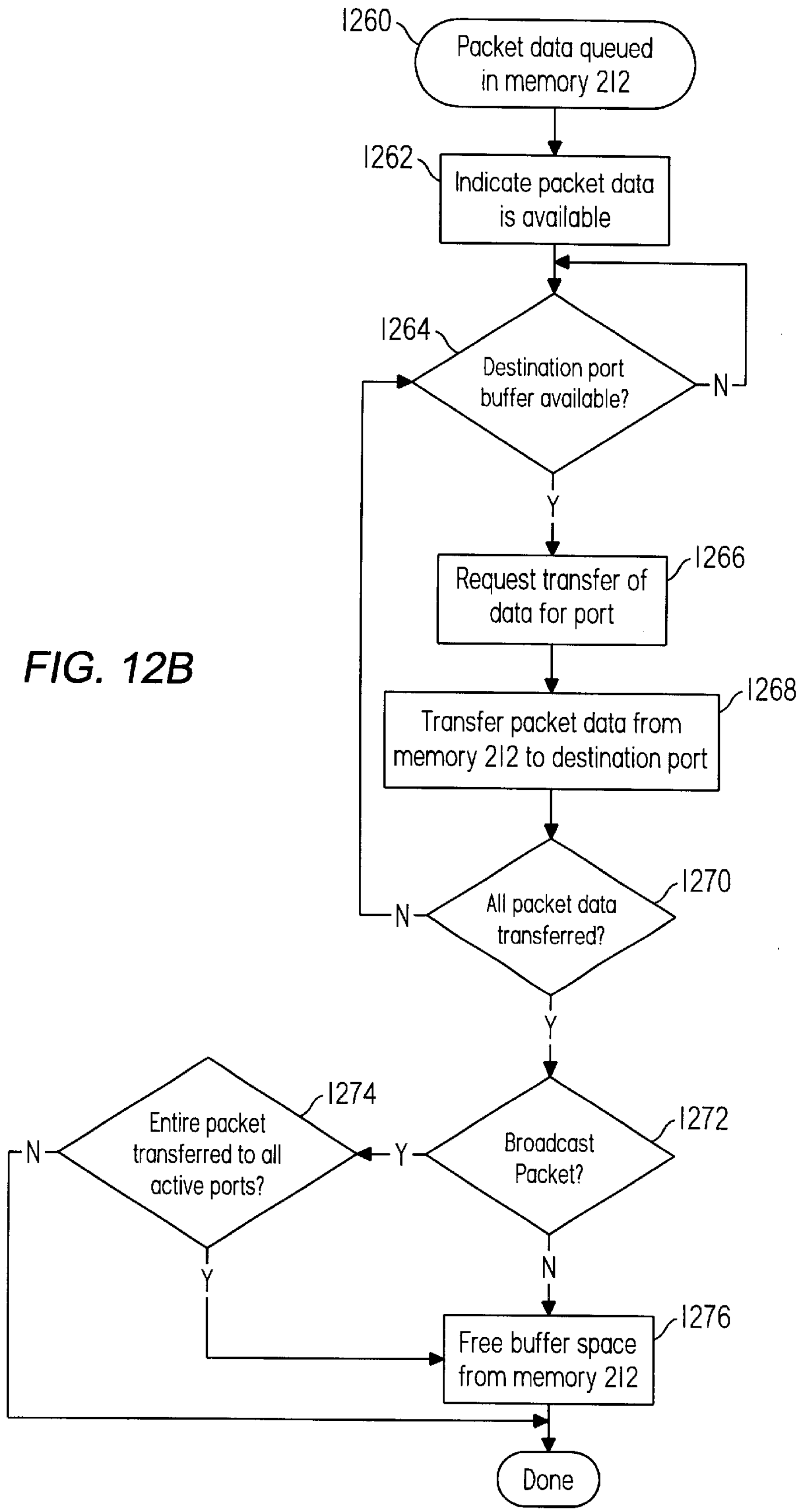
FIG. 12B is a flowchart diagram illustrating the general operation of the network switch of FIG. 2 for transmitting data packets from memory.

FIG. 12B is a simplified flowchart diagram illustrating the general operation of the network switch 102 for transmitting data from the memory 212 to one or more destination ports. The transmission procedure generally applies to SnF and mid-packet interim CT modes of operation, and to BC packets, as qualified below. A first step 1260 generally represents that packet data is queued in the memory 212 according to procedures described previously. Operation proceeds to next step 1262, where the MCB 404 indicates to the HCB 402 that packet data is available. For mid-packet interim CT mode, this indication is provided as soon as the first DWORD of data is sent to the MCB 404 for storage in the memory 212 since the data is almost immediately available for transfer to a destination port. For SnF mode, however, this indication is provided only after the last DWORD of data for a data packet is sent to the MCB 404 since the entire packet is stored prior to transmission. Once packet data is available for transmission, operation proceeds to step 1264, where it is determined whether the destination port has buffer space available to receive packet data for transmission. Step 1264 generally represents the polling procedure performed by the EPSM 210 for polling each of the ports 104, 110, which respond with corresponding BUF_AVAILm* signals as described previously. Operation remains at step 1264 until the destination port indicates that it has buffer space available to receive packet data.

When the destination port indicates it has buffer space at step 1264, operation proceeds to step 1266, where the HCB 402 requests transfer of data for the destination port. At next step 1268, a burst of data is transferred from the memory 212 to the destination port for transmission. Operation proceeds to next step 1270, where it is queried whether all of the data in the memory 212 has been transferred to the destination port. If not, operation returns to step 1264 to wait until the destination port has more buffer space available for another transfer of data. Eventually, the entire data packet, in the SnF and interim CT mode case, or the remaining packet data, in the mid-packet interim CT mode case, is transferred as determined at step 1270.

Operation then proceeds to step 1272, where it is determined whether the packet is a BC packet or not. If the packet is a BC packet, operation proceeds to step 1274 to determine if the entire packet has been transferred to all of the active ports. If not, then operation is complete for the current packet. The procedure is executed again for each port until the packet is transferred to all active ports. It is noted that steps 1272 and 1274 are shown to represent that steps 1264 through 1270 are performed for each destination port for each BC packet. Thus, the entire BC data packet remains in the memory 212 until sent to all active destination ports for transmission. If the packet is not a BC packet or after the entire packet is sent to all active ports for BC packets as indicated at step 1274, operation proceeds to step 1276, where the buffer space in the memory 212 holding the BC packet is freed. In particular, the sectors holding the packet data are returned to the FREEPOOL CHAIN of free memory sectors within the memory 212.

Figure 13A:
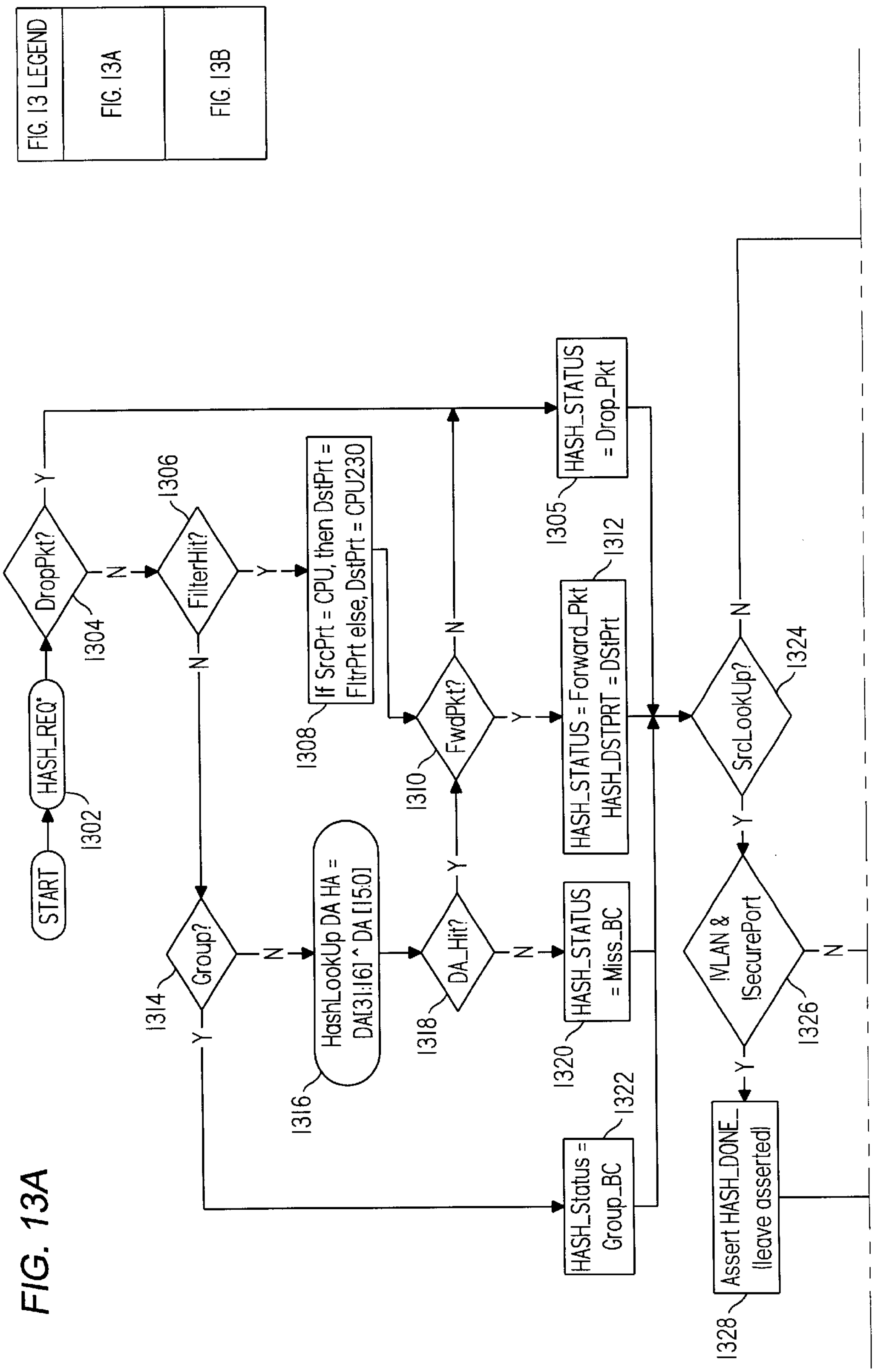
FIG. 13 is a flowchart diagram illustrating hash lookup operation of the switch manager of FIG. 2.
Figure 13B:
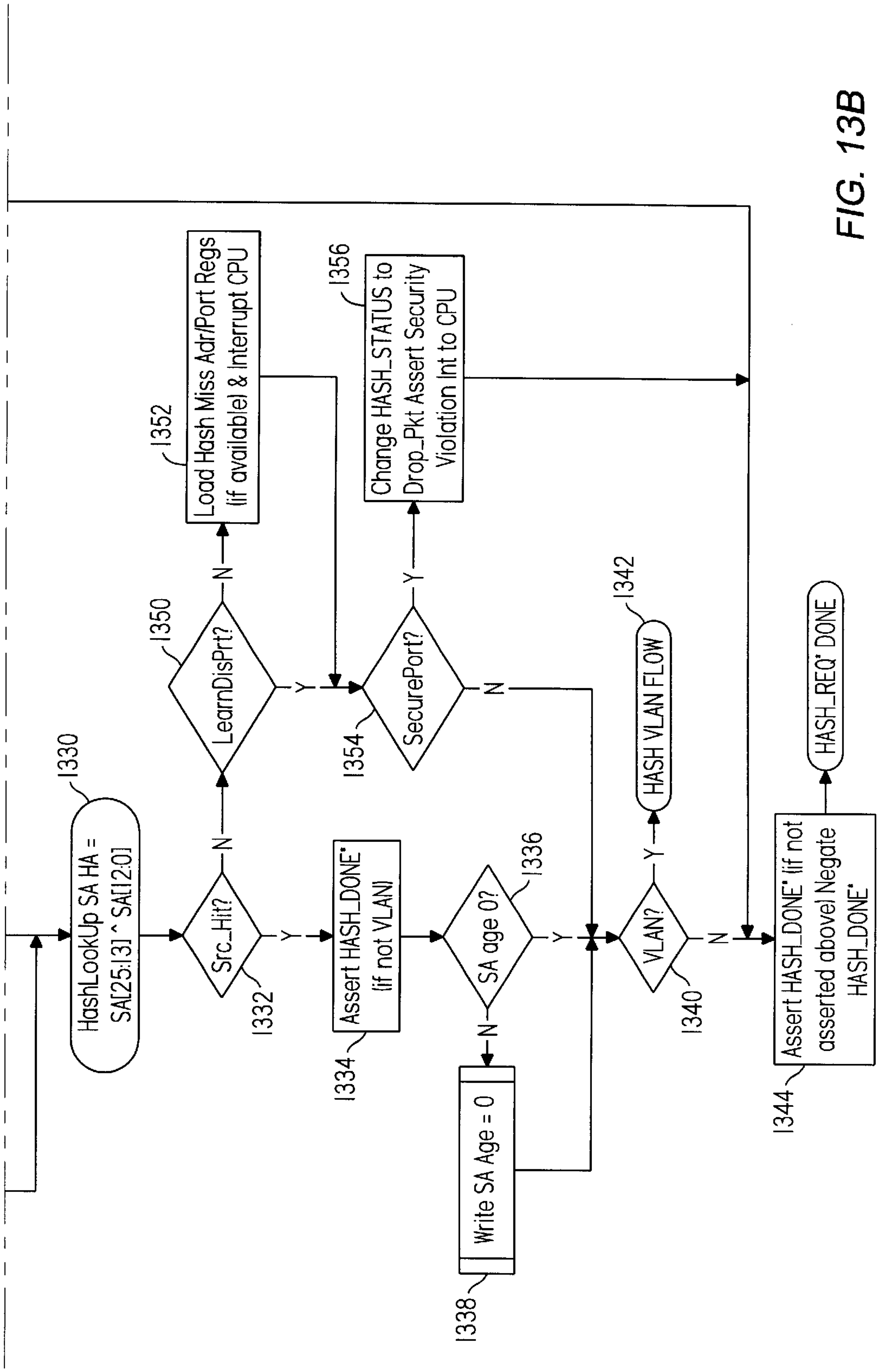

Referring now to FIG. 13, a flowchart diagram is shown illustrating hash lookup operation of the EPSM 210. The steps in the flowchart of FIG. 13 are performed by the MCB 404. An initial step 1302 detects a hash request as indicated by assertion of the HASH_REQ* signal. The HCB 402 identifies the header of the packet as a new packet, determines the source and destination addresses and the source port number and asserts the HASH_DA_SA[15:0] signals to the hash controller 602 of the MCB 404. The MCB 404 then retrieves the source and destination MAC addresses and the source port number and performs the hashing procedure, which determines the appropriate action for the packet.

The MCB 404 generally takes one of four actions with each packet based on the source port number and the source and destination MAC addresses. In particular, the hash controller 602 determines the HASH_STATUS[1:0] signals, which are set to FORWARD_PKT to forward the packet to the destination port, DROP_PKT to drop and ignore the packet, MISS_BC if the destination MAC address is new and unknown so that the packet is broadcast to all other ports, or GROUP_BC if the packet is to be duplicated to and transmitted by a subset of associated ports. From step 1302, operation proceeds to step 1304 to determine whether to drop the packet, which is determined by the following equation (1):

DropPkt:=(SrcState DIS) or (!FilterHit&SrcState!=FWD) (1)

where SrcState identifies the spanning tree state of the source port, FilterHit is a bit which is asserted if the source MAC address falls within a predetermined range, the ampersand "&" symbol represents the logic AND operation, the exclamation "!" symbol denotes logic negation, the symbol "!=" denotes the function "not equal to", and the symbol ":=" denotes the function "set equal to". Each port has one of five states provided in the HSB configuration registers 448 and as determined by the spanning tree function of the IEEE 802.1 specification, including learning (LRN), forwarding (FWD), blocked (BLK), listening (LST), and disabled (DIS). In the embodiment shown, the BLK and LST states are treated as the same. Thus, the packet is dropped if the source port is disabled, or if the source MAC address is not within the predetermined filter range and the state of the source port is not forwarding.

If DropPkt is true as determined at step 1304, operation proceeds to step 1305, where HASH_STATUS[1:0] signals are set equal to 00b=DROP_PKT to instruct the HCB 402 to ignore or otherwise drop the packet. If DropPkt is false, operation proceeds to step 1306, where the FilterHit bit is examined to determine if the source MAC address is within the predetermined range. The predetermined range identifies packets sourced from or destined for the CPU 230, including Bridge Protocol Data Units (BPDU's) that are sent to the CPU 230. If FilterHit is true as determined at step 1306, operation proceeds to step 1308 to identify the destination port (DstPrt). If the packet is from the CPU 230 (SrcPrt=CPU), then the destination port is set equal to a value FltrPrt set by the CPU 230 in a previous operation (DstPrt:=FltrPrt). Otherwise, the packet is sent to the CPU 230 (DstPrt:=PORT28). Operation then proceeds from step 1308 to step 1310 to determine whether to forward the packet (FwdPkt) according to the following equation (2):

FwdPkt:=(DstPrt!=SrcPrt)&((DstState=FWD) or (SrcPrt=CPU&DstState!=DIS)) (2)

where DstState is the spanning tree state of the destination port (DstPrt) and "&" denotes the logic AND operation. Thus, the packet is forwarded to the destination port if the destination and source ports are not the same and if the state of the destination port is forwarding, or if the source port is the CPU 230 and the state of the destination port is not disabled. The destination port is known even without hash lookup since it is either the CPU 230 or determined by the CPU 230 as FltrPrt. If FwdPkt is false, then operation proceeds to step 1305 to drop the packet. Otherwise, if FwdPkt is true, operation proceeds to step 1312, where HASH_STATUS[1:0] signals are set equal to 11b=FORWARD_PKT indicating the packet is to be forwarded to the destination port. Also, the HASH_DSTPRT[4:0] signals are asserted with the DstPrt destination port number.

Referring back to step 1306, if the source address is not within the predetermined range and thus outside the filtered MAC addresses, then operation proceeds to step 1314 to examine the GROUP bit within the received packet indicating whether the packet is a BC packet or not. If GROUP is false (GROUP bit=logic 0), operation proceeds to step 1316 to perform a hash lookup of the destination MAC address (DA). The MAC address is first hashed by taking two different sets of bits from the address and logically combining or comparing the two sets together on a bit-by-bit basis to form a corresponding 13–16 bit hash address, as described previously. Any bits of the MAC address may be chosen for purposes of the hashing procedure. The actual lookup procedure is performed by a separate routine or function, described below with reference to the flowchart of FIG. 14.

The lookup procedure at step 1316 returns one or more values as desired, including a bit referred to as HIT, which is returned as DA_Hit for destination addresses, or SA_Hit for source addresses. The HIT bit determines whether the hashed address was found in the hash memory section 902. From step 1316, operation proceeds to step 1318 where the DA_Hit value is examined to determine whether the address was found or not. The address will be found in the memory 212 if the device corresponding to the destination MAC address previously sourced a packet. If DA_Hit is true, operation proceeds to step 1310 to determine whether to forward the packet as described previously. If the hash address was not found and DA Hit is false, then operation proceeds to step 1320, where the HASH_STATUS[1:0] signals are set to 10b=MISS_BC indicating a new MAC address. Since the port number associated with the destination device is not yet known, the packet is broadcast to all other active (and as qualified by VLAN and other logic) ports to ensure that the packet is transmitted to the appropriate destination device. Eventually, the destination device responds to the packet with a new packet including the same MAC address as a source address. The network switch 102 is then able to associate the MAC address with a port and port number and correspondingly update the hash memory section 902. Referring back to step 1314, if the GROUP bit is true (or logic 1), operation proceeds to step 1322 where the HASH_STATUS[1:0] signals are set to 01b=GROUP_BC indicating that the packet is to be broadcast to all other ports or to a group of ports specified by the VLAN function.

From any of steps 1305, 1312, 1320 or 1322, operation proceeds to step 1324 to determine whether to search the hash memory section 902 for the source MAC address by examining a SrcLookUp value. The SrcLookUp value is determined according to the following equation (3):

SrcLookUp:=(SrcState=(LRN or FWD))&SrcPrt!=CPU (3)

indicating that the MAC source address will be searched if the source port is in learning or forwarding mode and is not the CPU 230. If SrcLookUp is true or asserted as determined at step 1324, operation proceeds to step 1326, where two values VLAN and SecurePort are examined. The VLAN bit is true if any of the VLAN modes are enabled, but is otherwise false. SecurePort is true or asserted if the source port is secure, where no new addresses are added to the hash memory section 902 and packets from unknown source addresses are dropped. If VLAN is not true and if the port is not secure, operation proceeds to step 1328, where the HASH_DONE* signal is asserted and temporarily left asserted. At this point, the HASH_STATUS and HASH_DSTPRT signals are captured by the HCB 402.

If VLAN is true or if SecurePort is true as determined at step 1326, or after step 1328 is performed, the assertion of the HASH_DONE* signal is delayed until after the source address lookup. Operation then proceeds to step 1330, where a hash lookup is performed on the source MAC address (SA) in a similar manner as described above for the destination MAC address. At step 1330, a value SA_Hit is returned true if the hash address is found for the corresponding device. From step 1330, operation proceeds to step 1332 where a value Src Hit is examined. Src Hit is related to SA_Hit by the following equation (4):

Src_Hit:=SA_Hit&(HshPrt=SrcPort) (4)

where Src_Hit is true if a source hit occurred (SA_Hit is true) and if the port number found in the entry in the hash memory section 902 is equal to the actual source port number where the packet was received. If the stored source port number is not equal to the actual source port number, then the device was likely moved to another port and the hash memory section 902 is updated by the CPU 230 as described below. If Src_Hit is true, then operation proceeds to step 1334, where the HASH_DONE* signal is asserted if VLAN is false. Operation then proceeds to step 1336, where the AGE number of the device is compared to zero. If AGE is not equal to zero, then the AGE number is set equal to zero at step 1338. If the AGE number is equal to zero as determined at step 1336, or after being set to zero at step 1338, operation proceeds to step 1340, where the VLAN bit is again examined. If VLAN is true, then operation proceeds to step 1342, where a hash VLAN routine or procedure is executed to identify related ports as determined from the corresponding VLAN bitmap value in the hash table entry 910. If VLAN is not true as determined at step 1340, operation proceeds to step 1344, where the HASH_DONE* signal is asserted or pulsed for a period of time, if not already asserted, and then negated. From step 1344, operation for this procedure is completed. The negation of the HASH_DONE* signal terminates the hash lookup of the HCB 402.

Referring back to step 1332, if Src_Hit is false, operation proceeds to step 1350, where it is determined whether the source port is learning disabled by examining a LeamDisPrt value. If not, operation proceeds to step 1352, where the new information of the packet is loaded into appropriate registers and the CPU 230 is interrupted. The CPU 230 respondingly updates the hash memory section 902 with a new hash table entry 910. If the source port is learning disabled as determined at step 1350, or after the hash memory section 902 is updated at step 1352, operation proceeds to step 1354 to examine the SecurePort bit. If SecurePort is true, operation proceeds to step 1356, where the HASH_STATUS[1:0] signals are changed to 00b=DROP_PKT. In this case, the new packet will be dropped since the address is new and new addresses are not allowed on secure ports. Also, a security violation interrupt is asserted to the CPU 230, if desired, to take appropriate measures in response to the security violation. From step 1356, operation proceeds to step 1344. Referring back to step 1354, if the SecurePort bit is false indicating a non-secure port, operation proceeds to step 1340. Referring back to step 1324, if SrcLookUp is false, operation proceeds directly to step 1344.

Figure 14:
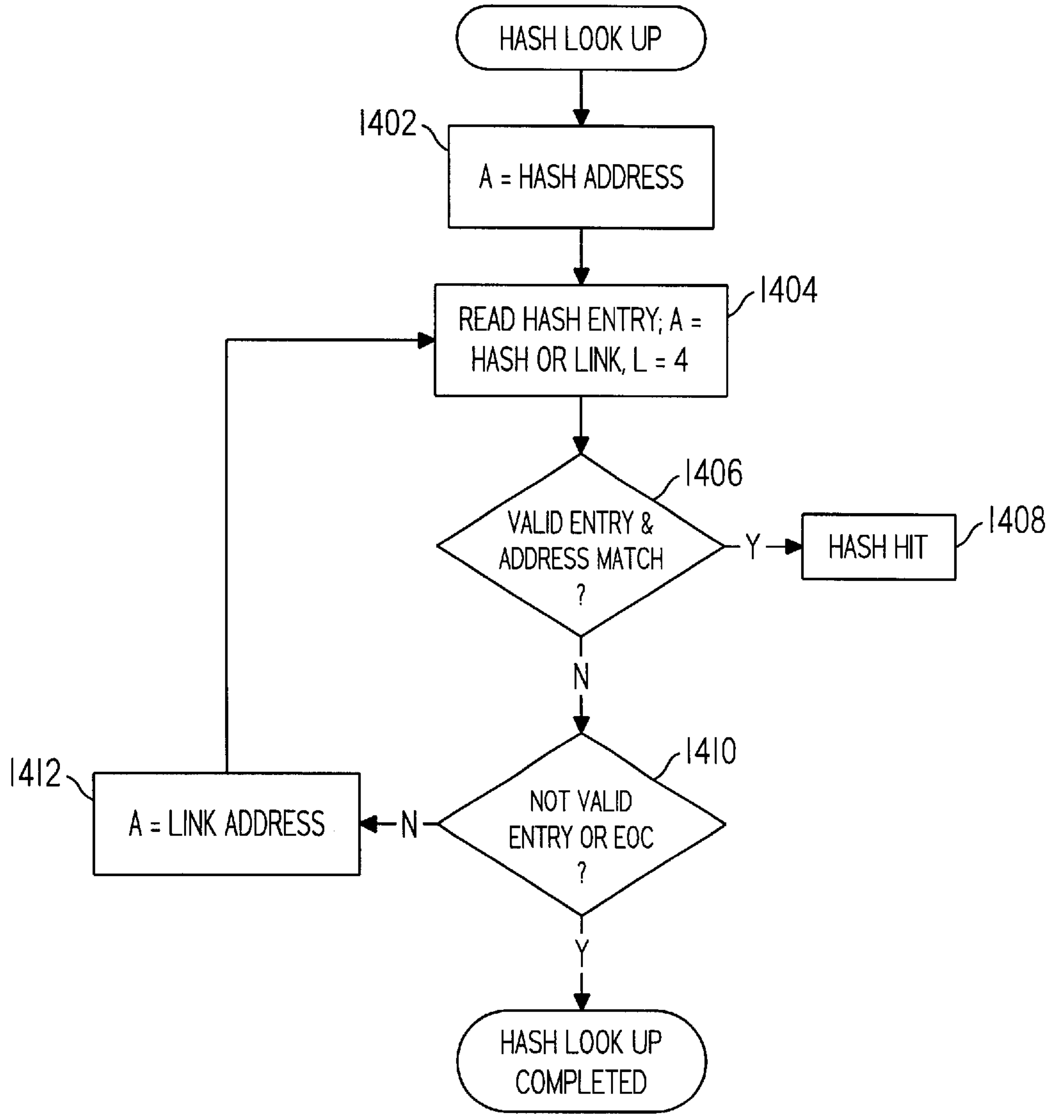
FIG. 14 is a flowchart diagram illustrating a hash lookup procedure for searching hash table entries in the memory of FIG. 2.

Referring now to FIG. 14, a flowchart diagram is shown illustrating a hash lookup procedure for searching all of the hash table entries 910 in the hash memory section 902. In a first step 1402, an address value A is set equal to the received hash address, such as would be sent from steps 1316 or 1330. Operation proceeds to step 1404, where the hash table entry 910 within the primary hash entry section 906 associated with the received hash address is read. Operation proceeds to step 1406, where the VALIDENTRY bit is read and the MAC address of the new packet is compared with the stored MAC address. If the entry is valid and an exact match occurs between the MAC addresses, then operation proceeds to step 1408 where the HIT bit is set to true indicating a hash hit, and operation returns to the calling procedure or routine. Otherwise, if the entry is not valid or an address match did not occur, operation proceeds to step 1410 where the VALIDENTRY bit and the EOC (end of chain) values of the entry are examined. If the entry is not valid or if the EOC is reached, then operation returns with the HIT bit being false. Otherwise, the hash address is set equal to the link address within the hash entry (bytes F:C) at step 1412, and operation returns to step 1404 to try the next chained entry within the chained hash entry section 908. Operation loops between steps 1404, 1406, 1410 and 1412 until either a valid entry is found with a MAC address match or an invalid entry is found or the EOC value is encountered.

The following table (1) provides the CPU 230 input/output (I/O) space registers for a particular embodiment implemented according to the present invention. Table (1) is provided only as an example, where particular registers may or may not be implemented in particular embodiments or similar registers may have different nomenclature.

TABLE 1

CPU 230 I/O Space Registers

| Offset(h) | Master | Shadowed | Access (R/W) | Reg name/Bit name | Description |
|---|---|---|---|---|---|
| 0 | PCB 406 | | CPU: R<br>PCB: W<br>MCB: —<br>HCB: — | Interrupt Source 1<br>Bit 0: MCB_INT<br>1: MEM_RDY<br>2: ABORT_PKT<br>3: STAT_RDY<br>4–31: RESERVED | The source of any interrupt(s) to the CPU 230. These interrupts are cleared by the CPU 230 when it acknowledges the interrupt. |
| 4 | PCB 406 | | CPU: R/W<br>PCB: R<br>MCB: —<br>HCB: — | Interrupt Mask 1<br>Bit 0: MCB_INT<br>1: MEM_RDY<br>2: ABORT_PKT<br>3: STAT_RDY<br>4: HASH_MISS<br>5–31: RESERVED | Interrupts to the CPU 230 which are to be masked. |
| 8 | PCB 406 | | CPU: R/W<br>PCB: R/W<br>MCB: —<br>HCB: — | Packet Information - RdPkt<br>Bit 0: SOP<br>1: EOP<br>2–15: RESERVED<br>16–23: Length (for EOP)<br>24–31: RESERVED | This register is written by the CPU 230. |
| C | PCB 406 | | CPU: R/W<br>PCB: R/W<br>MCB: —<br>HCB: — | Packet Information - WrPkt<br>Bit 0: SOP<br>1: EOP<br>2–5: BE (for SOP)<br>6–15: RESERVED | This register is written by the EPSM 210. |

TABLE 1-continued

CPU 230 I/O Space Registers

| Offset(h) | Master | Shadowed | Access (R/W) | Reg name/Bit name | Description |
|---|---|---|---|---|---|
| | | | | 16–23: Length<br>24–31: RESERVED | |
| 10 | PCB 406 | | CPU: R<br>PCB: R/W<br>MCB: —<br>HCB: — | SIMM Presence Detect<br>Bit 0–3: simm1_pd[0 . . . 3]<br>4–7: simm2_pd[0 . . . 3]<br>8–11: simm3_pd[0 . . . 3]<br>12–15: simm4_pd[0 . . . 3]<br>16–31: RESERVED | This register will contain information on the SIMM's through a shift register interface. |
| 14 | PCB 406 | | CPU: R/W<br>PCB: W<br>MCB: —<br>HCB: — | Polling Source (1 & 2)<br>Bit 0: MCB_INT<br>1: MEM_RDY<br>2: PKT_AVAIL<br>3: BUF_AVAIL<br>4: ABORT_PKT<br>5: STAT_RDY<br>6: HASH_MISS<br>7–31: RESERVED | The source of any interrupt(s) to the CPU 230 which have been masked. |
| 18 | PCB 406 | | CPU: R<br>PCB: W<br>MCB: —<br>HCB: — | Interrupt Source 2<br>Bit 0: PKT_AVAIL<br>1: BUF_AVAIL<br>2–31: RESERVED | The source of any interrupt(s) to the CPU 230. These interrupts are cleared by the CPU 230 when it acknowledges the interrupt. |
| 1c | PCB 406 | | CPU: R/W<br>PCB: R<br>MCB: —<br>HCB: — | Interrupt Mask 2<br>Bit 0: PKT_AVAIL<br>1: BUF_AVAIL<br>2–31: RESERVED | Interrupts to the CPU 230 which are to be masked. |
| 20 | PCB 406 | | CPU: R/W<br>PCB: R/W<br>MCB: —<br>HCB: — | QC Statistics Info<br>Bit 0–1: Port number<br>2–4: QC number<br>5–9: Register number<br>10–14: Number of Regs.<br>15–19: Max. number of regs.<br>20–31: RESERVED | The CPU 230 writing to this register will inform the QC interface to issue a statistics read of the appropriate port. |
| 24 | PCB 406 | | CPU: R<br>PCB: R/W<br>MCB: —<br>HCB: — | Total Packet Info<br>Bit 0–15: Packet Length<br>16–23: Source Port<br>24–31: Dest. Port | This register is written by the EPSM 210 |
| 28 | PCB 406 | | CPU: WO<br>PCB: R/W<br>MCB: —<br>HCB: — | Flush Fifo | This register when written to will flush the fifo contents and continue to flush until EOP is received. |
| 30 | PCB 406 | MCB 404<br>HCB 402 | CPU: R/W<br>PCB: R<br>MCB: R<br>HCB: R | EPSM Setup<br>Bit 0: TPI installed<br>1: EXP installed<br>2: Master Switch Enable<br>3–4: QcXfersize[1:0]<br>5–6: TpIXferSize[1:0]<br>7: AI_FCS<br>8: DramWrDis<br>9: SramWrDis<br>10–12: Epsm Addr Dcd<br>13: ClklSel<br>14–21: CPU Port Number<br>22–31: RESERVED | This register holds the general setup parameters. |
| 34 | PCB 406 | HCB 402 | CPU: R/W<br>PCB: —<br>MCB: R<br>HCB: R | Port Speed<br>Bit 0: Port 0 Speed<br>1: Port 1 Speed<br>.<br>.<br>.<br>27: Port 27 Speed<br>28–31: RESERVED | This is the Port Speed Bitmap register. When the bit for a port is reset it is a 10 mhz port and when the bit is set it is a 100 mhz port. i.e.: 0 = 10 mhz 1 = 100 mhz Powerup default should contain the correct values. |
| 38 | PCB 406 | MCB 404<br>HCB 402 | CPU: R<br>PCB: —<br>MCB: R<br>HCB: R | Port Type<br>Bit 0: Port 0 Type<br>1: Port 1 Type<br>. | This is the Port Type Bitmap register. When the bit for a port is reset it is a QC port |

TABLE 1-continued

CPU 230 I/O Space Registers

| Offset(h) | Master | Shadowed | Access (R/W) | Reg name/Bit name | Description |
|---|---|---|---|---|---|
| | | | | .<br>.<br>27: Port 27 Type<br>28–31: RESERVED | and when the bit is set it is a TLAN port.<br>i.e.: 0 = QC<br>1 = TLAN<br>Powerup default should contain the correct values. |
| 3c | PCB 406 | MCB 404 | CPU: R/W<br>PCB: R<br>MCB: R<br>HCB: — | MEM Request<br>Bit 0–23: Mem Address<br>24: Memory Select<br>25: Transfer size<br>26–29: Byte Enables<br>30: RW<br>31: Locked Page Hit | This is the register that contains the address and the controls for memory transfers from the CPU 230. |
| 40 | PCB 406 | HCB 402 | CPU: R<br>PCB: —<br>MCB: R<br>HCB: R | EPSM Revision<br>Bit 0–7: Rev. Number<br>8–31: RESERVED | This read only register provides the revision number for the EPSM 210. |
| 54 | HCB 402 | | CPU: R/W<br>PCB: —<br>MCB: —<br>HCB: R | HCB Utilization Setup<br>Bit 0–7: Port Number or Total<br>8–9: Mode<br>10–31: RESERVED | This register selects the port to be observed for HCB 402 utilization and the mode bits. The possible modes are TX, RX, Both. |
| 58 | HCB 402 | | CPU: R/W<br>PCB: —<br>MCB: —<br>HCB: R/W | HCB Utilization<br>Bit 0–31: Average Time | HCB 402 utilization is the average time the port selected is on the bus. |
| 5c | HCB 402 | | CPU: R/W<br>PCB: —<br>MCB: —<br>HCB: R | Source CT_SNF Per Port<br>Bit 0: Port 0<br>1: Port 1<br>.<br>.<br>.<br>27: Port 27<br>28–31: RESERVED | This register is a bitmap for the ports to indicate which source ports are able to CT and which are only able to do SnF. |
| 60 | HCB 402 | | CPU: R/W<br>PCB: —<br>MCB: —<br>HCB: R | Destination CT_SNF Per Port<br>Bit 0: Port 0<br>1: Port 1<br>.<br>.<br>.<br>27: Port 27<br>28–31: RESERVED | This register is a bitmap for the ports to indicate which destination ports are able to CT and which are only able to do SnF. |
| 64 | HCB 402 (High 2 bits of each xfersz) | | CPU: R/W<br>PCB: —<br>MCB: —<br>HCB: R | XferSize Per Port<br>Bit 0–3: Port 0 xfersize<br>4–7: Port 1 xfersize<br>8–11: Port 2 xfersize<br>12–15: Port 3 xfersize<br>16–19: Port 4 xfersize<br>20–23: Port 5 xfersize<br>24–27: Port 6 xfersize<br>28–31: Port 7 xfersize | This register contains the xfersize for the specified port. |
| 68 | HCB 402 (High 2 bits of each xfersz) | | CPU: R/W<br>PCB: —<br>MCB: —<br>HCB: R | XferSize Per Port<br>Bit 0–3: Port 8 xfersize<br>4–7: Port 9 xfersize<br>8–11: Port 10 xfersize<br>12–15: Port 11 xfersize<br>16–19: Port 12 xfersize<br>20–23: Port 13 xfersize<br>24–27: Port 14 xfersize<br>28–31: Port 15 xfersize | This register contains the xfersize for the specified port. |

TABLE 1-continued

CPU 230 I/O Space Registers

| Offset(h) | Master | Shadowed | Access (R/W) | Reg name/Bit name | Description |
|---|---|---|---|---|---|
| 6c | HCB 402 (High 2 bits of each xfersz) | | CPU: R/W PCB: — MCB: — HCB: R | XferSize Per Port Bit 0–3: Port 16 xfersize 4–7: Port 17 xfersize 8–11: Port 18 xfersize 12–15: Port 19 xfersize 16–19: Port 20 xfersize 20–23: Port 21 xfersize 24–27: Port 22 xfersize 28–31: Port 23 xfersize | This register contains the xfersize for the specified port. |
| 70 | HCB 402 (High 2 bits of each xfersz) | | CPU: R/W PCB: — MCB: — HCB: R | XferSize Per Port Bit 0–3: Port 24 xfersize 4–7: Port 25 xfersize 8–11: Port 26 xfersize 12–15: Port 27 xfersize 16–19: Port 28 xfersize 20–31: RESERVED | This register contains the xfersize for the specified port. |
| 74 | HCB 402 | | CPU: R/W PCB: — MCB: — HCB: R | Arb_Mode Bit 0–1: Mode Value 2–31: RESERVED | This register contains the arbitration mode value. Arbitration modes available are FCFS, weighted, or round robin. |
| 78 | HCB 402 | | CPU: R/W PCB: — MCB: — HCB: R | HCB Misc Cntl Bit 0: Enable CT Fifo 1: Enable Rd Extra WS 2: Enable CC Rd/Wr Qc 3: Enable CC Rd/Wr Qe 4: Enable Early AD 5–31: RESERVED | Miscellaneous controls for the HCB 402 subsection. |
| 7c | HCB 402 | | CPU: R/W PCB: — MCB: — HCB: R | Port Shutdown Bit 0–27: Bitmap | Bitmap of ports to be that are disabled. |
| 80 | MCB 404 | | CPU: R/W PCB: — MCB: R HCB: — | Program Port State Bit 0–1: State Value 2–31: RESERVED | This register tells what state the ports indicated in the port state bitmap register should be changed to. State Value Condition 00 b Disabled 01 b Blocked/ Listening 10 b Learning 11 b Forwarding |
| 90 | MCB 404 | | CPU: R/W PCB: — MCB: R HCB: — | Port State Bitmap Bit 0: Port 0 1: Port 1 . . . 27: Port 27 28–31: RESERVED | This register indicates which ports are going to change their state. This register in combination with program port state register fill the port state registers. |
| 94 | MCB 404 | | CPU: R PCB: — | Port State #1 Bit 0–1: Port_0_st[1:0] | The two hits for each port tell the arbiter |

TABLE 1-continued

CPU 230 I/O Space Registers

| Offset(h) | Master | Shadowed | Access (R/W) | Reg name/Bit name | Description |
|---|---|---|---|---|---|
| | | | MCB: R/W<br>HCB: — | 2–3:<br>Port_1_st[1:0]<br>4–5:<br>Port_2_st[1:0]<br>6–7:<br>Port_3_st[1:0]<br>8–9:<br>Port_4_st[1:0]<br>10–11: Port_5_st[1:0]<br>12–13: Port_6_st[1:0]<br>14–15: Port_7_st[1:0]<br>16–17: Port_8_st[1:0]<br>18–19: Port_9_st[1:0]<br>20–21:<br>Port_10_st[1:0]<br>22–23:<br>Port_11_st[1:0]<br>24–25:<br>Port_12_st[1:0]<br>26–27:<br>Port_13_st[1:0]<br>28–29:<br>Port_14_st[1:0]<br>30–31:<br>Port_15_st[1:0] | what state the port is in as follows:<br>State Value<br>Condition<br>00 b<br>Disabled<br>01 b<br>Blocked/<br>Listening<br>10 b<br>Learning<br>11 b<br>Forwarding |
| 98 | MCB<br>404 | | CPU: R<br>PCB: —<br>MCB: R/W<br>HCB: — | Port State #2<br>Bit 0–1: Port_16_st[1:0]<br>2–3:<br>Port_17_st[1:0]<br>4–5:<br>Port_18_st[1:0]<br>6–7:<br>Port_19_st[1:0]<br>8–9:<br>Port_20_st[1:0]<br>10–11:<br>Port_21_st[1:0]<br>12–13:<br>Port_22_st[1:0]<br>14–15:<br>Port_23_st[1:0]<br>16–17:<br>Port_24_st[1:0]<br>18–19:<br>Port_25_st[1:0]<br>20–21:<br>Port_26_st[1:0]<br>22–23:<br>Port_27_st[1:0]<br>24–31: RESERVED | The two bits for each port tell the arbiter what state the port is in as follows:<br>State Value<br>Condition<br>00 b<br>Disabled<br>01 b<br>Blocked/<br>Listening<br>10 b<br>Learning<br>11 b<br>Forwarding |
| 9c | MCB<br>404 | | CPU: R/W<br>PCB: —<br>MCB: R<br>HCB: — | Destination Miss Broadcast<br>Bit 0–28: DestMissBC bitmap<br>29–31: RESERVED | Destination miss broadcast bitmap. |
| a8 | MCB<br>404 | | CPU: R/W<br>PCB: —<br>MCB: R/W<br>HCB: — | Memory Bus Monitor Cntl<br>Bit 0–14: Monitor Mode<br>15: Monitor Select<br>16–23: Monitor Port Select<br>24–27: Filter Time Scale<br>28: Monitor Clear<br>29: Count/Filter Mode<br>30: Backpress. Enable<br>31: Alarm | The memory bus 214 monitor control is utilized to setup the monitoring (if any) that is being done on the memory bus 214. |
| ac | MCB<br>404 | | CPU: R/W<br>PCB: —<br>MCB: R<br>HCB: — | Memory Bus Monitor Thresholds<br>Bit 0–7: Alarm Set Threshold<br>8–15: Alarm Clr | The memory bus 214 monitor thresholds are used to set an alarm and to clear the alarm. |

TABLE 1-continued

CPU 230 I/O Space Registers

| Offset(h) | Master | Shadowed | Access (R/W) | Reg name/Bit name | Description |
|---|---|---|---|---|---|
| | | | | Threshold<br>16–19: RESERVED<br>20–31: Peak BW | |
| b0 | MCB 404 | | CPU: R<br>PCB: —<br>MCB: R/W<br>HCB: — | Memory Bus Utilization<br>Bit 0–31: Percent Utilization | Memory bus 214 utilization register. |
| b8 | MCB 404 | | CPU: R<br>PCB: —<br>MCB: R/W<br>HCB: — | Dropped Packets Memory OF<br>Bit 0–31: Number of packets | The number of packets dropped due lack of memory space because of the memory threshold counters. This register is cleared when read. |
| bc | MCB 404 | | CPU: R<br>PCB: —<br>MCB: R/W<br>HCB: — | Dropped Packets BC,OF<br>Bit 0–31: Number of packets | The number of broadcast packets dropped due lack of broadcast memory space. This register is cleared when read. |
| c0 | MCB 404 | | CPU: R/W<br>PCB: —<br>MCB: R<br>HCB: — | Hash Table Definition<br>Bit 0–14: Address[16:2]<br>15–23: Address[25:17]<br>24–25: Table size<br>26: Lock Hash Cycle<br>27: Vlan Group BC<br>28: Vlan Miss BC<br>29: Vlan Unicast<br>30–31: RESERVED | The address for the base of the hash table. Size of the hash table as described in the register definition. |
| c4 | MCB 404 | | CPU: R<br>PCB: —<br>MCB: R/W<br>HCB: — | Rx Sector Count OF<br>Bit 0–28: Bitmap<br>29–31: RESERVED | The bitmap of ports that have interrupted the CPU 230 due either a set or clear of receive sector threshold overflow. |
| c8 | MCB 404 | | CPU: R<br>PCB: —<br>MCB: R/W<br>HCB: — | Tx Packet Count OF<br>Bit 0–28: Bitmap<br>29–31: RESERVED | The bitmap of ports that have interrupted the CPU 230 due to either a set or clear of transmit packet threshold overflow. |
| cc | MCB 404 | | CPU: R<br>PCB: —<br>MCB: R/W<br>HCB: — | Hash Address Low<br>Bit 0–31: Byte 0–3 | The address which was missed when looking in the hash table. |
| d0 | MCB 404 | | CPU: R<br>PCB: —<br>MCB: R/W<br>HCB: — | Hash Address High<br>Bit 0–15: Byte 4–5<br>16–23: Source Port<br>24: Port Miss<br>25–31: RESERVED | The remaining hash address and source port. |
| d4 | MCB 404 | | CPU: R<br>PCB: —<br>MCB: R/W<br>HCB: — | Dropped Packets Receive OF<br>Bit 0–31: Number of packets | The number of packets dropped due to receive memory sectors overflow. This register is cleared when read. |
| d8 | MCB 404 | | CPU: R<br>PCB: —<br>MCB: R/W<br>HCB: — | Dropped Packets Transmit OF<br>Bit 0–31: Number of packets | The number of packets dropped due to transmit memory sectors overflow. This register is cleared when read. |
| dc | MCB 404 | | CPU: R/W<br>PCB: —<br>MCB: R<br>HCB: — | Dropped Packets Receive<br>Bit 0–28: Port Bitmap<br>29–31: RESERVED | This register is the bitmap of ports that have dropped packets due to receive overflow. |
| e0 | MCB 404 | | CPU: R/W<br>PCB: —<br>MCB: R<br>HCB: — | Dropped Packets Transmit<br>Bit 0–28: Port Bitmap<br>29–31: RESERVED | This register is the bitmap of ports that have dropped packets due to transmit overflow. |
| e4 | MCB 404 | | CPU: R/W<br>PCB: —<br>MCB: R<br>HCB: — | Learning Disable Ports<br>Bit 0–27: Learn'g Dis. bitmap<br>28–31: RESERVED | Learning disable port bitmap. |
| e8 | MCB 404 | | CPU: R/W<br>PCB: —<br>MCB: R<br>HCB: — | Secure Ports<br>Bit 0–27: Secure port bitmap<br>28–31: RESERVED | Secure port bitmap. |

TABLE 1-continued

CPU 230 I/O Space Registers

| Offset(h) | Master | Shadowed | Access (R/W) | Reg name/Bit name | Description |
|---|---|---|---|---|---|
| ec | MCB 404 | | CPU: R/W<br>PCB: —<br>MCB: R<br>HCB: — | Security Violation Stats<br>Bit 0–31: Count | This register contains the total dropped packets due to port security. |
| f0 | MCB 404 | | CPU: R/W<br>PCB: —<br>MCB: R<br>HCB: — | Security Violation<br>Bit 0–27: Port Bitmap<br>28–31: RESERVED | This register is the bitmap of ports that have dropped packets due to security. |
| f4 | MCB 404 | | CPU: R/W<br>PCB: —<br>MCB: R/W<br>HCB: — | Mem Control<br>Bit 0–1: Memory Type<br>2: Memory Speed<br>3: EDO Test Mode<br>4: Dbl Link Mode<br>5: DisRcPgHits<br>6: DisTxPGHits<br>7–31: RESERVED | This register contains the memory type, speed etc. |
| f8 | MCB 404 | | CPU: R/W<br>PCB: —<br>MCB: R<br>HCB: — | RAS Select<br>Bit 0–31: Rasenx[1:0] | RAS enables for 4M blocks of memory. |
| fc | MCB 404 | | CPU: R/W<br>PCB: R<br>MCB: —<br>HCB: — | Refresh Counter<br>Bit 0–9: Count<br>10–31: RESERVED | The refresh counter generates a refresh signal for the memory controller. |
| 100 | MCB 404 (bit 4–7) | | CPU: R/W<br>PCB: —<br>MCB: R<br>HCB: — | Filter Control<br>Bit 0–3: Address Enables[3:0]<br>4–7: Mask Enables [3:0]<br>8–31: RESERVED | This register enables address filtering and masking address. |
| 104 | MCB 404 | | CPU: R/W<br>PCB: —<br>MCB: R<br>HCB: — | Mask Address Filter Low<br>Bit 0–31: Bytes 0–3 | This register contains mask bits for address filtering. |
| 108 | MCB 404 | | CPU: R/W<br>PCB: —<br>MCB: R<br>HCB: — | Mask Address Filter High<br>Bit 0–15: Bytes 4–5<br>16–31: RESERVED | This register contains mask bits for address filtering. |
| 10c | MCB 404 | | CPU: R/W<br>PCB: —<br>MCB: R<br>HCB: — | Address Filter 0Low<br>Bit 0–31: Bytes 0–3 | This register contains bytes 0–3 of address filter 0. |
| 110 | MCB 404 | | CPU: R/W<br>PCB: —<br>MCB: R<br>HCB: — | Address Filter 0High<br>Bit 0–15: Bytes 4–5<br>16–23: Dest. Port<br>24–31: FilterMask0 | This register contains bytes 4–5 of address filter 0. |
| 114 | MCB 404 | | CPU: R/W<br>PCB: —<br>MCB: R<br>HCB: — | Address Filter 1Low<br>Bit 0–31: Bytes 0–3 | This register contains bytes 0–3 of address filter 1. |
| 118 | MCB 404 | | CPU: R/W<br>PCB: —<br>MCB: R<br>HCB: — | Address Filter 1High<br>Bit 0–15: Bytes 4–5<br>16–23: Dest. Port<br>24–31: FilterMask1 | This register contains bytes 4–5 of address filter 1. |
| 11c | MCB 404 | | CPU: R/W<br>PCB: —<br>MCB: R<br>HCB: — | Address Filter 2Low<br>Bit 0–31: Bytes 0–3 | This register contains bytes 0–3 of address filter 2. |
| 120 | MCB 404 | | CPU: R/W<br>PCB: —<br>MCB: R<br>HCB: — | Address Filter 2High<br>Bit 0–15: Bytes 4–5<br>16–23: Dest. Port<br>24–31: FilterMask2 | This register contains bytes 4–5 of address filter 2. |
| 124 | MCB 404 | | CPU: R/W<br>PCB: —<br>MCB: R<br>HCB: — | Address Filter 3Low<br>Bit 0–31: Bytes 0–3 | This register contains bytes 0–3 of address filter 3. |
| 128 | MCB 404 | | CPU: R/W<br>PCB: —<br>MCB: R<br>HCB: — | Address Filter 3High<br>Bit 0–15: Bytes 4–5<br>16–23: Dest. Port<br>24–31: FilterMask3 | This register contains bytes 4–5 of address filter 3. |
| 12c | MCB 404 | | CPU: R<br>PCB: — | MCB Interrupt Source<br>Bit 0: Security Int | This register contains the source of any |

TABLE 1-continued

CPU 230 I/O Space Registers

| Offset(h) | Master | Shadowed | Access (R/W) | Reg name/Bit name | Description |
|---|---|---|---|---|---|
| | | | MCB: R/W<br>HCB: — | 1: Memory Overflow Set<br>2: Memory Overflow Clr<br>3: Broadcast OF Set<br>4: Broadcast OF Clr<br>5: Receive OF<br>6: Transmit OF<br>7: Rx Packet Aborted<br>8: BW Alarm Set 0<br>9: BW Alarm Clr 0<br>10: BW Alarm Set 1<br>11: BW Alarm Clr 1<br>12–31: RESERVED | interrupt initiated in the MCB 404. |
| 130 | MCB 404 | | CPU: R/W<br>PCB: —<br>MCB: R<br>HCB: — | MCB Interrupt Mask<br>Bit 0: Security Int<br>1: Memory Overflow Set<br>2: Memory Overflow Clr<br>3: Broadcast OF Set<br>4: Broadcast OF Clr<br>5: Receive OF<br>6: Transmit OF<br>7: Rx Packet Aborted<br>8: BW Alarm Set 0<br>9: BW Alarm Clr 0<br>10: BW Alarm Set 1<br>11: BW Alarm Clr 1<br>12–31: RESERVED | This register contains the masking for any interrupt initiated in the MCB 404. |
| 134 | MCB 404 | | CPU: R/W<br>PCB: —<br>MCB: R/W<br>HCB: — | MCB Polling Source<br>Bit 0: Security Int<br>1: Memory Overflow Set<br>2: Memory Overflow Clr<br>3: Broadcast OF Set<br>4: Broadcast OF Clr<br>5: Receive OF<br>6: Transmit OF<br>7: Rx Packet Aborted<br>8: BW Alarm Set 0<br>9: BW Alarm Clr 0<br>10: BW Alarm Set 1<br>11: BW Alarm Clr 1<br>12–31: RESERVED | This register contains the source of any interrupt initiated in the MCB 404 which are masked. |
| 138 | MCB 404 | | CPU: R/W<br>PCB: —<br>MCB: R<br>HCB: — | BackPressure Enable<br>Bit 0–23: RESERVED<br>24–27: Port Bitmap<br>28–31: RESERVED | |
| 13c | MCB 404 | | CPU: R/W<br>PCB: —<br>MCB: R<br>HCB: — | Bonded Port Set 0<br>Bit 0–27: Port Bitmap<br>28–31: RESERVED | |
| 140 | MCB 404 | | CPU: R/W<br>PCB: —<br>MCB: R<br>HCB: — | Bonded Port Set 1<br>Bit 0–27: Port Bitmap<br>28–31: RESERVED | |
| 144 | MCB 404 | | CPU: R/W<br>PCB: —<br>MCB: R<br>HCB: — | Default Vlan Bitmap<br>Bit 0–28: Bitmap | |
| 148 | MCB 404 | | CPU: R/W<br>PCB: —<br>MCB: —<br>HCB: R | Promiscuous Port<br>Bit 0–7: Observed Port No.<br>8–15: Rx Monitor | This register holds the value of the port that is being observed in promiscuous mode. Also |

TABLE 1-continued

CPU 230 I/O Space Registers

| Offset(h) | Master | Shadowed | Access (R/W) | Reg name/Bit name | Description |
|---|---|---|---|---|---|
| | | | | Port No.<br>16–23: Tx Monitor Port No.<br>24–31: RESERVED | contains the ports that the Rx traffic and the Tx traffic appear on. |
| 200–2ff | | | CPU: R/W<br>PCB: R/W<br>MCB: —<br>HCB: — | Quad Cascade 0 Regs | This is the offset for the Quad Cascade registers. This is for QC0. |
| 300–3ff | | | CPU: R/W<br>PCB: R/W<br>MCB: —<br>HCB: — | Quad Cascade 1 Regs | This is the offset for the Quad Cascade registers. This is for QC1. |
| 400–4ff | | | CPU: R/W<br>PCB: R/W<br>MCB: —<br>HCB: — | Quad Cascade 2 Regs | This is the offset for the Quad Cascade registers. This is for QC2. |
| 500–5ff | | | CPU: R/W<br>PCB: R/W<br>MCB: —<br>HCB: — | Quad Cascade 3 Regs | This is the offset for the Quad Cascade registers. This is for QC3. |
| 600–6ff | | | CFU: R/W<br>PCB: R/W<br>MCB: —<br>HCB: — | Quad Cascade 4 Regs | This is the offset for the Quad Cascade registers. This is for QC4. |
| 700–7ff | | | CPU: R/W<br>PCB: P/W<br>MCB: —<br>HCB: — | Quad Cascade 5 Regs | This is the offset for the Quad Cascade registers. This is for QC5. |
| 800–8ff | | | CPU: R<br>PCB: R/W<br>MCB: —<br>HCB: — | QC Statistics Buffer | This is the address space for the statistics buffers just read from the Quad Cascade. |
| 900 | | | CPU: R/W<br>PCB: R/W<br>MCB: —<br>HCB: — | HCB FIFO - BPDU | This is address of the fifo to send/receive packet data to/from the HCB 402. |
| a00 | | | CPU: R/W<br>PCB: —<br>MCB: R/W<br>HCB: — | MCB DATA FIFO | This is address of the fifo to send/receive data to/from the MCB 404. 16 Byte Fifo. |
| b00–fff | | | | RESERVED For Expansion | |

The following register definitions are provided to clarify the registers of Table (1):

INTERRUPT INFORMATION

There are three interrupt pins from the EPSM 210 to the CPU 230; CPUINTHASHL, CPUINTPKTL, and CPUINTL. The CPUINTHASHL is only asserted when a hash miss has occurred and is cleared by reading the hash address low register (at offset ‘hcc). The CPUINTPKTL is asserted when there is either a packet available in the packet interface FIFO or if the packet interface FIFO has buffer space cleared for sending more packet data. The CPUINTL is asserted for four possible sources; one of these source refers to eight possible sources in the MCB 404. The interrupt sources will cause the CPU 230 to be interrupted if they are not masked. To allow for the information of the interrupt source to be available, without the CPU 230 being interrupted, a polling mechanism is available. The masking of an interrupt source causes the interrupts to be blocked from the CPU 230, but the information is still available in the polling source register. For example, if the STAT_RDY mask bit is set then when the statistics requested are available no interrupt will occur, but the CPU 230 can still determine that the statistics are ready to read by reading the polling register. Note: the interrupt source register is cleared by reading it, but the polling source register must be written to clear it.

Interrupt Source 1 Reg (Offset ‘h00) Source of the CPUINTL interrupt sent to the CPU 230. This register is updated by the EPSM 210 and then the interrupt is sent to the CPU 230. When the CPU 230 reads this register the contents are cleared. A value of 1 in a bit indicates that interrupt has occurred. Default = 32‘h0000_0000.

Bit 0 (W/R) MCB_INT is the interrupt that tells the CPU 230 that an interrupt has occurred in the MCB 404 and that the MCB Interrupt Source register will need to be read to further understand the interrupt. Default is 0.

Bit 1 (W/R) MEM_RDY is the interrupt that tells the CPU 230 that the Memory data requested is available in the buffer space. Default is 0.

Bit 2 (W/R) ABORT_PKT is the interrupt that tells the CPU 230 that the ABORT_IN* signal -continued

| | |
|---|---|
| | was asserted into the PCB 406. Default is 0. |
| Bit 3 (W/R) | STAT_RDY is the interrupt that tells the CPU 230 that the requested statistics' information is ready in the PCB 406 buffer space; Default is 0. |
| Bits 4–31 (RO) | RESERVED. Always read as 0. |

pcbregs interface for Interrupt Source Reg

| | |
|---|---|
| McbInt (in) | input from MCB, which determines bit 0. |
| MemRdy (in) | input from memory FIFO, which determines bit 1. |
| AbortPktInt (in) | input from the HCB 402 interface, which determines bit 4. |
| StatRdyInt (in) | input from QC interface, which determines bit 5. |
| CpuInt_(out) | the signal to the CPU 230 which indicates an interrupt has occurred. |
| Interrupt Mask 1 Reg | (Offset = 'h04) Interrupts to be masked by the CPU 230. A value of 1 in any bit indicates that interrupt is masked. Default = 32'h0000_001f. |
| Bit 0 (W/R) | Mask the McbInt interrupt to the CPU 230. Default is 1. |
| Bit 1 (W/R) | Mask the MemRdy interrupt to the CPU 230. Default is 1 |
| Bit 2 (W/R) | Mask the AbortPktInt interrupt to the CPU 230. Default is 1. |
| Bit 3 (W/R) | Mask the StatRdyInt interrupt to the CPU 230. Default is 1. |
| Bit 4 (W/R) | Mask the HashMiss interrupt to the CPU 230. Default is 1. |
| Bit 5–31 (RO) | RESERVED. Always read as 0. |
| Interrupt Source 2 Reg | (Offset = 'h18) Source of the CPUINTPKTL interrupt sent to the CPU 230. This register is updated by the EPSM 210 and then the interrupt is sent to the CPU 230. When the CPU 230 reads this register the contents are cleared. A value of 1 in a bit indicates that interrupt has occurred. Default = 32'h0000_0000. |
| Bit 0 (W/R) | PKT_AVAIL is the interrupt that tells the CPU 230 that packet data is available for the CPU 230. Default is 0. |
| Bit 1 (W/R) | BUF_AVAIL the interrupt that tells the CPU 230 that buffer space is available for the CPU 230 to send packet data. Default is 0. |
| Bits 2–31 (RO) | RESERVED. Always read as 0. |

pcbregs interface for Interrupt Source Reg

| | |
|---|---|
| PktAvailInt (in) | input from TX FIFO, which determines bit 2. |
| BufAvailInt (in) | input from RX FIFO, which determines bit 3. |
| CpuInt_Pkt_(out) | the signal to the CPU 230 which indicates a packet interrupt has occurred. |
| Interrupt Mask 2 Reg | (Offset 'h1c) Interrupts to be masked by the CPU 230. A value of 1 in any bit indicates that interrupt is masked. Default = 32'h0000_0003. |
| Bit 0 (W/R) | Mask the PktAvailInt interrupt to the CPU 230. Default is 1. |
| Bit 1 (W/R) | Mask the BufAvailInt interrupt to the CPU 230. Default is 1. |
| Bits 2–31 (RO) | RESERVED. Always read as 0. |
| Polling Source 1 & 2 Reg | (Offset = 'h14) This register contains the masked interrupt information and is cleared by the CPU 230 writing a ones to clear the bits desired. This allows the CPU 230 to poll instead of being interrupted. The CPU will have to mask any interrupt source that it would like to poll instead. |
| Bit 0 (W/R) | MCB_INT is the interrupt that tells the CPU 230 that an interrupt has occurred in the MCB 404 and that the MCB Interrupt Source register will need to be read to further understand the interrupt. Default is 0. |
| Bit 1 (W/R) | MEM_RDY is the interrupt that tells the CPU 230 that the Memory data requested is available in the buffer space. Default is 0. |
| Bit 2 (W/R) | PKT_AVAIL is the interrupt that tells the CPU 230 that packet data is available for the CPU 230. Default is 0. |
| Bit 3 (W/R) | BUF_AVAIL is the interrupt that tells the CPU 230 that buffer space is available for the CPU 230 to send packet data. Default is 0. |
| Bit 4 (W/R) | ABORT_PKT is the interrupt that tells the CPU 230 that the abort_in signal was asserted into the PCB 406. Default is 0. |
| Bit 5 (W/R) | STAT_RDY is the interrupt that tells the CPU 230 that the requested statistics' information is ready in the PCB 406 buffer space. Default is 0. |
| Bit 6 (W/R) | HASH_MISS is the interrupt that tells the CPU 230 that a hash miss has occurred. |
| Bits 7–31 (RO) | RESERVED. Always read as 0. |

pcbregs interface for Polling Source Reg

| | |
|---|---|
| McbInt (in) | input from MCB, which determines bit 0. |
| MemRdy (in) | input from memory FIFO, which determines bit 1. |
| PktAvailInt (in) | input from TX FIFO, which determines bit 2. |
| BufAvailInt (in) | input from RX FIFO, which determines bit 3. |
| AbortPktInt (in) | input from HCB 402 interface, which determines bit 4. |
| StatRdyInt (in) | input from QC interface, which determines bit 5. |
| m_HashInt (in) | input from the MCB 404, which determines bit 6. |

PACKET DATA CONFIGURATION

There are three registers used for packet transfers; one for received packets and two for transmit packets. The received packets are associated with the ReadOutPkt signal from the HSB 206. The transmit packets are associated with the WriteInPkt signal from the HSB 206. Note: The terms receive and transmit are referenced from the HSB 206. The CPU 230 should access the appropriate register before accessing the packet data buffer.

| | |
|---|---|
| Packet Information RdPkt Reg | (Offset = 'h08) The necessary information for the packet of data sent by the CPU 230. Received packet referenced from the HSB 206. Default = 32'h0000_0000. |
| Bit 0 (W/R) | SOP. Start of packet from the CPU 230. 1 = SOP. |
| Bit 1 (W/R) | EOP. End of packet from the CPU 230. 1 = EOP. |
| Bits 2–15 (RO) | RESERVED. Always read as 0. |

-continued

| | |
|---|---|
| Bits 16–23 (W/R) | Length of data in the FIFO when EOP is asserted (number of bytes). |
| Bits 24–31 (RO) | RESERVED. Always read as 0. |

pcbregs interface for Packet Information RdPkt Reg

| | |
|---|---|
| r_Sop (out) | Start of packet indicator given to the HSB 206 interface. |
| r_Eop (out) | End of packet indicator given to the HSB 206 interface. |
| r_length (out) | Length in bytes of data in buffer when EOP is indicated. |
| Packet Information WrPkt Reg | (Offset = 'h0c) The necessary information for the packet of data sent by the HSB 206. Transmit packet referenced from the HSB 206. Default = 32'h0000_0000. |
| Bit 0 (W/R) | SOP. Start of packet from the HSB 206. 1 = SOP. |
| Bit 1 (W/R) | EOP. End of packet from the HSB 206. 1 = EOP. |
| Bits 2–5 (W/R) | Byte Enables for DWORD associated with SOP or EOP. Usually all bytes are enabled. 1 = enabled. |
| Bits 6–15 (RO) | RESERVED. Always read as 0. |
| Bits 16–23 (W/R) | Length of data in the FIFO (number of bytes). |
| Bits 24–31 (RO) | RESERVED. Always read as 0. |

pcbregs interface for Packet Information WrPkt Reg

| | |
|---|---|
| h_SopIn (in) | SOP indicator from the HSB 206 interface. |
| h_EopIn (in) | EOP indicator from the HSB 206 interface. |
| h_ByteValIn (in) | Byte enables from the HSB 206 interface. |
| Total Packet Info | (Offset = 'h24) This is the information that the MCB 404 adds to the packet before sending it on to the CPU 230. This value is set when there is a SOP for a CPU bound packet. Default = 32'h0000_0000. |
| Bits 0–15 (RO) | Packet Length. |
| Bits 16–23 (RO) | Source Port. |
| Bits 24–31 (RO) | Destination Port. |

MEMORY PRESENCE DETECTION

| | |
|---|---|
| SIMM/DIMM Presence Detect Reg | (Offset = 'h10) Contains the information about the SIMM's in the system. This information will be loaded slightly after reset from a shift register on the board. |
| Bits 0–3 (RO) | simm1_pd[0 . . 3]. |
| Bits 4–7 (RO) | simm2_pd[0 . . 3]. |
| Bits 8–11 (RO) | simm3_pd[0 . . 3]. |
| Bits 12–15 (RO) | simm4_pd[0 . . 3]. |
| Bits 16–31 (RO) | RESERVED. Always read as 0. |

pcbregs interface for Presence Detection Reg

| | |
|---|---|
| i_PDSerIn (in) | Serial input from presence detect shift registers. |

QUADCASCADE STATISTICS SETUP

| | |
|---|---|
| QC Statistics Info Reg | (Offset = 'h20) Setup information for the reading of Quadcascade statistics registers. The CPU writes this register that initiates the statistic reads. Default = 32'h000b_8000. |
| Bits 0–1 (W/R) | Port number. This is the port number whose statistics will be read. The port to read is determined by this number and the specified Quadcascade. |
| Bits 2–4 (W/R) | QC number. Designates the Quadcascade to access. Reserved combinations: 3'b110 and 3'b111. |
| Bits 5–9 (W/R) | Register number. This is the number of the first register to be read for the specified port. |
| Bits 10–14 (W/R) | Number of registers. This is the number of registers to read. NOTE: Software is required to keep this number along with the Register number within the range of available register to read. |
| Bits 15–19 (W/R) | Maximum number of registers. This is the maximum number of statistic registers available in the Quadcascades. Default = 6'h17. |
| Bits 20–31 (RO) | RESERVED. Always read as 0. |

pcbregs interface for Quadcascade Statistics Setup Reg

| | |
|---|---|
| r_QcStatPortNo (out) | Port number for statistics read. This is a value between 0 and 3. It is used along with the QC number to determine which port in the switch is being observed. |
| r_QcStatQcNo (out) | Qc number. Used with above port number. |
| r_StatRegNo (out) | Starting register number. This is the number of the first statistics register to be read. |
| r_NoStatRegs (out) | Number of statistic registers to read. |
| r_MaxRegs (out) | Maximum number of statistic registers which exist. This is available particularly for future use if number of statistics being kept is changed. |

EPSM 210 SETUP

| | |
|---|---|
| EPSM Setup Reg | (Offset = 'h30) General setup parameters for the EPSM 210. Default = 32'h0007_1000 or 32'h0007_3000 depending on ckl1sel input. |
| Bit 0 (W/W) | TPI installed. 1 = TPI 220 installed. Default = 0. This bit may only be written when Master Switch Enable (Bit 2) is negated. |
| Bit 1 (W/R) | EXP installed. 1 = Expansion installed. Default = 0. This bit may only be written when Master Switch Enable (Bit 2) is negated. |
| Bits 2 (W/R) | Master Switch Enable. 1 = Enables packet traffic. Default = 0. |
| Bits 3–4 (W/R) | QcXferSize[1:0]. These bits may only be written when Master Switch Enable (Bit 2) is negated. |

-continued

| | |
|---|---|
| | 00 = 16 Byte transfer size on the HSB 206. |
| | 01 = 32 Byte transfer size on the HSB 206. |
| | 10 = 64 Byte transfer size on the HSB 206. |
| | 11 = Invalid combination. |
| Bits 5–6 (W/R) | TPIXferSize[1:0]. These bits may only be written when Master Switch Enable (Bit 2) is negated. |
| | 00 = 16 Byte transfer size on the HSB 206. |
| | 01 = 64 Byte transfer size on the HSB 206. |
| | 10 = 128 Byte transfer size on the HSB 206. |
| | 11 = 256 Byte transfer size on the HSB 206. |
| Bit 7 (W/R) | AIFCS. This bit is used to enable the Quadcascades to autoinsert the FCS bits. This will only be used for the packets from the CPU 230. |
| Bit 8 (W/R) | DramWrDis. This will disable writes to the DRAM from the CPU 230 when set. Default = 0. |
| Bit 9 (W/R) | SramWrDis. This will disable writes to the internal SRAM from the CPU 230 when set. Default = 0. |
| Bits 10–12 (W/R) | EPSM 210 Address Decode. These bits will be used to decode the EPSM 210 register space and the Memory interface. |
| Bit 13 (RO) | clk1sel. |
| | 1 = CLK2 frequency is 1X the CLK1 frequency. |
| | 0 = CLK2 frequency is 2X the CLK1 frequency. |
| Bits 14–21 (RO) | CPU Port Number. Designates the port number of the CPU 230. Default = 8‘hlc. |
| Bits 22–31 (RO) | RESERVED. Always read as 0. |

pcbregs interface for EPSM Setup Reg

| | |
|---|---|
| clk1sel (in) | Input from pin to determine if ckl1 and clk2 are at the same rate. |
| r__DramWrDis (out) | Lets the CPU 230 interface know that writes to the DRAM are disabled. |
| r__SramWrDis (out) | Lets the CPU 230 interface know that writes to the internal SRAM are disabled. |
| r__EPSMAdrDcd (out) | This 3 bit number is compared to address bits 31:29 on the CPU 230 bus. |

hcbregs interface for EPSM Setup Reg

| | |
|---|---|
| r__MstrSwEn (out) | Tells arbiter, etc.. that the switch is enabled for packet traffic. |
| r__TpiInst (out) | |
| r__ExpInst (out) | |
| r__NonULBCMode[1:0](out) | |
| r__ULBCMode[1:0](out) | |
| r__AIFCS(out) | |

mcbregs interface for EPSM Setup Reg

| | |
|---|---|
| r__DramWrDis (out) | Disables CPU requests for DRAM writes. |
| r__SramWrDis (out) | Disables CPU requests for internal SRAM writes. |
| EPSM Revision Reg | (Offset = ‘h40) The revision number of the EPSM 210. |
| Bit 0–7 (RO) | The revision number of the EPSM 210. |
| Bit 8–31 (RO) | RESERVED. Always read as 0. |

pcbregs interface for EPSM Revision Reg

None.

PORT SETUP

| | |
|---|---|
| Port Speed Reg | (Offset = ‘h34) Bitmap containing the speed of each port. 1 = 100 Mhz; 0 = 10 Mhz. Default = 32’h0f00__0000. |
| Bit 0 (W/R) | Port 0 Speed. |
| Bit 1 (W/R) | Port 1 Speed. |
| : | : |
| : | : |
| Bit 27 (W/R) | Port 27 Speed. |
| Bits 28–31 (RO) | RESERVED. Always read as 0. |

hebregs interface for Port Speed Reg

| | |
|---|---|
| r__PortSpd[27:0](out) | port speed bitmap for HCB 402 blocks. |
| Port Type Reg | (Offset = ‘h38) Bitmap containing the type of each port. 1 = TLAN; 0 = Quadcascade. Default = 32’h0f00__0000. |
| Bit 0 (W/R) | Port 0 Type. |
| Bit 1 (W/R) | Port 1 Type. |
| : | : |
| : | : |
| Bit 27 (W/R) | Port 27 Type. |
| Bits 28–31 (RO) | RESERVED. Always read as 0. |

mcbregs & hcbregs interface for Port Type Reg

| | |
|---|---|
| r__PortType[27:0](out) | port type bitmap for the HCB 402 & MCB 404. |

CPU MEMORY REQUEST

The memory requests by the CPU 230 can be done in two ways. The following register is used in both methods; the CPU 230 only accesses the register directly when using the initial register/FIFO memory request method.

| | |
|---|---|
| Memory Request Reg | (Offset = ‘h3c) The CPU writes to this reg to request a memory read or write. This requested mechanism is used to access either the external DRAM or the internal SRAM. |

-continued

| | |
|---|---|
| Bits 0–23 (W/R) | Starting Address[25:2] of the transfer. For SRAM accesses, bits 23–8 are reserved. Bits 7:0 address the 256 24-bit words. |
| Bit 24 (W/R) | Memory Select.<br>0 = External DRAM access (i.e., packet & hash memory)<br>1 = Internal SRAM access (i.e., packet control registers) |
| Bit 25 (W/R) | Transfer Length.<br>0 = 1 transfer (4 bytes)<br>1 = 4 transfers (16 bytes)<br>NOTE: The Starting Address & Transfer Length should not be set such that the transfer would cross a 2K page boundary. One way to guarantee this is to make sure all data structures (like Hash Entries) are 16 byte aligned. |
| Bits 26–29 (W/R) | Byte Enable[3:0]. (1 = asserted). Useful for partial word writes. Also used with EDO Test Mode set to do a read with no CAS. For writes with Transfer Length greater than 1, the Byte Enables must be 1111. These are don't cares for reads unless EDO Test Mode is set. |
| Bit 30 (W/R) | Write/Read. 0 = Read, 1 = Write. |
| Bit 31 (W/R) | Locked Page Hit. Indicates that another CPU request will follow in the same memory page. The DRAM memory arbiter will not grant the memory system to another requester and RAS will remain asserted after the current cycle. Used in EDO Test Mode only. No other requester including Refresh has access to the memory while set. Should never be used in SRAM accesses (except for hardware debugging) since packet memory traffic in will cease while the SRAM is locked. |

mchregs interface for Memory Request Reg

| | |
|---|---|
| CpuAdr[25:2](out) | passes Starting Address memctl & mcbsram module. |
| CpuBE[3:0](out) | passes ByteEnables to memctl & mcbsram module. |
| CpuLn[1:0](out) | passes Transfer Length to memctl & mcbsram module (00 if ln = 1 of 1, 11 if ln = 4). |
| CpuMemSel (out) | controls mux between external DRAM (0) & internal SRAM (1) data. |
| CpuWr (out) | asserted to memctl & mcbsram module if the Write/Read bit = 1. |
| CpuPgHit (out) | asserted to memctl & mcbsram module if the Locked Page Hit Bit = 1. |
| CpuReq (out) | asserted to memctl module when the Memory Request Reg is written and Memory Select = 0. It must remain asserted until CpuAck is asserted. |
| CpuAck (in) | is asserted from memctl module to mcbregs when the CpuReq is accepted. |
| CpuInternalReq (out) | asserted to mcbsram module when the Memory Request Reg is written and Memory Select = 1. It must remain asserted until CpuInternalAck is asserted. |
| CpuInternalAck (in) | is asserted from mcbsram module to mcbregs when the CpuInternalReq is accepted. |

NOTE: The following sequence should be used to test for EDO memory:
1: Set the EDO Test Mode bit in the Memory Control Register.
2. Write a DWORD in the bank under test with 0000h.
3. Read the same DWORD with the Locked Page Hit bit set and the Byte Enables = 1111b. After this read, EDO DRAMS will hold MD low while FPM DRAMS will float MD and a pull-up resistor on MD[0] will pull this line high after about 100 ns.
4. Read the DWORD again with the Locked Page. Hit bit cleared and the Byte Enables = 0000b. This is a read with no CAS asserted. MD[0] will be low for EDO DRAM and high for FPM.
5. Repeat steps 1–4 for each bank of memory installed. Memory Type may be set to EDO DRAM if and only if ALL banks contain EDO DRAM.
6. Clear EDO Test Mode bit and set the Memory Type. DO NOT leave EDO Test Mode set.

PROMISCUOUS PORT

| | |
|---|---|
| Promiscuous Port Reg | (Offset = 'h148) The controls and which port is observed in promiscuous mode is contained in the register. Default = 32'h0000_0000. This register may only be written when Master Switch Enable (EPSM Setup Reg) is negated. |
| Bits 0–7 (W/R) | Port number that will be observed in promiscuous mode. |
| Bits 8–15 (W/R) | The port that data that is being received will show up on. |
| Bits 16–23 (W/R) | The port that data that is sent to the observed port will show up on. |
| Bits 24–31 (RO) | RESERVED. Always read as 0. |

HIGH SPEED BUS MONITOR

| | |
|---|---|
| HSB Util Setup Reg | (Offset = 'h54) The controls and which port will be monitor for HSB 206 utilization. Default = 32'h0000_0000. |
| Bits 0–7 (W/R) | Port number or Total. |
| Bits 8–9 (W/R) | Mode. |
| Bits 10–31 (RO) | RESERVED. Always read as 0. |
| HSB Utilization Reg | (Offset = 'h58) HSB 206 utilization is the average time the port selected is on the HSB 206. Default = 32'h0000_0000. |
| Bits 0–31 (RO) | Average time port selected is on the HSB 206. |

CUT-THRU/STORE-N-FORWARD INFORMATION

| | |
|---|---|
| Source CT_SNF Reg | (Offset = 'h5c) Bitmap containing the CT/SnF status of the source port. 0 = CT; 1 = SNF. Default = 32'h0000_0000. |
| Bit 0 (W/R) | Port 0 Source CT_SNF. |
| Bit 1 (W/R) | Port 1 Source CT_SNF. |
| : | : |
| : | : |
| Bit 27 (W/R) | Port 27 Source CT_SNF. |
| Bits 28–31 (RO) | RESERVED. Always read as 0. |

| | -continued |
|---|---|
| hcbregs interface for Source CT_SNF Reg | |
| | |
| TblSrcPrt(in) | The current packet source port. 8-bit input. |
| r_RxPortCtSnf (out) | The CT_SNF status for TblSrcPrt. 1-bit output. |
| Destination CT_SNF Reg | (Offset = 'h60) Bitmap containing the CT/SnF status of the destination port. 0 = CT; 1 = SNF. Default = 32'h0000_0000. |
| Bit 0 (W/R) | Port 0 Destination CT_SNF. |
| Bit 1 (W/R) | Port 1 Destination CT_SNF. |
| : | : |
| : | : |
| Bit 27 (W/R) | Port 27 Destination CT_SNF. |
| Bits 28–31 (RO) | RESERVED. Always read as 0. |
| hcbregs interface for Source CT_SNF Reg | |
| | |
| TblDstPrt (in) | The current packet destination port. 8-bit input. |
| r_TxPortCtSnf (out) | The CT_SNF status for TblDstPrt. 1-bit output. |
| ARBITRATION INFORMATION | |
| | |
| Arbitration Mode Register | (Offset = 'h74) Contains the arbitration mode value. Default = 32'h0000_0000. This register may only be written when Master Switch Enable (EPSM Setup Reg) is negated. |
| Bits 0–1 (W/R) | Arbitration mode. |
| | 2'b00: First come first served arbitration mode. |
| | 2'b01: Weighted priority arbitration mode. |
| | 2'b10: Round robin arbitration mode. |
| | 2'b11: Also causes first come first served mode. |
| Bits 2–31 (RO) | RESERVED. Always read as 0. |
| hcbregs interface for Arbitration Mode Reg | |
| | |
| r_ArbMode (out) | The 2 bit value shown above which is needed in arbitration modules in the HCB 402. |
| Arbitration Weight Register #1 | (Offset = 'h64) The weight for ports 0–7 for the weighted priority arbitration mode. |
| Bits 0–3 (W/R) | Port 0 Arbitration weight for weighted priority mode. |
| Bits 4–7 (W/R) | Port 1 Arbitration weight for weighted priority mode. |
| Bits 8–11 (W/R) | Port 2 Arbitration weight for weighted priority mode. |
| Bits 12–15 (W/R) | Port 3 Arbitration weight for weighted priority mode. |
| Bits 16–19 (W/R) | Port 4 Arbitration weight for weighted priority mode. |
| Bits 20–23 (W/R) | Port 5 Arbitration weight for weighted priority mode. |
| Bits 24–27 (W/R) | Port 6 Arbitration weight for weighted priority mode. |
| Bits 28–31 (W/R) | Port 7 Arbitration weight for weighted priority mode. |
| hcbregs interface for Arbitration Weight Reg #1 | |
| | |
| r_ArbWt0 (out) | These four bits are used by HCB 402 for weighting for port 0 in weighted arbitration mode. |
| r_ArbWt1 (out) | These four bits are used by HCB 402 for weighting for port 1 in weighted arbitration mode. |
| r_ArbWt2 (out) | These four bits are used by HCB 402 for weighting for port 2 in weighted arbitration mode. |
| r_ArbWt3 (out) | These four bits are used by HCB 402 for weighting for port 3 in weighted arbitration mode. |
| r_ArbWt4 (out) | These four bits are used by HCB 402 for weighting for port 4 in weighted arbitration mode. |
| r_ArbWt5 (out) | These four bits are used by HCB 402 for weighting for port 5 in weighted arbitration mode. |
| r_ArbWt6 (out) | These four bits are used by HCB 402 for weighting for port 6 in weighted arbitration mode. |
| r_ArbWt7 (out) | These four bits are used by HCB 402 for weighting for port 7 in weighted arbitration mode. |
| Arbitration Weight Register #2 | (Offset = 'h68) The weight for ports 8–15 for the weighted priority arbitration mode. |
| Bits 0–3 (W/R) | Port 8 Arbitration weight for weighted priority mode. |
| Bits 4–7 (W/R) | Port 9 Arbitration weight for weighted priority mode. |
| Bits 8–1 (W/R) | Port 10 Arbitration weight for weighted priority mode. |
| Bits 12–15 (W/R) | Port 11 Arbitration weight for weighted priority mode. |
| Bits 16–19 (W/R) | Port 12 Arbitration weight for weighted priority mode. |
| Bits 20–23 (W/R) | Port 13 Arbitration weight for weighted priority mode. |
| Bits 24–27 (W/R) | Port 14 Arbitration weight for weighted priority mode. |
| Bits 28–31 (W/R) | Port 15 Arbitration weight for weighted priority mode. |
| hcbregs interface for Arbitration Weight Reg #2 | |
| | |
| r_ArbWt8 (out) | These four bits are used by HCB 402 for weighting for port 8 in weighted arbitration mode. |
| r_ArbWt9 (out) | These four bits are used by HCB 402 for weighting for port 9 in weighted arbitration mode. |
| r_ArbWt10 (out) | These four bits are used by HCB 402 for weighting for port 10 in weighted arbitration mode. |
| r_ArbWt11 (out) | These four bits are used by HCB 402 for weighting for port 11 in weighted arbitration mode. |

-continued

| | |
|---|---|
| r_ArbWt12 (out) | These four bits are used by HCB 402 for weighting for port 12 in weighted arbitration mode. |
| r_ArbWt13 (out) | These four bits are used by HCB 402 for weighting for port 13 in weighted arbitration mode. |
| r_ArbWt14 (out) | These four bits are used by HCB 402 for weighting for port 14 in weighted arbitration mode. |
| r_ArbWt15 (out) | These four bits are used by HCB 402 for weighting for port 15 in weighted arbitration mode. |
| Arbitration Weight Register #3 | (Offset = ‘h68) The weight for ports 16–23 for the weighted priority arbitration mode. |
| Bits 0–3 (W/R) | Port 16 Arbitration weight for weighted priority mode. |
| Bits 4–7 (W/R) | Port 17 Arbitration weight for weighted priority mode. |
| Bits 8–11 (W/R) | Port 18 Arbitration weight for weighted priority mode. |
| Bits 12–15 (W/R) | Port 19 Arbitration weight for weighted priority mode. |
| Bits 16–19 (W/R) | Port 20 Arbitration weight for weighted priority mode. |
| Bits 20–23 (W/R) | Port 21 Arbitration weight for weighted priority mode. |
| Bits 24–27 (W/R) | Port 22 Arbitration weight for weighted priority mode. |
| Bits 28–31 (W/R) | Port 23 Arbitration weight for weighted priority mode. |

hcbregs interface for Arbitration Weight Reg #3

| | |
|---|---|
| r_ArbWt16 (out) | These four bits are used by HCB 402 for weighting for port 16 in weighted arbitration mode. |
| r_ArbWt17 (out) | These four bits are used by HCB 402 for weighting for port 17 in weighted arbitration mode. |
| r_ArbWt18 (out) | These four bits are used by HCB 402 for weighting for port 18 in weighted arbitration mode. |
| r_ArbWt19 (out) | These four bits are used by HCB 402 for weighting for port 19 in weighted arbitration mode. |
| r_ArbWt20 (out) | These four bits are used by HCB 402 for weighting for port 20 in weighted arbitration mode. |
| r_ArbWt21 (out) | These four bits are used by HCB 402 for weighting for port 21 in weighted arbitration mode. |
| r_ArbWt22 (out) | These four bits are used by HCB 402 for weighting for port 22 in weighted arbitration mode. |
| r_ArbWt23 (out) | These four bits are used by HCB 402 for weighting for port 23 in weighted arbitration mode. |
| Arbitration Weight Register #4 | (Offset = ‘h70) The weight for ports 24–28 for the weighted priority arbitration mode. |
| Bits 0–3 (W/R) | Port 24 Arbitration weight for weighted priority mode. |
| Bits 4–7 (W/R) | Port 25 Arbitration weight for weighted priority mode. |
| Bits 8–11 (W/R) | Port 26 Arbitration weight for weighted priority mode. |
| Bits 12–15 (W/R) | Port 27 Arbitration weight for weighted priority mode. |
| Bits 16–19 (W/R) | Port 28 Arbitration weight for weighted priority mode. |
| Bits 20–31 (RO) | RESERVED. Always read as 0. |

hcbregs interface for Arbitration Weight Reg #4

| | |
|---|---|
| r_ArbWt24 (out) | These four bits are used by HCB 402 for weighting for port 24 in weighted arbitration mode. |
| r_ArbWt25 (out) | These four bits are used by HCB 402 for weighting for port 25 in weighted arbitration mode. |
| r_ArbWt26 (out) | These four bits are used by HCB 402 for weighting for port 26 in weighted arbitration mode. |
| r_ArbWt27 (out) | These four bits are used by HCB 402 for weighting for port 27 in weighted arbitration mode. |
| r_ArbWt28 (out) | These four bits are used by HCB 402 for weighting for port 28 in weighted arbitration mode. |

HCB 402 MISCELLANEOUS CONTROL

| | |
|---|---|
| HCB Misc Control | (Offset = ‘h78) Miscellaneous controls for the HCB 402. Default = 32’h0000_0000. |
| Bit 0 (W/R) | Enable CT FIFO. 1 = CT FIFO enabled. |
| Bit 1 (W/R) | Enable read extra wait states. 1 = wait states enabled. |
| Bit 2 (W/R) | Enable concurrent reads and writes for Quadcascade. |
| Bit 3 (W/R) | Enable concurrent reads and writes for QE110. |
| Bit 4 (W/R) | Enable early address. |
| Bits 5–31 (RO) | RESERVED. Always read as 0. |

PORT SHUTDOWN

| | |
|---|---|
| Port Shutdown | (Offset = ‘h7c) Bitmap for which ports are shutdown. Default = 32’h0000_0000. |
| Bits 0–27 (W/R) | Bitmap for ports 0 through 27. 1 = port is shutdown. |
| Bits 28–31 (RO) | RESERVED. Always read as 0. |

PORT STATE SETUP

In order to setup or change the state of a port two registers must be written. The first register to write is the Port State Bitmap register that contains the bitmap of the ports that will be changed. The second register to write is the Program Port State register that contains the value of the state and initiates the programming of the two Port State registers. The CPU’s port state is always Forwarding and can never be changed.

| | |
|---|---|
| Port State Bitmap Reg | (Offset = ‘h90) Bitmap of ports whose state will change. 1 = change this ports state to value in Program Port State register. Default = 32’h0000_0000. |
| Bit 0 (W/R) | Port 0. Setting this bit enables the changing of port 0’s state. |

-continued

| | |
|---|---|
| Bit 1 (W/R) | Port 1. Setting this bit enables the changing of port 1's state. |
| : | : |
| : | : |
| Bit 27 (W/R) | Port 27. Setting this bit enables the changing of port 27's state. |
| Bits 29–31 (RO) | RESERVED. Always read as 0. |
| Program Port State Reg | (Offset = 'h80) Port state. The CPU writes this register that initiates the programming of the Port State registers. The Port State Bitmap register MUST BE WRITTEN TO FIRST. Default = 32'h0000_0000. |
| Bits 0–1 (W/R) | State Value. This value will be placed in the ports indicated in the bitmap at offset 30. |
| | State Value / Condition |
| | 00 b Disabled |
| | 01 b Blocked/Listening |
| | 10 b Learning |
| | 11 b Forwarding |
| Bits 2–31 (RO) | RESERVED. Always read as 0. |
| Port State #1 Reg | (Offset = 'h94) States of ports 0 through 15. Programmed by the Program Port State and Port State Bitmap registers. Default = 32'h0000_0000. |
| | State Value / Condition |
| | 00 b Disabled |
| | 01 b Blocked/Listening |
| | 10 b Learning |
| | 11 b Forwarding |
| Bits 0–1 (RO) | Port_0_st[1:0]. |
| Bits 2–3 (RO) | Port_1_st[1:0]. |
| Bits 4–5 (RO) | Port_2_st[1:0]. |
| Bits 6–7 (RO) | Port_3_st[1:0]. |
| Bits 8–9 (RO) | Port_4_st[1:0]. |
| Bits 10–11 (RO) | Port_5_st[1:0]. |
| Bits 12–13 (RO) | Port_6_st[1:0]. |
| Bits 14–15 (RO) | Port_7_st[1:0]. |
| Bits 16–17 (RO) | Port_8_st[1:0]. |
| Bits 18–19 (RO) | Port_9_st[1:0]. |
| Bits 20–21 (RO) | Port_10_st[1:0]. |
| Bits 22–23 (RO) | Port_11_st[1:0]. |
| Bits 24–25 (RO) | Port_12_st[1:0]. |
| Bits 26–27 (RO) | Port_13_st[1:0]. |
| Bits 28–29 (RO) | Port_14_st[1:0]. |
| Bits 30–31 (RO) | Port_15_st[1:0]. |
| Port State #2 Reg | (Offset = 'h98) States of ports 16 through 28. Programmed by the Program Port State and Port State Bitmap registers. Default = 32'h0300_0000. |
| | State Value / Condition |
| | 00 b Disabled |
| | 01 b Blocked/Listening |
| | 10 b Learning |
| | 11 b Forwarding |
| Bits 0–1 (RO) | Port_16_st[1:0]. |
| Bits 2–3 (RO) | Port_17_st[1:0]. |
| Bits 4–5 (RO) | Port_18_st[1:0]. |
| Bits 6–7 (RO) | Port_19_st[1:0]. |
| Bits 8–9 (RO) | Port_20_st[1:0]. |
| Bits 10–11 (RO) | Port_21_st[1:0]. |
| Bits 12–13 (RO) | Port_22_st[1:0]. |
| Bits 14–15 (RO) | Port_23_st[1:0]. |
| Bits 16–17 (RO) | Port_24_st[1:0]. |
| Bits 18–19 (RO) | Port_25_st[1:0]. |
| Bits 20–21 (RO) | Port_26_st[1:0]. |
| Bits 22–23 (RO) | Port_27_st[1:0]. |
| Bits 24–25 (RO) | Port_28_st[1:0]. CPU port is always Forwarding (11). |
| Bits 26–31 (RO) | RESERVED. Always read as 0. |
| mcbregs interface for Port State Setup Reg | |
| SourcePort[7:0](in) | Source port number from mcbhash module. |
| m_HashDstprt[7:0](in) | Destination port number from mcbhash module. |
| SrcPrtState[1:0](out) | Combinatorial output to mcbhash based on SourcePort and Port State Regs. |
| DstPrtState[1:0](out) | Combinatorial output to mcbhash based on m_HashDstPrt & Port State Regs. |
| PACKET MEMORY DEFINITION | |
| Memory Sector Info Reg | (Offset = 'ha0) Packet Memory consists of a fixed number of sectors. This register defines the sector size. The min. sector size of 2K bytes insures that the largest packet (1518 bytes + overhead) can make no more than one sector boundary crossing. Currently only sector size of 2K bytes is supported. This register may only be written when Master Switch Enable (EPSM Setup Reg) is negated. |
| Bit 0–1 (W/R) | Sector Size. Currently only sector size of 2K bytes is supported. 00 = 2K bytes (default). |

-continued

| | |
|---|---|
| | 01 = 4K bytes.<br>10 = 8K bytes.<br>11 = 16K bytes. |
| Bits 2–31 (RO) | Reserved. Always Read 0s. |
| MEMORY BUS BAND WIDTH MONITOR | |
| Memory Bus Monitor Control Reg | (Offset = 'ha8) There are two independent bus monitors controlled by this register. The Monitor Select bit (24) is used to select which monitor is being accessed. This bit also controls access to the Memory Bus Monitor Thresholds Reg and the Memory Utilization Reg. The Monitor bit can be set independently by writing only the high byte of this register. |
| Bits 0–9 (W/R) | Monitor Mode [9:0]. Defines type of bus activity to be monitored.<br>Default is 10'h3FF (monitor everything).<br>CycleType (set one or more bits).<br>Bit 0-Packet (set to monitor packet related traffic).<br>Bit 1-Hash (set to monitor hash lookup traffic).<br>Bit 2-CPU (set to monitor CPU accesses to memory).<br>Bit 3-Refresh (set to monitor refresh cycles).<br>Packet Type (must set one or both bits if Packet bit (0) is set).<br>Bit 4-Unicast (set to monitor known individual address mode pkts).<br>Bit 5-Broadcast (set to monitor pkts with group bit set or hash miss).<br>Packet Tx/Rc (must set one or both bits if Packet bit (0) is set).<br>Bit 6-Transmit (set to monitor transmit related traffic).<br>Bit 7-Receive (set to monitor receive related traffic).<br>Packet Data/Overhead (must set one or both bits if Packet bit (0) is set).<br>Bit 8-Data (set to monitor the data portion of packet transfers).<br>Bit 9-Overhead (set to monitor non-data related portion of packet transfers, i.e. bus arb, pkt mem maintenance, unusable cycles) |
| Bits 10–15 (RO) | Reserved. Always read 0. |
| Bits 16–19 (W/R) | Filter Timescale. Sets approx. time constant for LP filtering:<br>0h = 75 msec, 4h = 300 ms, 8h = Rsvd, Ch = Rsvd<br>1h = 600 msec, 5h = 2.5 sec, 9h = Rsvd, Dh = Rsvd<br>2h = 5 msec, 6h = 20 sec, Ah = Rsvd, Eh = Rsvd<br>3h = 40 msec, 7h = 2.5 min, Bh = Rsvd, Fh = Rsvd<br>Default = 0h. Applies only if in Filter mode. |
| Bit 20 (W/R) | Count/Filter mode. (default = 0, Filter mode).<br>0 = monitor operates as a low pass filter as defined by Filter Timescale. Reading the Bus Utilization Register does not affect its value in Filter mode.<br>1 = monitor counts bus cycles, but does not filter. When in Count mode, the Bus Utilization Register is cleared when read. |
| Bit 21 (W/R) | Timer mode. Applies only if in Count mode. (default = 0)<br>0 = count only cycles defined by Monitor Mode bits.<br>1 = increment counter on every clock cycle. |
| Bit 22 (W/R) | Backpressure Enable. 1 = Use the alarm from this monitor to enable backpressure on all ports. Default = 0, disabled. |
| Bit 23 (W/R) | BroadcastControl Enable. 1 = Use the alarm from this monitor to drop broadcast packets received from any port. Default = 0, disabled. |
| Bit 24 (W/R) | Monitor Select. 0 = Monitor0 (default). 1 = Monitor1. |
| Bits 25–31 (RO) | Reserved. Always read 0. |
| Memory Bus Monitor Thresholds/BW Reg | (Offset = 'hac) The Monitor Select bit must be set prior to accessing this register. |
| Bits 0–7 (W/R) | Alarm Set Threshold. If the Bus Utilization reaches or exceeds this value, the Alarm flag will be set and a CPU interrupt is generated. Backpressure or Broadcast Control is applied if enabled. (default = 8'h00) |
| Bits 8–15 (W/R) | Alarm Clear Threshold. When the Bus Utilization drops to or below this value, the Alarm flag will be cleared and a CPU interrupt is generated. Backpressure and Broadcast Control are released. (default = 8'h00) |
| Bits 16–23 (RO) | Peak BW. Max. Bandwidth detected since last read. Cleared when read. |
| Bits 24–31 (RO) | Current BW. Current value of bus bandwidth utilization filter. A value of 00h represents 0% utilization and a value of FFh represents 100% utilization. |
| Memory Bus Utilization Reg | (Offset = 'hb0) The Monitor Select bit must be set prior to accessing this register. |
| Bits 0–31 (RO) | Bus Utilization [31:0]. Memory bus utilization counter.<br>In Count mode, this value is a count of the number of busy bus cycles since counter was last started. Cleared when read. Counters of both filters start simultaneously when the Bus Utilization reg for both have been read.<br>In Filter mode, it is not necessary to read this register since the top 8 bits are copied to the Thresholds/BW reg as Current BW. If it is desired to use more than 8 bits for BW, it should be noted that the max bandwidth value will always be 32'hFF00_0000 and the minimum value will be between 32'h0000_0000 and 32'h00FF_FFFF depending upon the timescale selected. Not cleared when read in Filter mode. |
| mcbregs interface for memory bandwidth monitors | |
| SelectedBandWidth [31:0](in) | Memory Bus Utilization Reg [31:0] for selected monitor. Also, bits 24–31 |

-continued

| | |
|---|---|
| | are Current BW in Thresholds/BW reg. |
| SelectedMaxBW[7:0](in) | Peak BW in Thresholds/BW reg bits 16–23. |
| Alarm0 (in) | Alarm flag for monitor 0. mcbregs will generate interrupts BWALARMSET0 and BWALARMCLR0 when this flag is set and cleared. |
| Alarm1 (in) | Alarm flag for monitor 1. mcbregs will generate interrupts BWALARMSET1 and BWALARMCLR1 when this flag is set and cleared. |
| r__MonMode0[9:0](out) | Monitor Mode for monitor 0. |
| r__MonMode1[9:0](out) | Monitor Mode for monitor 1. |
| r__BwScale0[2:0](out) | Filter Timescale for monitor 0. |
| r__BwScale1[2:0](out) | Filter Timescale for monitor 1. |
| r__CountOnly0 (out) | Count/Filter mode bit for monitor 0. |
| r__CountOnly1 (out) | Count/Filter mode bit for monitor 1. |
| r__TimerMode0 (out) | TimerMode bit for monitor 0. |
| r__TimerMode1 (out) | TimerMode bit for monitor 1. |
| r__BackPresOnAlarm0 (o) | Backpressure Enable bit for monitor 0. |
| r__BackPresOnAlarm1 (o) | Backpressure Enable bit for monitor 1. |
| r__DropBcPktsOnAlarm0 (o) | Broadcast Control Enable bit for monitor 0. |
| r__DropBcPktsOnAlarm1 (o) | Broadcast Control Enable bit for monitor 1. |
| r__FilterSelect (out) | Monitor Select bit. |
| r__AlarmSet0 [7:0](out) | Alarm Set Threshold for monitor 0. |
| r__AlarmSet1 [7:0](out) | Alarm Set Threshold for monitor 1. |
| r__AlarmClr0 [7:0](out) | Alarm Clr Threshold for monitor 0. |
| r__AlarmClr1 [7:0](out) | Alarm Clr Threshold for monitor 1. |
| ClrBwCtr0 (out) | Asserted for one clock when the Utilization Register for monitor 0 is read. |
| ClrBwCtr1 (out) | Asserted for one clock when the Utilization Register for monitor 1 is read. |
| ClrMaxBW0 (out) | Asserted for one clock when the Thresholds/BW Reg for monitor 0 is read. |
| ClrMaxBW0 (out) | Asserted for one clock when the Thresholds/BW Reg for monitor 0 is read. |

DROPPED PACKET STATISTICS

Packets which are dropped due to memory overflow, broadcast overflow, receive sector overflow, and transmit sector overflow are counted. These counts and the bitmaps, for the receive sector overflow and transmit sector overflow, are kept. These conditions also cause interrupts to the CPU 230. The interrupt information is kept in the MCB interrupt source register.

| | |
|---|---|
| Dropped Packet Memory Overflow Reg | (Offset = ‘hb8) This register contains the number of packets that were dropped due to memory overflow which is caused by two conditions. These conditions are threshold exceeded during hash lookup and actual memory overflow when a packet is being stored, this causes an aborted packet. |
| Bits 0–31 (W/R) | Number of packets dropped due to memory overflow. |
| Dropped Packet Broadcast Overflow Reg | (Offset = ‘hbc) This register contains the number of packets that were dropped due to broadcast threshold overflow. |
| Bits 0–31 (W/R) | Number of packets dropped due to broadcast threshold overflow. |
| Dropped Packet Receive Sector Overflow Reg | (Offset = ‘hd4) This register contains the number of packets that were dropped due to receive sector overflow. |
| Bits 0–31 (W/R) | Number of packets dropped due to receive sector overflow. |
| Dropped Packet Transmit Sector Overflow Reg | (Offset = ‘hd8) This register contains the number of packets that were dropped due to transmit sector overflow. |
| Bits 0–31 (W/R) | Number of packets dropped due to transmit sector overflow. |
| Dropped Packet Receive Sector Bitmap Reg | (Offset = ‘hdc) This register contains the bitmap of ports that dropped packets due to receive sector overflow. |
| Bits 0–28 (W/R) | Bitmap of ports that report overflow of receive sector usage. |
| Dropped Packet Transmit Sector Bitmap Reg | (Offset = ‘he0) This register contains the bitmap of ports that dropped packets due to transmit sector overflow. |
| Bits 0–28 (W/R) | Bitmap of ports that report overflow of transmit sector usage. |

mcbregs interface for Dropped Packet Statistics

| | |
|---|---|
| x__RxPktAborted__ | Strobe from XCB that tells when a packet was aborted due to memory overflow. |
| DropPktStb__MemOF | Strobe that tells when a packet is dropped because it will overflow memory. |
| DropPktStb__BCOF | Strobe that tells when a packet is dropped because the broadcast threshold will overflow. |
| DropPktStb__RXOF | Strobe that tells when a packet is dropped because the receive sector threshold will overflow. |
| DropPktStb__TxOF | Strobe that tells when a packet is dropped because the transmit sector threshold will overflow. |

HASH TABLE DEFINITION

| | |
|---|---|
| Hash Table Definition Reg | (Offset = ‘hc0) Defines the base address and size of the primary hash entry table. If multiple copies of the hash table are kept in memory, this register may be used to have the EPSM 210 switch between them. |
| Bits 0–14 (RO) | Primary Hash Table Base Address[16:2]. Always 0. |
| Bits 15–23 (RO) | Primary Hash Table Base Address[25:17]. Always 0. |
| Bits 24–25 (W/R) | Primary Hash Table Size [1:0]. (Default is 00).<br>00 = Key Size 13 bits, Table Size 128K bytes (8K 16-byte entries).<br>01 = Key Size 14 bits, Table Size 256K bytes (16K 16 byte entries).<br>(Base Address bit 17 is ignored and forced to 0 internally).<br>10 = Key Size 15 bits, Table Size 512K bytes (32K 16-byte entries).<br>(Base Address bits 18:17 are ignored and forced to 0 internally).<br>11 = Key Size 16 bits, Table Size 1M bytes (64K 16-byte entries).<br>(Base Address bits 19:17 are ignored and forced to 0 internally). |

-continued

| | |
|---|---|
| Bit 26 (W/R) | Lock Hash Cycles. Setting this bit causes memory cycles during a hash lookup to be locked. This minimizes the hash lookup time at the expense of delaying packet read and write transfers to memory. Default is 0. |
| Bits 31:27 (RO) | Reserved. Always read 0. |

mcbregs interface for Hash Table Definition Reg

| | |
|---|---|
| r__HashBaseAdr[25:17](out)-passes Base Address to memhash module. | |
| r__HashKeySize[1:0](out)-passes Key Size to memhash module. | |
| r__LockHashCycs (out)-asserted to mcbhash module if Lock Hash Cycles bit is set. | |
| HashLookUpIP (in) - asserted by | mcbhash module to indicate that a hash lookup is in progress and any writes to the Hash Table Definition Reg should be postponed until negated. mcbregs may update the register on any rising clock edge when HashLookUpIP is negated. |

SOURCE PORT LEARNING

| | |
|---|---|
| Hash Source Miss Reg Low | (Offset = 'hcc) Bytes 3:0 of the new source address to be added to hash table. These registers are loaded and an interrupt is issued when a hash SA is unknown or port has changed and the source port is not learning disabled. The registers are locked until the Hash Source Miss Reg High register is read (Low reg must be read first). Unknown SA's or port changes encountered while the registers are locked will be ignored. |
| Bit 0–7 (RO) | Byte 0 of the MAC Address to be added to hash table. (high order address byte, group bit = bit 0). |
| Bits 8–15 (RO) | Byte 1 of the MAC Address to be added to hash table. |
| Bits 16–23 (RO) | Byte 2 of the MAC Address to be added to hash table. |
| Bits 24–31 (RO) | Byte 3 of the MAC Address to be added to hash table. |
| Hash Source Miss Reg High | (Offset = 'hd0) Bytes 5:4 of the new source address and Source Port ID. |
| Bit 0–7 (RO) | Byte 4 of the MAC Address to be added to hash table. |
| Bits 8–15 (RO) | Byte 5 of the MAC Address to be added to hash table. |
| Bits 16–23 (RO) | Source Port ID [7:0] to be added to hash table. |
| Bits 24–31 (RO) | Reserved. Always read 0. |
| Learning Disabled Port Reg | (Offset = 'he4) Bit mapped learning disabled port reg. Does not apply to CPU. |
| Bit 0 (W/R) | Port 0 Learning Disabled. 1 = Disabled. Default = 0 |
| Bit 1 (W/R) | Port 1 Learning Disabled. 1 = Disabled. Default = 0 |
| . . . | |
| Bit 28 (W/R) | Port 28 Learning Disabled. 1 = Disabled. Default = 0 |
| Bits 29–31 (RO) | Reserved. Always read 0. |

mcbregs interface for source port learning

| | |
|---|---|
| SelectedAdr[47:0](in) | Source Address from memhash module. |
| SourcePort[7:0](in) | Source port number from memhash module. |
| SrcMissStb (in) | Asserted by memhash module when hash SA miss has occurred and SelectedAdr and SourcePort are valid. Should be used as a gate to the Hash Source Miss Regs. Memhash will guarantee hold time. |
| SrcMissLock (out) | Asserted to memhash to prevent SrcMissStb from being asserted. |
| LearnDisPort (out) | Asserted if Learning Disabled set for port. This is a combinatorial output to memhash based on the SourcePort input and the Learn Disabled Reg and is evaluated continuously. Memhash knows when to sample. |

PORT SECURITY

| | |
|---|---|
| Secure Port Reg | (Offset = 'he8) Bit mapped secure port reg. (It might also be desirable to set Learning Disable bits for ports with Security Enabled). |
| Bit 0 (W/R) | Port 0 Security Enable. 1 = Enabled. Default = 0 |
| Bit 1 (W/R) | Port 1 Security Enable. 1 = Enabled. Default = 0 |
| . . . | |
| Bit 28 (W/R) | Port 28 Security Enable. 1 = Enabled. Default = 0 |
| Bits 29–31 (RO) | Reserved. Always read 0. |
| Security Violation Reg | (Offset = 'hf0) Bit mapped security violation by port. Cleared when read. Init to 0s. An interrupt will be issued when the first bit is set & deared when read. |
| Bit 0 (RO) | Security Violation Port 0. 1 = Violation occurred. |
| Bit 1 (RO) | Security Violation Port 1. 1 = Violation occurred. |
| . . . | |
| Bit 28 (RO) | Security Violation Port 28. 1 = Violation occurred. |
| Bits 29–31 (RO) | Reserved. Always read 0. |
| Security Violation Statistics Reg | (Offset = 'hec) Count of total Security Violations on all ports. Cleared when read. Initialized to 0. |
| Bits 0–31 (RO) | Security Violation Count [31:0]. |

mcbregs interface for port security

| | |
|---|---|
| SourcePort[7:0](in) | Source port number from memhash module. |
| SecurePort (out) | Asserted if Secure mode is set for port. This is a combinatorial output to memhash based on the SourcePort input and the Secure Port Reg and is evaluated continuously. Memhash knows when to sample. |
| SecViolationStb (in) | Strobe indicating a security violation has occurred on the SourcePort indicated. Should be used as a gate to the Security Violation Reg bit indicated by Sourceport. Memhash will guarantee hold time. |

MEMORY CONFIGURATION

| | |
|---|---|
| Memory Control Reg | (Offset = 'hf4) Misc. memory control functions. This register may only be written |

-continued

| | |
|---|---|
| | when Master Switch Enable (EPSM Setup Reg) is negated. |
| Bits 0–1 (W/R) | Memory Type<br>00 = Fast Page Mode DRAM (default)<br>01 = EDO DRAM<br>10 = Sync DRAM<br>11 = Reserved |
| Bit 2 (W/R) | Memory Speed (0 = 60 ns, 1 = 50 ns). Default is 0. |
| Bit 3 (W/R) | EDO Test Mode (1 = Enable). Default is 0. |
| Bit 4 (W/R) | Double Link Mode. Default is 0. |
| Bit 5 (W/R) | Disable Receive Page Hits. Default is 0. |
| Bit 6 (W/R) | Disable Transmit Page Hits. Default is 0. |
| Bits 7–31 (RO) | Reserved. Always read 0. |

mcbregs interface for Memory Control Reg

| | |
|---|---|
| r_MemEDO (out) | asserted by mcbregs to memctl module if Memory Type is 01. |
| r_MemSync (Out) | asserted by mcbregs to memctl module if Memory Type is 10. |
| r_Mem50ns (out) | asserted by mcbregs to memctl module if Memory Speed bit is 1. |
| r_TestForEDO (out) | asserted by mcbregs to memctl module if EDO Test Mode is 1. |
| Memory RAS Select Reg | (Offset = 'hf8) Defines which RAS line to be asserted for each 4M block of memory. This register may only be written when Master Switch Enable (EPSM Setup Reg) is negated. |
| Bits 0–1 (W/R) | RAS Select for 0000000h-03FFFFFh (4M) |
| Bits 2–3 (W/R) | RAS Select for 0400000h-07FFFFFh (8M) |
| Bits 4–5 (W/R) | RAS Select for 0800000h-0BFFFFFh (12M) |
| Bits 6–8 (W/R) | RAS Select for 0C00000h-0FFFFFFh (16M) |
| . . . | |
| Bits 30–31 (W/R) | RAS Select for 3C00000h-3FFFFFFh (64M) |

RAS Selects are encoded as follows: 00 = RAS0, 01 = RAS1, 10 = RAS2, 11 = RAS3.
Defaults are always 00.

mcbregs interface for Memory RAS Select Reg

| | |
|---|---|
| r_RasSelReg[31:0](out) | passes the data from mcbregs to memctl module. |
| Memory Refresh Count Reg | (Offset = 'hfc) Defines the number of CLK cycles between refresh requests. |
| Bits 0–9 (W/R) | Refresh Count [9:0]. Refresh count times CLK period must be less than or equal to 15.625 msec. Default is 208h. (15.60 msec for 30ns CLK). |
| Bits 10–31 (RO) | Reserved. Always read 0s. |

mcbreg interface for Memory Refresh Count Reg

| | |
|---|---|
| RefReq (out) | Refresh request strobe to memctl module. Strobe may be any length since memctl detects the request on the positive edge. No ack is returned. |

MAC ADDRESS FILTERING

Filtering based on destination address is provided to direct packets to and from the CPU 230. Four filters are provided although currently there is a requirement for only two. Masking is available to include don't cares in the address compare although currently there is no requirement for this. Two filters should be set up, one with the CPU 230 individual address and the other with the BPDU multicast addresses (for spanning tree). If a packet received from a port which is not the CPU 230 hits a filter address, then the packet is forwarded to the CPU 230 and only the CPU 230 (even if BC or MC). If a packet sourced by the CPU 230 hits a filter address (BPDU address), then the packet is forwarded to the destination port specified in the filter address register. Hash table destination lookups are bypassed if a packet hits a filter address.

| | |
|---|---|
| Filter Control Reg | (Offset = 'h100) Controls MAC Destination Address filtering. |
| Bits 0–3 (W/R) | Address Filter Enables [3:0]. 1 = Enable individual dest adr filtering for corresponding Address Filter Reg [3:0]. Default 0s. |
| Bits 4–7 (W/R) | Address Mask Enables [3:0]. 1 = Enable masking if the Address Filter Reg [3:0] with the Address Filter Mask Reg. Default 0s. |
| Filter Mask Reg Low | (Offset = 'h104) Default 0s. |
| Bit 0–7 (W/R) | Byte 0 of the MAC Address mask (1 = mask address bit). |
| Bits 8–15 (W/R) | Byte 1 of the MAC Address mask (1 = mask address bit). |
| Bits 16–23 (W/R) | Byte 2 of the MAC Address mask (1 = mask address bit). |
| Bits 24–31 (W/R) | Byte 3 of the MAC Address mask (1 = mask address bit). |
| Filter Mask Reg High | (Offset = 'h108) Default = 0s. |
| Bit 0–7 (W/R) | Byte 4 of the MAC Address mask (1 = mask address bit). |
| Bits 8–15 (W/R) | Byte 5 of the MAC Address mask (1 = mask address bit). |
| Bits 16–31 (RO) | Reserved. Always read 0. |
| Filter Address Reg 0 Low | (Offset = 'h10c) |
| Bit 0–7 (W/R) | Byte 0 of the MAC Address to be forwarded. |
| Bits 8–15 (W/R) | Byte 1 of the MAC Address to be forwarded. |
| Bits 16–23 (W/R) | Byte 2 of the MAC Address to be forwarded. |
| Bits 24–31 (W/R) | Byte 3 of the MAC Address to be forwarded. |
| Filter Address Reg 0 High | (Offset = 'h110) |
| Bit 0–7 (W/R) | Byte 4 of the MAC Address to be forwarded. |
| Bits 8–15 (W/R) | Byte 5 of the MAC Address to be forwarded. |
| Bits 16–23 (W/R) | Destination Port. If the source port is the CPU 230, then this field specifies which port the packet should be forwarded to if the MAC address matches the filter address. If the source port is not the CPU 230, then this field is ignored and hits to the filter MAC address will be forwarded to the CPU 230. |
| Bits 24–31 (RO) | Reserved. Always read 0. |
| Filter Address Reg 1 Low | (Offset = 'h114) see above. |
| Filter Address Reg 1 High | (Offset = 'h118) see above. |

-continued

| | |
|---|---|
| Filter Address Reg 2 Low | (Offset = 'h11c) see above. |
| Filter Address Reg 2 High | (Offset = 'h120) see above. |
| Filter Address Reg 3 Low | (Offset = 'h124) see above. |
| Filter Address Reg 3 High | (Offset = 'h128) see above. |

mcbregs interface for address filtering

| | |
|---|---|
| SelecteAdr[47:0](in) | Destination Address from memhash module. |
| FilterHit (out) | Asserted if a filter address hit occurs. This is a combinatorial output to memhash based on the SelectedAdr and the filter regs and is evaluated continuously. Memhash knows when to sample. |
| FilterPort[7:0](out) | If the source port is the CPU 230, then FilterPort is equal to the Destination Port field from the filter register which generates a filter hit. If the source port is not the CPU 230, then FilterPort is equal to CpuPort (from the EPSM Setup Reg). |
| SourcePort[7:0](in) | Source port number from memhash module. |
| SrcPrtIsCpu | asserted if SourcePort input matches CpuPort number in EPSM Setup Reg. |

MCB INTERRUPT INFORMATION

There are eight sources of interrupts in the MCB 404. The interrupt sources will cause the CPU 230 to be interrupted if they are not masked. To allow for the information of the interrupt source to be available without the CPU 230 being interrupted, a polling mechanism is available. The masking of an interrupt source causes the interrupts to be blocked from the CPU 230, but the information is still available in the polling source register.

| | |
|---|---|
| MCB Interrupt Source Reg | (Offset = 'h12c) Source of the interrupt sent to the CPU 230. This register is updated by the EPSM 210 and then an interrupt is sent to the CPU 230. When the CPU 230 reads this register the contents are cleared. A value of 1 in a bit indicates that interrupt has occurred. Default = 32'h0000_0000. |
| Bit 0 (W/R) | Security Interrupt. If a security violation happens this interrupt occurs. |
| Bit 1 (W/R) | Memory Overflow Set. When the memory is filling up with packets and the overflow threshold is passed this interrupt occurs. |
| Bit 2 (W/R) | Memory Overflow Clear. When the memory is emptying and the overflow threshold is passed this interrupt occurs. |
| Bit 3 (W/R) | Broadcast OF Set. When the broadcast packets are filling up memory and the broadcast threshold is passed this interrupt occurs. |
| Bit 4 (W/R) | Broadcast OF Clear. When the broadcast packets are being emptied out of memory and the broadcast threshold is passed this interrupt occurs. |
| Bit 5 (W/R) | Receive OF. When a port will exceed it's allotted space for receiving packets this interrupt occurs. |
| Bit 6 (W/R) | Transmit OF. When a port which is transmitting packets will exceed it's allotted space this interrupt occurs. |
| Bit 7 (W/R) | Rx Packet Aborted. When a packet has started to be stored and it is determined that memory will be exceeded the packet is aborted and this interrupt occurs. |
| Bits 8–31 (RO) | RESERVED. Always read as 0. |

mcbregs interface for Interrupt Source Reg

| | |
|---|---|
| Interrupt Mask Reg | (Offset = 'h130) Interrupts to be masked by the CPU 230. A value of 1 in any bit indicates that interrupt is masked. Default = 32'h0000_0000. |
| Bit 0 (W/R) | Mask for the Security Interrupt. |
| Bit 1 (W/R) | Mask for the Memory Overflow Set Interrupt. |
| Bit 2 (W/R) | Mask for the Memory Overflow Clear Interrupt. |
| Bit 3 (W/R) | Mask for the Broadcast OF Set Interrupt. |
| Bit 4 (W/R) | Mask for the Broadcast OF Clear Interrupt. |
| Bit 5 (W/R) | Mask for the Receive OF Interrupt. |
| Bit 6 (W/R) | Mask for the Transmit OF Interrupt. |
| Bit 7 (W/R) | Mask for the Rx Packet Aborted Interrupt. |
| Bits 8–31 (RO) | RESERVED. Always read as 0. |
| Polling Source Reg | (Offset = 'h134) This register contains the masked interrupt information and is cleared by the CPU 230 writing a one to clear the bits desired. This allows the CPU 230 to poll instead of being interrupted. The CPU will have to mask any interrupt source that it would like to poll instead. |
| Bit 0 (W/R) | Security Interrupt. If a security violation happens this interrupt occurs. |
| Bit 1 (W/R) | Memory Overflow Set. When the memory is filling up with packets and the overflow threshold is passed this interrupt occurs. |
| Bit 2 (W/R) | Memory Overflow Clear. When the memory is emptying and the overflow threshold is passed this interrupt occurs. |
| Bit 3 (W/R) | Broadcast OF Set. When the broadcast packets are filling up memory and the broadcast threshold is passed this interrupt occurs. |
| Bit 4 (W/R) | Broadcast OF Clear. When the broadcast packets are being emptied out of memory and the broadcast threshold is passed this interrupt occurs. |
| Bit 5 (W/R) | Receive OF. When a port will exceed it's allotted space for receiving packets this interrupt occurs. |
| Bit 6 (W/R) | Transmit OF. When a port which is transmitting packets will exceed it's allotted space this interrupt occurs. |
| Bit 7 (W/R) | Rx Packet Aborted. When a packet has started to be stored and it is determined that memory will be exceeded the packet is aborted and this interrupt occurs. |
| Bits 8–31 (RO) | RESERVED. Always read as 0. |

mcbregs interface for Polling Source Reg

BACKPRESSURE

-continued

| | |
|---|---|
| Backpressure Enable | (Offset = 'h138) Bitmap for enabling backpressure. |
| Bits 0–23 (RO) | RESERVED. Always read as 0. |
| Bits 24–27 (W/R) | Bitmap. |
| Bits 28–31 (RO) | RESERVED. Always read as 0. |
| PORT BONDING | |
| There are two sets of bonded ports. Therefore there are two register to tell what ports are bonded together. | |
| Note: Only two bits in each register should be set, that is no more than two ports should be bonded together. | |
| Bonded Port Set 0 | (Offset = 'h13c) This bitmap tells which ports are bonded together in this set. |
| Bits 0–27 (W/R) | Bitmap for set 0. |
| Bits 28–31 (RO) | RESERVED. Always read as 0. |
| Bonded Port Set 1 | (Offset = 'h140) This bitmap tells which ports are bonded together in this set. |
| Bits 0–27 (W/R) | Bitmap for set 1. |
| Bits 28–31 (RO) | RESERVED. Always read as 0. |
| VLAN | |
| Default VLAN Reg | (Offset = 'h144) |

It is now appreciated that a network switch with shared and central memory system provides many advantages and overcomes many deficiencies of prior network switches. A centralized memory allows the use of less expensive DRAM devices and enables easy upgrade of the size of the memory without significant cost. The performance the DRAM devices is enhanced since the memory is consolidated and since the switch manager controls the memory rather than the processor. The switch manager is preferably implemented as an ASIC, which operates the memory faster than many processors and which also handles the refresh functions thereby alleviating the processor from a significant amount of overhead. The network switch preferably includes a memory controller, which detects and supports multiple types of memory devices, including FPM, EDO and synchronous mode DRAM.

The centralized memory stores packet data as well as the port identification information in a chain structure, including hash tables, source and destination MAC addresses as well as port count numbers and thresholds, thereby improving memory efficiency and utilization. The chained structure eliminates the need for a separate memory of link addresses, so that port information is immediately available, and allows quick access of entries corresponding to duplicate hash entries. The switch manager also performs dynamic memory sector allocation, which allows the number of sectors for each receive sector chain per port to grow or shrink as necessary.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A network switch for enabling communication among a plurality of network devices, comprising:

a plurality of network ports that receive and transmit data;

a central memory that temporarily stores at least one packet of data received at one or more of said plurality of network ports, said central memory including a packet section that temporarily stores received data and is organized into a plurality of sectors, each of said plurality of sectors including a packet sector section and a corresponding sector information section, the central memory also including a network device identification section that stores a plurality of identification entries, each of said plurality of identification entries corresponding to one of the plurality of network devices coupled to one of said plurality of network ports; and a switch manager coupled to said plurality of network ports and to said central memory, the switch manager controlling data flow between said plurality of network ports and said central memory.

2. The network switch of claim 1, further comprising:

each of said plurality of identification entries of said network device identification section including a unique network address identifying one of the plurality of network devices and a port number identifying a corresponding one of said plurality of network ports.

3. The network switch of claim 2, further comprising:

each of said plurality of identification entries of said network device identification section including a group bitmap number identifying a subset of said plurality of network ports according to a virtual local area network.

4. The network switch of claim 2, further comprising:

each of said plurality of identification entries of said network device identification section being located within said central memory at a hash address derived by hashing said unique network address.

5. The network switch of claim 4, wherein said switch manager further comprises:

hash logic that receives and hashes said unique network address to determine said hash address, and that accesses one of said plurality of identification entries within said central memory corresponding to said hash address.

6. The network switch of claim 5, wherein said hash logic further includes:

a cache memory that retrieves and locally stores a copy of data from said central memory.

7. The network switch of claim 4, further comprising:

said network device identification section being organized into a primary section and a chained section, wherein said primary section stores identification entries corresponding to a first occurrence of each hash address, and wherein said chained section stores identification entries corresponding to subsequent and identical hash addresses of different unique network addresses; and each of said plurality of identification entries further including a link address to access a subsequent identification entry within said chained section if at least one identical hash address occurs.

8. The network switch of claim 1, further comprising:

said packet sector section of each of said plurality of sectors storing packet data, where each packet of data is stored in a packet data block; and said sector information section of each of said plurality of sectors including a sector packet count identifying a number of packet data blocks of data stored in said packet sector section.

9. The network switch of claim 1, further comprising:

said switch manager initially organizing said plurality of sectors into a freepool chain of sectors, wherein said sector information section of each of said plurality of sectors includes a link address to a next sector in said freepool chain; and said switch manager forming a receive sector chain of sectors within said central memory for each of said plurality of network ports receiving at least one packet of data for storage by allocating at least one sector from said freepool chain, linking allocated sectors into a receive sector chain using said link address of each allocated sector, and storing said at least one packet of data received from one of said plurality of network ports into said receive sector chain.

10. The network switch of claim 9, further comprising:

for each packet of data to be stored, said switch manager determines if a packet sector section of a current sector in said receive sector chain is large enough to store said each packet of data, and if not, allocates a subsequent sector from said freepool chain, and then stores said each packet of data into said current sector and said subsequent sector, if allocated.

11. The network switch of claim 9, further comprising:

said packet sector section storing a portion of at least one data packet in a packet data block; and each said packet data block including a packet block header, said packet block header including a packet length value identifying the amount of data in said packet data block.

12. The network switch of claim 11, further comprising:

each said packet block header including a transmit link address to a next packet data block holding subsequent data for one of said plurality of network ports to form a transmit packet chain for said one of said plurality of network ports; and said switch manager forming a transmit packet chain for each one of said plurality of network ports from which stored data is to be transmitted.

13. The network switch of claim 12, further comprising:

said sector information section of each of said plurality of sectors including a sector packet count identifying a number of packet data blocks of data stored in said packet sector section; and said switch manager retrieving packets of data from packet data blocks within said sectors of said receive sector chains in said central memory in an order specified by a transmit packet chain and providing said retrieved packets of data to a corresponding transmit port, and when said sector packet count indicates a sector is empty, said switch manager replaces said empty sector back into said freepool chain.

14. The network switch of claim 12, further comprising:

at least one of said packet block headers comprising a broadcast packet header if said packet data is intended to be transmitted to more than one of said plurality of network ports, said broadcast packet header including a plurality of transmit link addresses for maintaining a plurality of transmit packet chains for each of said plurality of network ports from which said packet of data is to be transmitted.

15. The network switch of claim 12, wherein said switch manager further comprises:

at least one freepool control register that identifies said freepool chain;

a plurality of receive control registers, each to identify a corresponding receive sector chain for one of said plurality of network ports receiving packet data for storage; and a plurality of transmit control registers, each to identify a corresponding transmit packet chain for one of said plurality of network ports from which stored packet data is to be transmitted.

16. The network switch of claim 15, further comprising:

each of said receive control registers including a receive base pointer, a current data store pointer, a receive packet data length value, a value indicating a number of receive sectors, and a pointer to a last data packet in a corresponding transmit packet chain; and each of said transmit control registers including a transmit base pointer, a current data retrieval pointer, a transmit packet data length value, and a value indicating a number of transmit packet data blocks.

17. The network switch of claim 1, further comprising:

said central memory comprising dynamic random access memory (DRAM); and said switch manager further including a memory controller that controls data flow between said switch manager and said central memory.

18. The network switch of claim 17, wherein said memory controller further comprises:

refresh logic that maintains valid data within said central memory.

19. The network switch of claim 18, wherein said memory controller detects and supports fast page mode DRAM, extended data output DRAM and synchronous mode DRAM.

20. A network system, comprising:

a plurality of networks, each including at least one data device for sending and receiving data packets; and a network switch coupled to said plurality of networks to transfer said data packets, said network switch comprising:

a plurality of network ports that receive and transmit said data packets;

a central memory that temporarily stores said data packets received at one or more of said plurality of network ports, said central memory including a packet section that temporarily stores data and a network device identification section that stores a plurality of identification entries, each of said plurality of identification entries corresponding to one of a plurality of data devices coupled to one of said plurality of network ports, the identification entries being based on hashing an address associated with a corresponding data device; and a switch manager coupled to said plurality of network ports and to said central memory, the switch manager controlling data flow between said plurality of network ports and said central memory.

21. The network system of claim 20, further comprising:

each of said plurality of identification entries of said network device identification section being located within said central memory at a hash address derived by hashing a unique network address identifying a corresponding data device.

22. The network system of claim 21, further comprising:

said network device identification section being organized into a primary section and a chained section, wherein said primary section stores identification entries corresponding to a first occurrence of each hash address, and wherein said chained section stores identification entries corresponding to subsequent occurrences of each hash address.

23. The network system of claim 20, further comprising:

said packet section being organized into a plurality of sectors, each of said plurality of sectors storing packet data.

24. A switch for enabling communication among a plurality of devices, comprising:

a plurality of ports that receive and transmit data, each configured to couple to any one of the plurality of devices;

a central memory that temporarily stores data received at one or more of said plurality of ports, said central memory including a data section that temporarily stores received data and a device identification section that stores a plurality of identification entries, each of said plurality of identification entries being located within said central memory at a hash address derived by hashing a unique address identifying one of the plurality of devices; and a switch manager coupled to said plurality of ports and to said central memory, the switch manager controlling data flow between said plurality of ports and said central memory.

25. The switch of claim 24 further comprising:

each of said plurality of identification entries of said device identification section including an address identifying one of the plurality of devices and a port number identifying a corresponding one of said plurality of ports.

26. The switch of claim 24 further comprising:

said data section being organized into a plurality of sectors, each of said plurality of sectors including a data sector section and a corresponding sector information section.

27. The switch of claim 24 further comprising:

said switch manager detecting and supporting any one of several different types of memory devices, including fast page mode memory, extended data output memory, and synchronous mode memory.

* * * * *